(12) United States Patent
Labonte et al.

(10) Patent No.: US 12,349,765 B2
(45) Date of Patent: Jul. 8, 2025

(54) SKATE OR OTHER FOOTWEAR

(71) Applicant: Bauer Hockey Ltd., Blainville (CA)

(72) Inventors: Ivan Labonte, Montreal (CA); Jean-Francois Corbeil, Prevost (CA); Alexis Seguin, Laval (CA); Conrad Payeur, Prevost (CA); Sebastien Lambert, Saint-Jerome (CA); Garnet Alexander, Beaconsfield (CA)

(73) Assignee: BAUER HOCKEY LLC, Exeter, NH (US)

( * ) Notice: Subject to any disclaimer, the term of this patent is extended or adjusted under 35 U.S.C. 154(b) by 289 days.

(21) Appl. No.: 17/289,851

(22) PCT Filed: Oct. 29, 2019

(86) PCT No.: PCT/CA2019/051531
§ 371 (c)(1),
(2) Date: Apr. 29, 2021

(87) PCT Pub. No.: WO2020/087163
PCT Pub. Date: May 7, 2020

(65) Prior Publication Data
US 2021/0401109 A1  Dec. 30, 2021

Related U.S. Application Data

(60) Provisional application No. 62/816,465, filed on Mar. 11, 2019, provisional application No. 62/752,053, filed on Oct. 29, 2018.

(51) Int. Cl.
*A43B 5/16* (2006.01)
*A63C 1/02* (2006.01)
*B29D 35/10* (2010.01)

(52) U.S. Cl.
CPC .......... *A43B 5/1683* (2013.01); *A43B 5/1691* (2013.01); *A63C 1/02* (2013.01); *B29D 35/10* (2013.01)

(58) Field of Classification Search
CPC ... A43B 5/1683; A43B 5/1691; A43B 23/088; A43B 23/0245; A43B 23/0255; A63C 1/02; A63C 1/42; A63C 1/40; B29D 35/10
See application file for complete search history.

(56) References Cited

U.S. PATENT DOCUMENTS

| 37,934 A | 3/1863 | Yates |
| 1,371,609 A | 3/1921 | Drevitson |
| (Continued) | | |

FOREIGN PATENT DOCUMENTS

| CA | 1318502 | 6/1993 |
| CA | 2123046 | 7/1995 |
| (Continued) | | |

OTHER PUBLICATIONS

Communication pursuant to Article 94(3) issued on May 8, 2015 in connection with European Patent Application No. 14160032.0, 3 pages.

(Continued)

*Primary Examiner* — Khoa D Huynh
*Assistant Examiner* — Erick I Lopez

(57) ABSTRACT

A skate (e.g., an ice skate) or other footwear for a user. The skate or other footwear comprises a skate boot or other foot-receiving structure for receiving a foot of the user and possibly one or more other components, such as a skating device (e.g., a blade and a blade holder) disposed beneath the skate boot to engage a skating surface (e.g., ice). In some cases, at least part of the skate boot or other foot-receiving structure and optionally at least part of one or more other (Continued)

components (e.g., the skating device) may be constructed from one or more materials (e.g., foams) molded by flowing in molding equipment during a molding process (e.g., injection molding or casting). This may allow the skate or other footwear to have useful performance characteristics (e.g., reduced weight, proper fit and comfort, etc.) while being more cost-effectively manufactured.

27 Claims, 132 Drawing Sheets

(56) References Cited

U.S. PATENT DOCUMENTS

| | | | |
|---|---|---|---|
| 1,666,690 | A | 4/1928 | Drevitson |
| 1,746,297 | A | 2/1930 | Henry |
| 3,454,992 | A | 7/1969 | Santelmann |
| 3,823,493 | A | 7/1974 | Brehm et al. |
| 3,975,840 | A | 8/1976 | Juzenko |
| 4,276,254 | A | 6/1981 | Combronde |
| 4,384,413 | A | 5/1983 | Bourque |
| 4,509,276 | A | 4/1985 | Bourque |
| 4,549,742 | A | 10/1985 | Husak et al. |
| 4,869,001 | A | 9/1989 | Brown |
| 5,248,156 | A | 9/1993 | Cann et al. |
| 5,320,366 | A | 6/1994 | Shing |
| 5,484,148 | A | 1/1996 | Olivieri |
| 5,641,169 | A | 6/1997 | Bekessy |
| 5,769,434 | A | 6/1998 | Wurthner |
| 6,007,748 | A | 12/1999 | Krajcir |
| 6,109,622 | A | 8/2000 | Reynolds |
| 6,164,667 | A | 12/2000 | Olivieri |
| 6,295,679 | B1 | 10/2001 | Chenevert |
| 6,485,033 | B2 | 11/2002 | Nicoletti et al. |
| 6,761,363 | B2 | 7/2004 | Fask et al. |
| 6,932,361 | B2 | 8/2005 | Steinhauser |
| 7,287,293 | B2 | 10/2007 | Cook et al. |
| 7,316,083 | B2 | 1/2008 | Labonte |
| 7,380,801 | B2 | 6/2008 | Rudolph |
| 7,434,284 | B2 | 10/2008 | Blanc et al. |
| 7,628,405 | B2 | 12/2009 | Smith, II |
| 7,673,884 | B2 | 3/2010 | Wurthner |
| 7,758,053 | B2 | 7/2010 | Wylie et al. |
| 7,866,675 | B2 | 1/2011 | Hauser |
| 7,896,363 | B2 | 3/2011 | Lovejoy |
| 8,109,536 | B2 | 2/2012 | Labonte |
| 8,329,083 | B2 | 11/2012 | Jou et al. |
| 8,353,535 | B2 | 1/2013 | Salmon et al. |
| 8,387,286 | B2 | 3/2013 | Koyess et al. |
| 8,505,217 | B2 | 8/2013 | Stewart |
| 8,770,595 | B2 | 7/2014 | Cruikshank et al. |
| 9,004,502 | B2 | 4/2015 | Van Horne et al. |
| 9,295,901 | B2 | 3/2016 | Cruikshank et al. |
| 9,408,435 | B2 * | 8/2016 | Labonte ............... A43B 5/1691 |
| 9,510,639 | B2 | 12/2016 | Cruikshank et al. |
| 9,554,615 | B2 | 1/2017 | Labonte |
| 10,195,514 | B2 | 2/2019 | Davis et al. |
| 10,413,804 | B2 | 9/2019 | Lefebvre et al. |
| 10,532,269 | B2 | 1/2020 | Davis et al. |
| 11,130,044 | B2 | 9/2021 | Davis et al. |
| 11,406,157 | B2 | 8/2022 | Labonte et al. |
| 11,826,633 | B2 | 11/2023 | Davis et al. |
| 11,969,056 | B2 | 4/2024 | Labonté et al. |
| 2001/0022434 | A1 | 9/2001 | Sauter et al. |
| 2002/0190487 | A1 | 12/2002 | Blankenburg et al. |
| 2003/0225240 | A1 | 12/2003 | Quint |
| 2005/0134010 | A1 | 6/2005 | Blankenburg |
| 2006/0082081 | A1 | 4/2006 | Loveridge |
| 2006/0084777 | A1 | 4/2006 | Bleys |
| 2006/0108751 | A1 | 5/2006 | Labonte et al. |
| 2008/0001369 | A1 | 1/2008 | Wylie et al. |
| 2008/0100008 | A1 | 5/2008 | Wan |
| 2008/0172906 | A1* | 7/2008 | Jou ..................... A43B 23/081 12/147 R |
| 2009/0224494 | A1 | 9/2009 | Wan |
| 2009/0289427 | A1 | 11/2009 | Lovejoy |
| 2010/0139126 | A1 | 6/2010 | Koyess |
| 2010/0156058 | A1 | 6/2010 | Koyess et al. |
| 2010/0176564 | A1 | 7/2010 | Koyess et al. |
| 2010/0192412 | A1 | 8/2010 | Stewart |
| 2011/0001297 | A1 | 1/2011 | Labonte et al. |
| 2011/0101665 | A1 | 5/2011 | Van Horne et al. |
| 2011/0198834 | A1 | 8/2011 | Olivieri |
| 2011/0277250 | A1 | 11/2011 | Langvin et al. |
| 2012/0187642 | A1 | 7/2012 | Corbeil |
| 2012/0317842 | A1 | 12/2012 | McClelland |
| 2013/0038031 | A1 | 2/2013 | Cruikshank |
| 2013/0074277 | A1 | 3/2013 | Luezlbauer |
| 2013/0119580 | A1 | 5/2013 | Yang |
| 2014/0250733 | A1 | 9/2014 | Cruikshank et al. |
| 2014/0252736 | A1* | 9/2014 | Lefebvre ............... A43B 5/0496 280/11.12 |
| 2014/0265175 | A1 | 9/2014 | Labonte |
| 2016/0114239 | A1 | 4/2016 | Davis et al. |
| 2016/0236065 | A1 | 8/2016 | Cruikshank et al. |
| 2016/0332063 | A1* | 11/2016 | Van Horne ........ A43B 23/0215 |
| 2017/0080323 | A1 | 3/2017 | Dubois et al. |
| 2018/0065286 | A1 | 3/2018 | Pruitt |
| 2018/0116329 | A1* | 5/2018 | Champagne ......... A43B 5/1616 |
| 2019/0045879 | A1* | 2/2019 | Labont ................. A43B 5/1616 |
| 2019/0160363 | A1 | 5/2019 | Davis et al. |
| 2020/0222785 | A1 | 7/2020 | Davis |
| 2021/0206130 | A1 | 7/2021 | Labonte et al. |
| 2021/0394038 | A1 | 12/2021 | Davis et al. |
| 2022/0312886 | A1 | 10/2022 | Labonte et al. |
| 2024/0109263 | A1 | 4/2024 | Labonte et al. |
| 2024/0285022 | A1 | 8/2024 | Labonté et al. |

FOREIGN PATENT DOCUMENTS

| | | | |
|---|---|---|---|
| CA | 2174042 | | 11/1996 |
| CA | 2256917 | A1 * | 6/2000 ............. A43B 17/00 |
| CA | 2523481 | | 12/2004 |
| CA | 2506005 | | 8/2006 |
| CA | 2638352 | | 2/2009 |
| CA | 2935348 | | 12/2017 |
| CA | 2947087 | A1 | 4/2018 |
| CA | 3028419 | | 6/2019 |
| CA | 2909496 | | 7/2020 |
| CA | 3101479 | C | 9/2023 |
| CN | 103434062 | | 1/2016 |
| CN | 206124138 | U | 4/2017 |
| CN | 113301825 | | 8/2021 |
| DE | 4010458 | A1 | 10/1990 |
| EP | 2478937 | | 7/2012 |
| EP | 2777415 | | 9/2014 |
| FR | 1014328 | A | 8/1952 |
| FR | 1369981 | A | 8/1964 |
| FR | 2322560 | A1 | 4/1977 |
| GB | 388949 | | 3/1933 |
| GB | 776715 | | 6/1957 |
| GB | 782437 | | 9/1957 |
| GB | 784168 | | 10/1957 |
| JP | S6042106 | U | 9/1989 |
| KR | 20110007837 | | 8/2011 |
| WO | 2017136942 | | 8/2017 |
| WO | 2019222828 | | 11/2019 |
| WO | 2020087163 | | 5/2020 |
| WO | 2021237365 | | 12/2021 |
| WO | 2023205905 | A1 | 11/2023 |

OTHER PUBLICATIONS

Final Office Action issued on Mar. 1, 2016 in connection with U.S. Appl. No. 14/212,468, 20 pages.
Final Office Action issued on Mar. 22, 2017 in connection with U.S. Appl. No. 14/920,664, 8 pages.
International Preliminary Report on Patentability issued on Aug. 14, 2018 in connection with International Patent Application PCT/CA2017/050155, 9 pages.
International Search Report and Written Opinion issued on Jan. 29, 2020 in connection with International Patent Application PCT/CA2019/051531, 11 pages.

(56) References Cited

OTHER PUBLICATIONS

International Search Report issued on Jan. 22, 2019 in connection with Internation Patent Application PCT/CA2018/050617, 4 pages.
International Search Report issued on May 19, 2017 in connection with International Patent Application PCT/CA2017/050155, 4 pages.
Non-Final Office Action issued on Jan. 28, 2021 in connection with U.S. Appl. No. 16/712,094, 8 pages.
Non-Final Office Action issued on Mar. 7, 2018, in connection with U.S. Appl. No. 14/920,664, 7 pages.
Non-Final Office Action issued on May 22, 2019 in connection with U.S. Appl. No. 16/225,095, 20 pages.
Non-Final Office Action issued on Sep. 10, 2015 in connection with U.S. Appl. No. 14/212,468, 15 pages.
Non-final Office Action issued on Sep. 14, 2016 in connection with U.S. Appl. No. 14/920,664, 7 pages.
Non-Final Office Action issued on Sep. 26, 2017 in connection with U.S. Appl. No. 14/920,664, 8 pages.
Notice of Allowance issued on May 26, 2021 in connection with U.S. Appl. No. 16/712,094, 25 pages.
Notice of Allowance issued on Sep. 19, 2018 in connection with U.S. Appl. No. 14/920,664, 7 pages.
Notice of Allowance issued on Sep. 9, 2019 in connection with U.S. Appl. No. 16/225,095, 7 pages.
Non-Final Office Action issued on Apr. 7, 2021 in connection with U.S. Appl. No. 16/076,986, 22 pages.
Restriction Requirement issued on May 15, 2015 in connection with U.S. Appl. No. 14/212,468, 8 pages.
Restriction Requirement issued Mar. 14, 2016 in connection with U.S. Appl. No. 14/920,664, 8 pages.
Written Opinion issued on Jan. 22, 2019 in connection with Internation Patent Application PCT/CA2018/050617, 4 pages.
Written Opinion issued on May 19, 2017 in connection with International Patent Application PCT/CA2017/050155, 8 pages.
International Search Report and Written Opinion issued on Sep. 3, 2021 in connection with International Patent Application PCT/CA2021/050727, 15 pages.
Examiner's Report issued on Nov. 19, 2021 in connection with Canadian Patent Application No. 3,101,479, 3 pages.
Notice of allowance issued on Nov. 16, 2021 in connection with U.S. Appl. No. 16/076,986, 8 pages.
Corrected Notice of Allowability issued on Dec. 1, 2021 in connection with U.S. Appl. No. 16/076,986, 11 pages.
Office Action issued on Feb. 20, 2023 in connection with Chinese Patent Application No. 201980085564.0, 19 pages.
Restriction requirement issued on Apr. 3, 2023 in connection with U.S. Appl. No. 17/059,137, 6 pages.
Non-Final Office Action issued on May 25, 2023 in connection with U.S. Appl. No. 17/059,137, 10 pages.
Office Action issued on May 31, 2023 in connection with Chinese Patent Application No. 201880095854,9, 19 pages.
Examiner's Report issued on Feb. 22, 2023 in connection with Canadian Patent Application No. 3,014,387, 3 pages.
Non-Final Office Action issued on Jan. 12, 2023 in connection with U.S. Appl. No. 17/467,562, 56 pages.
Office Action issued on Dec. 5, 2022 in connection with Chinese Patent Application No. 201880095854.9, 15 pages.
Examiner's Report issued on May 12, 2022 in connection with Canadian Patent Application No. 3,101,479, 3 pages.
Extended European Search Report issued on Jul. 8, 2022 in connection with European Patent Application No. 1987065.1, 7 pages.
Notifications of the first Office Action issued on Jul. 7, 2022 in connection with Chinese Patent Application No. 201980085564.0, 11 pages.
Written Opinion of the international preliminary examining authority issued on Jul. 28, 2022 in connection with International Patent Application No. PCT/CA2021/050727, 9 pages.
Extended European Search Report issued on Dec. 14, 2021 in connection with European patent application No. 18919912.8, 11 pages.
Notice of allowance issued on Mar. 16, 2022 in connection with U.S. Appl. No. 16/076,986, 13 pages.
Notification to Make Divisional Application issued on Apr. 12, 2022 in connection with the Chinese Patent Application No. 201980085564,0, 2 pages.
Office Action issued on Apr. 24, 2022 in connection with Chinese Patent Application No. 201880095854,9, 4 pages.
International Search Report and Written Opinion issued on Aug. 9, 2023 in connection with International PCT Patent Application No. PCT/CA2023/050578, 15 pages.
Non-Final Office Action issued on Aug. 9, 2023 in connection with U.S. Appl. No. 17/842,867, 15 pages.
Notice of Allowance issued on Jul. 20, 2023 in connection with U.S. Appl. No. 17/467,562, 13 pages.
Examiner's Report issued in connection with CA Patent Application No. 3185309 on Mar. 15, 2024, 3 pages.
Examiner's Report issued on Feb. 8, 2024 in connection with Canadian Patent Application No. 3118214, 3 pages.
Examiner's Report issued on Mar. 11, 2024 in connection with Canadian Patent Application No. 3014387, 3 pages.
Final Action issued on Jan. 17, 2024 in connection with U.S. Appl. No. 17/059,137, 23 pages.
Notice of Allowance issued on Jan. 5, 2024 in connection with U.S. Appl. No. 17/842,867, 15 pages.
Non-Final Office Action issued on Jun. 20, 2024 in connection with U.S. Appl. No. 17/059,137, 11 pages.
Non-Final Office Action issued on Sep. 23, 2024 in connection with U.S. Appl. No. 18/070,263, 15 pages.
Restriction Requirement issued on Jun. 26, 2024 in connection with U.S. Appl. No. 18/070,263, 6 pages.
Final Office Action issued on Dec. 10, 2024 in connection with U.S. Appl. No. 17/059,137, 14 pages.

* cited by examiner

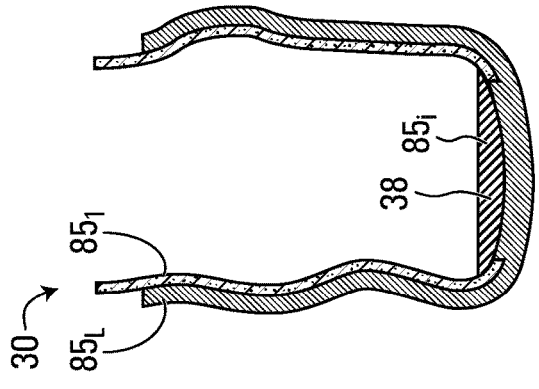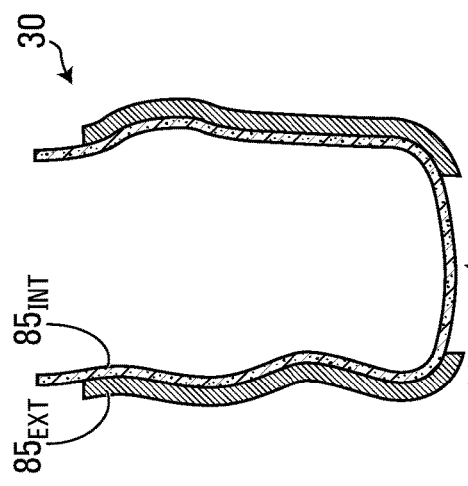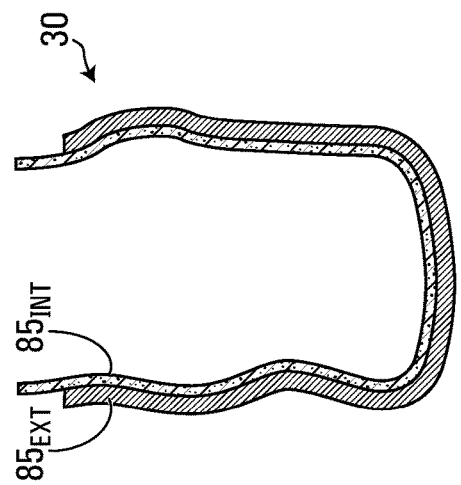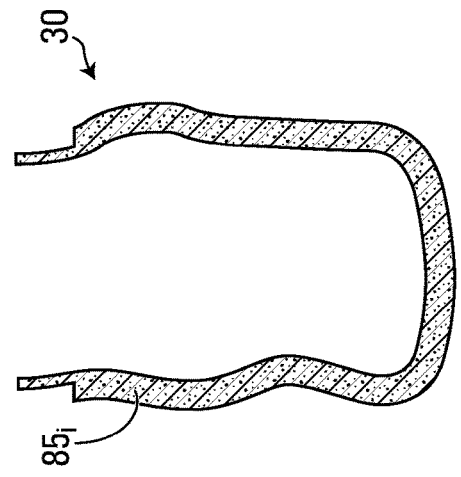

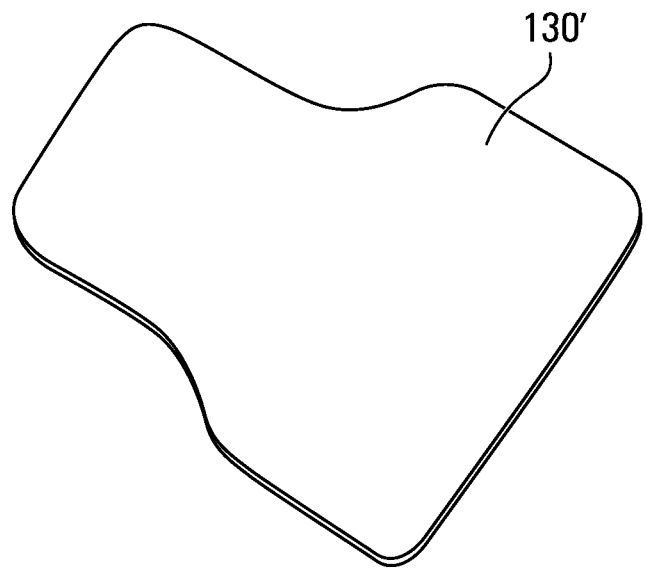
FIG. 66A
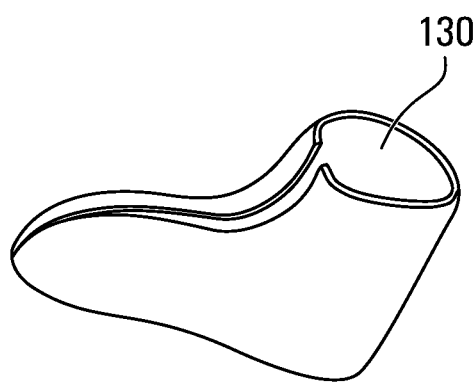 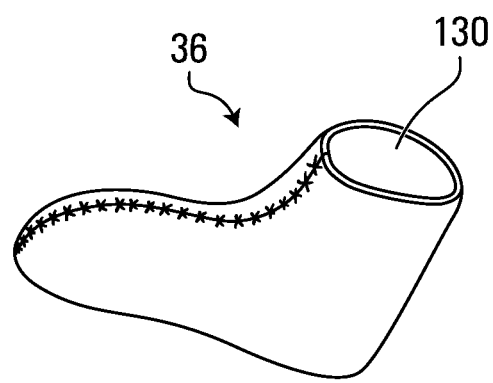
FIG. 66B     FIG. 67

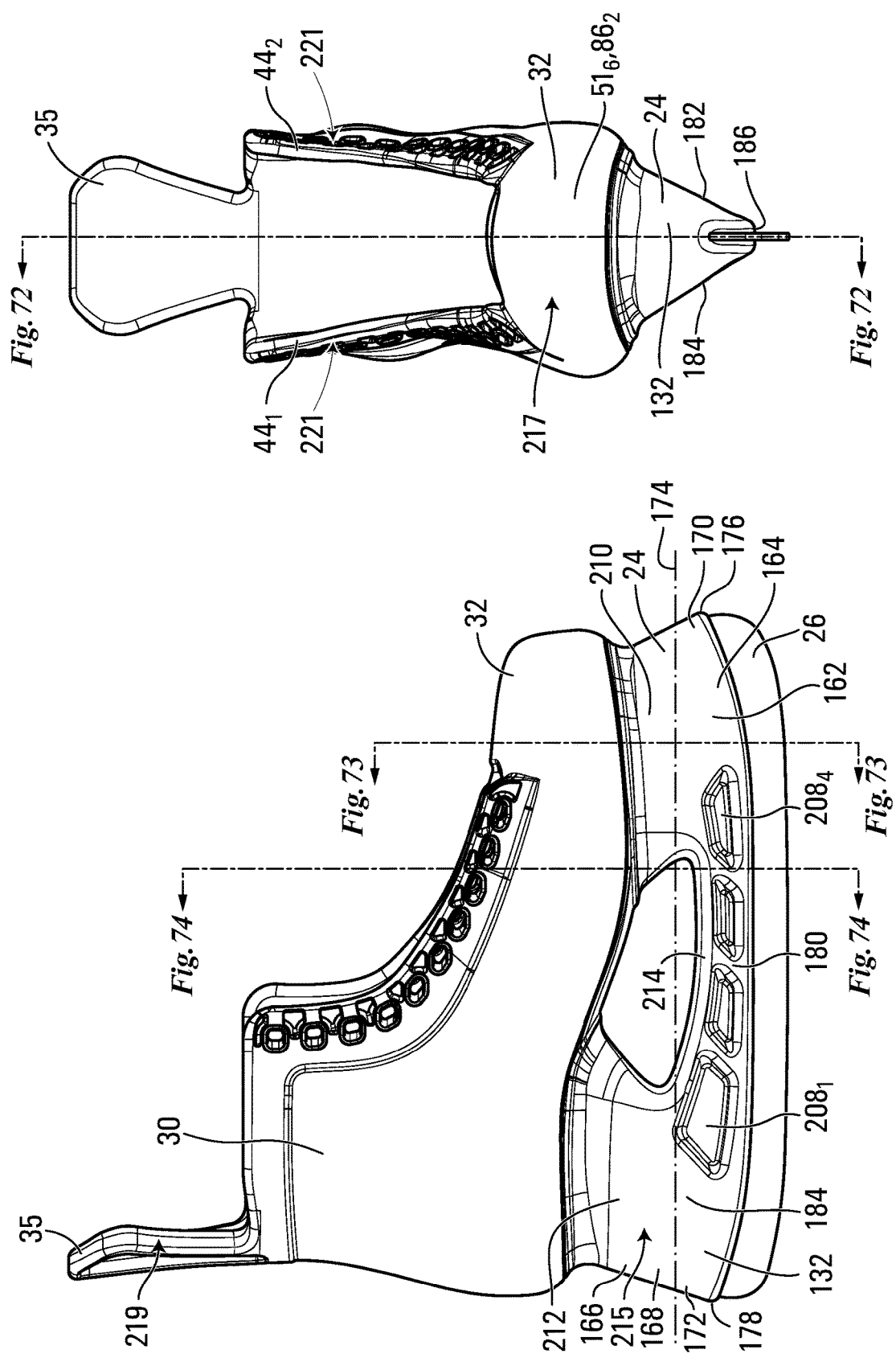

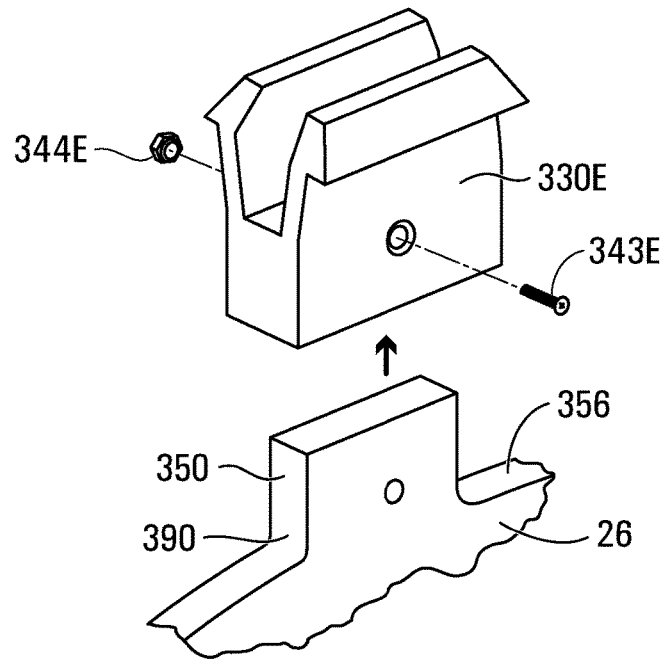
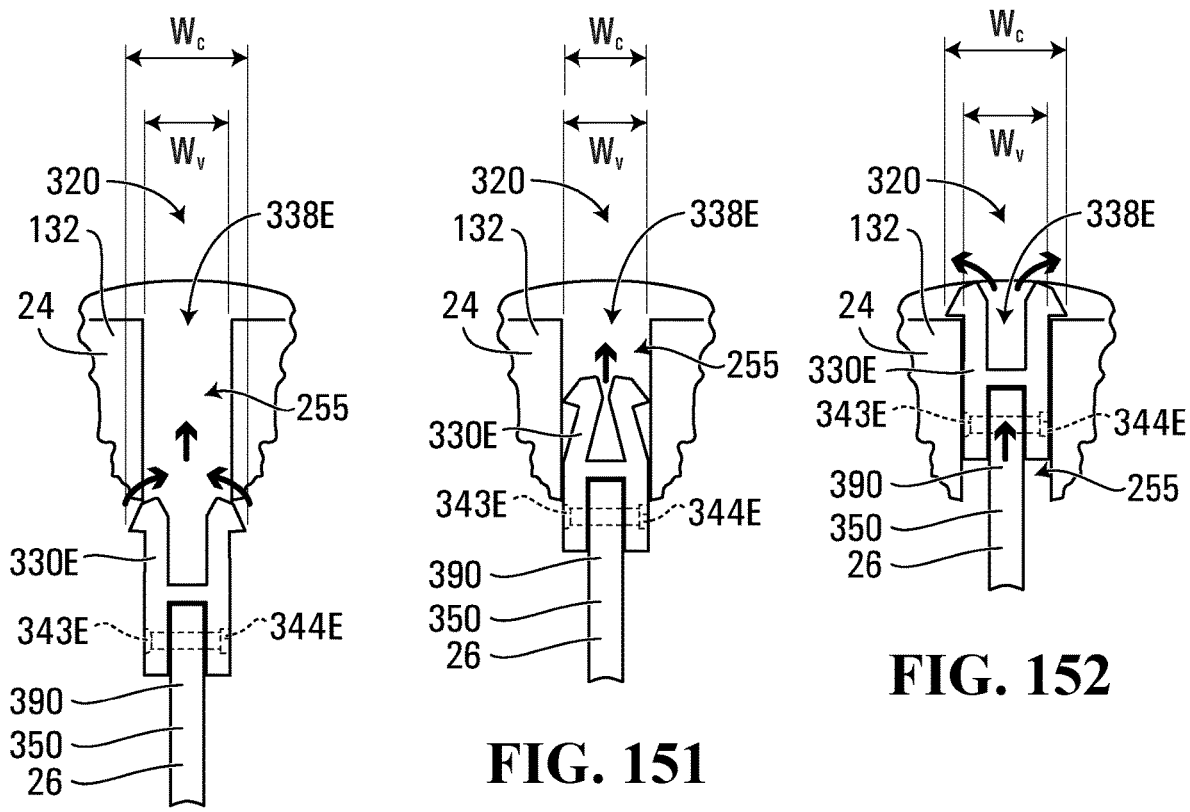

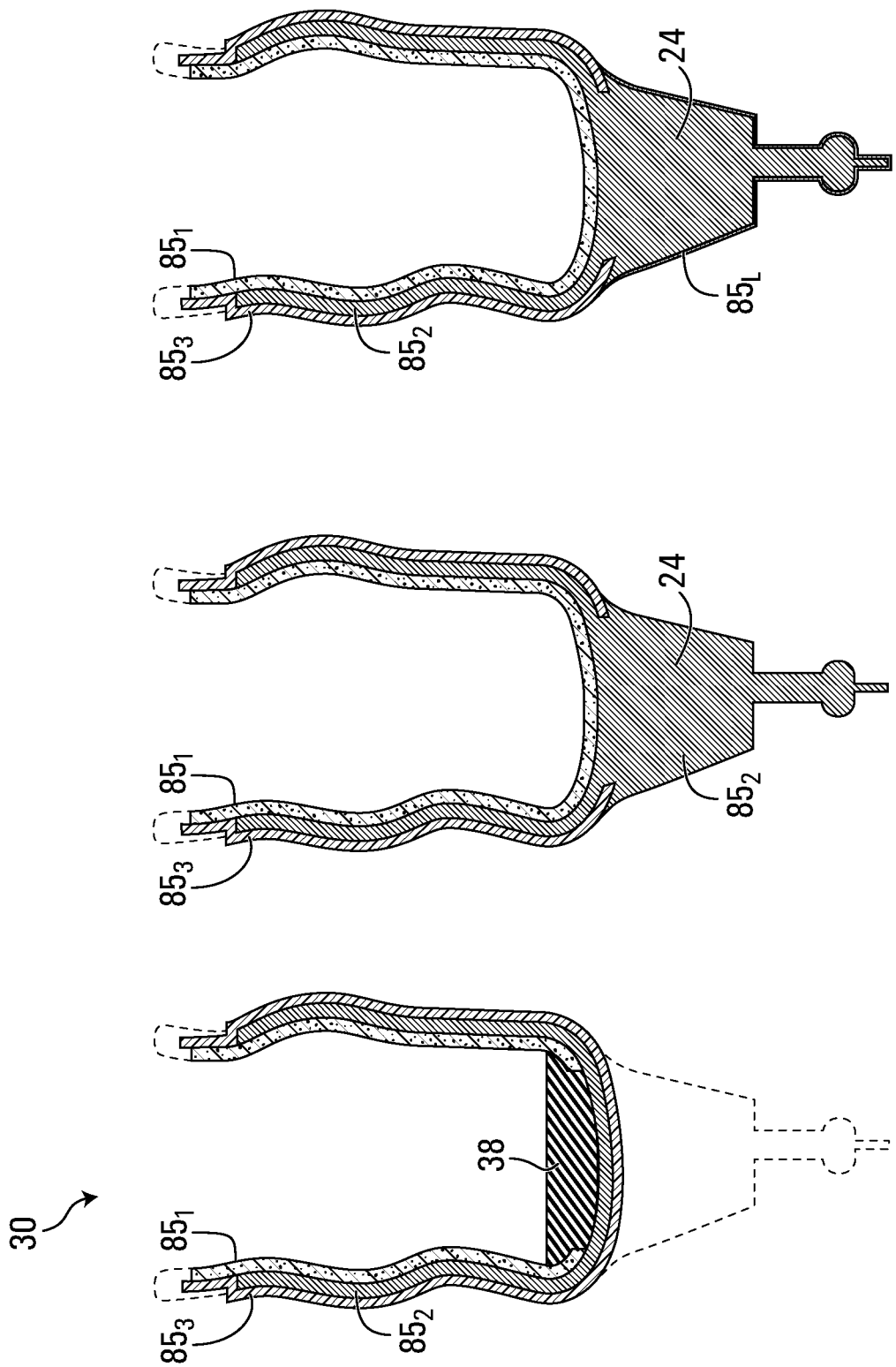

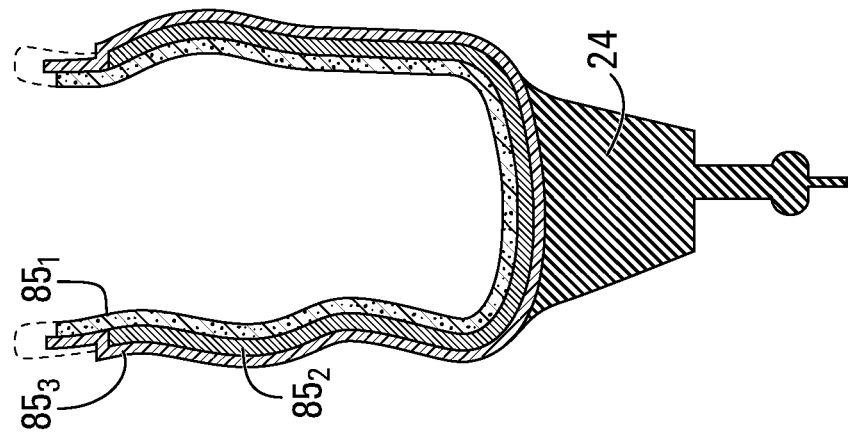
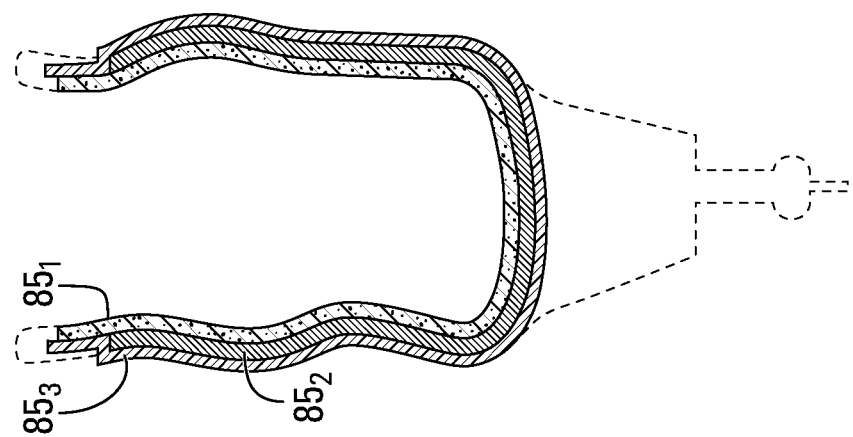
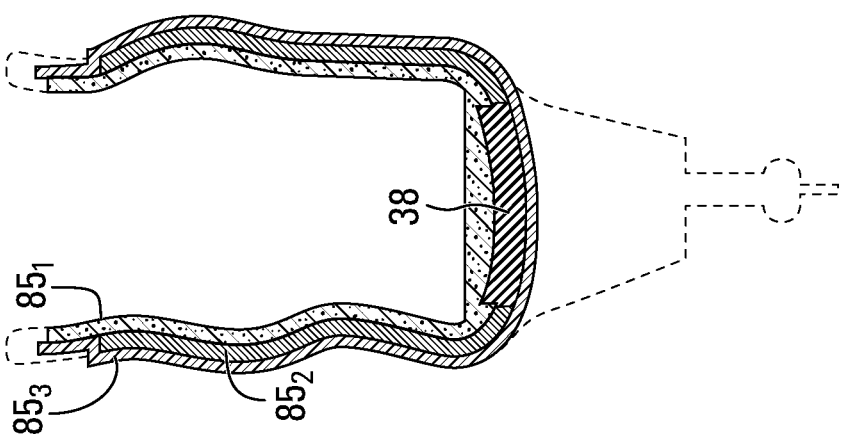

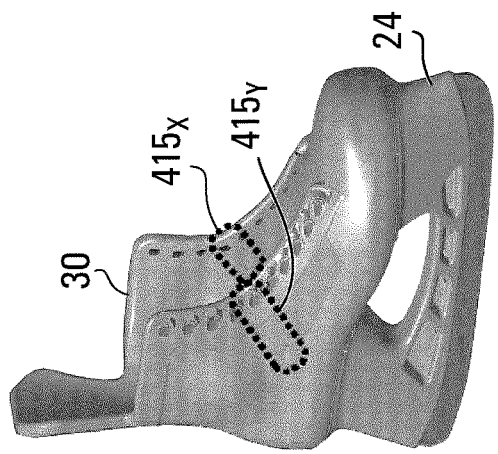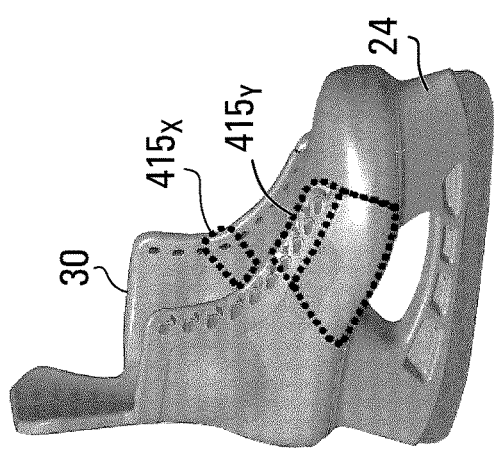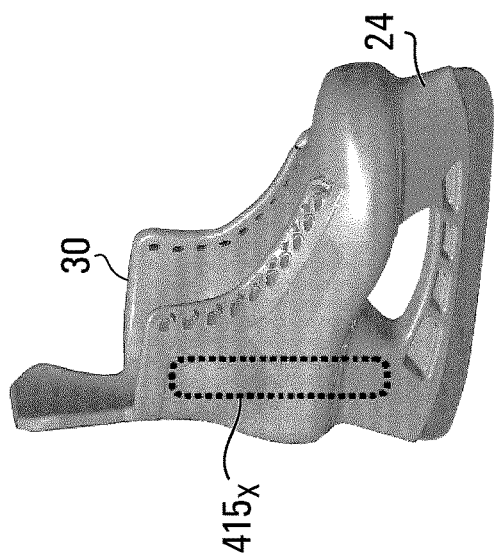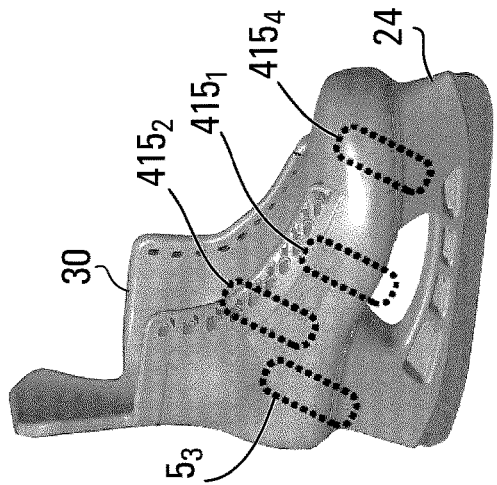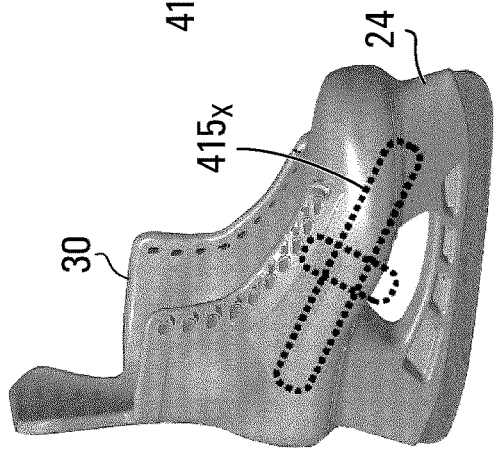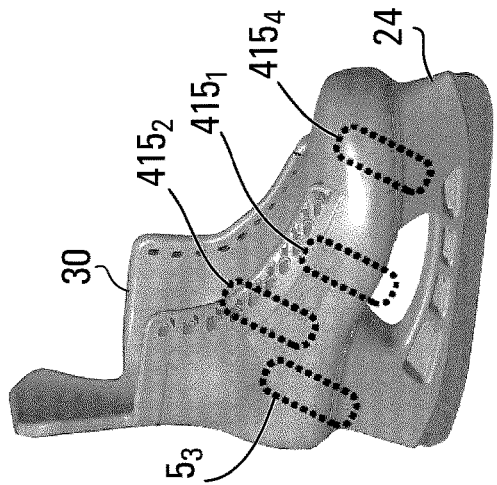

SKATE OR OTHER FOOTWEAR

CROSS-REFERENCE TO RELATED APPLICATIONS

This application is a national stage of International Application PCT/CA2019/051531 filed on Oct. 29, 2019, which claims priority from U.S. Provisional Patent Application 62/752,053 filed on Oct. 29, 2018 and from U.S. Provisional Patent Application 62/816,465 filed on Mar. 11, 2019, and each of these applications are incorporated by reference herein.

FIELD

This disclosure generally relates to footwear, including skates (e.g., ice skates) such as for playing hockey and/or other skating activities and other footwear.

BACKGROUND

Skates are used by skaters in various sports such as ice hockey, roller hockey, etc. A skate comprises a skate boot that typically comprises a number of components that are assembled together to form the skate boot. This can include a body, sometimes referred to as a "shell", a toe cap, a tongue, a tendon guard, etc.

For example, an approach to manufacturing a shell of a skate boot of conventional skates consists of thermoforming different layers of synthetic material and then assembling these layers to form the shell. However, such conventional skates may sometimes be overly heavy, uncomfortable, lacking in protection in certain areas, and/or a bad fit on a skater's foot. Moreover, such conventional skates can be expensive to manufacture.

Also, a skating device, such as a blade holder holding a blade for ice skating or a wheel holder holding wheels for roller skating (e.g., inline skating), is normally fastened under a skate boot. This may add attachment, manufacturing, and/or other issues.

Similar considerations may arise for other types of footwear (e.g., ski boots, snowboarding boots, motorcycle boots, work boots, etc.).

For these and/or other reasons, there is a need for improvements directed to skates and other footwear.

SUMMARY

In accordance with various aspects of this disclosure, there is provided a skate (e.g., an ice skate) or other footwear for a user. The skate or other footwear comprises a skate boot or other foot-receiving structure for receiving a foot of the user and possibly one or more other components, such as a skating device (e.g., a blade and a blade holder) disposed beneath the skate boot to engage a skating surface. In some cases, at least part of the skate boot or other foot-receiving structure and optionally at least part of one or more other components (e.g., the skating device) of the skate or other footwear may be constructed from one or more materials (e.g., foams) molded by flowing in molding equipment during a molding process (e.g., injection molding or casting). This may allow the skate or other footwear to have useful performance characteristics (e.g., reduced weight, proper fit and comfort, etc.) while being more cost-effectively manufactured.

In accordance with an aspect of the disclosure, there is provided a skate boot for a skate, the skate boot being configured to receive a foot of a user. The skate boot comprises: a body comprising a medial side portion configured to face a medial side of the user's foot, a lateral side portion configured to face a lateral side of the user's foot, and a heel portion configured to receive a heel of the user's foot; and a tendon guard configured to face an Achilles tendon of the user, extending upwardly from the body of the skate boot, and affixed to the body of the skate boot by overmolding.

In accordance with another aspect of the disclosure, there is provided a skate boot for a skate, the skate boot being configured to receive a foot of a user. The skate boot comprises: a body comprising a medial side portion configured to face a medial side of the user's foot, a lateral side portion configured to face a lateral side of the user's foot, and a heel portion configured to receive a heel of the user's foot that are formed integrally with one another, the body of the skate boot including a plurality of layers formed integrally with one another by flowing in a molding apparatus; and a tendon guard configured to face an Achilles tendon of the user, extending upwardly from the body of the skate boot, and affixed to the body of the skate boot by overmolding of at least one of the layers of the body of the skate boot onto the tendon guard.

In accordance with another aspect of the disclosure, there is provided a skate boot for a skate, the skate boot being configured to receive a foot of a user. The skate boot comprises: a body comprising a medial side portion configured to face a medial side of the user's foot, a lateral side portion configured to face a lateral side of the user's foot, an ankle portion configured to receive an ankle of the user, and a heel portion configured to receive a heel of the user's foot that are formed integrally with one another, the body of the skate boot including a plurality of layers formed integrally with one another by flowing in a molding apparatus; a liner disposed inwardly of the body of the skate boot; and a pad disposed between the liner and the body of the skate boot.

In accordance with another aspect of the disclosure, there is provided a skate boot for a skate, the skate boot being configured to receive a foot of a user. The skate boot comprises: a medial side portion configured to face a medial side of the user's foot; a lateral side portion configured to face a lateral side of the user's foot; an ankle portion configured to receive an ankle of the user; a heel portion configured to receive a heel of the user's foot; a heel-locking pad configured to project forwardly above a rearwardly-projecting part of the user's heel.

In accordance with another aspect of the disclosure, there is provided a skate boot for a skate, the skate boot being configured to receive a foot of a user. The skate boot comprises: a body that comprises a medial side portion configured to face a medial side of the user's foot, a lateral side portion configured to face a lateral side of the user's foot, a toe portion configured to receive toes of the user's foot, and a heel portion configured to receive a heel of the user's foot which are formed integrally with one another. The body of the skate boot comprises: a plurality of layers formed integrally with one another by flowing in a molding apparatus; and a layer formed other than by flowing in the molding apparatus.

In accordance with another aspect of the disclosure, there is provided a skate boot for a skate, the skate boot being configured to receive a foot of a user. The skate boot comprises: a body comprising a medial side portion configured to face a medial side of the user's foot, a lateral side portion configured to face a lateral side of the user's foot, a toe portion configured to receive toes of the user's foot, and a heel portion configured to receive a heel of the user's foot which are formed integrally with one another, the body of the skate boot including a plurality of layers formed integrally with one another by flowing in a molding apparatus; and an insole affixed to the body of the skate boot.

In accordance with another aspect of the disclosure, there is provided a skate boot for a skate, the skate boot being configured to receive a foot of a user. The skate boot comprises: a body that comprises a medial side portion configured to face a medial side of the user's foot, a lateral side portion configured to face a lateral side of the user's foot, and a heel portion configured to receive a heel of the user's foot which are formed integrally with one another by flowing in a molding apparatus, the body of the skate boot including a layer including a plurality of materials different from one another and disposed adjacent to one another in a direction of extent of the layer of the body of the skate boot that is normal to a thicknesswise direction of the layer of the body of the skate boot.

In accordance with another aspect of the disclosure, there is provided a skate boot for a skate, the skate boot being configured to receive a foot of a user. The skate boot comprises: a body that comprises a medial side portion configured to face a medial side of the user's foot, a lateral side portion configured to face a lateral side of the user's foot, a toe portion configured to receive toes of the user's foot, and a heel portion configured to receive a heel of the user's foot which are formed integrally with one another, the body of the skate boot including a plurality of layers formed integrally with one another by flowing in a molding apparatus, a given one of the layers of the body of the skate boot including a plurality of materials different from one another and disposed adjacent to one another in a direction of extent of the given one of the layers of the body of the skate boot that is normal to a thicknesswise direction of the given one of the layers of the body of the skate boot.

In accordance with another aspect of the disclosure, there is provided a skate boot for a skate, the skate boot being configured to receive a foot of a user. The skate boot comprises: a body comprising a medial side portion configured to face a medial side of the user's foot, a lateral side portion configured to face a lateral side of the user's foot, a toe portion configured to receive toes of the user's foot, and a heel portion configured to receive a heel of the user's foot that are formed integrally with one another; and a graphical element disposed at least in the toe portion of the body of the skate boot.

In accordance with another aspect of the disclosure, there is provided a skate boot for a skate, the skate boot being configured to receive a foot of a user. The skate boot comprises: a medial side portion configured to face a medial side of the user's foot; a lateral side portion configured to face a lateral side of the user's foot; a heel portion configured to receive a heel of the user's foot; a toe portion configured to receive toes of the user's foot; and a graphical element disposed at least in the toe portion and occupying at least a substantial part of a surface area of the toe portion that is externally visible.

In accordance with another aspect of the disclosure, there is provided a skate boot for a skate, the skate boot being configured to receive a foot of a user. The skate boot comprises: a medial side portion configured to face a medial side of the user's foot; a lateral side portion configured to face a lateral side of the user's foot; a heel portion configured to receive a heel of the user's foot; a toe portion configured to receive toes of the user's foot; and a graphical element disposed at least in the toe portion and in a given one of the medial side portion and the lateral side portion. There is continuity of the graphical element between the toe portion and the given one of the medial side portion and the lateral side portion.

In accordance with another aspect of the disclosure, there is provided footwear for a user, the footwear being configured to receive the user's foot and comprising skate boot for a skate, the skate boot being configured to receive a foot of a user. The skate boot comprises: a body comprising a medial side portion configured to face a medial side of the user's foot, a lateral side portion configured to face a lateral side of the user's foot, and a heel portion configured to receive a heel of the user's foot; and a tendon guard configured to face an Achilles tendon of the user, extending upwardly from the body of the skate boot, and affixed to the body of the skate boot by overmolding.

In accordance with another aspect of the disclosure, there is provided footwear for a user, the footwear being configured to receive a foot of a user and comprising skate boot for a skate, the skate boot being configured to receive the user's foot. The skate boot comprises: a body comprising a medial side portion configured to face a medial side of the user's foot, a lateral side portion configured to face a lateral side of the user's foot, and a heel portion configured to receive a heel of the user's foot that are formed integrally with one another, the body of the skate boot including a plurality of layers formed integrally with one another by flowing in a molding apparatus; and a tendon guard configured to face an Achilles tendon of the user, extending upwardly from the body of the skate boot, and affixed to the body of the skate boot by overmolding of at least one of the layers of the body of the skate boot onto the tendon guard.

In accordance with another aspect of the disclosure, there is provided footwear for a user, the footwear being configured to receive a foot of a user and comprising skate boot for a skate, the skate boot being configured to receive the user's foot. The skate boot comprises: a body comprising a medial side portion configured to face a medial side of the user's foot, a lateral side portion configured to face a lateral side of the user's foot, an ankle portion configured to receive an ankle of the user, and a heel portion configured to receive a heel of the user's foot that are formed integrally with one another, the body of the skate boot including a plurality of layers formed integrally with one another by flowing in a molding apparatus; a liner disposed inwardly of the body of the skate boot; and a pad disposed between the liner and the body of the skate boot.

In accordance with another aspect of the disclosure, there is provided footwear for a user, the footwear being configured to receive a foot of a user and comprising skate boot for a skate, the skate boot being configured to receive the user's foot. The skate boot comprises: a medial side portion configured to face a medial side of the user's foot; a lateral side portion configured to face a lateral side of the user's foot; an ankle portion configured to receive an ankle of the user; a heel portion configured to receive a heel of the user's foot; a heel-locking pad configured to project forwardly above a rearwardly-projecting part of the user's heel.

In accordance with another aspect of the disclosure, there is provided footwear for a user, the footwear being configured to receive a foot of a user and comprising skate boot for a skate, the skate boot being configured to receive the user's foot. The skate boot comprises: a body that comprises a medial side portion configured to face a medial side of the user's foot, a lateral side portion configured to face a lateral side of the user's foot, a toe portion configured to receive toes of the user's foot, and a heel portion configured to receive a heel of the user's foot which are formed integrally with one another. The body of the skate boot comprises: a plurality of layers formed integrally with one another by flowing in a molding apparatus; and a layer formed other than by flowing in the molding apparatus.

In accordance with another aspect of the disclosure, there is provided footwear for a user, the footwear being configured to receive a foot of a user and comprising skate boot for a skate, the skate boot being configured to receive the user's foot. The skate boot comprises: a body comprising a medial side portion configured to face a medial side of the user's foot, a lateral side portion configured to face a lateral side of the user's foot, a toe portion configured to receive toes of the user's foot, and a heel portion configured to receive a heel of the user's foot which are formed integrally with one another, the body of the skate boot including a plurality of layers formed integrally with one another by flowing in a molding apparatus; and an insole affixed to the body of the skate boot.

In accordance with another aspect of the disclosure, there is provided footwear for a user, the footwear being configured to receive a foot of a user and comprising skate boot for a skate, the skate boot being configured to receive the user's foot. The skate boot comprises: a body that comprises a medial side portion configured to face a medial side of the user's foot, a lateral side portion configured to face a lateral side of the user's foot, and a heel portion configured to receive a heel of the user's foot which are formed integrally with one another by flowing in a molding apparatus, the body of the skate boot including a layer including a plurality of materials different from one another and disposed adjacent to one another in a direction of extent of the layer of the body of the skate boot that is normal to a thicknesswise direction of the layer of the body of the skate boot.

In accordance with another aspect of the disclosure, there is provided footwear for a user, the footwear being configured to receive a foot of a user and comprising skate boot for a skate, the skate boot being configured to receive the user's foot. The skate boot comprises: a body that comprises a medial side portion configured to face a medial side of the user's foot, a lateral side portion configured to face a lateral side of the user's foot, a toe portion configured to receive toes of the user's foot, and a heel portion configured to receive a heel of the user's foot which are formed integrally with one another, the body of the skate boot including a plurality of layers formed integrally with one another by flowing in a molding apparatus, a given one of the layers of the body of the skate boot including a plurality of materials different from one another and disposed adjacent to one another in a direction of extent of the given one of the layers of the body of the skate boot that is normal to a thicknesswise direction of the given one of the layers of the body of the skate boot.

In accordance with another aspect of the disclosure, there is provided footwear for a user, the footwear being configured to receive a foot of a user and comprising skate boot for a skate, the skate boot being configured to receive the user's foot. The skate boot comprises: a body comprising a medial side portion configured to face a medial side of the user's foot, a lateral side portion configured to face a lateral side of the user's foot, a toe portion configured to receive toes of the user's foot, and a heel portion configured to receive a heel of the user's foot that are formed integrally with one another; and a graphical element disposed at least in the toe portion of the body of the skate boot.

In accordance with another aspect of the disclosure, there is provided footwear for a user, the footwear being configured to receive a foot of a user and comprising skate boot for a skate, the skate boot being configured to receive the user's foot. The skate boot comprises: a medial side portion configured to face a medial side of the user's foot; a lateral side portion configured to face a lateral side of the user's foot; a heel portion configured to receive a heel of the user's foot; a toe portion configured to receive toes of the user's foot; and a graphical element disposed at least in the toe portion and occupying at least a substantial part of a surface area of the toe portion that is externally visible.

In accordance with another aspect of the disclosure, there is provided footwear for a user, the footwear being configured to receive a foot of a user and comprising skate boot for a skate, the skate boot being configured to receive the user's foot. The skate boot comprises: a medial side portion configured to face a medial side of the user's foot; a lateral side portion configured to face a lateral side of the user's foot; a heel portion configured to receive a heel of the user's foot; a toe portion configured to receive toes of the user's foot; and a graphical element disposed at least in the toe portion and in a given one of the medial side portion and the lateral side portion. There is continuity of the graphical element between the toe portion and the given one of the medial side portion and the lateral side portion.

In accordance with another aspect, this disclosure relates to a skate for skating on ice. The skate comprises a skate boot configured to receive a foot of a user, the skate boot comprising a body that comprises a medial side portion to face a medial side of the user's foot, a lateral side portion to face a lateral side of the user's foot, a heel portion to receive a heel of the user's foot, and an ankle portion to receive an ankle of the user. The skate comprises a blade holder disposed below the skate boot and configured to hold a blade for engaging the ice, the blade holder comprising a body that is at least partly formed integrally with the body of the skate boot, the blade holder comprising a quick-connect system configured to attach the blade to and detach the blade from the blade holder.

In accordance with another aspect, this disclosure relates to a skate for skating on ice. The skate comprises a skate boot configured to receive a foot of a user, the skate boot comprising a body that comprises a medial side portion to face a medial side of the user's foot, a lateral side portion to face a lateral side of the user's foot, a heel portion to receive a heel of the user's foot, and an ankle portion to receive an ankle of the user. The skate comprises a blade holder disposed below the skate boot and configured to hold a blade for engaging the ice, the blade holder comprising a body and a connection system that is configured to attach the blade to and detach the blade from the blade holder. At least part of the body of the skate boot and at least part of the body of the blade holder are formed integrally with one another by flow of material in a molding apparatus.

In accordance with another aspect, this disclosure relates to a skate for skating on ice. The skate comprises a skate boot configured to receive a foot of a user, the skate boot comprising a body that comprises a medial side portion to face a medial side of the user's foot, a lateral side portion to face a lateral side of the user's foot, a heel portion to receive a heel of the user's foot, and an ankle portion to receive an ankle of the user. The skate comprises a blade holder disposed below the skate boot and configured to hold a blade for engaging the ice, the blade holder comprising a body that is at least partly formed integrally with the body of the skate boot, the blade holder comprising a connection system configured to attach the blade to and detach the blade from the blade holder without using a screwdriver when the blade is positioned in the blade holder.

In accordance with another aspect, this disclosure relates to a skate for skating on ice. The skate comprises a skate boot configured to receive a foot of a user, the skate boot comprising a body that comprises a medial side portion to face a medial side of the user's foot, a lateral side portion to face a lateral side of the user's foot, a heel portion to receive a heel of the user's foot, and an ankle portion to receive an ankle of the user. The skate comprises a blade holder disposed below the skate boot and configured to hold a blade for engaging the ice, the blade holder comprising a body that is at least partly formed integrally with the body of the skate boot, the blade holder comprising a connection system configured to attach the blade to and detach the blade from the blade holder screwlessly when the blade is positioned in the blade holder.

In accordance with another aspect, this disclosure relates to a skate for skating on ice. The skate comprises a skate boot configured to receive a foot of a user, the skate boot comprising a body that comprises a medial side portion to face a medial side of the user's foot, a lateral side portion to face a lateral side of the user's foot, a heel portion to receive a heel of the user's foot, and an ankle portion to receive an ankle of the user. The skate comprises a blade holder disposed below the skate boot and configured to hold a blade for engaging the ice, the blade holder comprising a body that is at least partly formed integrally with the body of the skate boot, the blade holder comprising a connector movable relative to the body of the blade holder to attach the blade to and detach the blade from the blade holder.

In accordance with another aspect, this disclosure relates to a skate for skating on ice. The skate comprises a blade holder for holding a blade to engage the ice, the skate boot being configured to receive a foot of a user. The skate boot comprises a body comprising a medial side portion to face a medial side of the user's foot, a lateral side portion to face a lateral side of the user's foot, a heel portion to receive a heel of the user's foot, an ankle portion to receive an ankle of the user, and a sole portion to face a plantar surface of the user's foot that are formed integrally with one another by flow of material in a molding apparatus. The skate boot comprises a connecting member configured to fasten the blade holder to the skate boot and placed in the molding apparatus such that the body of the skate boot is molded onto the connecting member.

In accordance with another aspect, this disclosure relates to a molding apparatus for molding a body of a skate boot of a skate for skating on ice, the skate comprising a blade holder for holding a blade to engage the ice. The molding apparatus comprises a mold for molding the body of the skate boot such that the body of the skate boot comprises a medial side portion to face a medial side of the user's foot, a lateral side portion to face a lateral side of the user's foot, a heel portion to receive a heel of the user's foot, an ankle portion to receive an ankle of the user, and a sole portion to face a plantar surface of the user's foot that are formed integrally with one another. The molding apparatus comprises an insert placeable in the molding apparatus and configured to adjust a position of the skate boot relative to the blade holder when the blade holder is connected to the skate boot.

In accordance with another aspect, this disclosure relates to a method of molding a body of a skate boot of a skate for skating on ice, the skate comprising a blade holder for holding a blade to engage the ice. The method comprises: molding the body of the skate boot in a molding apparatus such that the body of the skate boot comprises a medial side portion to face a medial side of the user's foot, a lateral side portion to face a lateral side of the user's foot, a heel portion to receive a heel of the user's foot, an ankle portion to receive an ankle of the user, and a sole portion to face a plantar surface of the user's foot that are formed integrally with one another; and placing an insert in the molding apparatus to adjust a position of the skate boot relative to the blade holder when the blade holder is connected to the skate boot.

In accordance with another aspect, this disclosure relates to a skate for skating on ice. The skate comprises a blade holder for holding a blade to engage the ice, the skate boot being configured to receive a foot of a user. The skate boot comprises a body comprising a medial side portion to face a medial side of the user's foot, a lateral side portion to face a lateral side of the user's foot, a heel portion to receive a heel of the user's foot, an ankle portion to receive an ankle of the user, a sole portion to face a plantar surface of the user's foot, and a blade-holder-connecting portion projecting downwardly from the sole portion that are formed integrally with one another. The skate boot comprises a connecting member disposed between the blade holder and the blade-holder-connecting portion of the body of the skate boot to fasten the blade holder to the skate boot.

In accordance with another aspect, this disclosure relates to a skate for skating on ice. The skate comprises a skate boot configured to receive a foot of a user, the skate boot comprising a body that comprises a medial side portion to face a medial side of the user's foot, a lateral side portion to face a lateral side of the user's foot, a heel portion to receive a heel of the user's foot, and an ankle portion to receive an ankle of the user. The skate comprises a blade holder disposed below the skate boot and configured to hold a blade for engaging the ice, the blade holder comprising a front pillar and a rear pillar spaced in a longitudinal direction of the skate, the blade holder comprising a connector movable relative to a body of the blade holder to attach the blade to and detach the blade from the blade holder, the connector being configured to preclude the blade from moving away from the blade holder when the blade is attached to the blade holder, the connector being at least partly disposed between the front pillar and the rear pillar.

In accordance with another aspect, this disclosure relates to a blade for a skate for skating on ice. The blade comprises an ice-contacting surface and a connector for attaching the blade to a blade holder of the skate. The connector of the blade is configured to connect with a connector of the blade holder at least partly disposed between a front pillar and a rear pillar of the blade holder.

In accordance with another aspect, this disclosure relates to a blade for a skate for skating on ice. The blade comprises an ice-contacting surface and a connector for attaching the blade to a blade holder of the skate. The connector of the blade is within 30% of a length of the blade from a longitudinal center of the blade.

In accordance with another aspect, this disclosure relates to a blade holder for a skate for skating on ice. The blade holder is configured to be disposed below a skate boot of the skate and configured to hold a blade for engaging the ice The blade holder comprises a front pillar and a rear pillar spaced in a longitudinal direction of the blade holder. The blade holder comprising a connector movable relative to a body of the blade holder to attach the blade to and detach the blade from the blade holder, the connector being configured to preclude the blade from moving away from the blade holder when the blade is attached to the blade holder, the connector being at least partly disposed between the front pillar and the rear pillar.

In accordance with another aspect, this disclosure relates to a blade holder for a skate for skating on ice. The blade holder is configured to be disposed below a skate boot of the skate and configured to hold a blade for engaging the ice. The blade holder comprising a connector movable relative to a body of the blade holder to attach the blade to and detach the blade from the blade holder, the connector being configured to preclude the blade from moving away from the blade holder when the blade is attached to the blade holder, the connector comprising a hand-engaging actuator to detach the blade from the blade holder, the hand-engaging actuator comprising a hand-engaging surface that occupies at least a majority of a width of a cross-section of the blade holder normal to a longitudinal axis of the blade holder where the hand-engaging surface is located.

These and other aspects of this disclosure will now become apparent to those of ordinary skill in the art upon review of a description of embodiments that follows in conjunction with accompanying drawings.

BRIEF DESCRIPTION OF DRAWINGS

A detailed description of embodiments is provided below, by way of example only, with reference to drawings annexed hereto, in which:

FIG. 6 is a cross-sectional view of the shell of the skate boot in an embodiment in which the shell is a unitary shell (i.e., has no subshells);

FIG. 7 is a cross-sectional view of the shell of the skate boot in an embodiment in which the shell comprises subshells;

FIGS. 8 to 10 are cross-sectional views of the shell in embodiments in which at least one of the subshells comprise an opening in a sole region of the shell;

FIG. 11 is a cross-sectional view of the shell in embodiments in which a footbed of the skate boot is formed integrally with the shell of the skate boot;

FIGS. 66A and 66B show a sheet of material used for manufacturing the inner liner in accordance with an embodiment;

FIG. 67 shows the inner liner of FIGS. 66A and 66B;

FIGS. 68 to 71 are respective side, front, top and bottom views of the shell of FIG. 3;

FIGS. 118 to 166 show variants of the connection system;

FIG. 183 is a cross-sectional of the shell in an embodiment in which the footbed of the skate boot is formed integrally with the shell;

FIG. 184 is a cross-sectional view of the shell in an embodiment in which the blade holder is molded integrally with the shell and the intermediate subshell making up the blade holder is exposed;

FIG. 185 is a cross-sectional view of the shell in an embodiment in which the blade holder is molded integrally with the shell and a given subshell envelops the blade holder but not the shell;

FIG. 200 is a cross-sectional view of the shell in an embodiment in which the footbed of the skate boot is an insert that is disposed between given ones of the subshells of the shell;

FIG. 201 is a cross-sectional view of the shell in an embodiment in which the shell comprises the internal, intermediate and external subshells and is molded separately from the blade holder;

FIG. 202 is a cross-sectional view of the shell in an embodiment in which the blade holder is molded separately from the shell and is affixed to the shell;

FIGS. 210 to 215 show other examples of the variant of FIG. 209;

Figure 1:
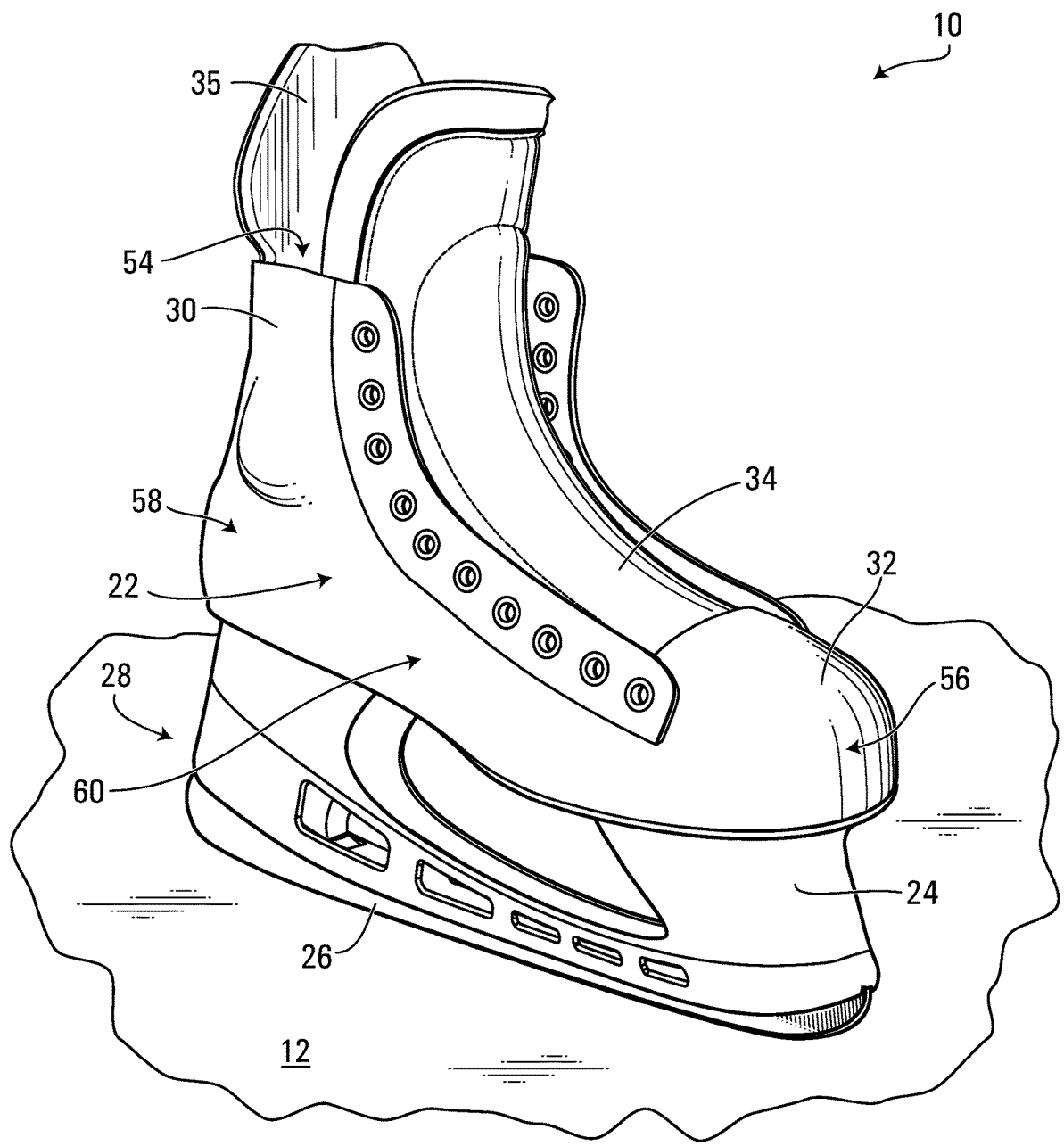
FIG. 1 is an example of a skate for a skater, in accordance with an embodiment.

In the drawings, embodiments are illustrated by way of example. It is to be expressly understood that the description and drawings are only for purposes of illustration and as an aid to understanding, and are not intended to be and should not be limitative.

DETAILED DESCRIPTION OF EMBODIMENTS

Figure 2:
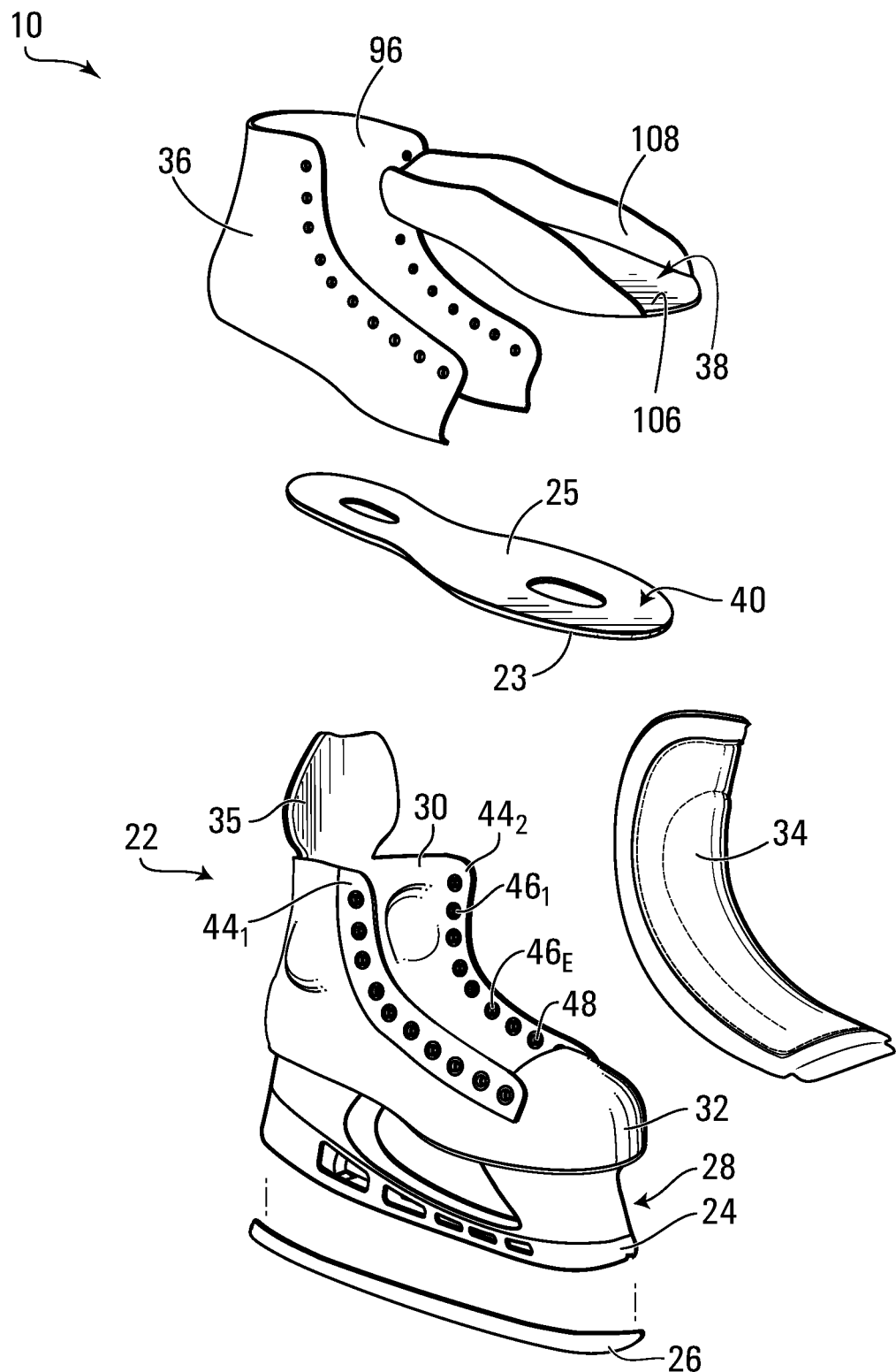
FIG. 2 is an exploded view of the skate.

FIGS. 1 and 2 show an example of an embodiment of footwear 10 for a user. In this embodiment, the footwear 10 is a skate for the user to skate on a skating surface 12. More particularly, in this embodiment, the skate 10 is a hockey skate for the user who is a hockey player playing hockey. In this example, the skate 10 is an ice skate, a type of hockey played is ice hockey, and the skating surface 12 is ice.

The skate 10 comprises a skate boot 22 for receiving a foot 11 of the player and a skating device 28 disposed beneath the skate boot 22 to engage the skating surface 12. In this embodiment, the skating device 28 comprises a blade 26 for contacting the ice 12 and a blade holder 24 between the skate boot 22 and the blade 26. The skate 10 has a longitudinal direction, a widthwise direction, and a heightwise direction.

In this embodiment, as further discussed below, the skate 10, including at least part of the skate boot 22 and possibly at least part of one or more other components (e.g., the blade holder 24), may be constructed from one or more materials (e.g., foams) molded by flowing in molding equipment during a molding process (e.g., injection molding or casting). This may allow the skate 10 to have useful performance characteristics (e.g., reduced weight, proper fit and comfort, etc.) while being more cost-effectively manufactured. Also, the skate 10 may facilitate installation and removal of the blade 26 and/or the blade holder 24, such as for replacement of the blade 26 and/or the blade holder 24, assemblage of the skate 10, and/or other purposes. For example, in some embodiments, the skate boot 22 and the blade holder 24 may be at least partly formed integrally with one another (e.g., by injection molding or other material flow), while the blade 26 may be readily attachable to and detachable from the blade holder 24.

Figure 250:
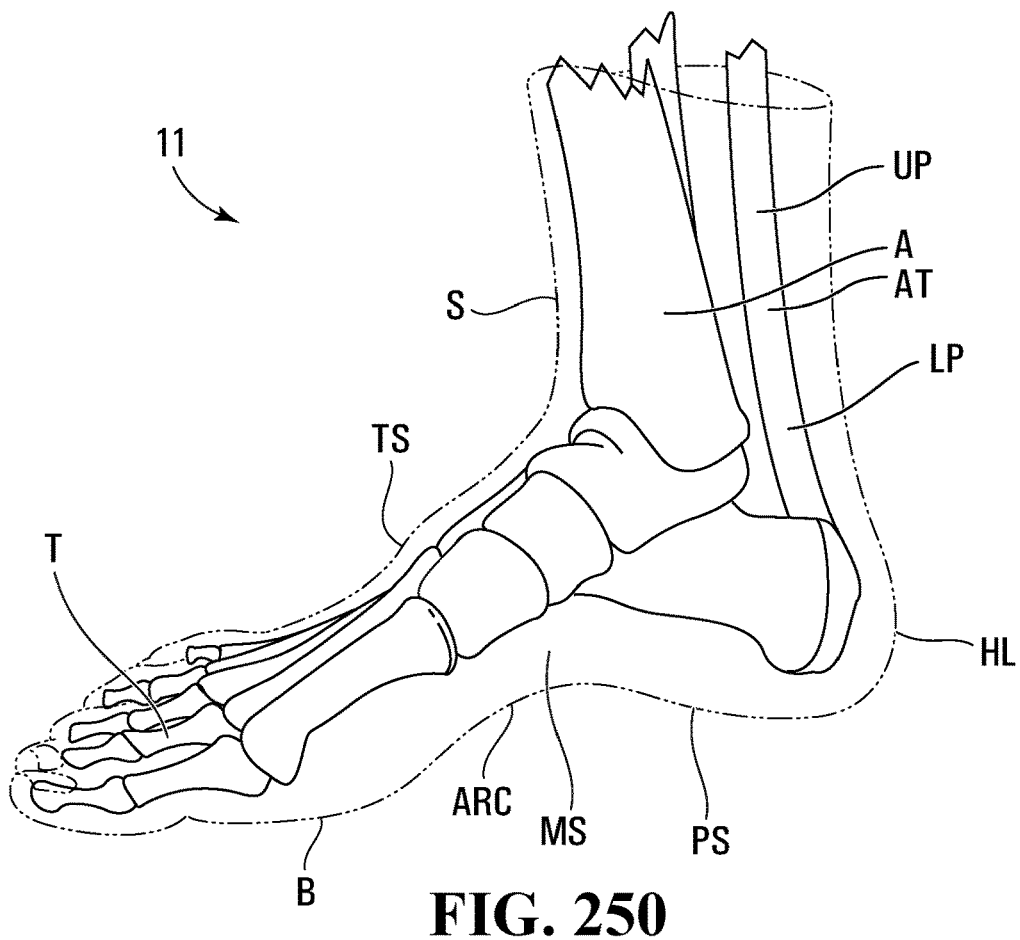
FIGS. 250 and 251 are side and front views of a right foot of the skater with an integument of the foot shown in dotted lines and bones shown in solid lines.
Figure 251:
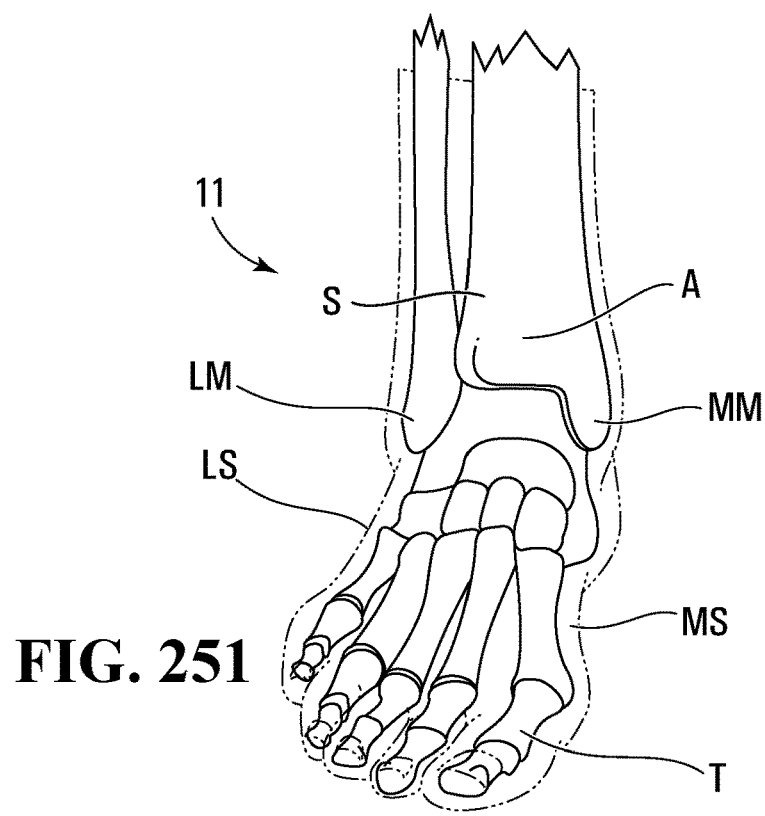

The skate boot 22 is a foot-receiving structure defining a cavity 54 for receiving the player's foot 11. With additional reference to FIGS. 250 and 251, the player's foot 11 includes toes T, a ball B, an arch ARC, a plantar surface PS, a top surface TS, a medial side MS, and a lateral side LS. The top surface TS of the player's foot 11 is continuous with a lower portion of a shin S of the player. In addition, the player has a heel HL, an Achilles tendon AT, and an ankle A having a medial malleolus MM and a lateral malleolus LM that is at a lower position than the medial malleolus MM. The Achilles tendon AT has an upper part UP and a lower part LP projecting outwardly with relation to the upper part UP and merging with the heel HL. A forefoot of the player includes the toes T and the ball B, a hindfoot of the player includes the heel HL, and a midfoot of the player is between the forefoot and the hindfoot.

The skate boot 22 comprises a front portion 56 for receiving the toes T of the player, a rear portion 58 for receiving the heel HL and at least part of the Achilles tendon AT and the ankle A of the player, and an intermediate portion 60 between the front portion 56 and the rear portion 58.

More particularly, in this embodiment, the skate boot 22 comprises a body 30, a toe cap 32, a tongue 34, a tendon guard 35, a liner 36, a footbed 38, and an insole 40. The skate boot 22 also comprises lace members $44_1$, $44_2$ and eyelets $46_1$-$46_E$ extending through (e.g., punched into) the lace members $44_1$, $44_2$, the body 30 and the liner 36 vis-à-vis apertures 48 in order to receive laces for tying on the skate 10. In some embodiments, the skate boot 22 may not comprise any lace members and the eyelets $46_1$-$46_E$ may extend directly through the body 30 and the liner 36 via the apertures 48.

Figure 3:
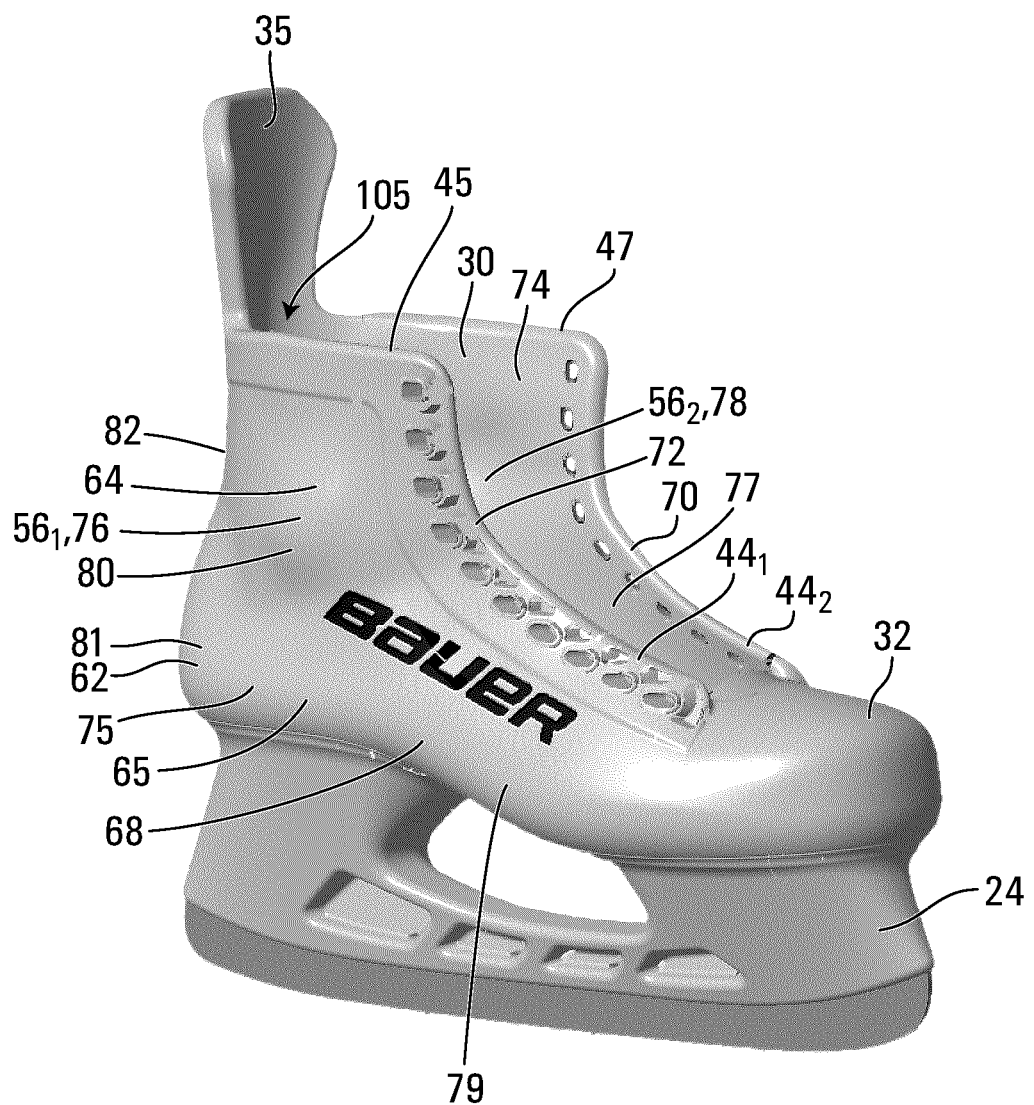
FIG. 3 is a perspective view of a shell of a skate boot of the skate.

The body 30 of the skate boot 22 imparts strength and structural integrity to the skate 10 to support the player's foot 11. More particularly, in this embodiment, as shown in FIG. 3, the body 30 of the skate boot 22, which will be referred to as a "shell", comprises a heel portion 62 for receiving the heel HL of the player, an ankle portion 64 for receiving the ankle A of the player, medial and lateral side portions 66, 68 for respectively facing the medial and lateral sides MS, LS of the player's foot 11, and a sole portion 69 for facing the plantar surface PS of the player's foot 11. The shell 30 thus includes a quarter 75 which comprises a medial quarter part 77, a lateral quarter part 79, and a heel counter 81. The medial and lateral side portions 66, 68 include upper edges 70, 72 which, in this embodiment, constitute upper edges of the lace members $44_1$, $44_2$ (i.e., the lace members $44_1$, $44_2$ are made integrally with the shell as will be described later). The heel portion 62 may be formed such that it is substantially cup-shaped for following the contour of the heel HL of the player. The ankle portion 64 comprises medial and lateral ankle sides 74, 76. The medial ankle side 74 has a medial depression 78 for receiving the medial malleolus MM of the player and the lateral ankle side 76 has a lateral depression 80 for receiving the lateral malleolus LM of the player. The lateral depression 80 is located slightly lower than the medial depression 78 for conforming to the morphology of the player's foot 11. The ankle portion 64 further comprises a rear portion 82 facing the lower part LP of the Achilles tendon AT of the player.

Figure 4:
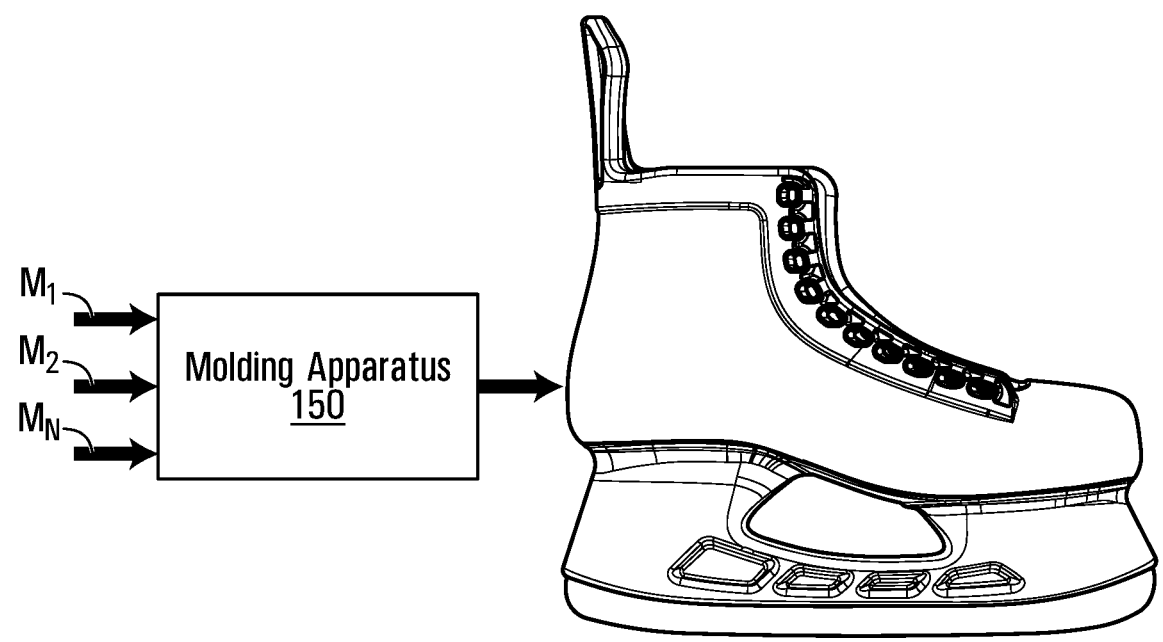
FIG. 4 is a block diagram showing a molding process implementing a molding apparatus to form the shell of the skate boot.

In this embodiment, with additional reference to FIG. 4, the shell 30 comprises one or more materials molded into a shape of the shell 30 by flowing in a molding apparatus 150 during a molding process (e.g., injection molding or casting). More particularly, in this embodiment, the shell 30 comprises a plurality of materials $M_1$-$M_N$ that are molded into the shape of the shell 30 by flowing in the molding apparatus 150 during the molding process. The materials $M_1$-$M_N$ are different from one another, such as by having different chemistries and/or exhibiting substantially different values of one or more material properties (e.g., density, modulus of elasticity, hardness, etc.). In this example, the materials $M_1$-$M_N$ are arranged such that the shell 30 comprises a plurality of layers $85_1$-$85_L$ which are made of respective ones of the materials $M_1$-$M_N$. In that sense, in this case, the shell 30 may be referred to as a "multilayer" shell and the layers $85_1$-$85_L$ of the shell 30 may be referred to as "subshells". This may allow the skate 10 to have useful performance characteristics (e.g., reduced weight, proper fit and comfort, etc.) while being more cost-effectively manufactured.

The materials $M_1$-$M_N$ may be implemented in any suitable way. In this embodiment, each of the materials $M_1$-$M_N$ is a polymeric material. For example, in this embodiment, each of the polymeric materials $M_1$-$M_N$ is polyurethane (PU). Any other suitable polymer may be used in other embodiments (e.g., polypropylene, ethylene-vinyl acetate (EVA), nylon, polyester, vinyl, polyvinyl chloride, polycarbonate, polyethylene, an ionomer resin (e.g., Surlyn®), styrene-butadiene copolymer (e.g., K-Resin®) etc.), self-reinforced polypropylene composite (e.g., Curv®), or any other thermoplastic or thermosetting polymer).

In this example of implementation, each of the polymeric materials $M_1$-$M_N$ is a foam. In this case, each of the polymeric materials $M_1$-$M_N$ is a PU foam. This foamed aspect may allow the shell 30 to be relatively light while providing strength. For instance, in some embodiments, a density of each of the polymeric materials $M_1$-$M_N$ may be no more than 40 kg/m$^3$, in some cases no more than 30 kg/m$^3$, in some cases no more than 20 kg/m$^3$, in some cases no more than 15 kg/m$^3$, in some cases no more 10 kg/m$^3$ and in some cases even less. One or more of the polymeric materials $M_1$-$M_N$ may not be foam in other examples of implementation.

In this embodiment, the materials $M_1$-$M_N$ of the subshells $85_1$-$85_L$ of the shell 30 constitute at least part of the heel portion 62, the ankle portion 64, the medial and lateral side portions 66, 68, and the sole portion 69 of the shell 30. More particularly, in this embodiment, the materials $M_1$-$M_N$ constitute at least a majority (i.e., a majority or an entirety) of the heel portion 62, the ankle portion 64, the medial and lateral side portions 66, 68, and the sole portion 69 of the shell 30. In this example, the materials $M_1$-$M_N$ constitute the entirety of the heel portion 62, the ankle portion 64, the medial and lateral side portions 66, 68, and the sole portion 69 of the shell 30.

The subshells $85_1$-$85_L$ constituted by the polymeric materials $M_1$-$M_N$ may have different properties for different purposes.

For instance, in some cases, a polymeric material $M_x$ may be stiffer than a polymeric material $M_y$ such that a subshell comprising the polymeric material $M_x$ is stiffer than a subshell comprising the polymeric material $M_y$. For example, a ratio of a stiffness of the subshell comprising the polymeric material $M_x$ over a stiffness of the subshell comprising the polymeric material $M_y$ may be at least 1.5, in some cases at least 2, in some cases at least 2.5, in some cases 3, in some cases 4 and in some cases even more.

In some cases, a given one of the subshells $85_1$-$85_L$ may be configured to be harder than another one of the subshells $85_1$-$85_L$. For instance, to provide a given subshell with more hardness than another subshell, the hardness of the polymeric materials $M_1$-$M_N$ may vary. For example, a hardness of the polymeric material $M_x$ may be greater than a hardness of the polymeric material $M_y$. For example, in some cases, a ratio of the hardness of the polymeric material $M_x$ over the hardness of the polymeric material $M_y$ may be at least 1.5, in some cases at least 2, in some cases at least 2.5, in some cases at least 3, in some cases at least 4, in some cases at least 5 and in some cases even more.

Figure 244:
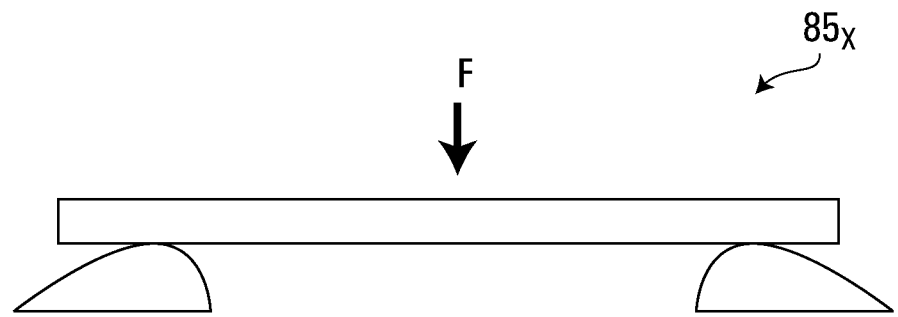
FIG. 244 shows an example of a test for determining the stiffness of a part of a subshell.

To observe the stiffness of a subshell $85_x$, as shown in FIG. 244, a part of the subshell $85_x$ can be isolated from the remainder of the subshell $85_x$ (e.g., by cutting, or otherwise removing the part from the subshell $85_x$, or by producing the part without the remainder of the subshell $85_x$) and a three-point bending test can be performed on the part to subject it to loading tending to bend the part in specified ways (along a defined direction of the part if the part is anisotropic) to observe the rigidity of the part and measure parameters indicative of the rigidity of the part. For instance in some embodiments, the three-point bending test may be based on conditions defined in a standard test (e.g., ISO 178(2010)).

For example, to observe the rigidity of the subshell $85_x$, the three-point bending test may be performed to subject the subshell $85_x$ to loading tending to bend the subshell $85_x$ until a predetermined deflection of the subshell $85_x$ is reached and measure a bending load at that predetermined deflection of the subshell $85_x$. The predetermined deflection of the subshell $85_x$ may be selected such as to correspond to a predetermined strain of the subshell $85_x$ at a specified point of the subshell $85_x$ (e.g., a point of an inner surface of the subshell $85_x$). For instance, in some embodiments, the predetermined strain of the subshell $85_x$ may be between 3% and 5%. The bending load at the predetermined deflection of the subshell $85_x$ may be used to calculate a bending stress at the specified point of the subshell $85_x$. The bending stress at the specified point of the subshell $85_x$ may be calculated as σ=My/I, where M is the moment about a neutral axis of the subshell $85_x$ caused by the bending load, y is the perpendicular distance from the specified point of the subshell $85_x$ to the neutral axis of the subshell $85_x$, and I is the second moment of area about the neutral axis of the subshell $85_x$. The rigidity of the subshell $85_x$ can be taken as the bending stress at the predetermined strain (i.e., at the predetermined deflection) of the subshell $85_x$. Alternatively, the rigidity of the subshell $85_x$ may be taken as the bending load at the predetermined deflection of the subshell $85_x$.

A stiffness of the subshells $85_1$-$85_L$ may be related to a modulus of elasticity (i.e., Young's modulus) of the polymeric materials $M_1$-$M_N$ associated therewith. For example, to provide a given subshell with more stiffness than another subshell, the modulus of elasticity of the polymeric materials $M_1$-$M_N$ may vary. For instance, in some embodiments, the modulus of elasticity of the polymeric material $M_x$ may be greater than the modulus of elasticity of the polymeric material $M_y$. For example, in some cases, a ratio of the modulus of elasticity of the polymeric material $M_x$ over the modulus of elasticity of the polymeric material $M_y$ may be at least 1.5, in some cases at least 2, in some cases at least 2.5, in some cases at least 3, in some cases at least 4, in some cases at least 5 and in some cases even more. This ratio may have any other suitable value in other embodiments.

In some cases, a given one of the subshells $85_1$-$85_L$ may be configured to be denser than another one of the subshells $85_1$-$85_L$. For instance, to provide a given subshell with more density than another subshell, the density of the polymeric materials $M_1$-$M_N$ may vary. For instance, in some embodiments, the polymeric material $M_x$ may have a density that is greater than a density of the polymeric material $M_y$. For example, in some cases, a ratio of the density of the material $M_x$ over the density of the material $M_y$ may be at least 1.1, in some cases at least 1.5, in some cases at least 2, in some cases at least 2.5, in some cases at least 3 and in some cases even more.

Figure 5:
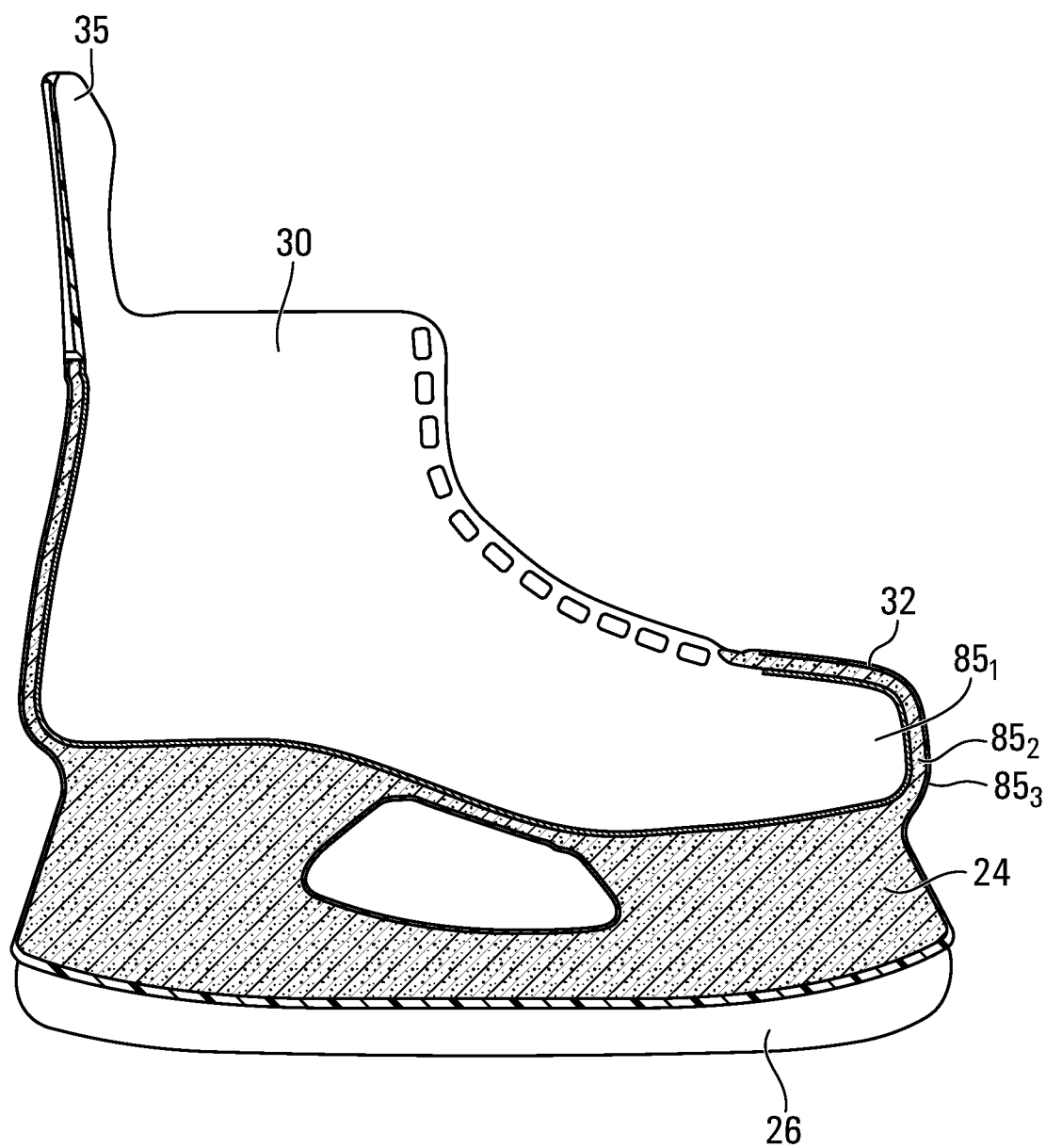
FIG. 5 is a cross-sectional view of the shell showing a plurality of subshells of the shell, including an internal, an intermediate and an external subshell of the shell.

In this embodiment, as shown in FIG. 5, the subshells $85_1$-$85_L$ comprise an internal subshell $85_1$, an intermediate subshell $85_2$ and an external subshell $85_3$. The internal subshell $85_1$ is "internal" in that it is an innermost one of the subshells $85_1$-$85_L$. That is, the internal subshell $85_1$ is closest to the player's foot 11 when the player dons the skate 10. In a similar manner, the external subshell $85_3$ is "external" in that is an outermost one of the subshells $85_1$-$85_L$. That is, the external subshell $85_3$ is furthest from the player's foot 11 when the player dons the skate 10. The intermediate subshell $85_2$ is disposed between the internal and external subshells $85_1$, $85_3$.

The internal, intermediate and external subshells $85_1$, $85_2$, $85_3$ comprise respective polymeric materials $M_1$, $M_2$, $M_3$. In this embodiment, the polymeric materials $M_1$, $M_2$, $M_3$ have different material properties that impart different characteristics to the internal, intermediate and external subshells $85_1$, $85_2$, $85_3$. As a result, in certain cases, a given one of the subshells $85_1$, $85_2$, $85_3$ may be more resistant to impact than another one of the subshells $85_1$, $85_2$, $85_3$, a given one of the subshells $85_1$, $85_2$, $85_3$ may be more resistant to wear than another one of the subshells $85_1$, $85_2$, $85_3$, and/or a given one of the subshells $85_1$, $85_2$, $85_3$ may be denser than another one of the subshells $85_1$, $85_2$, $85_3$.

For instance, a density of each of the internal, intermediate and external subshells $85_1$, $85_2$, $85_3$ may vary. For example, in this embodiment, the densities of the internal, intermediate and external subshells $85_1$, $85_2$, $85_3$ increase inwardly such that the density of the internal subshell $85_1$ is greater than the density of the intermediate subshell $85_2$ which in turn is greater than the density of the external subshell $85_3$. For example, the density of the internal subshell $85_1$ may be approximately 30 kg/m$^3$, while the density of the intermediate subshell $85_2$ may be approximately 20 kg/m$^3$, and the density of the external subshell $85_3$ may be approximately 10 kg/m$^3$. The densities of the internal, intermediate and external subshells $85_1$, $85_2$, $85_3$ may have any other suitable values in other embodiments. In other embodiments, the densities of the internal, intermediate and external subshells $85_1$, $85_2$, $85_3$ may increase outwardly such that the external subshell $85_3$ is the densest of the subshells $85_1$-$85_L$. In yet other embodiments, the densities of the internal, intermediate and external subshells $85_1$, $85_2$, $85_3$ may not be arranged in order of ascending or descending density.

Moreover, in this embodiment, a stiffness of the internal, intermediate and external subshells $85_1$, $85_2$, $85_3$ may vary. For example, in this embodiment, the stiffness of the internal subshell $85_1$ is greater than the respective stiffness of each of the intermediate subshell $85_2$ and the external subshell $85_3$.

In addition, in this embodiment, a thickness of the internal, intermediate and external subshells $85_1$, $85_2$, $85_3$ may vary. For example, in this embodiment, the intermediate subshell $85_2$ has a thickness that is greater than a respective thickness of each of the internal and external subshells $85_1$, $85_3$. For example, in some cases, the thickness of each of the internal, intermediate and external subshells $85_1$, $85_2$, $85_3$ may be between 0.1 mm to 25 mm, and in some cases between 0.5 mm to 10 mm. For instance, the thickness of each of the internal, intermediate and external subshells $85_1$, $85_2$, $85_3$ may be no more than 30 mm, in some cases no more than 25 mm, in some cases no more than 15 mm, in some cases no more than 10 mm, in some cases no more than 5 mm, in some cases no more than 1 mm, in some cases no more than 0.5 mm, in some cases no more than 0.1 mm and in some cases even less.

In order to provide the internal, intermediate and external subshells $85_1$, $85_2$, $85_3$ with their different characteristics, the polymeric materials $M_1$, $M_2$, $M_3$ of the internal, intermediate and external subshells $85_1$, $85_2$, $85_3$ may comprise different types of polymeric materials. For instance, in this example, the polymeric material $M_1$ comprises a generally soft and dense foam, the polymeric material $M_2$ comprises a structural foam that is more rigid than the foam of the polymeric material $M_1$ and less dense than the polymeric material $M_1$, and the polymeric material $M_3$ is a material other than foam. For example, the polymeric material $M_3$ of the external subshell $85_3$ may consist of a clear polymeric coating.

The subshells $85_1$-$85_L$ may be configured in various other ways in other embodiments. For instance, in other embodiments, the shell 30 may comprise a different number of subshells or no subshells. For example, in some embodiments, as shown in FIG. 6, the shell 30 may be a single shell and therefore does not comprise any subshells. In other embodiments, as shown in FIG. 7, the shell 30 may comprise two subshells $85_1$-$85_L$.

Moreover, as shown in FIGS. 8 to 10, when the shell 30 comprises two subshells, notably interior and exterior subshells $85_{INT}$, $85_{EXT}$, if the exterior subshell $85_{EXT}$ has a density that is greater than a density of the interior subshell $85_{INT}$, a given one of the subshells $85_{INT}$, $85_{EXT}$ may have an opening, which can be referred to as a gap, along at least part of the sole portion 69 of the shell 30 (e.g., along a majority of the sole portion 69 of the shell 30). For example, as shown in FIG. 8, in some embodiments, the exterior subshell $85_{EXT}$ may comprise a gap G at the sole portion 69 of the shell 30 such that the interior and exterior subshells $85_{INT}$, $85_{EXT}$ do not overlie one another at the sole portion 69 of the shell 30 (i.e., the interior subshell $85_{INT}$ may be the only subshell present at the sole portion 69 of the shell 30). As shown in FIG. 9, in an embodiment in which the exterior subshell $85_{EXT}$ has a gap at the sole portion 69 of the shell 30, the interior subshell $85_{INT}$ may project outwardly toward the exterior subshell $85_{EXT}$ at the sole portion 69 of the shell 30 and fill in the gap of the exterior subshell $85_{EXT}$ such that a thickness of the interior subshell $85_{INT}$ is greater at the sole portion 69 of the shell 30. As another example, as shown in FIG. 10, in an embodiment in which the interior subshell $85_{INT}$ has a gap at the sole portion 69 of the shell 30, the exterior subshell $85_{EXT}$ may project inwardly toward the interior subshell $85_{INT}$ at the sole portion 69 of the shell 30 and fill in the gap of the interior subshell $85_{INT}$ such that a thickness of the exterior subshell $85_{EXT}$ is greater at the sole portion 69 of the shell 30. As shown in FIG. 11, the footbed 38 may be formed integrally with the shell 30 such as to cover at least partially an inner surface of the innermost subshell (in this case, the interior subshell $85_{INT}$) and overlie the sole portion 69 of the shell 30. In other cases, the footbed 38 may be inserted separately after the molding process of the shell 30 has been completed.

Figure 13:
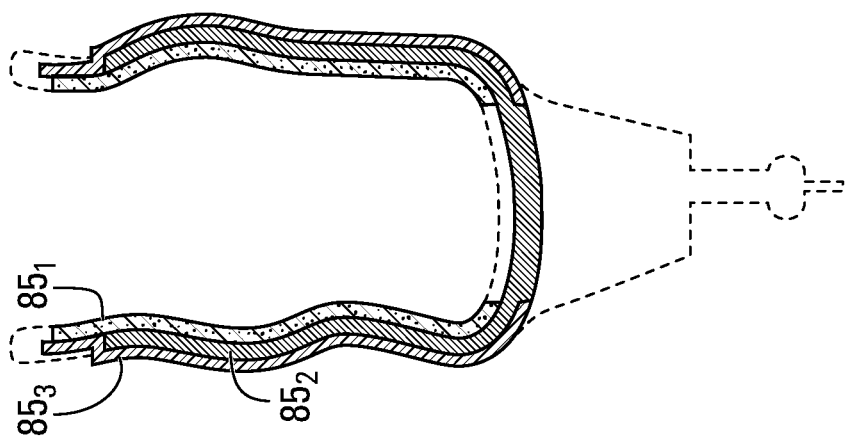
FIGS. 12 and 13 are cross-sectional views of the shell in embodiments in which the external subshell of the shell and/or the internal subshell of the shell comprises an opening at the sole region of the shell.
Figure 12:
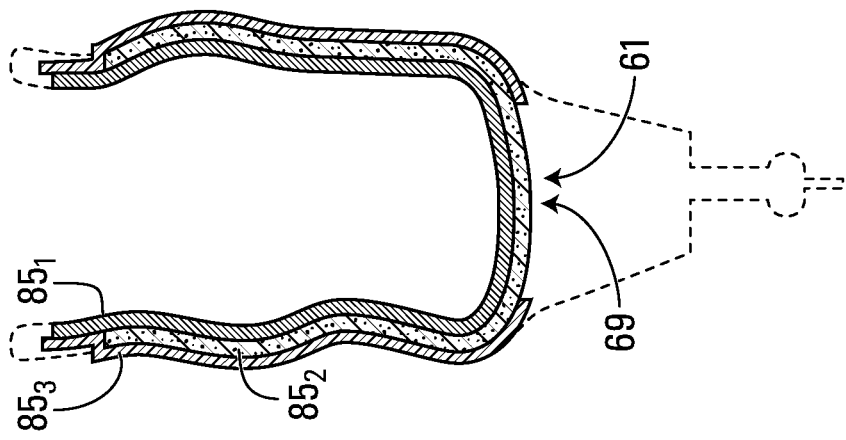

In some embodiments, as shown in FIGS. 12 and 13, when the shell 30 comprises three subshells, notably the internal, intermediate and external subshells $85_1$, $85_2$, $85_3$, and the external subshell $85_3$ has a density that is greater than a density of the intermediate subshell $85_2$, the external subshell $85_3$ may comprise a gap 61 at the sole portion 69 of the shell 30 and the intermediate subshell $85_2$ may project into the external subshell $85_3$ at the sole portion 69 of the shell 30 such as to fill in the gap 61 of the external subshell $85_3$. In such embodiments, the intermediate subshell $85_2$ may have a greater thickness at the sole portion 69 of the shell 30.

Figure 14:
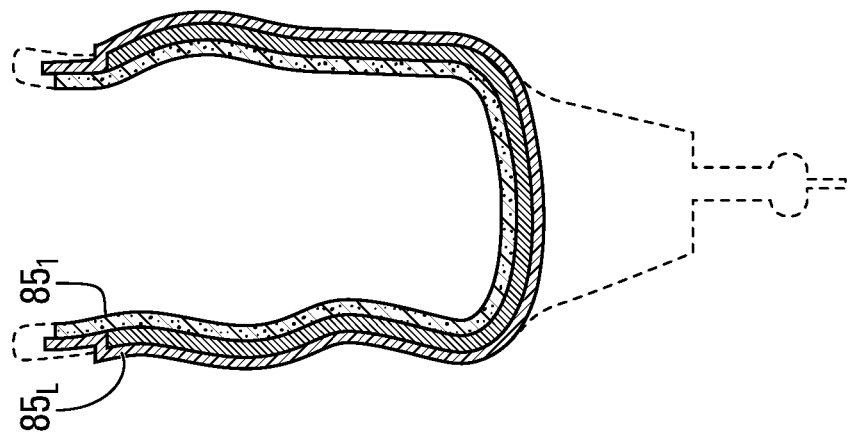
FIG. 14 is a cross-sectional view of the shell in an embodiment in which the shell comprises four subshells.

In some embodiments, as shown in FIG. 14, the subshells $85_1$-$85_L$ of the shell 30 may include four subshells $85_1$, $85_2$, $85_3$, $85_4$.

In this embodiment, the subshells $85_1$-$85_L$ constituted by the polymeric materials $M_1$-$M_N$ are integral with one another such that they constitute a monolithic one-piece structure. That is, the subshells $85_1$-$85_L$ constituted by the polymeric materials $M_1$-$M_N$ are integrally connected to one another such that the shell 30 is a one-piece shell. In this example of implementation, this is achieved by the subshells $85_1$-$85_L$ bonding to one another in the molding apparatus 150 during the molding process by virtue of chemical bonding of the polymeric materials $M_1$-$M_N$.

The subshells $85_1$-$85_L$ constituted by the polymeric materials $M_1$-$M_N$ are molded into the shape of the shell 30 by flowing into the molding apparatus 150 during the molding process. In this embodiment, the molding process comprises causing the polymeric materials $M_1$-$M_N$ to flow (i.e., in liquid or other fluid form) in the molding apparatus 150 so as to form the subshells $85_1$-$85_L$ and thus the shell 30 within the molding apparatus 150 and recovering the shell 30 from the molding apparatus 150 once its molding is completed.

Figure 15:
FIG. 15 is an example of a last of the molding apparatus used to form the shell.

In this embodiment, the molding process of the shell 30 is injection molding and the molding apparatus 150 comprises a male mold 152 (also commonly referred to as a "last") with which all the polymeric materials $M_1$-$M_N$ are molded into shape, as shown in FIG. 15. That is, in this example, the last 152 is a single last with which all of the subshells $85_1$-$85_L$ of the shell 30 are formed. The molding apparatus 150 also comprises a plurality of female molds $154_1$-$154_N$, each female mold $154_i$ being configured to contain the last 152 at different stages of the molding process. In this embodiment, each female mold $154_i$ comprises first and second portions 155, 157 that are secured together to contain the last 152.

An example of a method for molding the shell 30 comprising the internal, intermediate and external subshells $85_1$, $85_2$, $85_3$ will be described in more detail below with reference to FIGS. 16 to 18.

Figure 16:
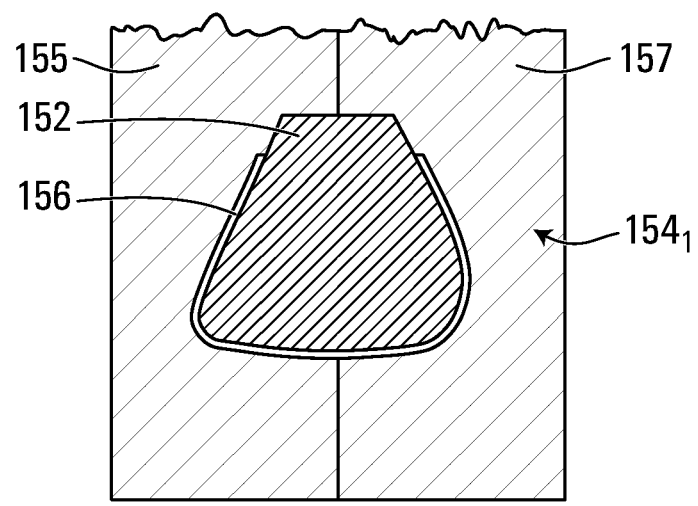
FIG. 16 is a cross-sectional view of the last and a first female mold used to produce the internal subshell of the shell.

With additional reference to FIG. 16, in order to mold the internal subshell $85_1$, the last 152 is secured within a first female mold $154_1$ to form a mold cavity 156 between the last 152 and the first female mold $154_1$. The mold cavity 156 has a shape of the desired internal subshell $85_1$. The mold cavity 156 is then filled with a desired polymeric material $M_1$ via a sprue, runner and gate system (not shown) of the first female mold $154_1$ and left to cure. Once the polymeric material $M_1$ has cured for a sufficient amount of time to form the internal subshell $85_1$, the first female mold $154_1$ is opened (i.e., its first and second portions 155, 157 are separated from one another) and removed from the molding apparatus 150 while the last 152 remains on the molding apparatus 150 with the internal subshell $85_1$ still on it.

Figure 17:
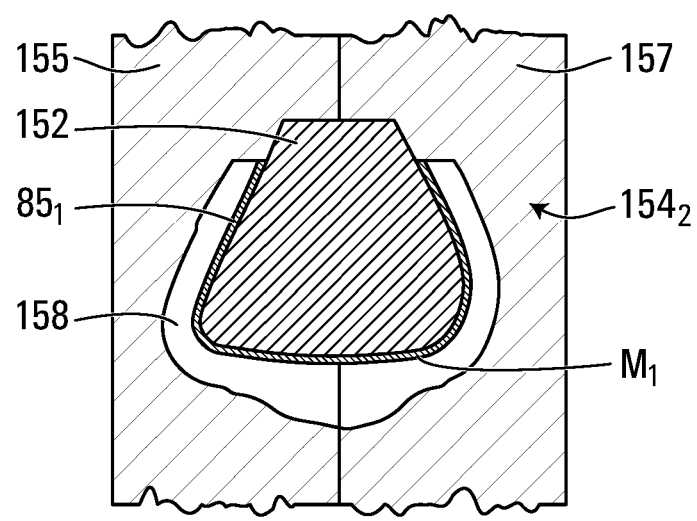
FIG. 17 is a cross-sectional view of the last and a second female mold used to produce the intermediate subshell of the shell.

At this stage, with additional reference to FIG. 17, in order to form the intermediate subshell $85_2$, a second female mold $154_2$ is installed on the molding apparatus 150. The last 152 is secured within the second female mold $154_2$ to form a mold cavity 158 between the internal subshell $85_1$ (and in some cases at least part of the last 152) and the second female mold $154_2$. The mold cavity 158 has a shape of the desired intermediate subshell $85_2$. The mold cavity 158 is then filled with a desired polymeric material $M_2$ via a sprue, runner and gate system (not shown) of the second female mold $154_2$ and left to cure. Once the polymeric material $M_2$ has cured for a sufficient amount of time to form the intermediate subshell $85_2$, the second female mold $154_2$ is opened (i.e., its first and second portions 155, 157 are separated from one another) and removed from the molding apparatus 150 while the last 152 remains on the molding apparatus 150 with the internal subshell $85_1$ and the intermediate subshell $85_2$ still on it.

Figure 18:
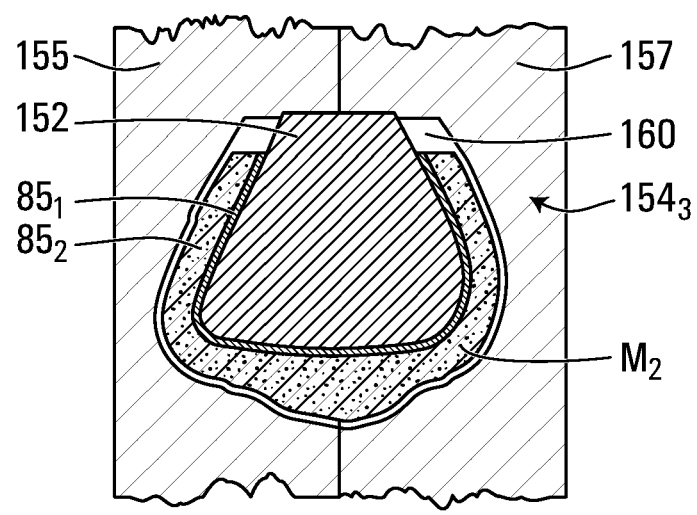
FIG. 18 is a cross-sectional view of the last and a third female mold used to produce the external subshell of the shell.

With additional reference to FIG. 18, in order to form the external subshell $85_3$, a third female mold $154_3$ is installed on the molding apparatus 150. The last 152 is secured within the third female mold $154_3$ to form a mold cavity 160 between the intermediate subshell $85_2$ (and in some cases at least part of the last 152, and in some cases at least part of the internal subshell $85_1$) and the third female mold $154_3$. The mold cavity 160 has a shape of the desired external subshell $85_3$. The mold cavity 160 is then filled with a desired polymeric material $M_3$ via a sprue, runner and gate system (not shown) of the third female mold $154_3$ and left to cure.

Once the polymeric material $M_3$ has cured for a sufficient amount of time to form the external subshell $85_3$, the shell 30, including its now formed internal, intermediate and external subshells $85_1$, $85_2$, $85_3$, is demolded from (i.e., removed from) the last 152. This may be achieved in various ways.

For instance, in some embodiments, the polymeric materials $M_1$, $M_2$, $M_3$ which constitute the internal, intermediate and external subshells $85_1$, $85_2$, $85_3$ may have sufficient elasticity to allow an operator of the molding apparatus 150 to remove the shell 30 from the last 152 by flexing the internal, intermediate and external subshells $85_1$, $85_2$, $85_3$ of the shell 30. In some cases, the shell 30 may be removed from the last 152 while at least a given one of the internal, intermediate and external subshells $85_1$, $85_2$, $85_3$ has not fully cured such that the shell 30 has some flexibility that it would not have if the at least one given one of the internal, intermediate and external subshells $85_1$, $85_2$, $85_3$ had fully cured.

Moreover, in some embodiments, with additional reference to FIGS. 19 to 46, the last 152 may be reconfigurable to facilitate demolding (i.e., removal) of the shell 30 from the last 152. That is, a configuration (e.g., shape) of the last 152 may be changeable between a "molding" configuration to mold the shell 30 on the last 152 and a "demolding" configuration to demold the shell 30 from the last 152. The demolding configuration of the last 152 differs from the molding configuration of the last 152, notably in that demolding of the shell 30 from the last 152 is easier in the demolding configuration of the last 152 than in the molding configuration of the last 152 (e.g., less effort has to be exerted on the shell 30 to remove the shell 30 from the last 152 in its demolding configuration than in its molding configuration, or removal of the shell 30 from the last 152 in its demolding configuration is readily allowed while removal of the shell 30 from the last 152 in its molding configuration is precluded without damaging the shell 30). For example, the last 152 may contract (i.e., be reduced in size) in its demolding configuration relative to its molding configuration. Removal of the shell 30 from the last 152, which may be by holding the shell 30 to move it away from the last 152 and/or holding and moving at least part of the last 152 away from the shell 30, is thus facilitated.

This may be particularly useful to mold the shell 30 on the last 152 such that the shell 30 has undercuts $51_1$-$51_6$, i.e., recesses (e.g., depressions) or other reentrant portions, which would otherwise complicate demolding of the shell 30. For example, in this embodiment, the undercuts $51_1$, $51_2$ are the medial and lateral depressions 78, 80 for receiving the medial and lateral malleoli MM, LM of the player, the undercuts $51_3$, $51_4$ are recesses $83_1$, $83_2$ defined by curvature of the heel portion 62 in the longitudinal and heightwise directions of the skate 10 and curvature of the heel portion 62 in the widthwise direction of the skate 10 such that the heel portion 62 is substantially cup-shaped, and the undercuts $51_5$, $51_6$ are recesses $86_1$, $86_2$ defined by curvature of the medial side portion 66 and curvature of the lateral side portion 68 in the longitudinal and heightwise directions of the skate 10 adjacent to the player's forefoot. The shell 30 may have any other suitable undercut such as the undercuts $51_1$-$51_6$ in other embodiments.

Furthermore, this may facilitate demolding of the shell 30 from the last 152 without deforming the shell 30. That is, a shape of the shell 30 once molding is completed can be maintained during and upon demolding. In this example, this may be useful as the shell 30 is rigid (e.g., to avoid stressing the shell 30, etc.).

For example, in some embodiments, a volume occupied by the last 152 may be reduced from its molding configuration to its demolding configuration such that the volume occupied by the last 152 in its demolding configuration is smaller than the volume occupied by the last 152 in its molding configuration.

Figure 19:
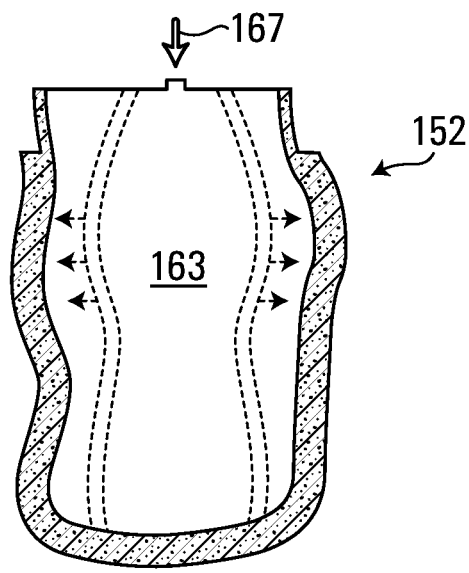
FIGS. 19 and 20 show examples of the last to form the shell in other embodiments.

In some embodiments, as shown in FIG. 19, the last 152 comprises a cavity 163 to receive a fluid 167 to vary the volume occupied by the last 152, by expanding and contracting the last 152. For instance, in some cases, the last 152 may be an inflatable last that can be expanded and retracted by controlling a fluid pressure within the last 152. For instance, the inflatable last 152 may be filled with the fluid 167 which is air (or any other fluid) to expand the inflatable last 152 to a "molding" size at which the molding process is carried out, and then emptied of air to contract the inflatable last 152 to a "demolding" size that is less than the molding size and at which the demolding of the shell 30 from the last 152 can be carried out. The fluid 167 may be a liquid (e.g., water, oil, etc.) or any other suitable fluid in other cases.

Figure 20:
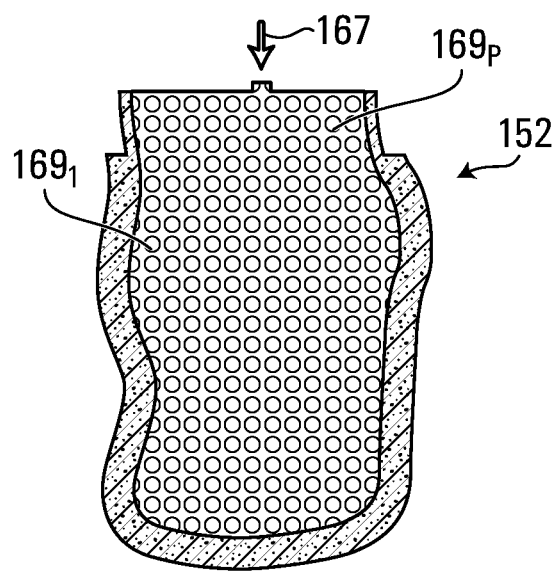
Figure 21:
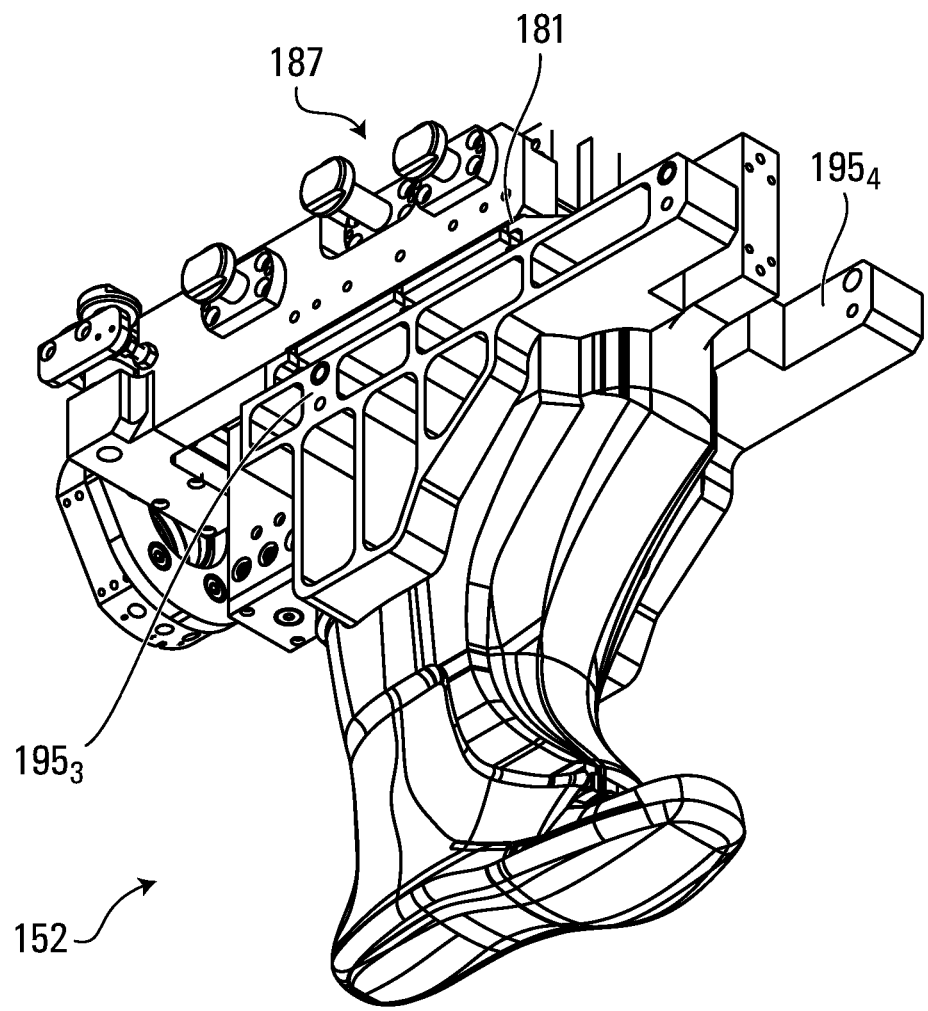
FIGS. 21 to 32 show an example of the last to form the shell in another embodiment.
Figure 22:
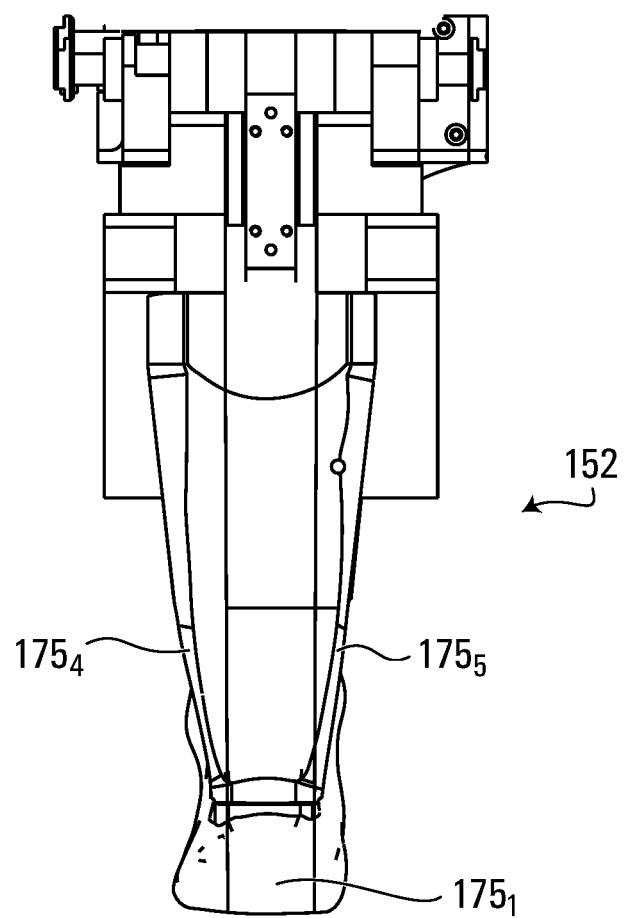
Figure 23:
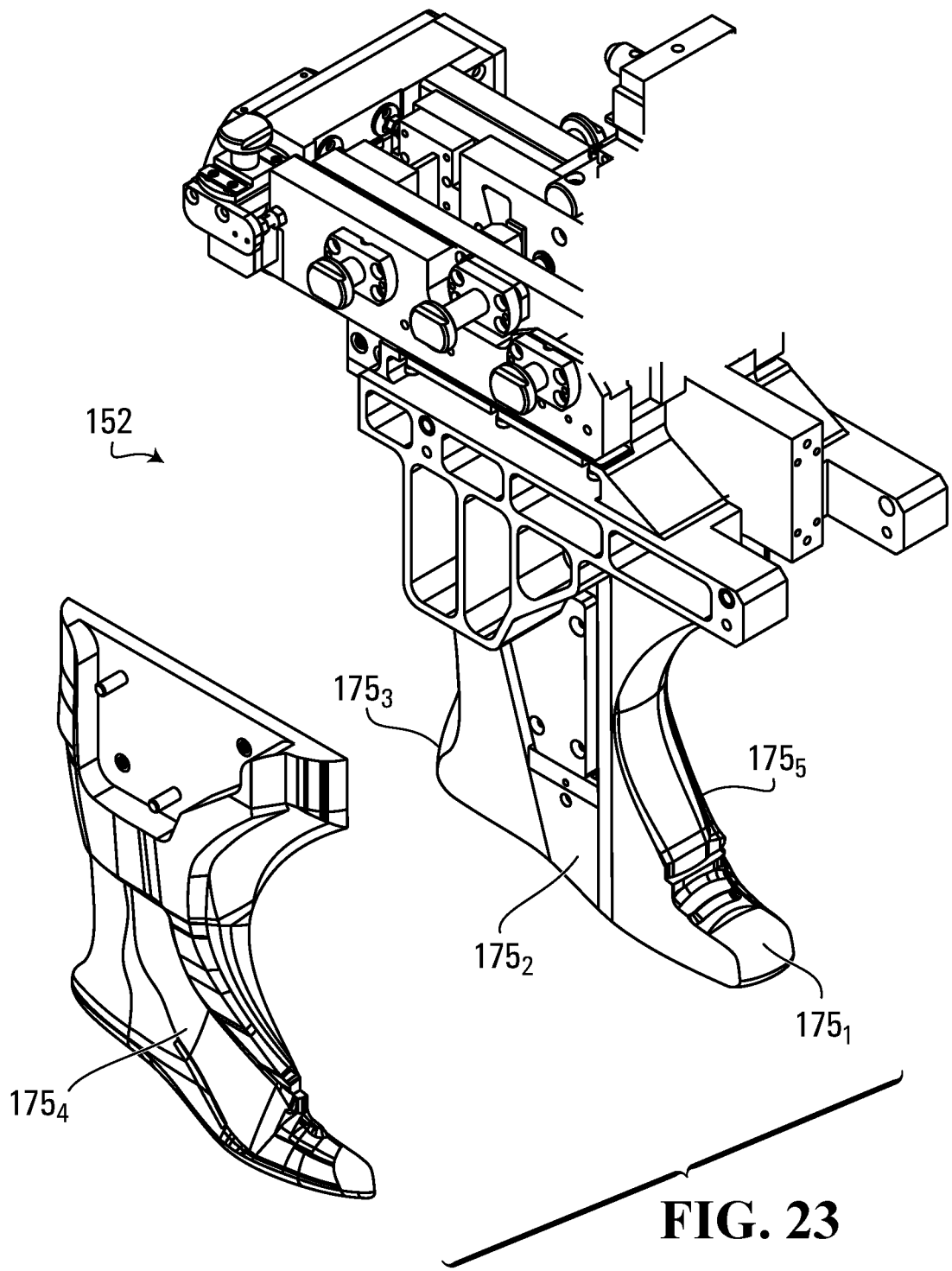
Figure 24:
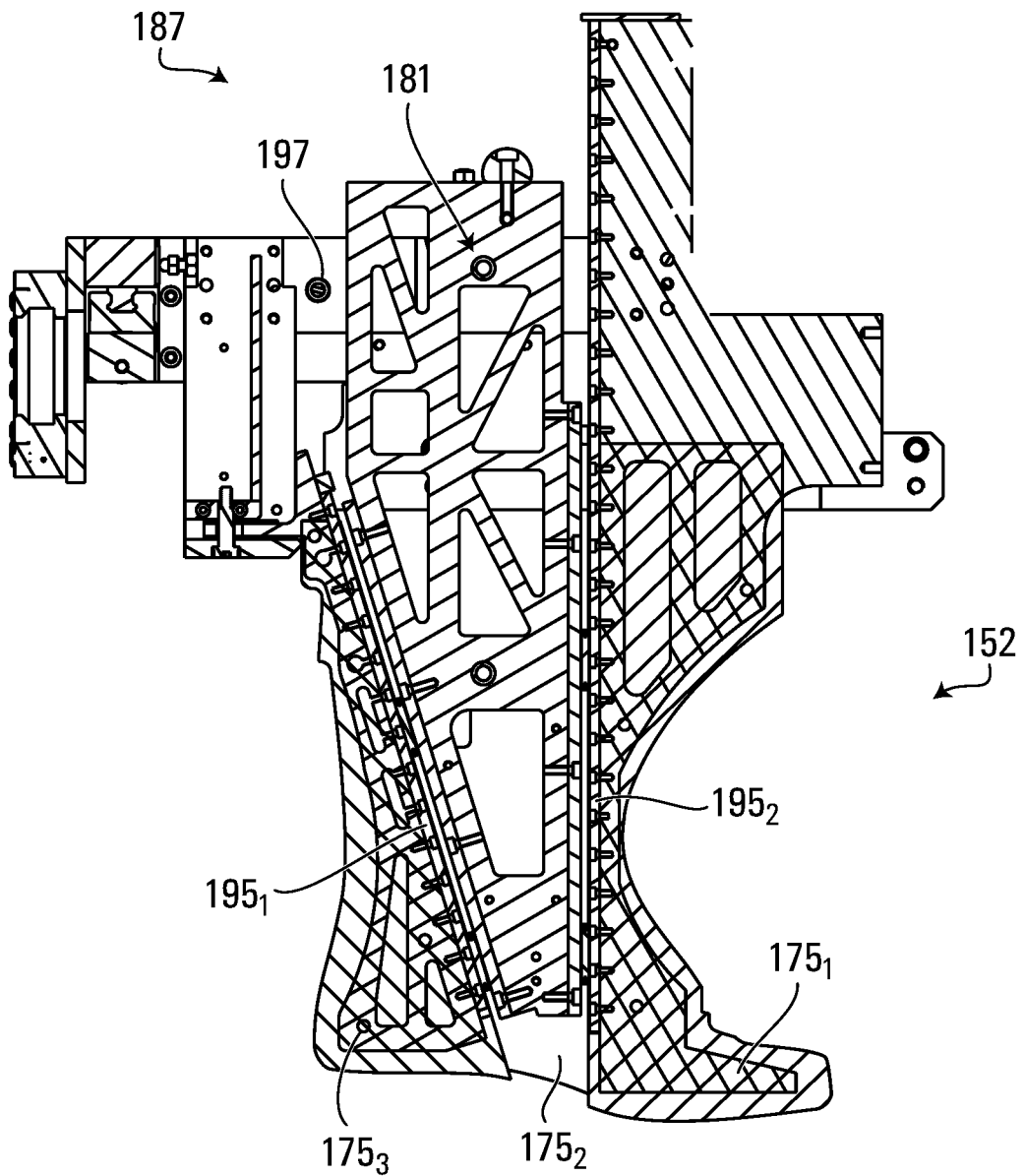
Figure 25:
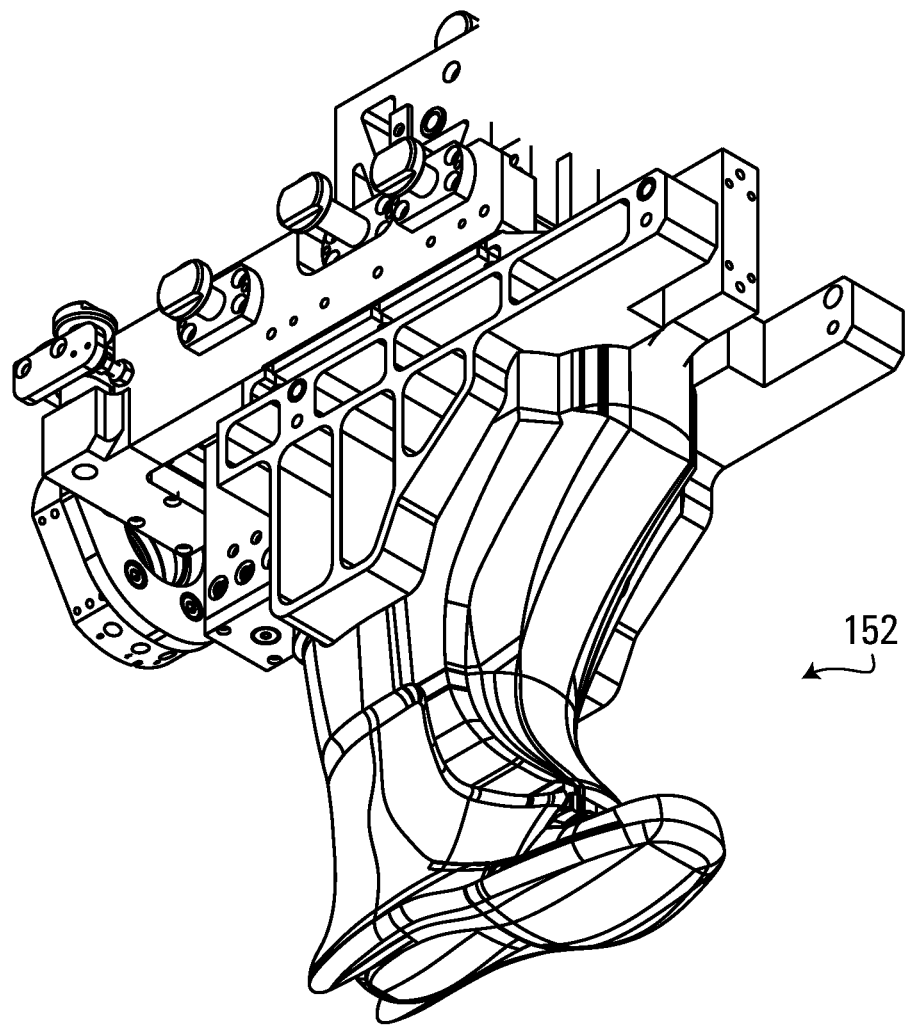
Figure 26:
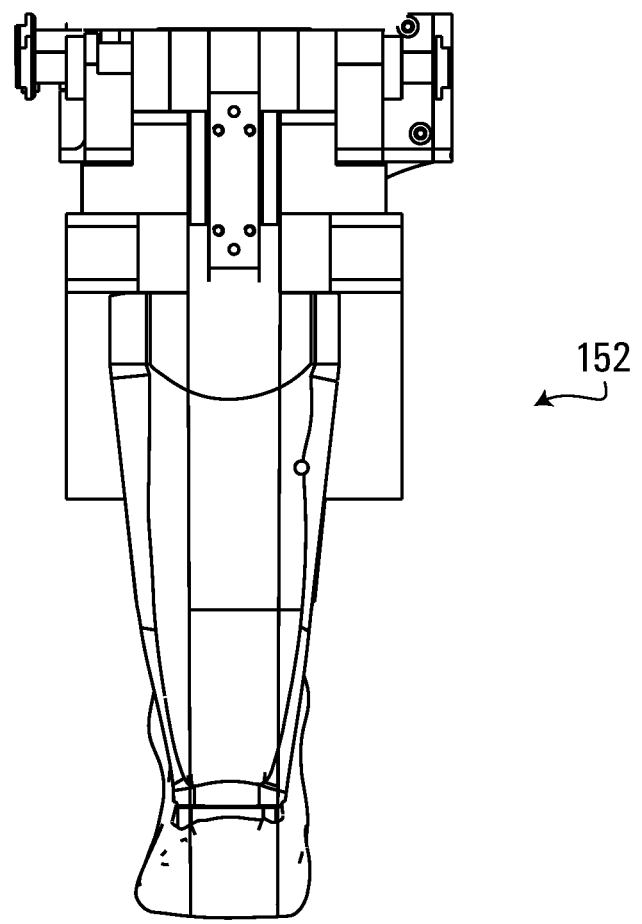
Figure 27:
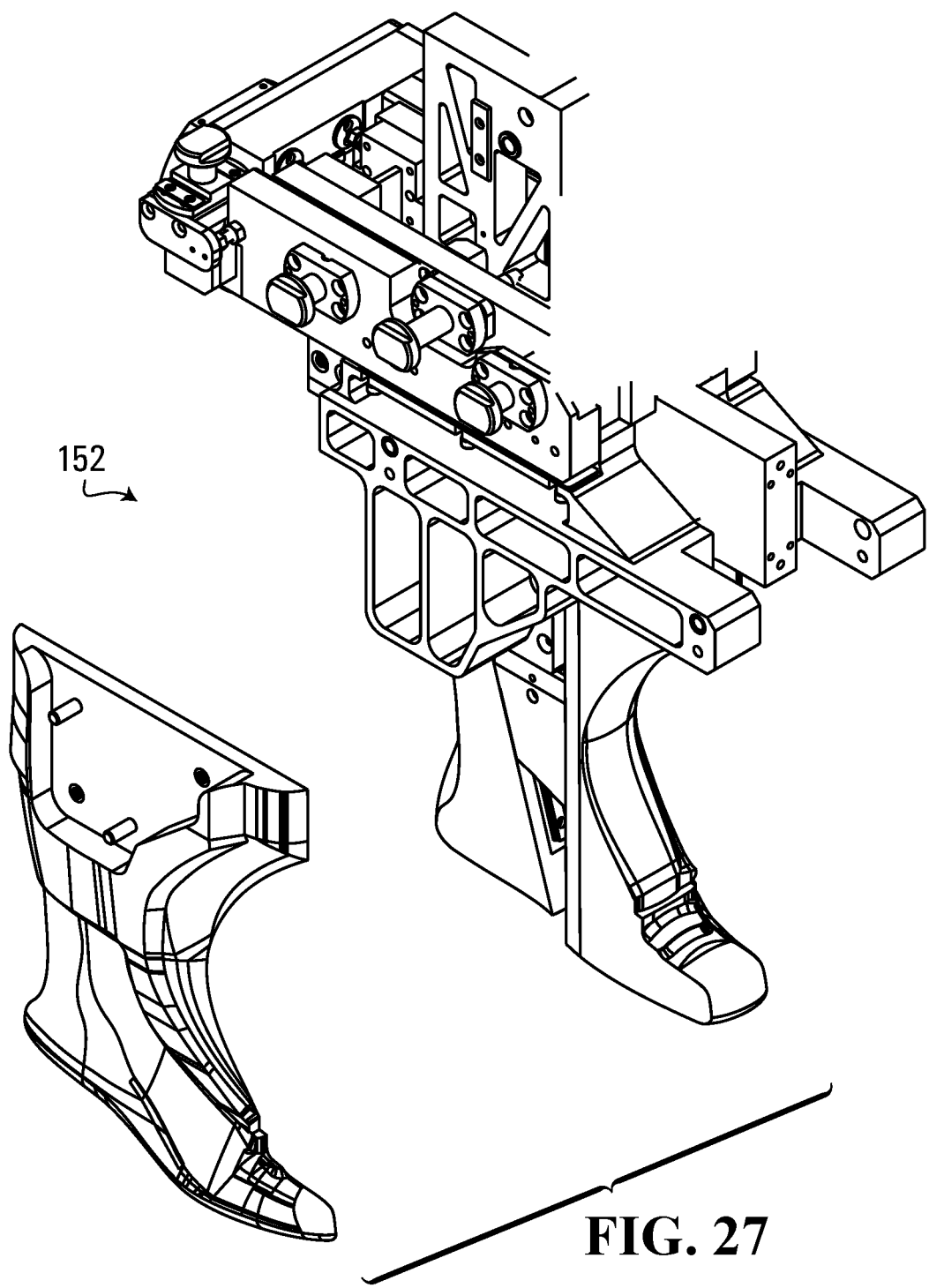
Figure 28:
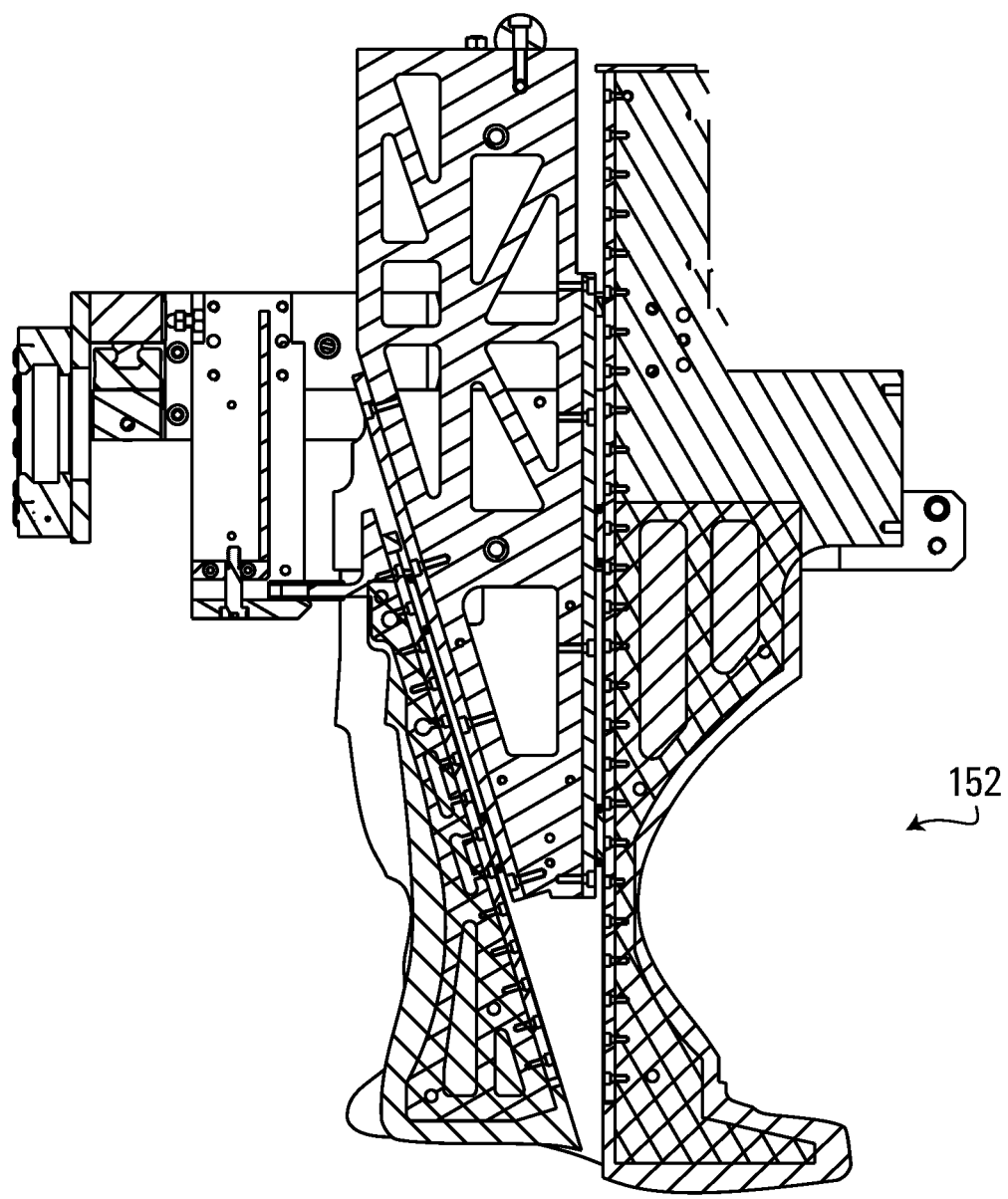
Figure 29:
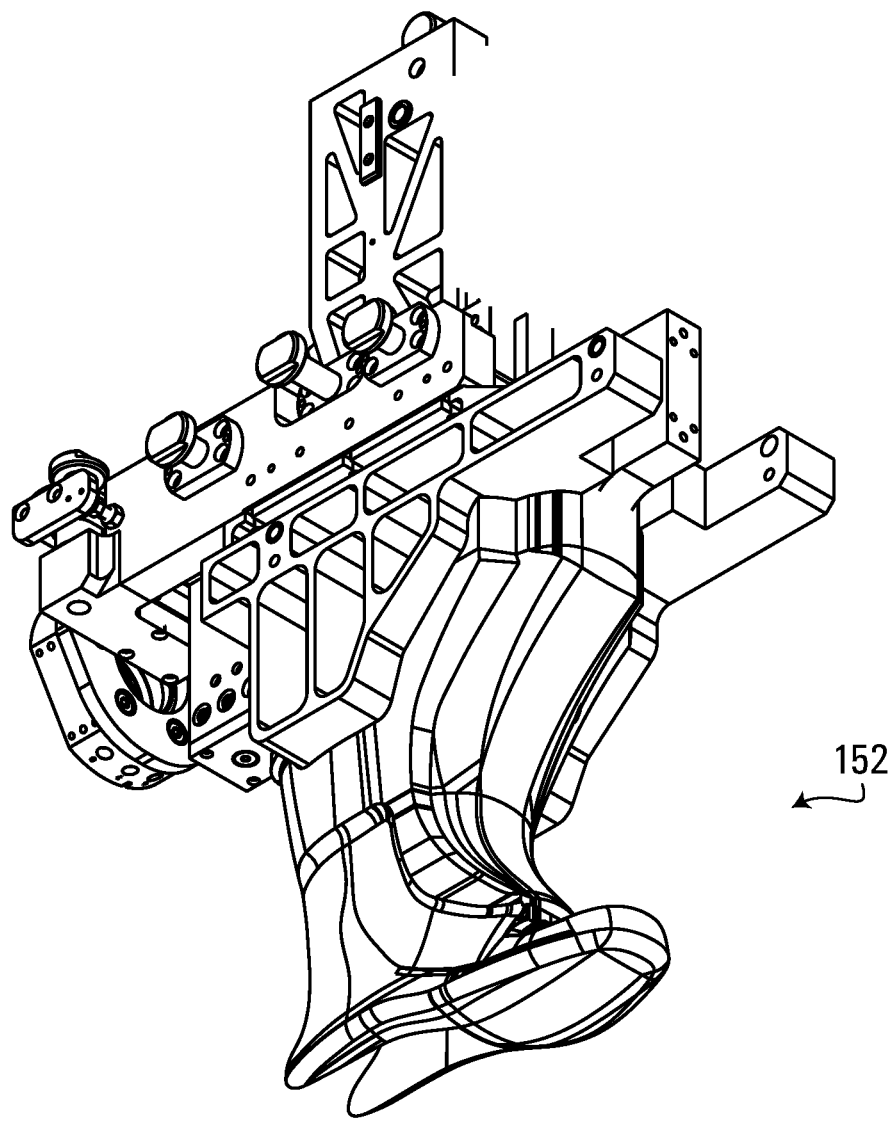
Figure 30:
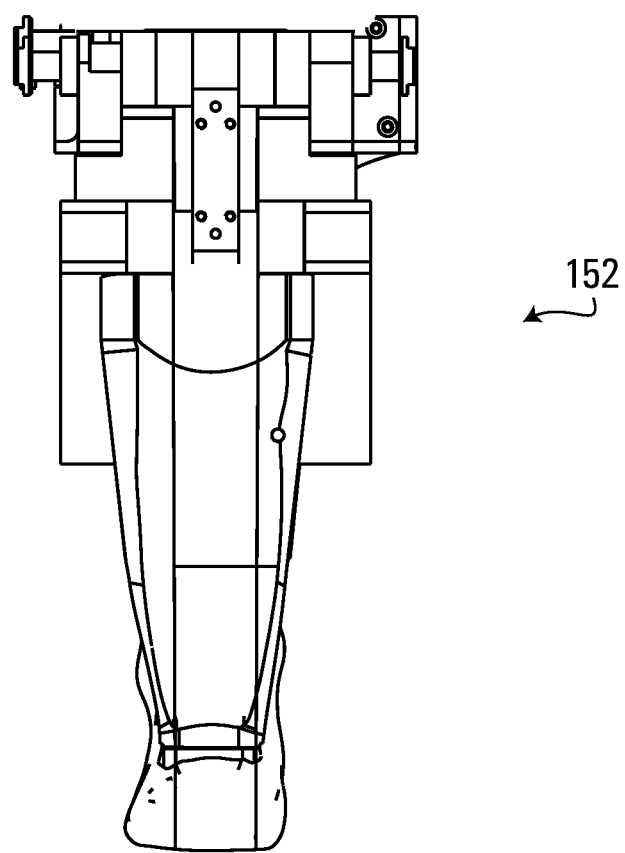
Figure 31:
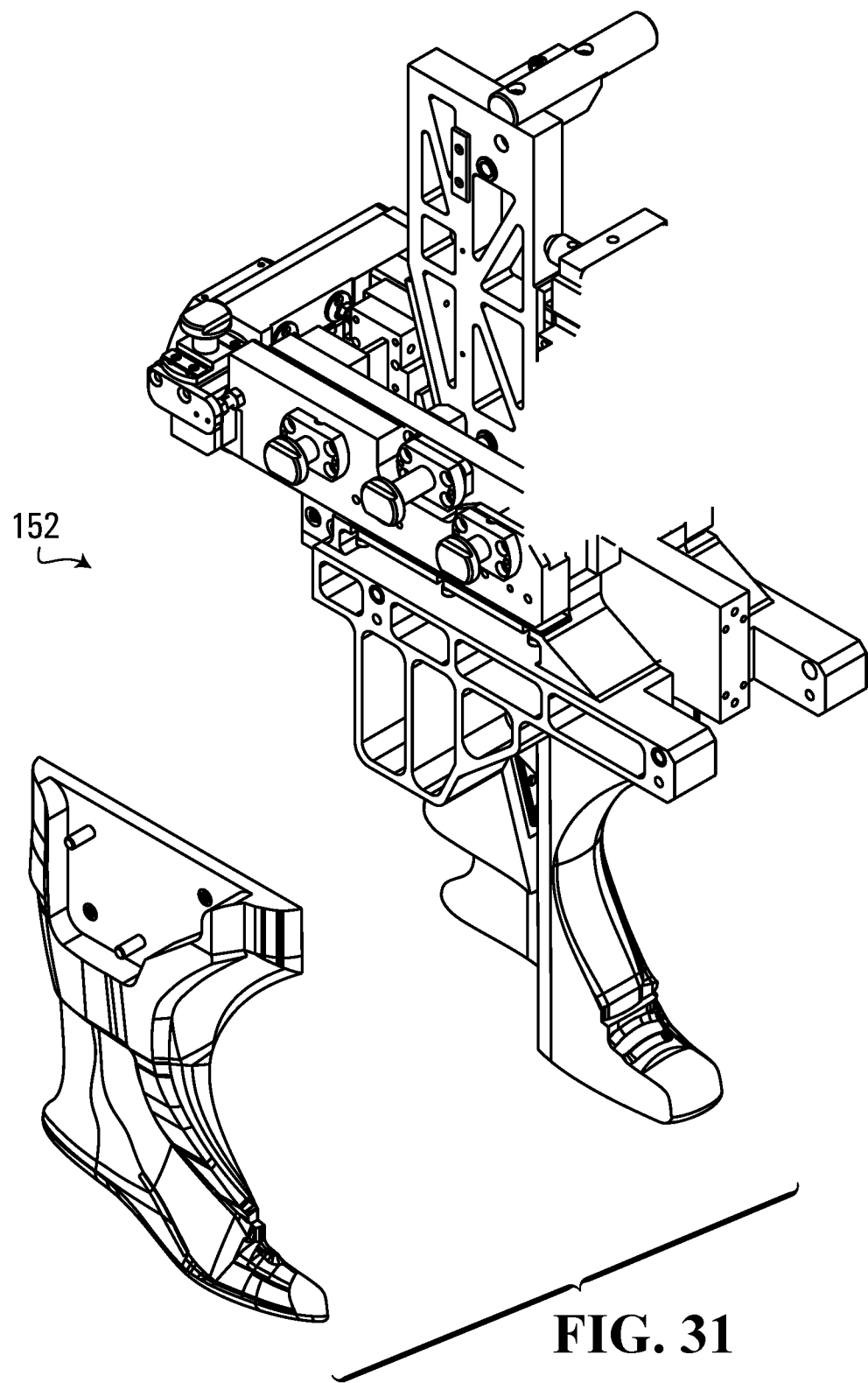
Figure 32:
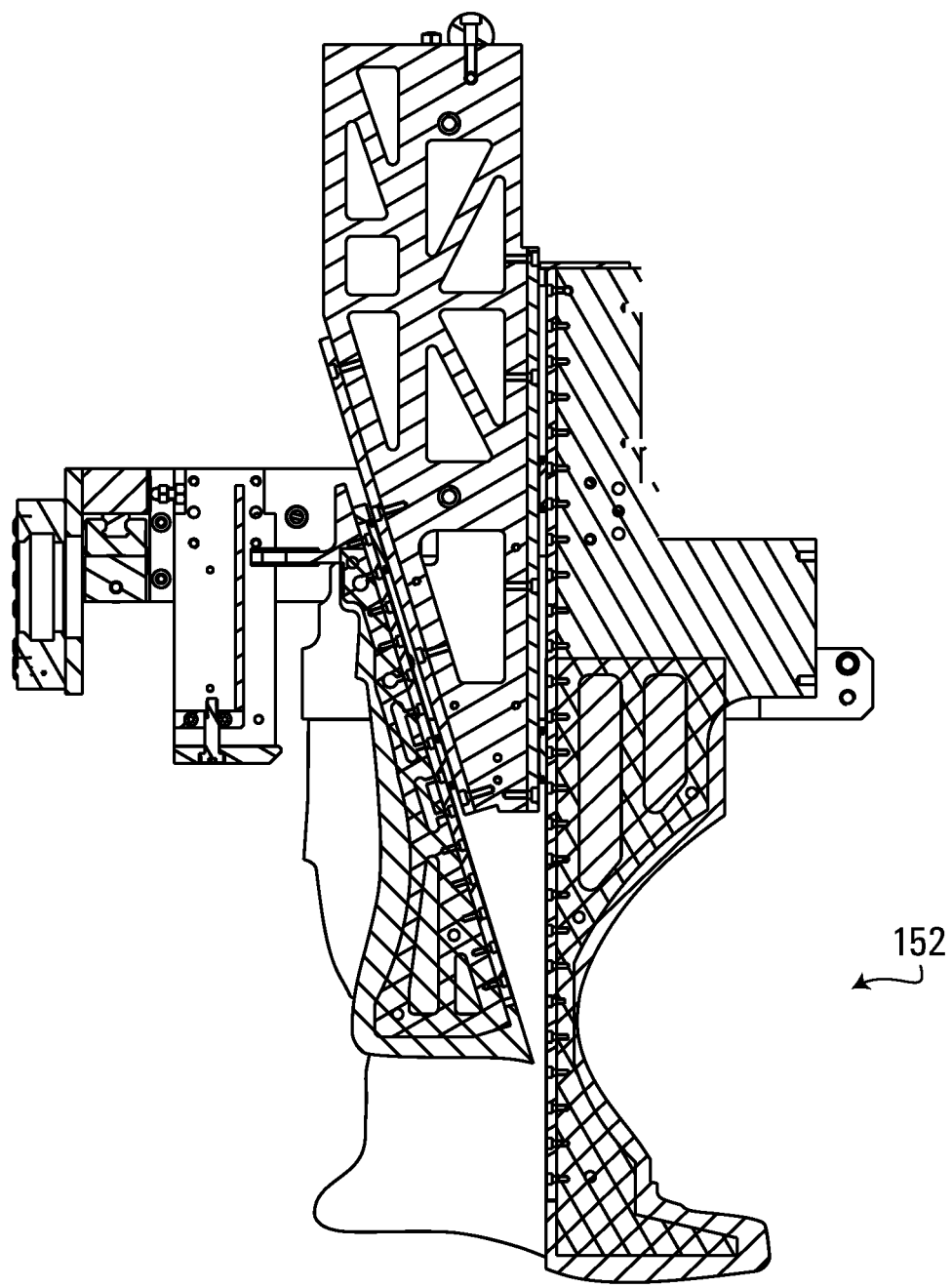
Figure 33:
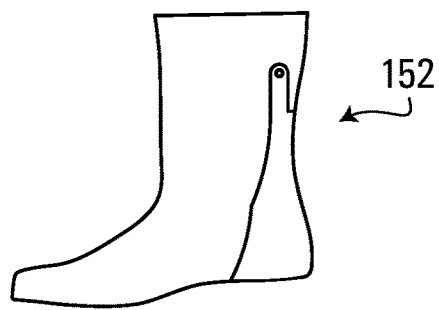
FIGS. 33 to 37 show an example of the last to form the shell in another embodiment.
Figure 34:
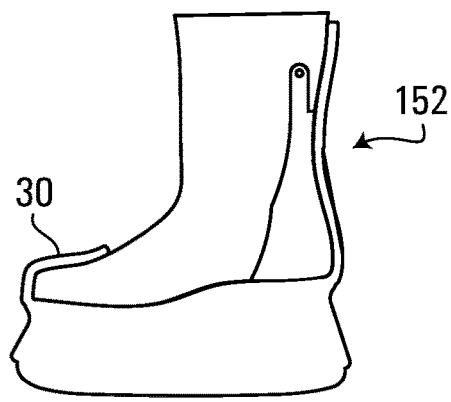
Figure 35:
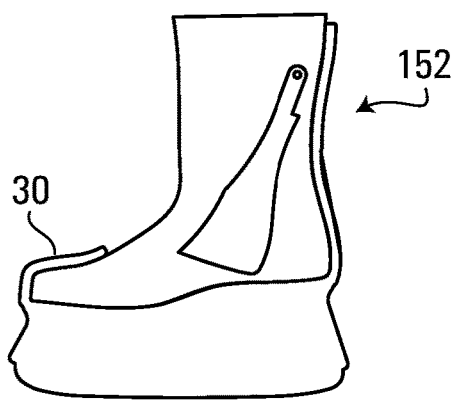
Figure 36:
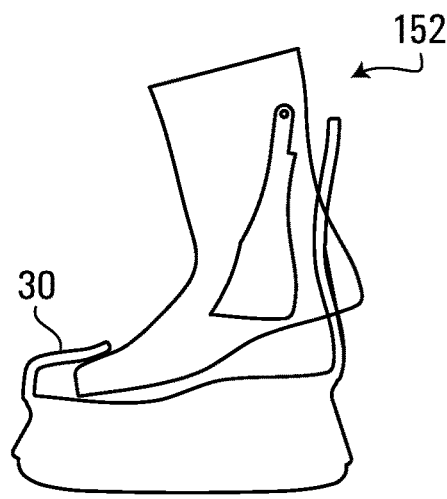
Figure 37:
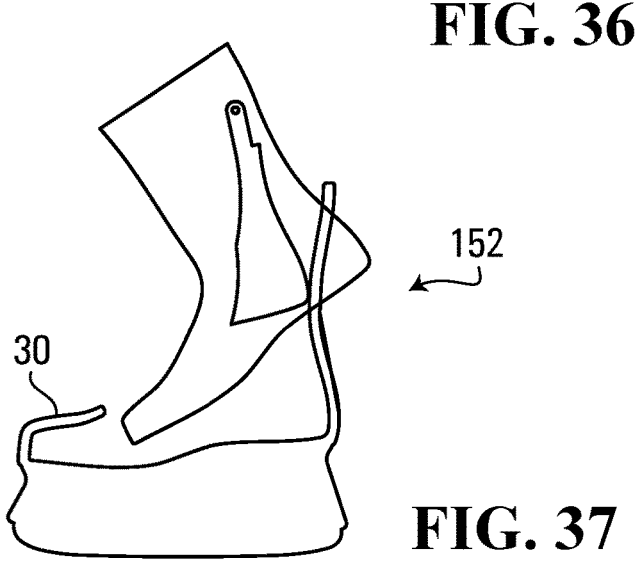
Figure 38:
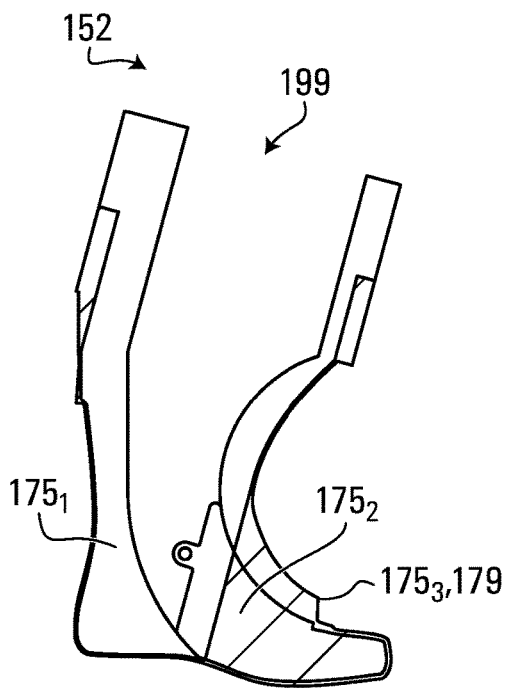
FIGS. 38 to 42 show an example of the last to form the shell in another embodiment.
Figure 39:
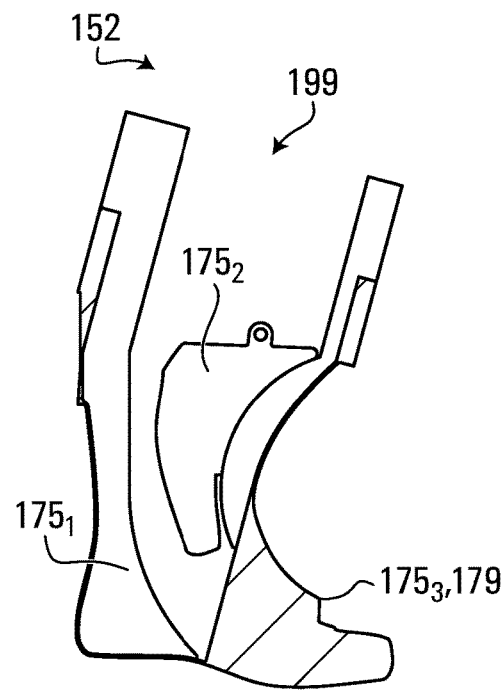
Figure 40:
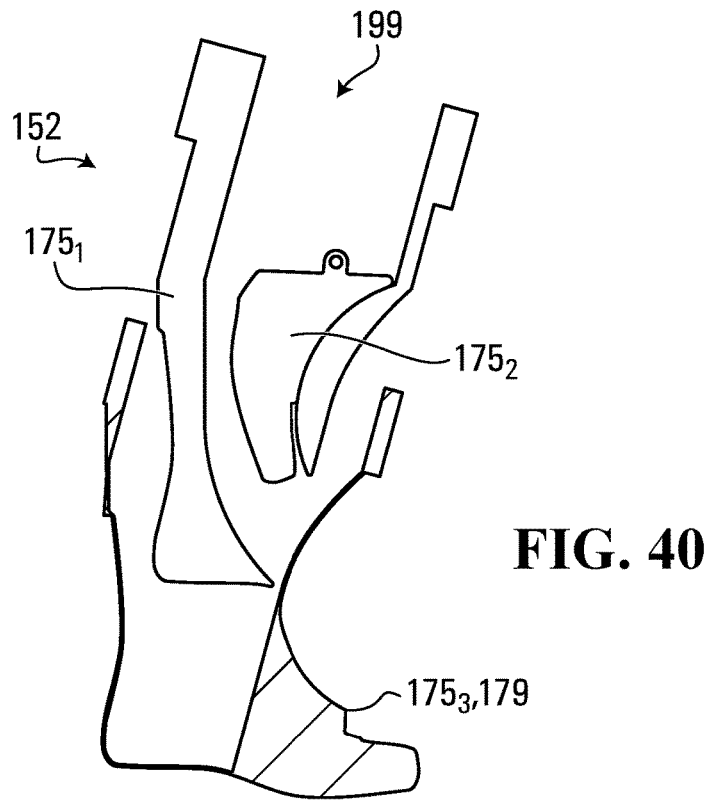
Figure 41:
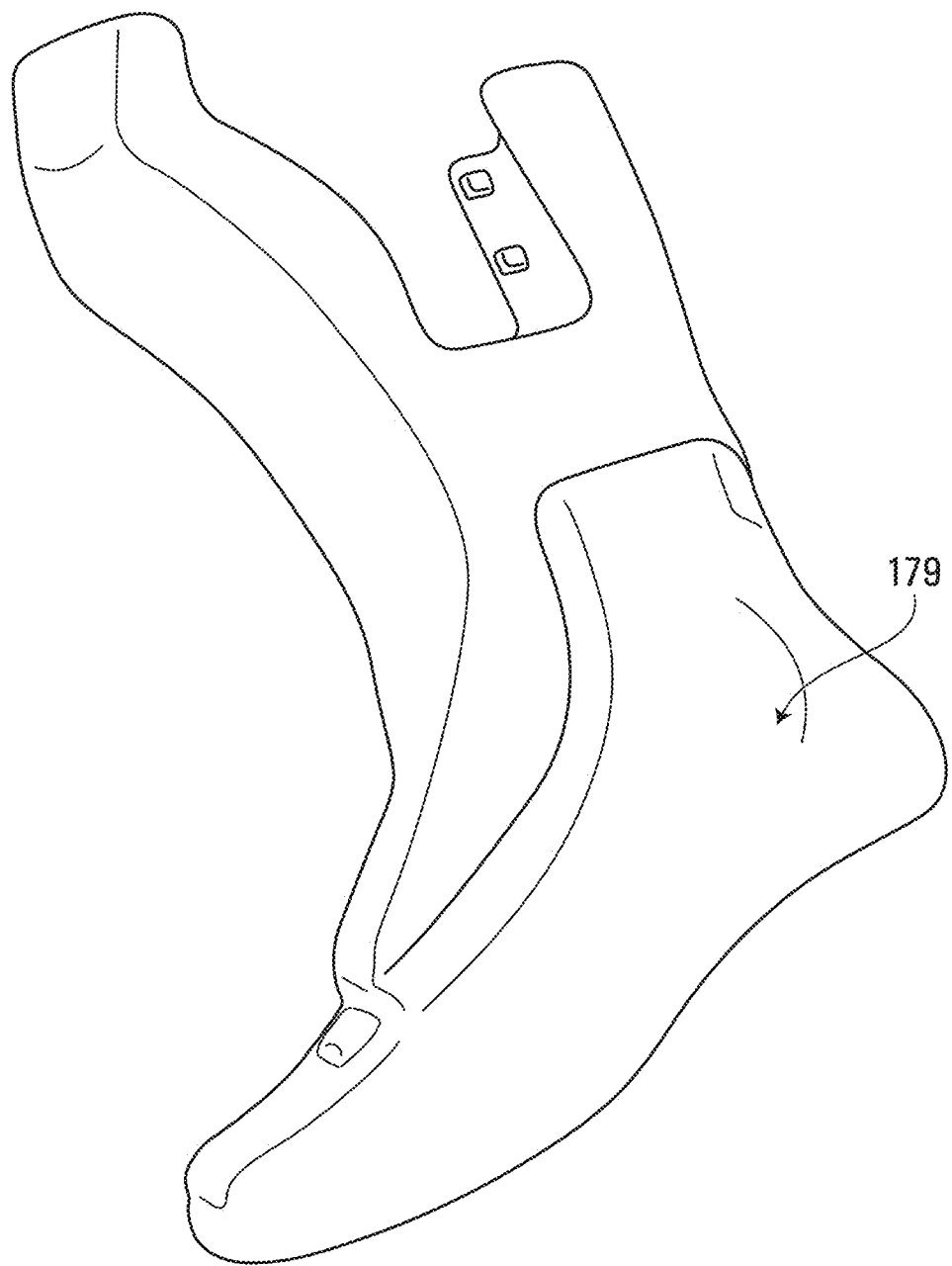
Figure 42:
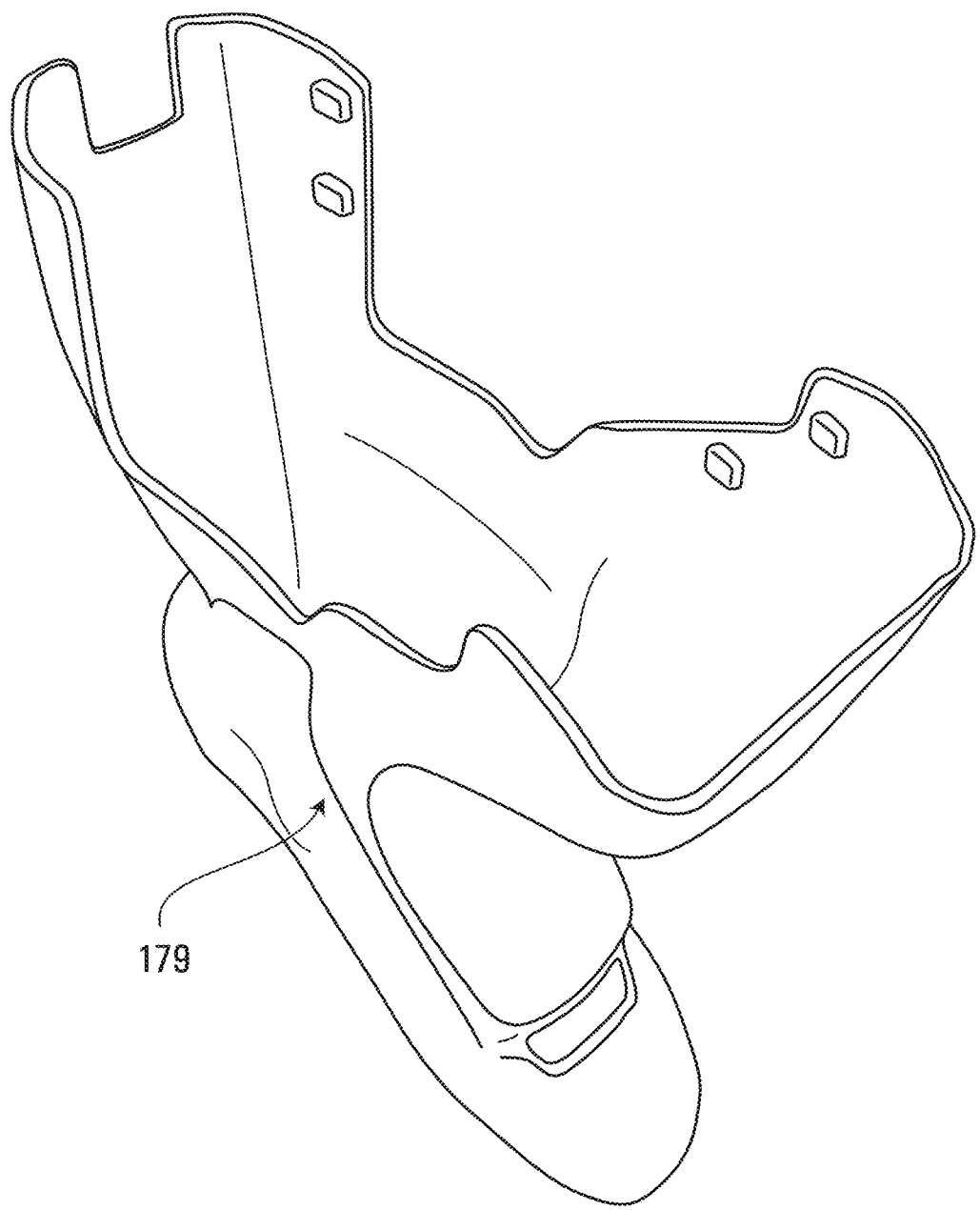

As a variant, in some embodiments, as shown in FIG. 20, the cavity 163 of the last 152 may contain particles $169_1$-$169_P$, such as beads, granules, sand, or other grit, that are configured to vary a rigidity of the last 152 in response to flow of the fluid 167 relative to (i.e., into or out of) the cavity 163 of the last 152. For instance, the particles $169_1$-$169_P$ may rigidify (i.e., increase the rigidity of the last 152) when the fluid 167 flows out of the cavity 167 (e.g., by vacuum).

As another example, in some embodiments, as shown in FIGS. 21 to 32, the last 152 may comprise a plurality of last members $175_1$-$175_M$ that are movable relative to one another to change between its molding configuration and its demolding configuration. The last members $175_1$-$175_M$ may be viewed as last "modules" so that the last 152 is a "modular" last. Each of the last members $175_1$-$175_M$ is shaped such that the last members $175_1$-$175_M$ collectively form the shape of the last 152 to mold the shell 30 in its molding configuration.

In this embodiment, respective ones of the last members $175_1$-$175_M$ are movable relative to one another while remaining connected to one another as the last 152 changes between its molding configuration and its demolding configuration. The last 152 comprises a control system 187 to control movement of the last members $175_1$-$175_M$ relative to one another. The control system 187 comprises a linkage 181 that includes links $183_1$-$183_C$ linking adjacent ones of the last members $175_1$-$175_M$ so that they are movable relative to one another and an actuating mechanism 191 that includes a plurality of actuators $193_1$-$193_4$ operable to move the last members $175_1$-$175_M$ relative to one another between the molding configuration of the last 152 and the demolding configuration of the last 152.

Adjacent ones of the last members $175_1$-$175_M$ may be translatable and/or rotatable relative to one to change the last 152 between its molding configuration and its demolding configuration. That is, adjacent ones of the last members $175_1$-$175_M$ may move relative to one by translation, rotation, or a combination of translation and rotation to change the last 152 between its molding configuration and its demolding configuration. For example, in this embodiment, the linkage 181 comprises translation guides $195_1$-$195_4$ for translating adjacent ones of the last members $175_1$-$175_M$ relative to one another and a pivot 197 for pivoting adjacent ones of the last members $175_1$-$175_M$ relative to one another.

In this embodiment, the last member $175_1$ is a front central last member to form part of a front region of the shell 30 including a central part of the toe cap 32 integrally formed with the shell 30 and a front central part of the sole portion 69; the last member $175_3$ is a rear central last member to form part of a rear central region of the shell 30 including a central part of the heel portion 62, a central part of the ankle portion 64, and a rear central part of the sole portion 69; the last member $175_2$ is an intermediate central last member disposed between the front central last member $175_1$ and the rear central last member $175_3$ to form an intermediate central part of the sole portion 69; and the last members $175_4$, $175_4$ are medial and lateral last members to form medial and lateral parts of the heel portion 62, medial and lateral parts of the ankle portion 64, medial and lateral parts of the sole portion 69, medial and lateral parts of the toe cap 32 integrally formed with the shell 30, and the medial and lateral side portions 66, 68 of the shell 30.

More particularly, in this embodiment, the last members $175_1$-$175_M$ are movable relative to one another to change the last 152 from its molding configuration to its demolding configuration by: (1) translating the intermediate central last member $175_2$ upwardly relative to the front central last member $175_1$ and the rear central last member $175_3$ via the translation guide $195_1$, $195_2$; (2) translating the intermediate central last member $175_2$ forwardly towards the front central last member $175_1$ via the translation guide $195_2$ that is slanted relative to the translation guide $195_1$ such that the front central last member $175_1$ and the rear central last member $175_3$ are closer to one another and the rear central last member $175_3$ clears the heel portion 62 of the shell 30; (3) translating the rear central last member $175_3$ upwardly relative to the front central last member $175_1$ via the translation guide $195_2$; (4) pivoting the front central last member $175_1$, the rear central last member $175_3$ and the intermediate central last member $175_2$ together about the pivot 197 so that the front central last member $175_1$ clears the central part of the toe cap 32 integrally formed with the shell 30; and (5) translating the medial and lateral last members $175_4$, $175_4$ laterally towards one another to clear the medial and lateral parts of the heel portion 62, the medial and lateral parts of the ankle portion 64, the medial and lateral parts of the sole portion 69, the medial and lateral parts of the toe cap 32 integrally formed with the shell 30, and the medial and lateral side portions 66, 68 of the shell 30, thereby clearing all of the shell 30 that can be removed from the last 152. The shell 30 can thus be molded and easily demolded, even with its undercuts $51_1$-$51_6$, without deforming it during demolding.

In a variant, in some embodiments, as shown in FIGS. 33 to 37, last members $175_1$, $175_2$ are movable relative to one another to change the last 152 from its molding configuration to its demolding configuration by: (1) rotating the last member $175_2$, which forms the heel portion 62 of the shell 30, relative to the last member $175_1$ to clear the heel portion 62 of the shell 30; and then rotating the last member $175_1$ and the last member $175_2$ together to remove them from the shell 30.

In some embodiments, respective ones of the last members $175_1$-$175_M$ of the last 152 may be movable relative to one another by disconnecting and separating them from one another. For example, one or more of the last members $175_1$-$175_M$ of the last 152 may be disassembled to facilitate removal of the shell 30 from the last 152. In such embodiments, one or more of the links $183_1$-$183_C$ linking adjacent ones of the last members $175_1$-$175_M$ allow these adjacent last members to be connected to one another in the molding configuration of the last 152 and to be disconnected and separated from one another in the demolding configuration of the last 152.

The last members $175_1$-$175_M$ may comprise any suitable material. In this embodiment, the last members $175_1$-$175_M$ are rigid. For example, the last members $175_1$-$175_M$ may be made of metal, rigid plastic, wood, or any other suitable material.

In a variant, in some embodiments, as shown in FIGS. 38 to 42, the last 152 comprises a base 199 that includes last members $175_1$, $175_2$ which are movable relative to one another, and a last member $175_3$ that is a removable covering 179, i.e., sheath, which covers the base 199 and is removable from the base 199. The sheath 179 may allow different sizes or shapes of the shell 30 to be molded on the 152 by using different sheaths similar to the sheath 179, protect against leakage of the polymeric material $M_1$ during injection, and/or reduce or eliminate internal parting lines on the shell 30.

In this embodiment, the sheath 179 is flexible to facilitate its placement onto the base 199 of the last 152 and its subsequent removal upon molding, yet sufficiently strong to maintain its desired shape during molding of the shell 30. For instance, in some embodiments, the sheath 179 may comprise an elastomeric material, such as silicone rubber or any other polymeric material with suitable elasticity. For example, in some embodiments, a hardness of the elastomeric material of the sheath 179 may be between 10 Shore A and 99 Shore A of have any other suitable value. This may create a sealing effect to protect against leakage of the polymeric material $M_1$ during injection. Also, the sheath 179 may have a smooth external surface that may reduce or eliminate internal parting lines on the shell 30.

Thus, in this embodiment, the sheath 179 is placed over the base 199 of the last 152 for molding the shell 30. This is facilitated by flexibility of the sheath 179. Then, to demold the shell 30, the last member $175_2$ is moved relative to the last member $175_1$ and the sheath 179 to clear a front region of the sheath 179. In this example, the last member $175_1$ includes a cavity 171 and the last member $175_2$ is rotatable into the cavity 171, thus effectively moving into an interior of the last member $175_1$. The last member $175_1$ and the last member $175_2$ which is located in the cavity 171 are then moved upwardly out of the sheath 179. The shell 30 may be removed by deforming the sheath 179 to take the shell 30 away from it. Alternatively, in some cases, the sheath 179 may be left in the shell 30 to be part of the skate boot 22 of the skate 10.

The sheath 179 of the last 152 may be implemented in various other ways in other embodiments.

For example, in some embodiments, the sheath 179 may comprises a reinforcement (e.g., a layer of fabric such as mesh, a thin metallic layer, a plastic film, etc.) within its elastomeric material to reinforce it (e.g., protect against tearing).

As another example, in some embodiments, the sheath 179 may be injection molded using a thermoplastic material such as polypropylene, polyethylene (e.g., high-density polyethylene), or any other suitable material (e.g., with low surface adhesion).

Figure 43:
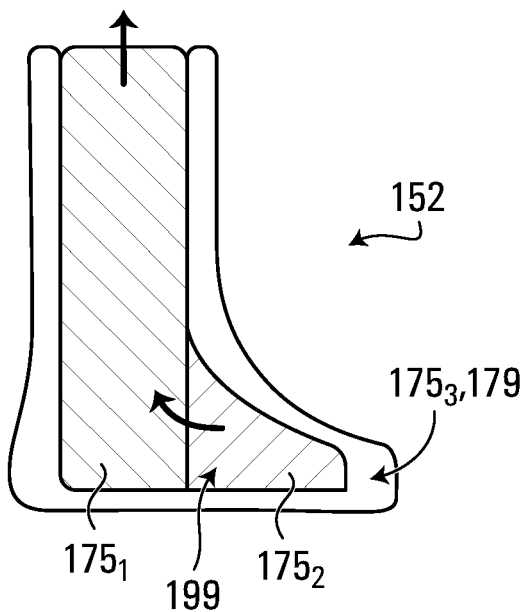
FIGS. 43 and 44 show an example of the last to form the shell in another embodiment.
Figure 44:
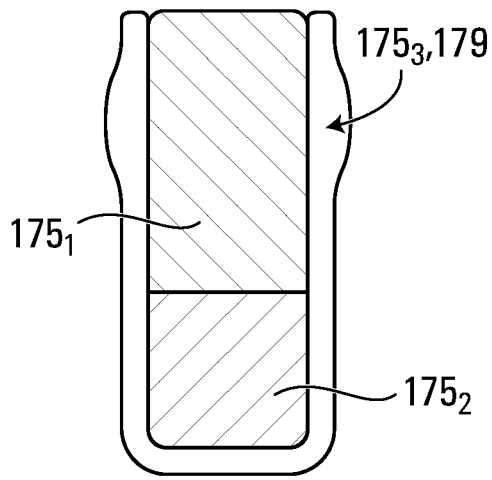

As another example, in some embodiments, as shown in FIGS. 43 and 44, a thickness of the sheath 179 may vary to define the undercuts $51_1$-$51_6$ of the shell 30 while facilitating demolding of the shell 30 from the last 152. For example, in this embodiment, the sheath 179 is thicker at locations of the medial and lateral depressions 78, 80 of the shell 30 for receiving the medial and lateral malleoli MM, LM of the player, the recesses $83_1$, $83_2$ defined by the curvature of the heel portion 62 in the longitudinal and heightwise directions of the skate 10 and the curvature of the heel portion 62 in the widthwise direction of the skate 10, and the recesses $86_1$, $86_2$ defined by the curvature of the medial side portion 66 and the curvature of the lateral side portion 68 in the longitudinal and heightwise directions of the skate 10 adjacent to the player's forefoot. Also, in this embodiment, the last member $175_1$ is shaped (e.g., straight or tapered downwardly) so as to me movable vertically during demolding and the last member $175_2$ can be removed from the shell 30 after moving the last member $175_1$ vertically.

As another example, in some embodiments, the sheath 179 may be a film placed (e.g., wrapped about) the base 199 of the last 152.

As another example, in other embodiments, the sheath 179 may be an impermeable sock pullable onto and off the last 152.

Figure 45:
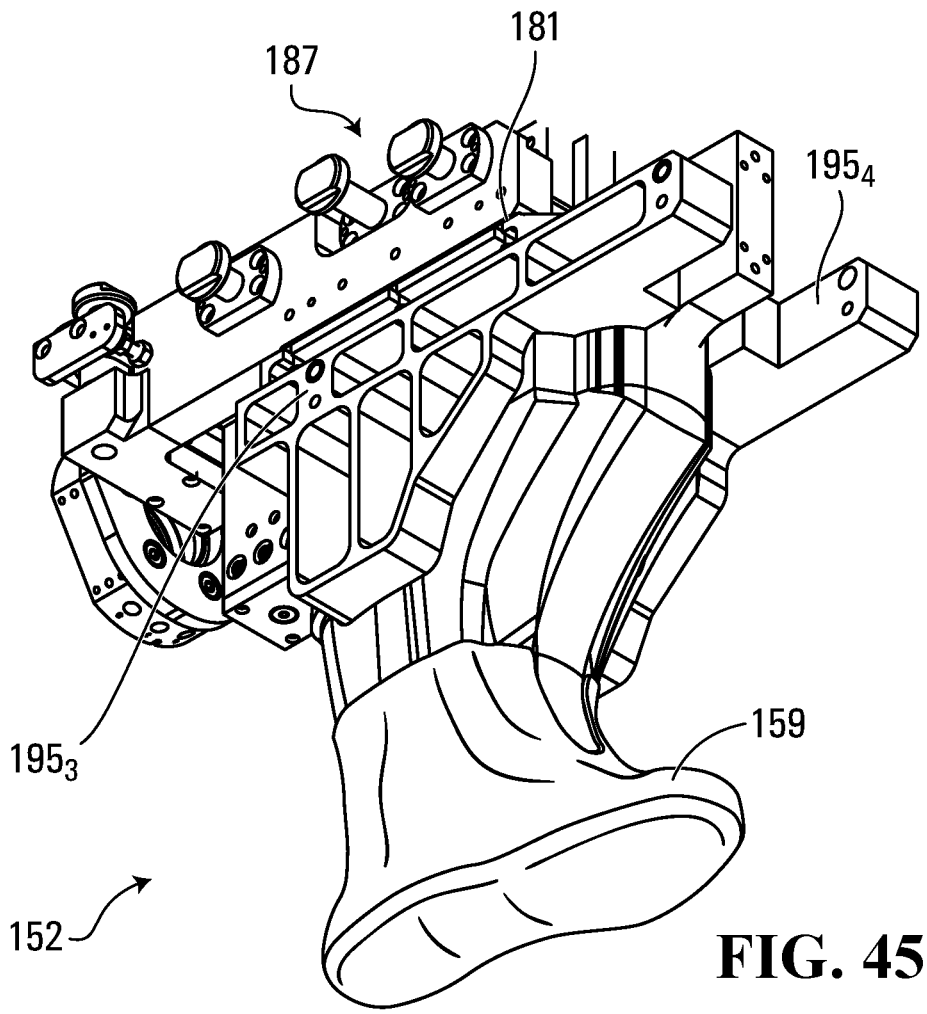
FIGS. 45 to 47 show an example of the last to form the shell in another embodiment.
Figure 46:
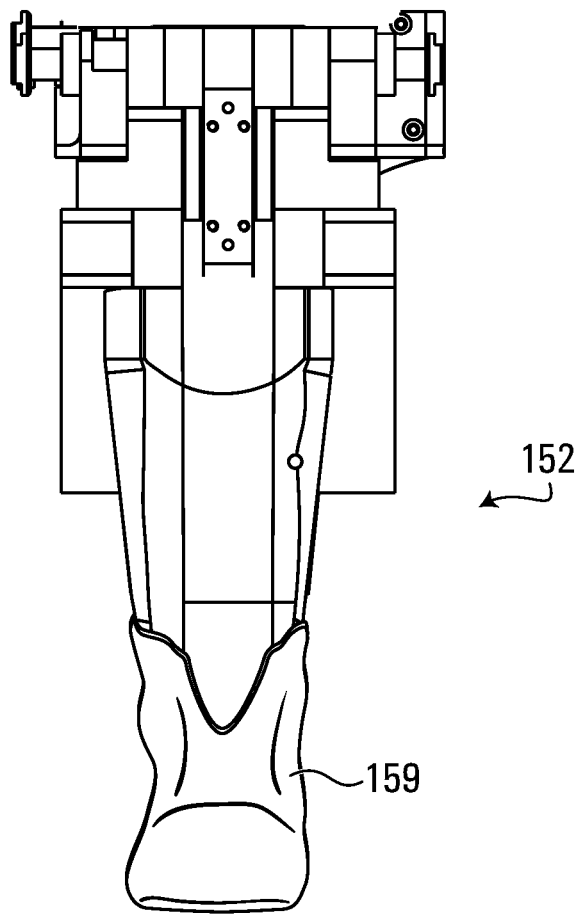
Figure 47:
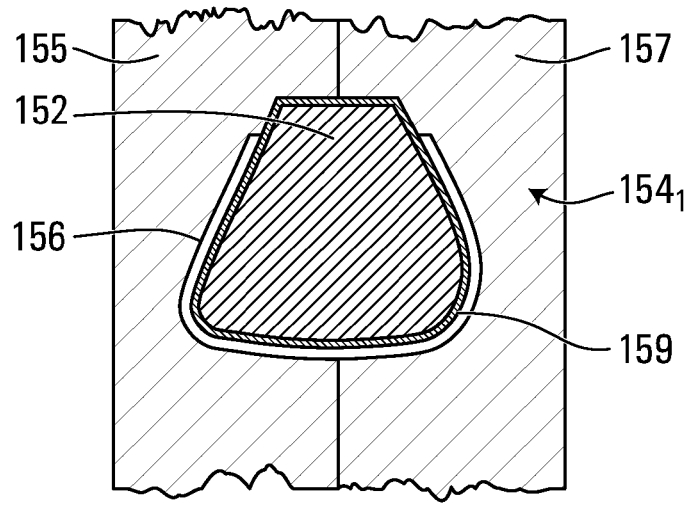

As another example, in some embodiments, as shown in FIGS. 45 to 47, the sheath 179 may be covered with a film 159 prior to molding to protect the last 152 and increase its durability. In this embodiment, the film 159 may be a bag. The bag 159 may be connected the last 152 by using tape, by being pinched to the last 152, or by any suitable means.

In this embodiment, the bag 159 is a reusable bag, that is, the bag 159 may be used to mold more the shell 30 and one or more other shells similar to the shell 30. To this end, the bag 159 may be made of a material which eases installation of the bag 159 over the last 152 and the sheath 179, facilitates molding by being relatively smooth, and is relatively durable. In this example, the bag 159 is made of of an elastomeric material such as plastic or silicone.

In other embodiments, the bag 159 may not be reusable. That is, the bag 159 may be configured for being used for molding only one shell 30. For instance, the bag 159 may be configured such that it remains affixed with the skate shell 30 after molding. More specifically, during molding, the bag 159 binds with the shell 30 and when the shell 30 is removed from the molding apparatus, the bag 159 remains with the skate shell. In some cases, a portion of the bag 159 may need to be cut off from the shell 30 so that no loose portion of the bag 159 remains attached to the shell 30. In some embodiments, the bag 159 may include a graphical representation of: one or more alphanumeric characters that may form text (e.g., a word, a message, etc.); one or more symbols (e.g., a logo, a sign, an emblem, etc.); one or more shapes or patterns; and/or one or more real or imaginary objects (e.g., a person, an animal, a vehicle, an imaginary or fictional character, or any other real or imaginary thing), to enhance the look of at least a portion of the shell 30, such as the inner side of the shell 30. In some embodiments, the bag 159 may be made of a polymeric material and may have a thickness between 0.01 mm and 1 mm, in some embodiments between 0.05 mm and 0.5 mm, in some embodiments about 0.1 mm.

The control system 187 to control movement of the last members $175_1$-$175_M$ relative to one another may be implemented in any other suitable way in other embodiments.

Figure 48:
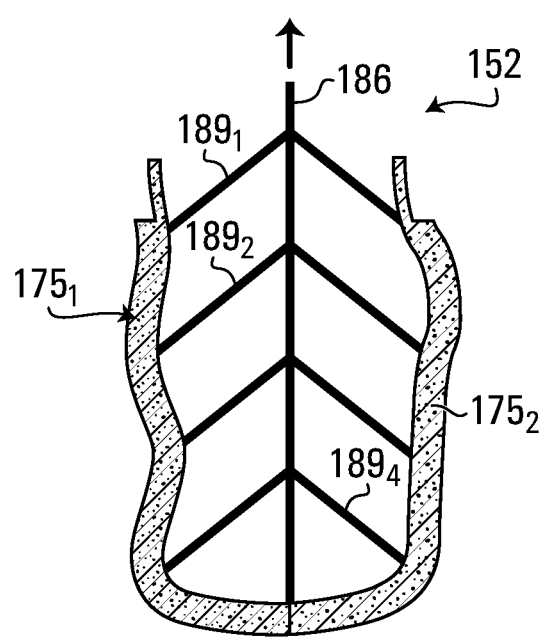
FIGS. 48 to 52 show an example of a flexible female mold member in another embodiment.
Figure 49:
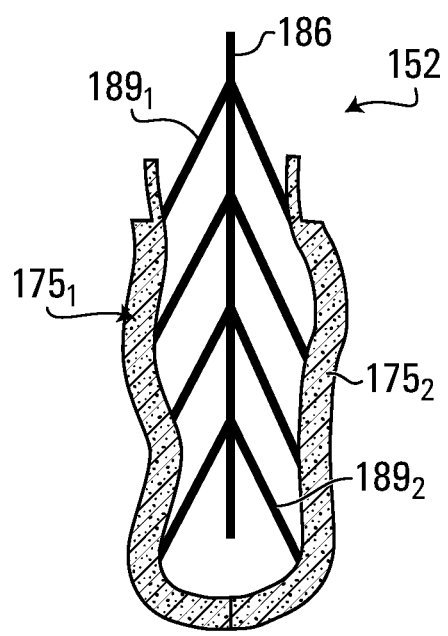

For example, in some embodiments, as shown in FIGS. 48 and 49, the control system 187 may be configured to control movement of last members $175_1$, $175_2$ so that the last 152 is expandable into its molding configuration and contractible into its demolding configuration. In this embodiment, the links $183_1$-$183_C$ between the last members $175_1$, $175_2$ include a central member 186 and arms $189_1$-$189_A$ that extend from the central member 186 to respective ones of the last members $175_1$, $175_2$, such that movement of the central member 186 in a given direction (e.g., downwardly) causes the arms $189_1$-$189_A$ to push the members $175_1$, $175_2$ away from one another to expand the last 152 for molding the shell 30, and movement of the central member 186 in an opposite direction (e.g., upwardly) causes the arms $189_1$-$189_A$ to pull the members $175_1$, $175_2$ towards one another to contract the last 152 for demolding the shell 30.

The last members $175_1$-$175_M$ may be implemented in any other suitable way in other embodiments. For example, in various embodiments, the last members $175_1$-$175_M$ may have any other suitable shape, there may be any other suitable number of last members (e.g., two, three, four, six, seven, etc. last members), respective ones of the last members $175_1$-$175_M$ may move in any other way relative to one another, etc. Also, in various embodiments, features of the last members $175_1$-$175_M$ of different embodiments considered herein may be combined together in some examples of implementation.

Figure 50:
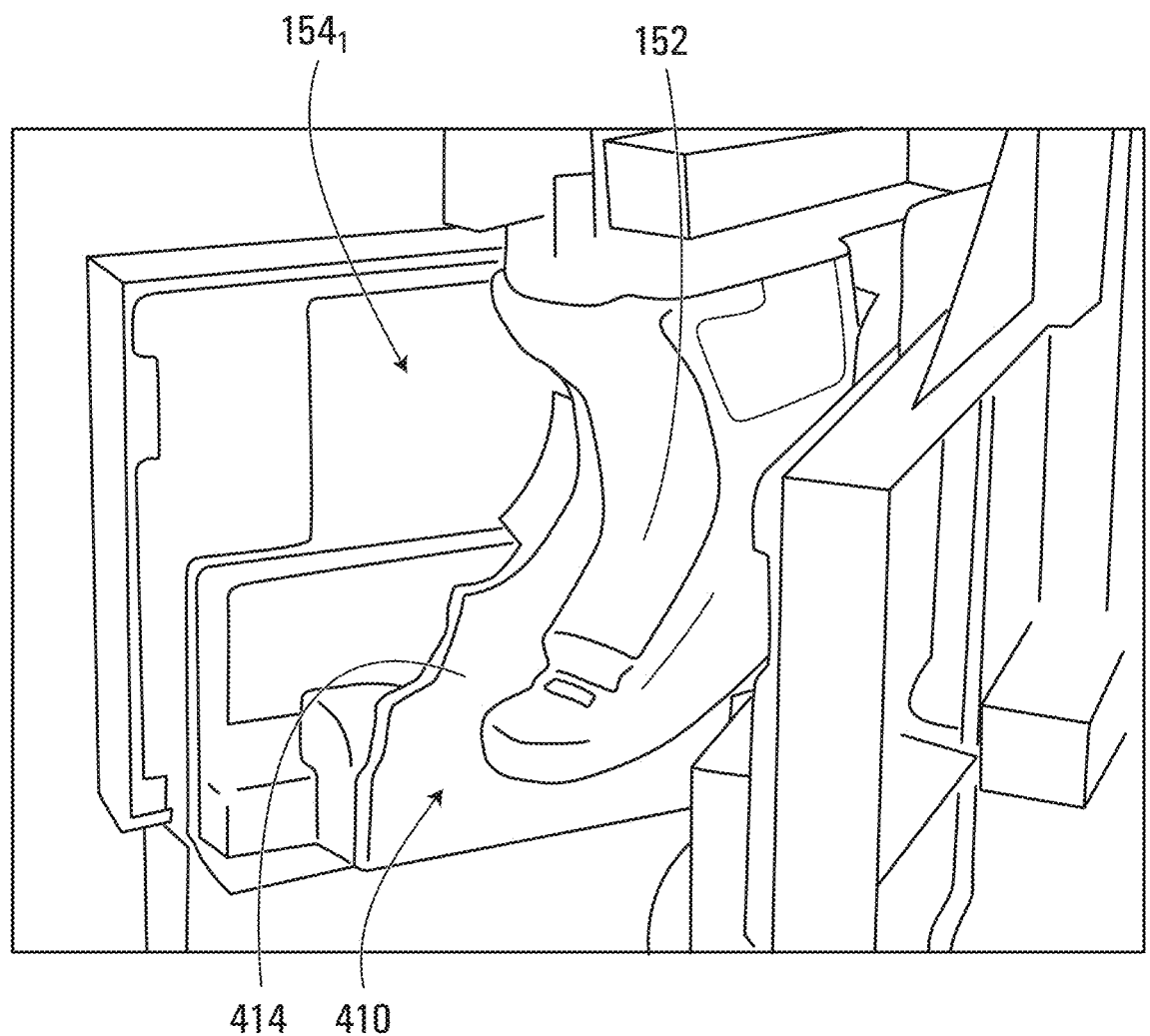
Figure 51:
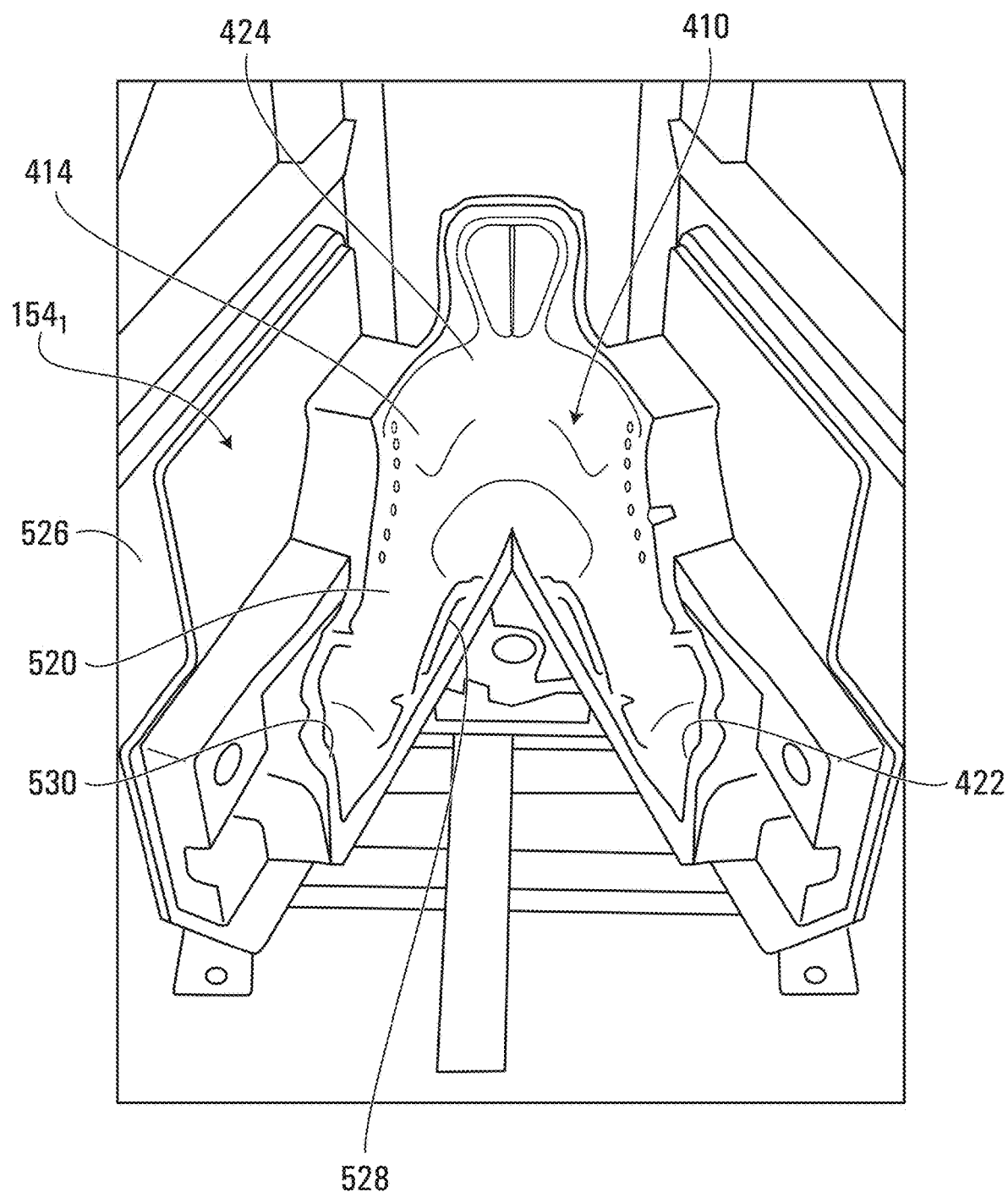
Figure 52:
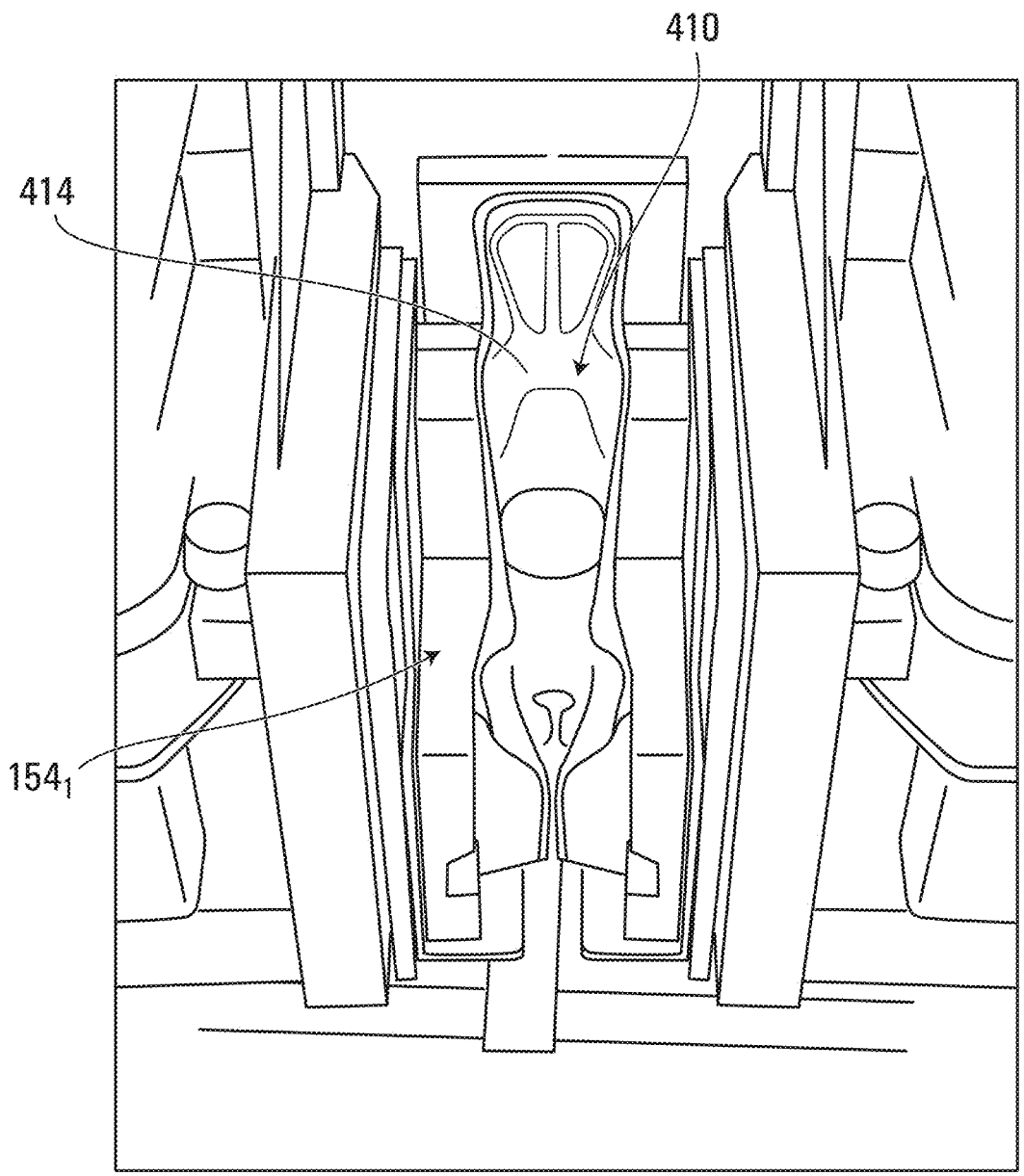

With additional reference to FIGS. 50 to 52, in some embodiments, a given one of the female molds $154_1$-$154_3$ may comprise a flexible female mold member 410 comprising an inner surface 414 constituting at least part of an inner surface of the given one of the female molds $154_1$-$154_3$ and preformed to define a given one of the mold cavities 156, 158, 160 between itself and the last 152 in which a given one of the polymeric materials $M_1$-$M_3$ is injected to mold a given one of the subshells $85_1$-$85_3$ such that the inner surface 414 creates an outer surface of the given one of the subshells $85_1$-$85_3$. The flexible female mold member 410, which will also be referred to as a "membrane", is configured to avoid at least one parting line on the shell 30 that would otherwise result because of the portions 155, 157 of the given one of the female molds $154_1$-$154_3$ if the membrane 410 was omitted.

For example, in this embodiment, the membrane 410 is part of the female mold $154_1$ such that its inner surface 414 is preformed to define the mold cavity 156 between itself and the last 152 in which the polymeric material $M_1$ is injected to mold the subshell $85_1$ such that the inner surface 414 creates the outer surface of the subshell $85_1$.

The inner surface 414 of the membrane 410 is preformed in that it is formed to define the mold cavity 156 to mold the subshell $85_1$ and create the outer surface of the subshell $85_1$ before the membrane 410 is placed in the molding apparatus 150. For instance, the membrane 410 may be preformed in a separate mold in a prior operation.

The membrane 410 is flexible to flex during movement of the portions 155, 157 of the female mold $154_1$ when closing and opening the female mold $154_1$ and overlies one or more spaces where the portions 155, 157 of the female mold $154_1$ move relative to one another. This allows one or more parting lines to be avoided as the membrane 410 overlies where these one or more parting lines would otherwise be located.

In this embodiment, the membrane 410 extends continuously to constitute to at least a majority (i.e., a majority or an entirety) of the inner surface of the female mold $154_1$ and to create at least a majority of the outer surface of the subshell $85_1$. More particularly, in this embodiment, the membrane 410 comprises medial and lateral side portions 420, 422, an ankle portion 424, a heel portion 426, and a sole portion 428 that are integral and continuous with one another as a one-piece structure. In this example, the membrane 410 is flexible and jointless (i.e., without any joint) at the heel portion 426 and a rear of the ankle portion 424, while the medial and lateral side portions 420, 422 and medial and lateral parts of the sole portion 428 are separable and movable relative to one another, to allow the membrane 410 to flex during movement of the portions 155, 157 of the female mold $154_1$ when closing and opening the female mold $154_1$.

Thus, in this embodiment, the membrane 410 is configured such that the subshell $85_1$ may be free of parting lines opposite from one another (i.e., on opposite sides of the subshell $85_1$). For instance, in this embodiment, the subshell $85_1$ may have a parting line 263, which in this example is in a toe portion of the subshell $85_i$ to enclose toes of the user's foot, but is free of any parting line opposite to the parting line 263, i.e., at an opposite side of the subshell $85_1$, which in this example is a heel portion and a rear of an ankle portion of the subshell $85_1$, because of the membrane 410.

In this embodiment, the membrane 410 may comprise an elastomeric material, such as silicone rubber, any other rubber, or any other polymeric material with suitable elasticity. For example, in some embodiments, a hardness of the elastomeric material of the membrane 410 may be between 10 Shore A and 99 Shore A of have any other suitable value.

The membrane 410 of the molding apparatus 150 may be implemented in various other ways in other embodiments.

For example, in other embodiments, the membrane 410 may be flexible and jointless at other areas while separable and movable elsewhere to allow the membrane 410 to flex during movement of the portions 155, 157 of the female mold $154_1$ when closing and opening the female mold $154_1$. For instance, in some embodiments, the membrane 410 may be flexible and jointless at the sole portion 428, while medial and lateral parts of the ankle portion 424, medial and lateral parts of the heel portion 426, and the medial and lateral side portions 420, 422 are separable and movable relative to one another, to allow the membrane 410 to flex during movement of the portions 155, 157 of the female mold $154_1$ when closing and opening the female mold $154_1$. In other embodiments, the membrane 410 may be flexible and jointless at a front portion, while medial and lateral parts of the sole portion 428, medial and lateral parts of the ankle portion 424, medial and lateral parts of the heel portion 426 and the medial and lateral side portions 420, 422 are separable and movable relative to one another, to allow the membrane 410 to flex during movement of the portions 155, 157 of the female mold $154_1$ when closing and opening the female mold $154_1$.

As another example, in some embodiments, the membrane 410 may comprises a reinforcement (e.g., a layer of fabric such as mesh, a thin metallic layer, a plastic film, etc.) within its elastomeric material to reinforce it (e.g., protect against tearing).

As another example, in some embodiments, the membrane 410 may be injection molded using a thermoplastic material such as polypropylene, polyethylene (e.g., high-density polyethylene), or any other suitable material (e.g., with low surface adhesion).

As another example, in some embodiments, the membrane 410 may be incorporated into a rigid casting of a material (e.g., polyurethane, epoxy or other polymeric material; aluminum, steel or other metallic material; cement; etc.) stiffer and stronger than that of the membrane.

While the molding process has been described as being performed on a single molding apparatus 150, in some embodiments, the molding process may utilize various molding apparatuses (e.g., molding stations), each apparatus comprising a different female mold $154_i$. In such embodiments, the last 152, still mounted with at least one subshell $85_j$, can be moved from one molding station to the next without requiring removal of the female molds installed on the various molding apparatuses. In some embodiments, molding stations may be horizontally distributed (e.g., linearly and/or in a carrousel or other rotary or otherwise curved arrangement). In other embodiments, molding stations may be vertically distributed such as being stacked vertically over one another, which may be more efficient space-wise.

Figure 53:
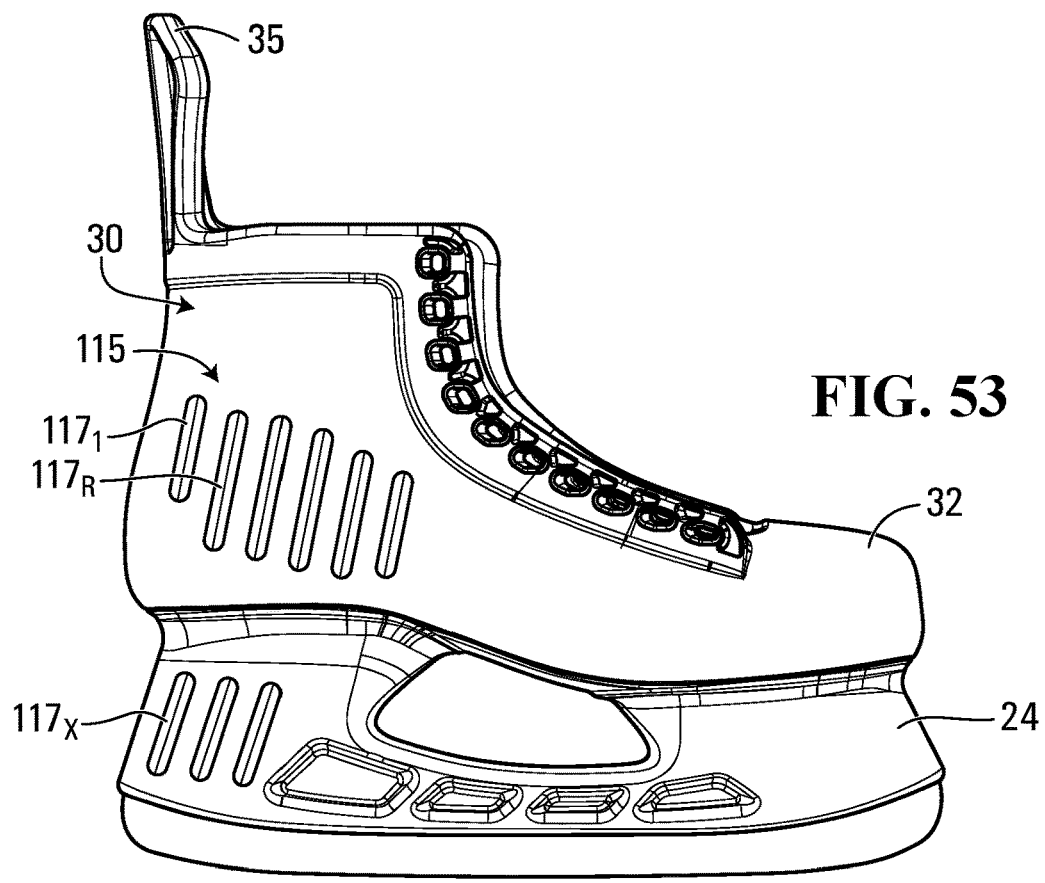
FIGS. 53 and 54 are side views of the shell in embodiments in which the shell comprises a reinforcement and the reinforcement comprises a rib.
Figure 54:
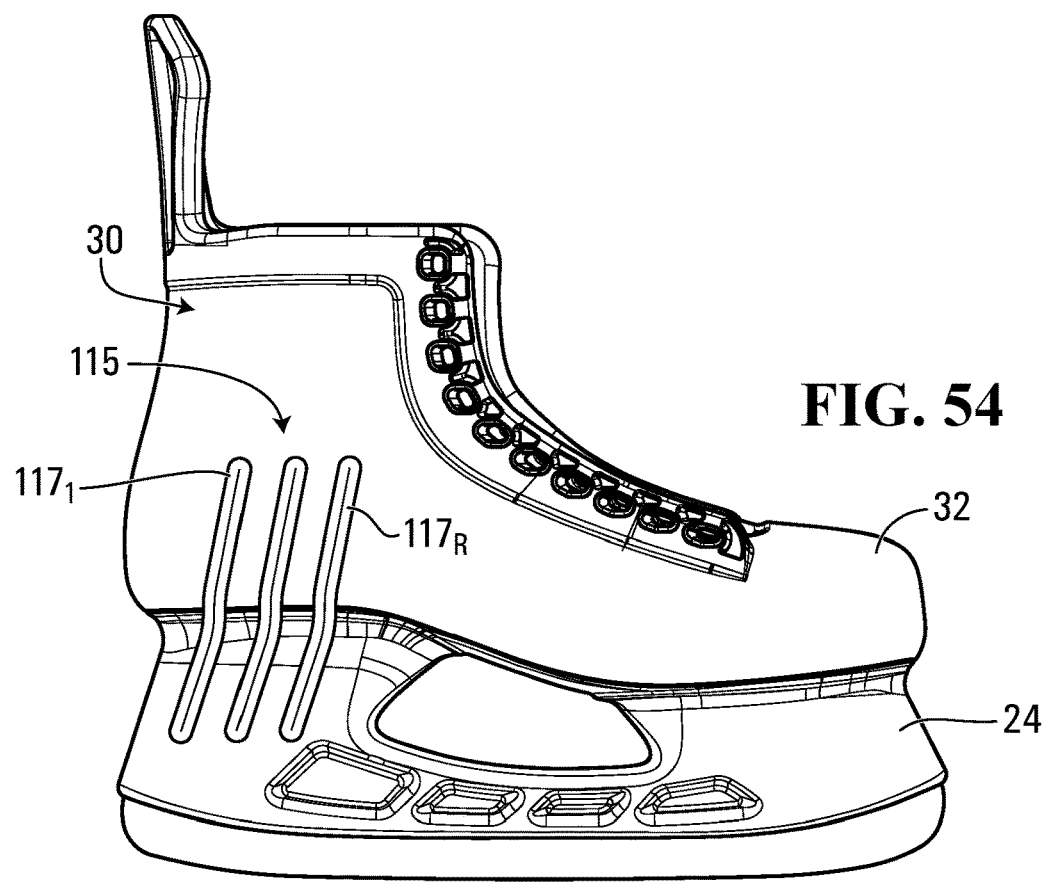
Figure 55A:
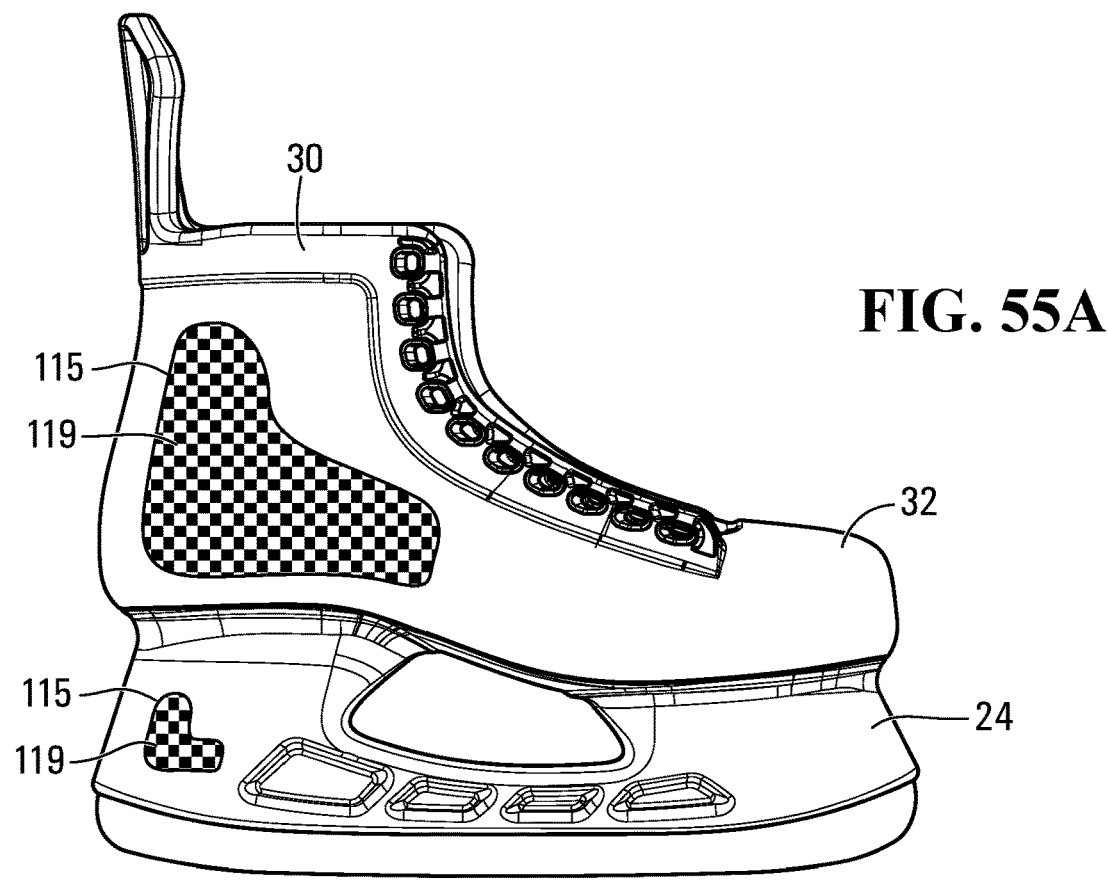
FIGS. 55A and 55B are side views of the shell in embodiments in which the reinforcement comprises a reinforcing sheet.
Figure 55B:
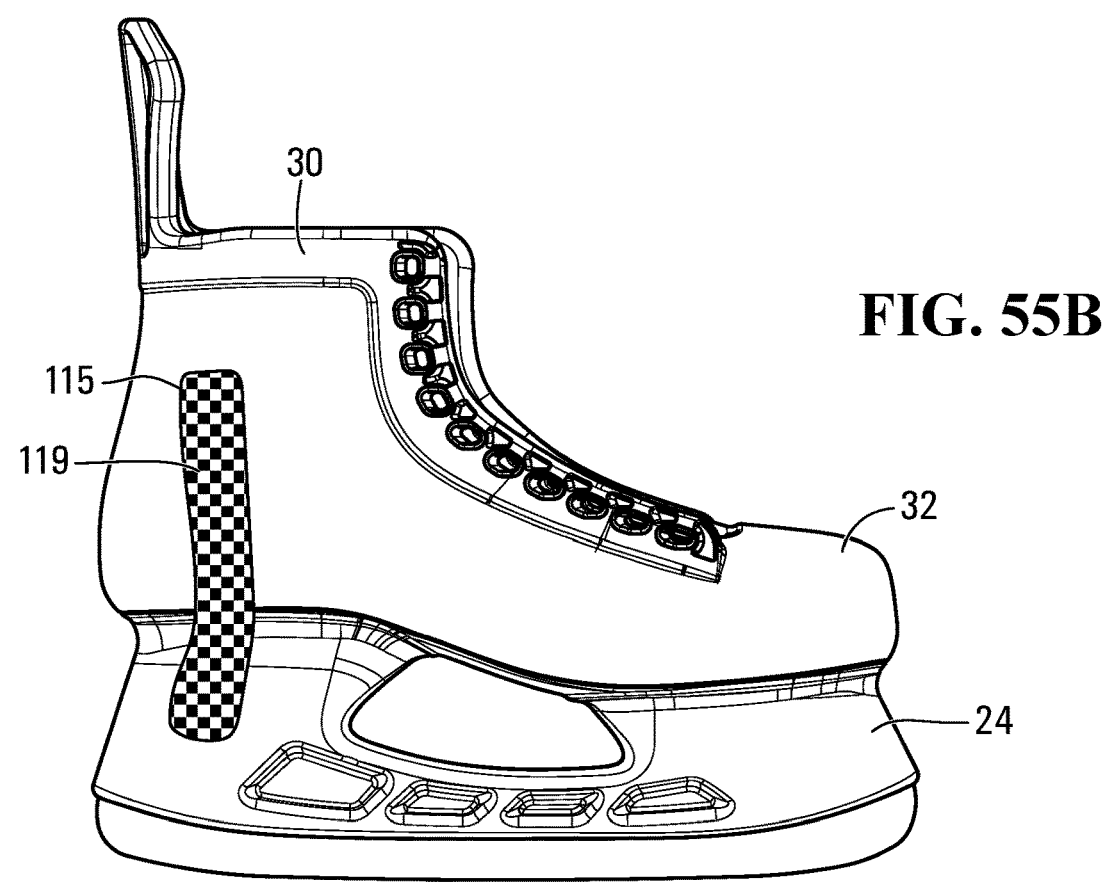

With additional reference to FIGS. 53 and 54, in some embodiments, the shell 30 may comprise a reinforcement 115 disposed between certain ones of the subshells $85_1$-$85_L$ of the shell 30 such as, for example, between the intermediate and external subshells $85_2$, $85_3$. The reinforcement 115 is produced separately from the shell 30 and is configured to reinforce selected areas of the shell 30 (e.g., the medial and/or lateral side portions 66, 68 of the shell 30) such as, for example, to make it stronger or stiffer (e.g., increase resistance to deflection or impacts). In order to include the reinforcement 115 between the intermediate and external subshells $85_2$, $85_3$, the reinforcement 115 is affixed to an exterior surface of the intermediate subshell $85_2$ after forming the intermediate subshell $85_2$ and prior to forming the external subshell $85_3$. For instance, the reinforcement 115 may be mechanically affixed (e.g., stapled, stitched, etc.), glued (e.g., via an adhesive), ultrasonically bonded, or affixed in any other suitable way to the exterior surface of the intermediate subshell $85_2$.

The reinforcement 115 may be configured in any suitable way. For instance, as shown in FIG. 53, the reinforcement 115 may comprise a plurality of ribs $117_1$-$117_R$ (or a single rib $117_i$) which project outwardly from the exterior surface of the intermediate subshell $85_2$ when the reinforcement 115 is affixed to the intermediate subshell $85_2$. Moreover, the ribs $117_1$-$117_R$ may extend on the shell 30 and/or on the blade holder 24. As shown in FIG. 54, in some embodiments, the ribs $117_1$-$117_R$ may extend from the shell 30 to the blade holder 24. That is, the ribs $117_1$-$117_R$ have a vertical extent that spans the blade holder 24 and the shell 30. In other examples, the ribs $117_1$-$117_R$ may span the blade holder 24, the shell 30 and the lace members $44_1$, $44_2$. Furthermore, in some cases, the ribs $117_1$-$117_8$ may not all be disposed between the same subshells. For example, in some cases, a first rib $117_i$ may be disposed between the intermediate and external subshells $85_2$, $85_3$ while a second rib $117_j$ is disposed between the internal and intermediate subshells $85_1$, $85_2$.

Alternatively, as shown in FIGS. 55A to 57, the reinforcement 115 may comprise a reinforcing sheet 119 that is similarly affixed to the exterior surface of the intermediate subshell $85_2$ (e.g., glued thereto). In this embodiment, the reinforcing sheet 119 comprises a material that is stiffer and/or harder than the polymeric material $M_2$ of the intermediate subshell $85_2$. For instance, the reinforcing sheet 119 may comprise a composite material comprising thermoset material, thermoplastic material, carbon fibers and/or fiberglass fibers. For example, the composite material may be a fiber-matrix composite material that comprises a matrix in which fibers are embedded. The matrix may include any suitable polymeric resin, such as a thermosetting polymeric material (e.g., polyester, vinyl ester, vinyl ether, polyurethane, epoxy, cyanate ester, etc.), a thermoplastic polymeric material (e.g., polyethylene, polypropylene, acrylic resin, polyether ether ketone, polyethylene terephthalate, polyvinyl chloride, polymethyl methacrylate, polycarbonate, acrylonitrile butadiene styrene, nylon, polyimide, polysulfone, polyamide-imide, self-reinforcing polyphenylene, etc.), or a hybrid thermosetting-thermoplastic polymeric material. The fibers may be made of any suitable material such as carbon fibers, polymeric fibers such as aramid fibers, boron fibers, glass fibers, ceramic fibers, etc.

Furthermore, in some embodiments, the reinforcing sheet 119 may comprise a fabric or textile material. For example, the reinforcing sheet 119 may comprise a fabric mesh such as a nylon mesh or any other suitable fabric material. For example, the reinforcing sheet 119 may envelop the subshell $85_x$ over which it is disposed such as to cover at least a majority (i.e., a majority or an entirety) of an outer surface of that subshell $85_x$. Moreover, the reinforcing sheet 119 may also cover at least a majority of an internal surface of a subsequent subshell $85_y$ overlying the subshell $85_x$. Thus, the reinforcing sheet 119 may extend from the lateral side portion 66 to the medial side portion 68 of the shell 30. In other cases, the reinforcing sheet 119 may be disposed at limited portions of the shell 30 (e.g., only the ankle portion 64 of the shell 30).

Figure 57:
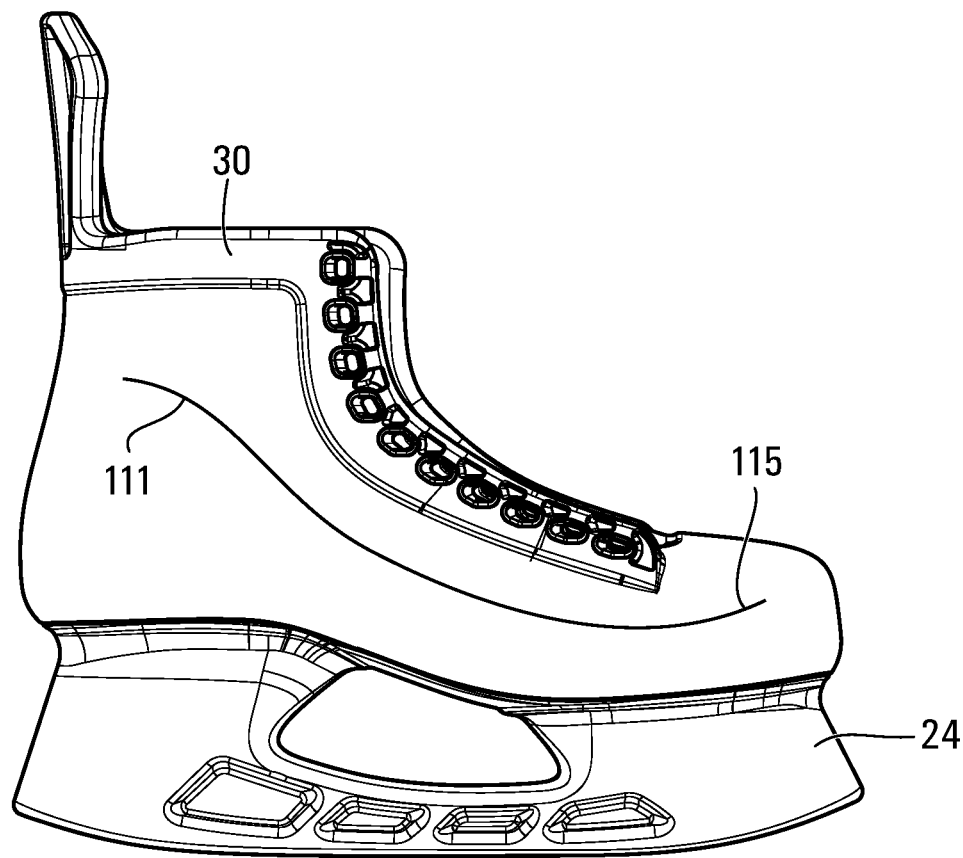
FIG. 57 is a side view of the shell in accordance with an embodiment in which the reinforcement comprises a single fiber.

In another example, as shown in FIG. 57, the reinforcement 115 may comprise a single fiber 111 rather than a fabric mesh. The single fiber 111 is configured to apply tension forces on the shell 30 and/or other components of the skate boot 22. In particular, the tension of the single fiber 111 is transmitted onto the shell 30 and thus may allow controlling its performance.

Figure 56:
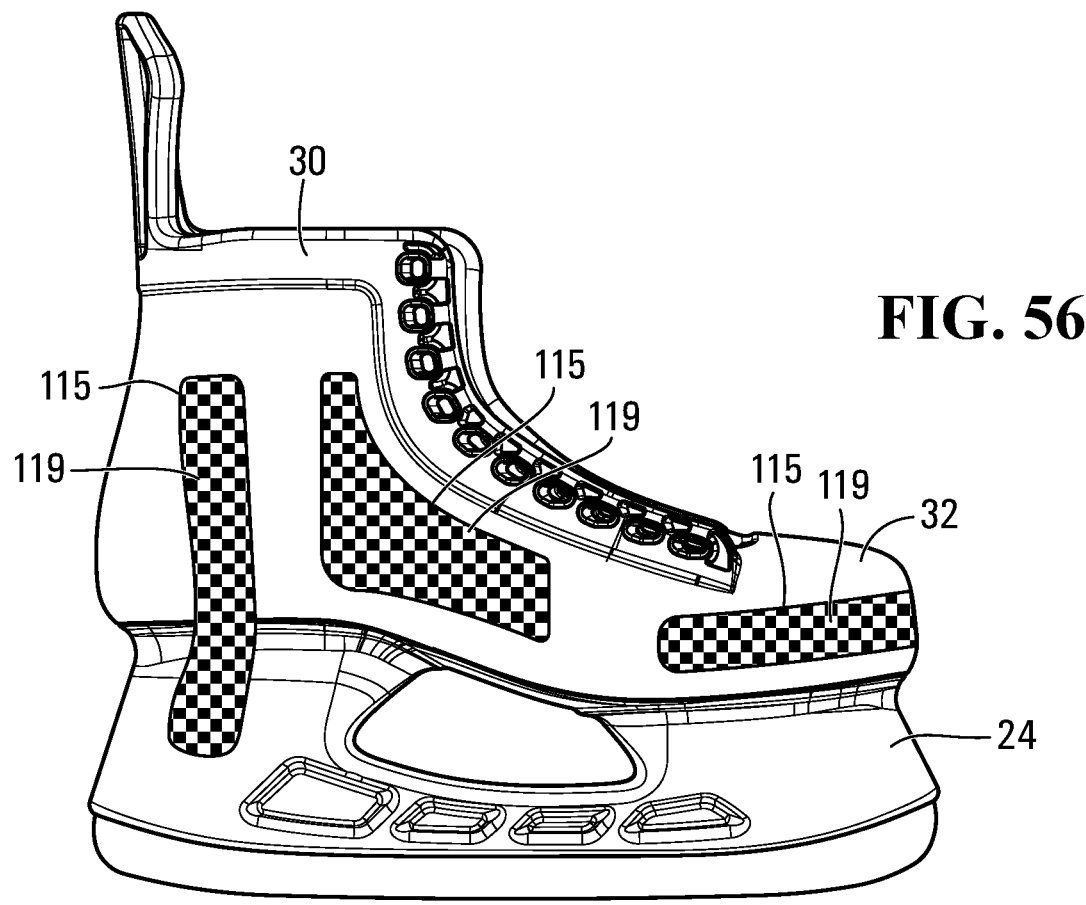
FIG. 56 are side views of the shell in embodiments in which the shell comprises more than one reinforcements.

In another example, as shown in FIG. 56 the shell 30 may comprise more than one reinforcements $115_1$-$115_r$ disposed between certain ones of the subshells $85_1$-$85_L$ of the shell 30 and each one of the reinforcements $115_1$-$115_r$ may comprise a material that is different from the material of another one of the reinforcements $115_1$-$115_r$. For instance, the materials of different ones of the reinforcements $115_1$-$115_r$ may differ in rigidity, in density, etc., such as to provide desired properties to different parts of the skate boot 22 and blade holder 24.

In some embodiments, multiple reinforcements 115 may be included between the subshells $85_1$-$85_L$ of the shell 30. For instance, a rib $117_i$ may be disposed at a selected area of the shell 30 while a reinforcing sheet 119 may be disposed at another selected area of the shell 30.

Figure 58:
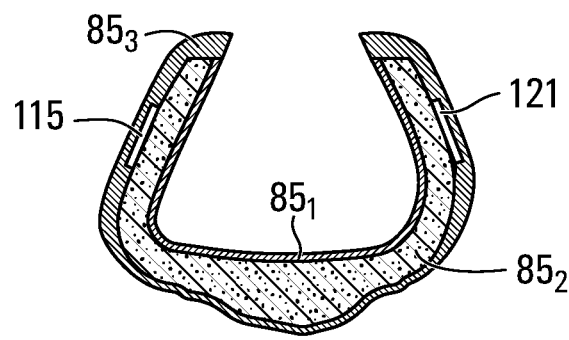
FIG. 58 is a cross-sectional view of the shell in an embodiment in which the shell comprises a reinforcement and a design element disposed between the intermediate subshell and the external subshell.

Moreover, in some embodiments, rather than or in addition of the reinforcement 115, the shell 30 may comprise a decoration 121, which can be referred to as a design element, disposed between certain ones of the subshells $85_1$-$85_L$ of the shell 30 such as, for instance, between the intermediate and external subshells $85_2$, $85_3$ as shown in FIG. 58. The design element 121 constitutes an aesthetic element that is produced separately from the shell 30 and may be included in the shell 30 in order to affect its aesthetic look. For instance, the design element 121 may comprise a piece of material including a graphical representation of: one or more alphanumeric characters that may form text (e.g., a word, a message, etc.); one or more symbols (e.g., a logo, a sign, an emblem, etc.); one or more shapes or patterns; and/or one or more real or imaginary objects (e.g., a person, an animal, a vehicle, an imaginary or fictional character, or any other real or imaginary thing). The design element 121 is affixed to an exterior surface of the intermediate subshell $85_2$ after forming the intermediate subshell $85_2$ and prior to forming the external subshell $85_3$. For instance, the design element 121 may be mechanically affixed (e.g., stapled, stitched, etc.), glued (e.g., via an adhesive), ultrasonically bonded, or affixed in any other suitable way to the exterior surface of the intermediate subshell $85_2$. While a single design element 121 is depicted in FIG. 58, the shell 30 may comprise a plurality of such design elements which may be spaced apart from one another.

Figure 59:
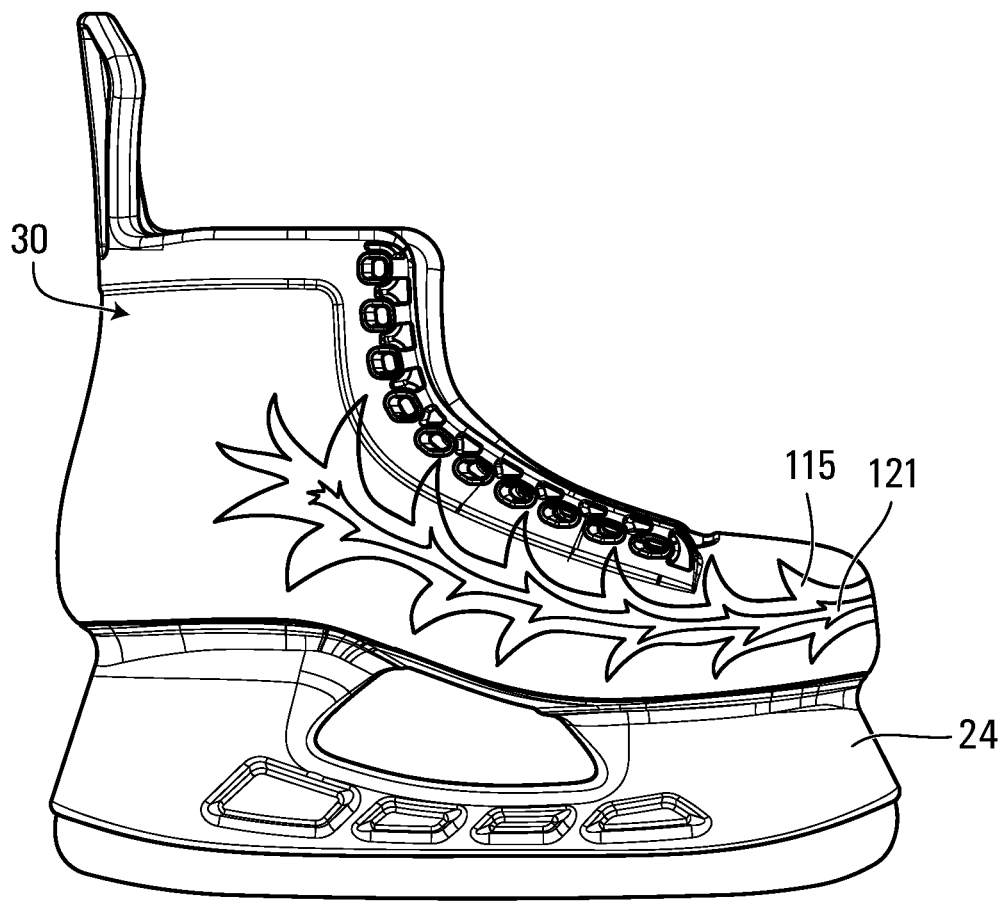
FIG. 59 is a side view of the shell in accordance with variant.
Figure 60:
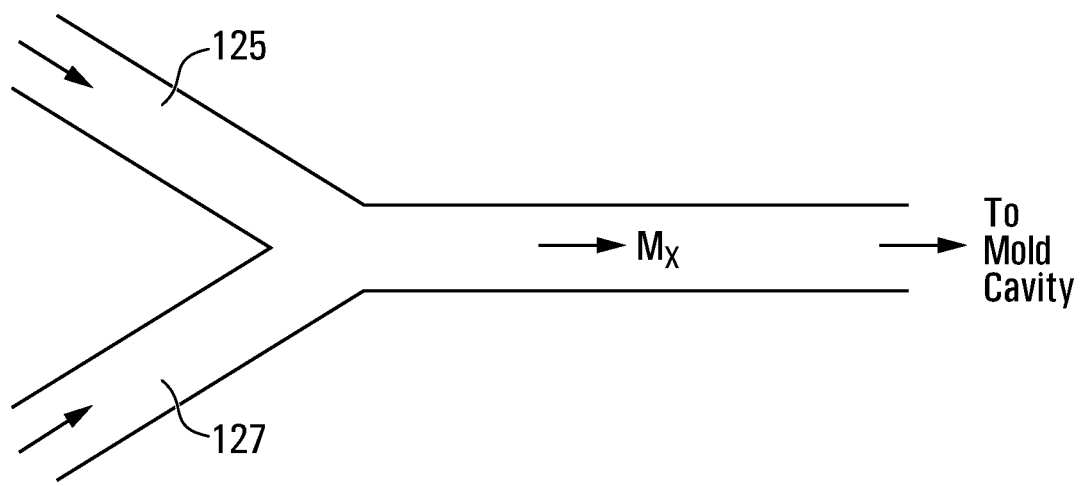
FIG. 60 is a conceptual illustration of constituents of a material flowing into a mold cavity to produce a resulting polymeric material.

The one or more design elements 121 may be disposed over various portions of the shell 30 and/or over various other portions of the skate boot 22, for instance over the medial side portion 68, over the lateral side portion 66, over a top portion and/or over the toe portion 32 of the shell 30, and may also be disposed over the tongue 34, over the tendon guard 35, over the liner 36, over the footbed 38, over the insole 40, over the lace members $44_1$, $44_2$, over the eyelets $46_1$-$46_E$, and so on, as shown in FIG. 59. For instance, the design elements 121 may be disposed at least on a side of the toe portion 32. In this example, the design elements 121 are disposed on a medial side, on a lateral side and on a top side of the toe portion 32.

The design elements 121 may cover at least a substantial part (i.e., a substantial part or an entirety) of a surface area of the portion of the skate boot 22 (e.g., the toe portion 32) over which they are disposed and that is externally visible (i.e., visible from outside of the skate boot 22). For instance, in some embodiments, the design elements 121 covers at least a quarter (i.e., 25%), in some embodiments at least a third (i.e., 33%), in some embodiments at least a majority (i.e., at least 50%), in some embodiments at least 75%, and in some embodiments an entirety of the toe portion 32.

Some of the design elements 121 may also be continuous with other design elements 121 of adjacent portions of the skate boot 22. That is, there may be a continuity of the design element 121 between the toe portion 32 and a given one of the medial side portion 68 and the lateral side portion 66 of the shell 30, thus providing an impression that the design elements 121 extend from a given one of the toe portion 32, the medial side portion 68 and the lateral side portion 66 to another one of the toe portion 32, the medial side portion 68 and the lateral side portion 66. In this embodiment, there is continuity of design elements 121 between the toe portion 32, the medial side portion 68 and the lateral side portion 66 of the shell 30.

In this embodiment, an external one of the layers $85_1$-$85_L$ of the shell 30 may be a clear layer overlying the design elements 121 such that the design elements 121 are visible through the clear layer and such that the clear layer protects the design elements 121 from flying pucks, sticks, etc.

The design elements 121 may include a design pattern, a printed image, and so on. In this embodiment, the design element is a graphic element which includes one or many different colors.

Moreover, in some cases, the reinforcement 115, which is depicted in FIG. 58 spaced apart from the decoration 121, itself may act as a decoration in addition to its reinforcing functionality.

Once the reinforcement 115 (or multiple reinforcements 115) and/or the design element 121 (or multiple design elements 121) has been affixed to the exterior surface of the intermediate subshell $85_2$, the molding process proceeds as described above. Notably, the next subshell, in this case the external subshell $85_3$, is formed such that it covers the reinforcement 115 and/or the design element 121 thus trapping the reinforcement 115 and/or the design element 121 between the intermediate subshell $85_2$ and the external subshell $85_3$. In some embodiments, the external subshell $85_3$ may be clear (i.e., translucent) and may thus allow displaying the reinforcement 115 and/or the design element 121 through the external subshell $85_3$. This may be particularly useful to display the design element 121 but may also be useful to display the reinforcement 115 for aesthetic purposes.

In some embodiments, the reinforcement 115 may be pre-shaped before being placed in the molding apparatus 150 with the subshells $85_1$-$85_L$ of the skate boot 22. For example, in some embodiments, the reinforcement 115 may be thermoformed before being placed in the molding apparatus 150 with the subshells $85_1$-$85_L$ of the skate boot 22.

In this embodiment, the molding process employed to form the shell 30 is low-pressure injection molding. That is, the polymeric materials $M_1$-$M_N$ that constitute the subshells $85_1$-$85_L$ are injected into the mold cavity formed by each mold $154_i$ at a relatively low pressure. In addition, the molding process employed to form the shell 30 may be characterized as a co-injection molding process since the polymeric materials $M_1$-$M_N$ are injected into a same mold.

In this embodiment, no external heat is applied to the polymeric materials $M_1$-$M_N$ of the shell 30. Rather, in this embodiment, as shown in FIG. 56, in order to form a subshell $85_i$, two or more constituents of a given polymeric material $M_x$ chemically react when combined to release heat. In other words, the two or more constituents have an exothermic reaction when combined. For instance, in one example, the material $M_x$ is polyurethane and includes constituents 125, 127 that chemically react when combined. The constituents 125, 127 may be polyols and isocyanates. The exothermic chemical reaction that characterizes the molding process of the shell 30 contrasts the conventional method of forming a skate boot shell which involves thermoforming whereby heat is applied to a thermoformable sheet of material in a mold such that the thermoformable sheet of material acquires the shape of the mold.

In other embodiments, external heat may be applied to one or more of the polymeric materials $M_1$-$M_N$ of the shell 30, such as, for instance, to facilitate a chemical reaction of two or more constituents of a given polymeric material $M_x$. Heat may be applied by radiation, by air convection, by steam convection, by heating the last 152 and/or the associated female mold $154_i$ prior to molding and/or by any other suitable means. The two or more constituents may have an exothermic reaction or an endothermic reaction when combined and sufficiently heated. In this example, the external heat may furnish triggering energy to initiate the reaction of the two or more constituents and optionally catalyzing energy to catalyze the reaction. For instance, in one example, the material $M_x$ is polyurethane and includes constituents 125, 127 that chemically react when combined. The constituents 125, 127 may be polyols and isocyanates. Although in this embodiment heat is applied, this manufacturing process still contrasts the conventional method of forming a skate boot shell which involves thermoforming whereby heat is applied to a thermoformable sheet of material in a mold such that the thermoformable sheet of material acquires the shape of the mold.

In other embodiments, no external heat is applied to some of the polymeric materials $M_1$-$M_N$ of the shell 30 (e.g., the polymeric material $M_2$ of the intermediate subshell $85_2$, which may be injected and blown into its final form without external heat), while external heat is applied to other ones of the polymeric materials $M_1$-$M_N$ of the shell 30 (e.g., the polymeric material $M_3$ of the external subshell $85_3$, the polymeric material $M_1$ of an insert $315_M$ between the intermediate subshell $85_2$ and the external subshell $85_3$, etc.).

In other embodiments, energy in a different form from heat may be applied to the polymeric materials $M_1$-$M_N$ of the shell 30 in addition to or in replacement to heat. For instance, the polymeric materials $M_1$-$M_N$ may be radiated using electromagnetic radiation (e.g., UV, x-rays, microwaves) and/or acoustic radiation (e.g., ultrasound).

The molding process of the shell 30 may be implemented in any suitable way in other embodiments. For example, in some embodiments, injection molding at higher pressure may be used. As another example, in some embodiments, two or more lasts such as the last 152 may be used (e.g., different lasts for molding respective ones of the subshells $85_1$-$85_L$). Moreover, the last 152 may be configured differently than the last shown in FIG. 15. For instance, the last 152 may not comprise projections for forming the apertures 48 and rather one or more of the female molds $154_1$-$154_N$ may comprise such projections for forming the apertures 48. In other cases, the projections on the last 152 for forming the apertures 48 may be retractable. As another example, in some embodiments, the molding process of the shell 30 may be casting in which the polymeric materials $M_1$-$M_N$ are poured into one or more molds. In some embodiments, the last 152 may be customizable and/or otherwise configurable such as by adding or removing last attachments (e.g. shims), which may be created by additive manufacturing (e.g., 3D-printed), as described in U.S. Patent Application No. 62/692,057, which is incorporated herein.

The skate boot 22 may comprise an overlay 102 on an external surface 65 of the shell 30 for aesthetic or functional purposes.

Figure 61:
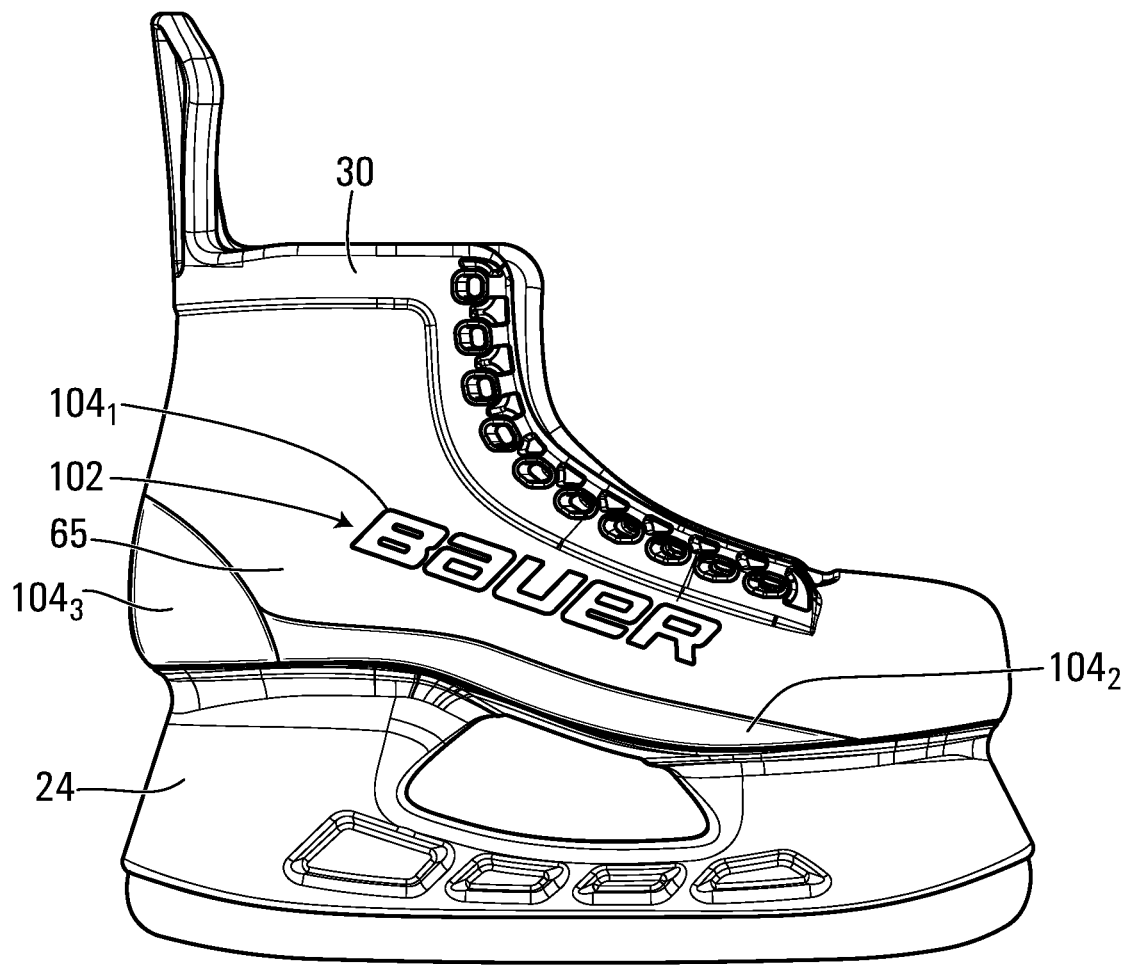
FIG. 61 is a perspective view of an embodiment in which the shell comprises an overlay.

With additional reference to FIG. 61, in this embodiment, the overlay 102 comprises a plurality of overlay elements $104_1$-$104_O$ that can be disposed at any suitable part of the shell 30. For example, in some cases, the overlay elements $104_1$-$104_O$ may be a graphic (e.g., a logo), a brand name, a pattern, a word, etc. While the overlay elements $104_1$-$104_O$ may improve an aesthetic appearance of the skate 10, in some cases, certain overlay elements $104_1$-$104_O$ may also serve functional purposes. For instance, in some cases, the overlay elements $104_1$-$104_O$ may be configured to minimize wear of at least a portion of the external surface 65 of the shell 30. For example, an overlay element $104_x$ may be located close to a bottom portion of the medial and/or lateral sides of the shell 30 in order to prevent contact between the playing surface 12 and the shell 30 of the skate boot 22. This may help in reducing undue wear of the skate 10.

The overlay 102 may be affixed to the external surface 65 of the shell 30 in various ways. For instance, each of the overlay elements $104_1$-$104_O$ may be mechanically fastened to the external surface 65 of the shell 30 (e.g., via stitching, staples, etc.), glued thereto via an adhesive, or ultrasonically bonded. The overlay elements $104_i$-$104_O$ may be affixed to the external surface 65 of the shell 30 in any other suitable way, such as by means of air brushing, by means of water printing (e.g., water dripping), using a flexible membrane comprising the overlay, the flexible membrane being placed in the mold prior to molding, etc.

Figure 65A:
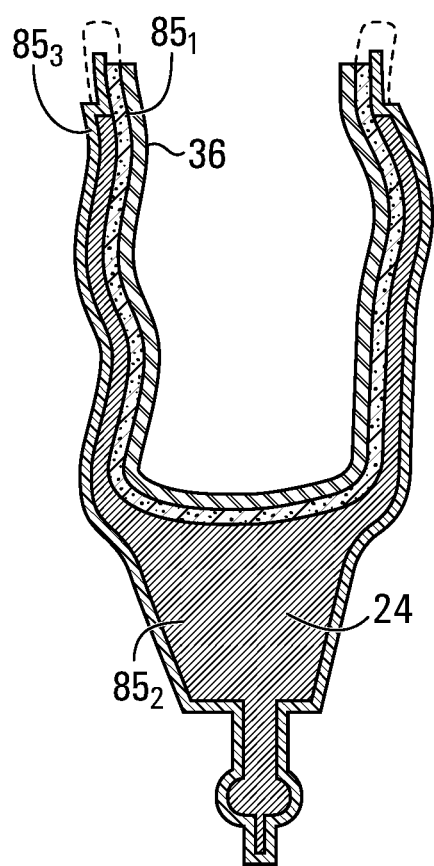
FIG. 65A shows an example of an embodiment wherein an inner liner of the skate boot comprises a sole portion.
Figure 65B:
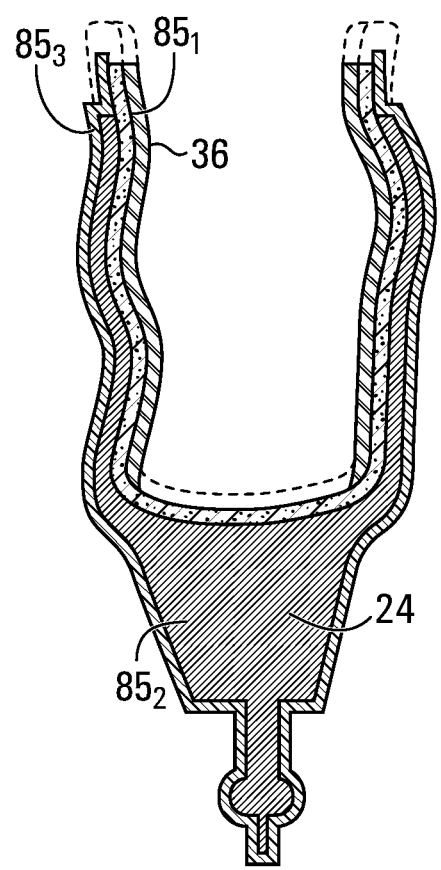
FIG. 65B shows an example of an embodiment wherein an inner liner of the skate boot does not comprise a sole portion.

The inner liner 36 of the skate boot 22 is affixed to an inner surface of the shell 30 and comprises an inner surface 96 for facing the heel HL and medial and lateral sides MS, LS of the player's foot 11 and ankle A in use. In some embodiments, as shown in FIG. 65A, the inner liner 36 may comprise a sole portion for facing the plantar surface of the user's foot 11, while in other embodiments the inner liner 36 does not comprise a sole portion, as shown in FIG. 65B. The inner liner 36 may be made of a soft material (e.g., a fabric made of NYLON® fibers or any other suitable fabric). The footbed 38 is mounted inside the shell 30 and comprises an upper surface 106 for receiving the plantar surface PS of the player's foot 11 and a wall 108 projecting upwardly from the upper surface 106 to partially cup the heel HL and extend up to a medial line of the player's foot 11.

The insole 40 has an upper surface 25 for facing the plantar surface PS of the player's foot 11 and a lower surface 23 on which the shell 30 may be affixed.

Figure 62:
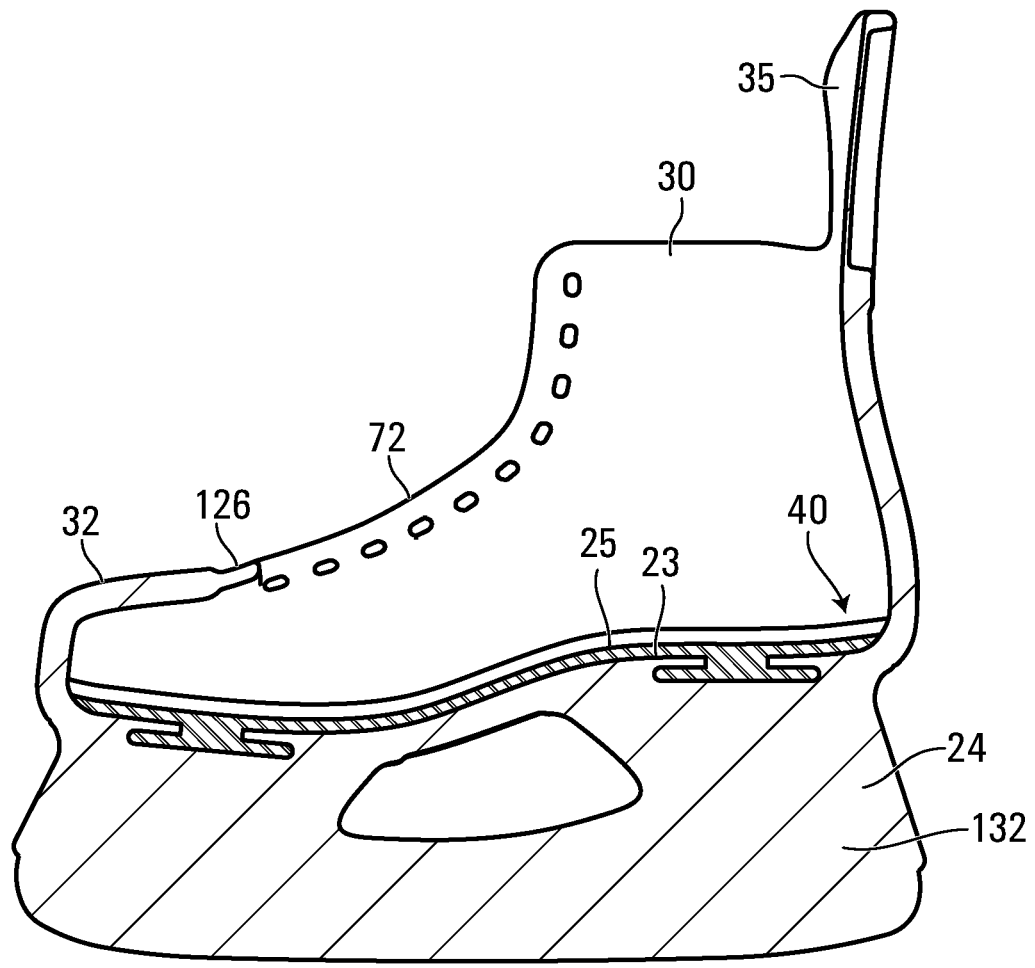
FIGS. 62 to 64 are variants of the skate wherein an insole of the skate boot is affixed to the skate boot.
Figure 63:
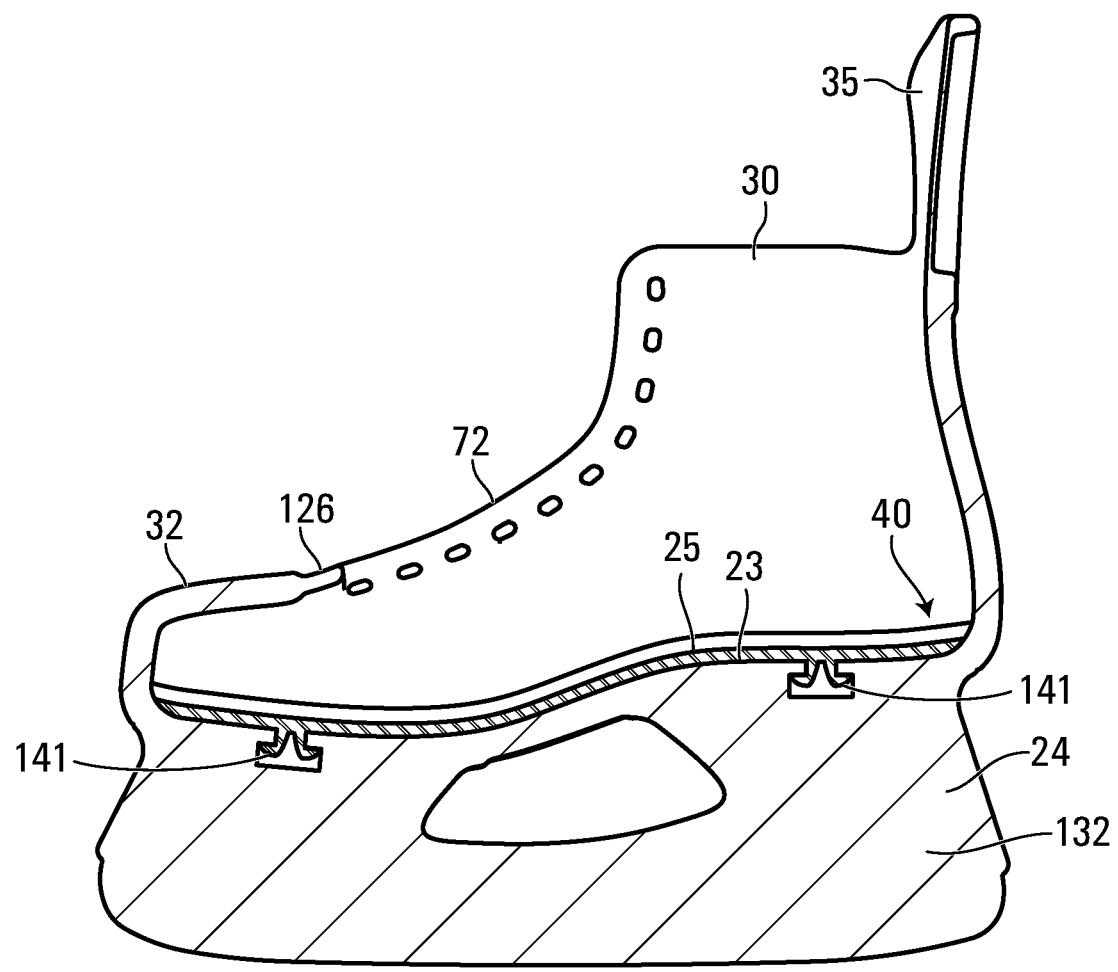
Figure 64:
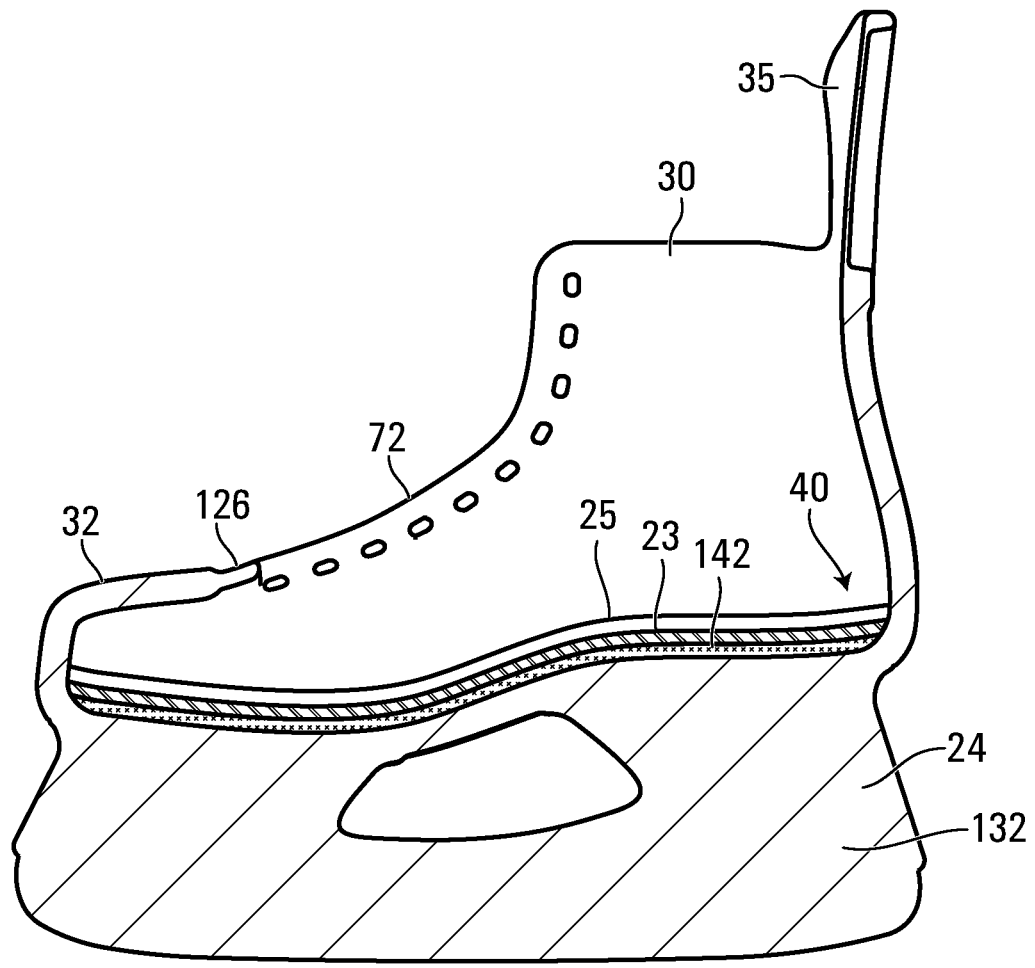

In some embodiments, the insole 40 may be affixed to the shell 30 of the skate boot 22. For instance, in some embodiments, as shown in FIG. 62, the lower surface 23 of the insole 40 may be overmolded to the shell 30 of the skate boot 22. In other embodiments, as shown in FIG. 63, the insole 40 may be joined mechanically to the shell 30 of the skate boot 22 by a mechanical fastener 141 (e.g., a clip, a rivet, or any suitable fastener). In other embodiments, as shown in FIG. 64, the insole 40 may be adhesively bonded to the shell 30 of the skate boot 22 via an adhesive 142.

In some embodiments, as shown in FIGS. 66A to 67, the inner liner 36 of the skate boot may be a "3D liner", i.e., may be formed of a three-dimensional sheet 130 of material (e.g., fabric). This may allow reducing the use of stitching and tape for manufacturing the inner liner 36, thereby reducing weight, improving comfort and reducing manufacturing cost of the inner liner 36. The 3D inner liner 36 may be manufactured in any suitable way. For instance, in some embodiments, the 3D inner liner 36 may be formed using a standard 2D sheet 130' of fabric that is thermoformed over a 3D last such that the 3D last imparts its shape to the sheet of fabric. The sheet of fabric, now having the 3D shape of the 3D last, may then be cut to pre-determined dimensions and finalized by affixing (e.g., by stitching, taping, etc.) portions of its edges to one another. As a result, a ratio of the amount of stiches and/or tape required for manufacturing the 3D inner liner 36 over the amount of stiches and/or tape required for manufacturing a standard inner liner 36 may be no more than 0.9, in some cases no more than 0.8, in some cases no more than 0.7, in some cases even less.

In some embodiments, the skate boot 22 may not comprise an inner liner 36. For instance, the internal subshell $85_1$ of the shell 30 of the skate boot 22 may serve as an inner lining already and thus the addition of the inner liner 36 may be redundant. In other cases, the inner liner 36 may be inserted during the molding process using the molding apparatus 150. For example, a textile material may first be placed on the last 152 prior to forming the first subshell (i.e., the internal subshell $85_1$) such as to serve as a pre-formed "sock" onto which the internal subshell $85_1$ is formed.

Figure 70:
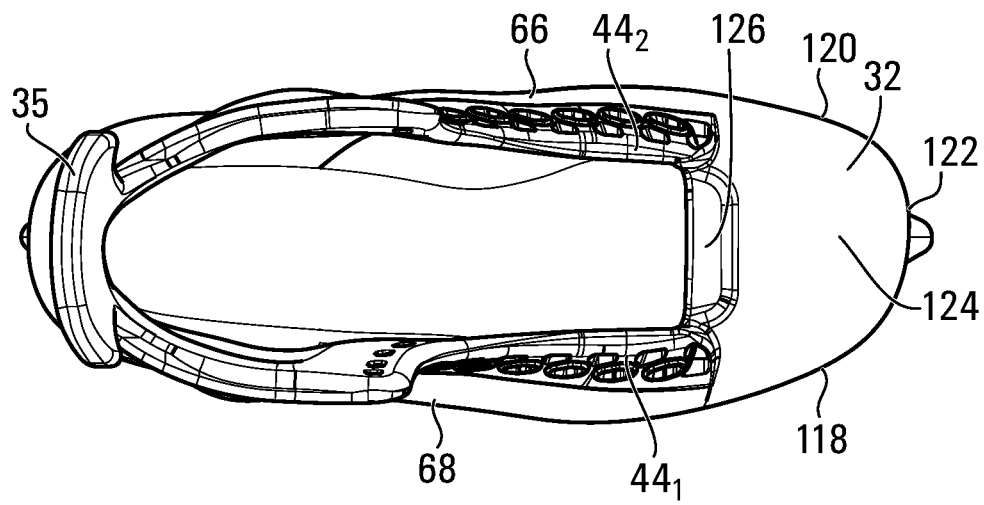
Figure 71:
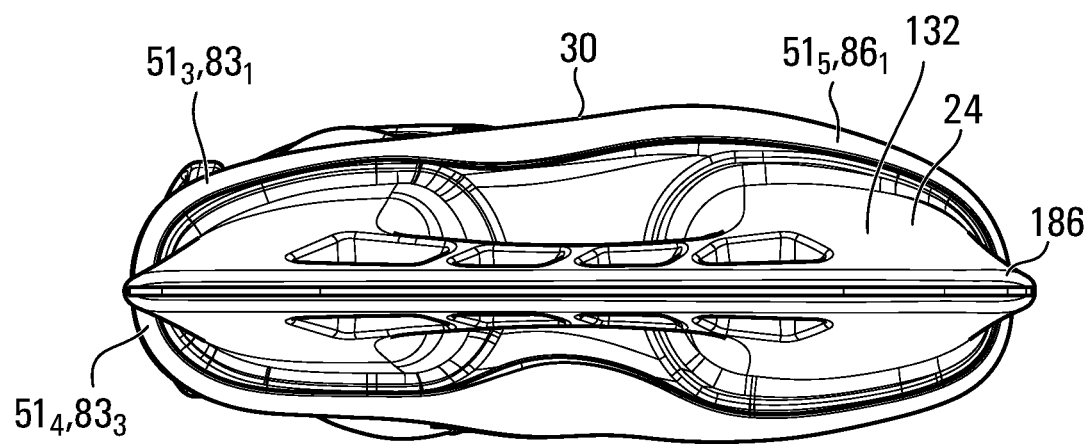
Figure 72:
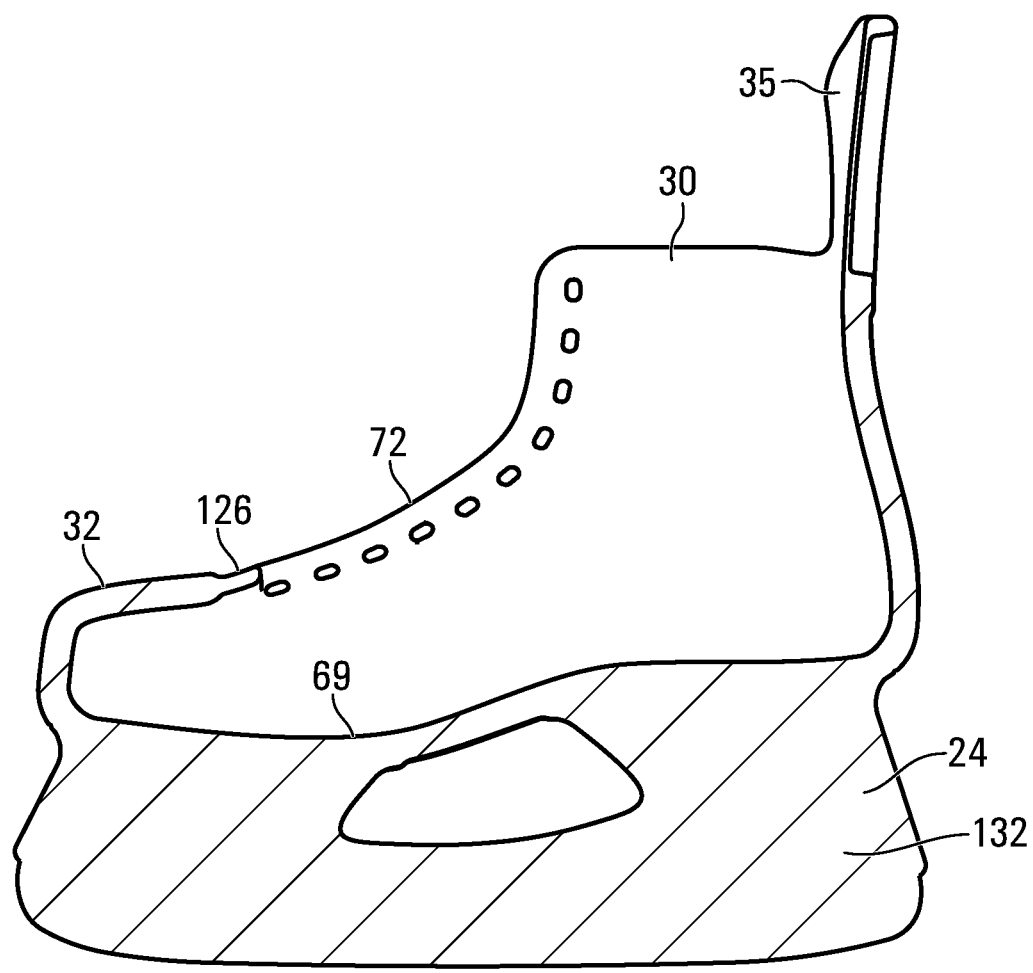
FIG. 72 is a cross-sectional view of the shell taken along line 62-62 of FIG. 59.
Figure 73:
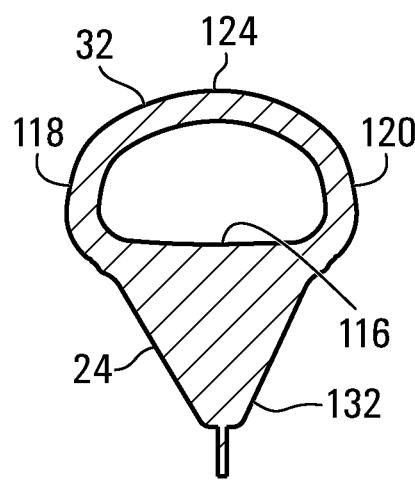
FIGS. 73 and 74 are cross-sectional views of the shell taken along lines 73-73 and 74-74 of FIG. 68.
Figure 74:
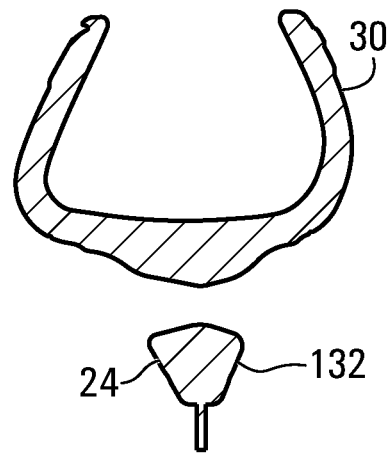

With additional reference to FIGS. 68 to 74, the toe cap 32 of the skate boot 22 is configured to face and protect the toes T of the player's foot 11. As will be described in more detail below, in this example, at least part (i.e., part or all) of the toe cap 32 is formed integrally with the shell 30 and can thus be referred to as a toe portion of the shell 30. As shown in FIGS. 70, 72 and 73, the toe cap 32 comprises a bottom portion 116 for at least partially covering a front portion of the lower surface 23 of the insole 40, a lateral side portion 118 for facing a small toe of the foot 11 of the player, a medial side portion 120 for facing a big toe of the foot 11 of the player, an end portion 122 between the lateral and medial side portions 118, 120, an upper portion 124 for facing a top of the toes T of the player's foot 11, and a top extension 126 for affixing the tongue 34 to the toe cap 32. The top extension 126 of the toe cap 32 may be affixed (e.g., glued and/or stitched) to a distal end portion of the tongue 34 in order to affix the tongue 34 to the toe cap 32.

The toe cap 32 may comprise a synthetic material 105 that imparts stiffness to the toe cap 32. For instance, in various embodiments, the synthetic material 105 of the toe cap 32 may comprise nylon, polycarbonate materials (e.g., Lexan®), polyurethane, thermoplastics, thermosetting resins, reinforced thermoplastics, reinforced thermosetting resins, polyethylene, polypropylene, high density polyethylene or any other suitable material. In some cases, the synthetic material 105 of the toe cap 32 may be a composite material comprising thermoset material, thermoplastic material, carbon fibers and/or fiberglass fibers. For example, the composite material may be a fiber-matrix composite material that comprises a matrix in which fibers are embedded. The matrix may include any suitable polymeric resin, such as a thermosetting polymeric material (e.g., polyester, vinyl ester, vinyl ether, polyurethane, epoxy, cyanate ester, etc.), a thermoplastic polymeric material (e.g., polyethylene, polyurethane, polypropylene, acrylic resin, polyether ether ketone, polyethylene terephthalate, polyvinyl chloride, polymethyl methacrylate, polycarbonate, acrylonitrile butadiene styrene, nylon, polyimide, polysulfone, polyamide-imide, self-reinforcing polyphenylene, etc.), or a hybrid thermosetting-thermoplastic polymeric material. The fibers may be made of any suitable material such as carbon fibers, polymeric fibers such as aramid fibers, boron fibers, glass fibers, ceramic fibers, etc.

Figure 75:
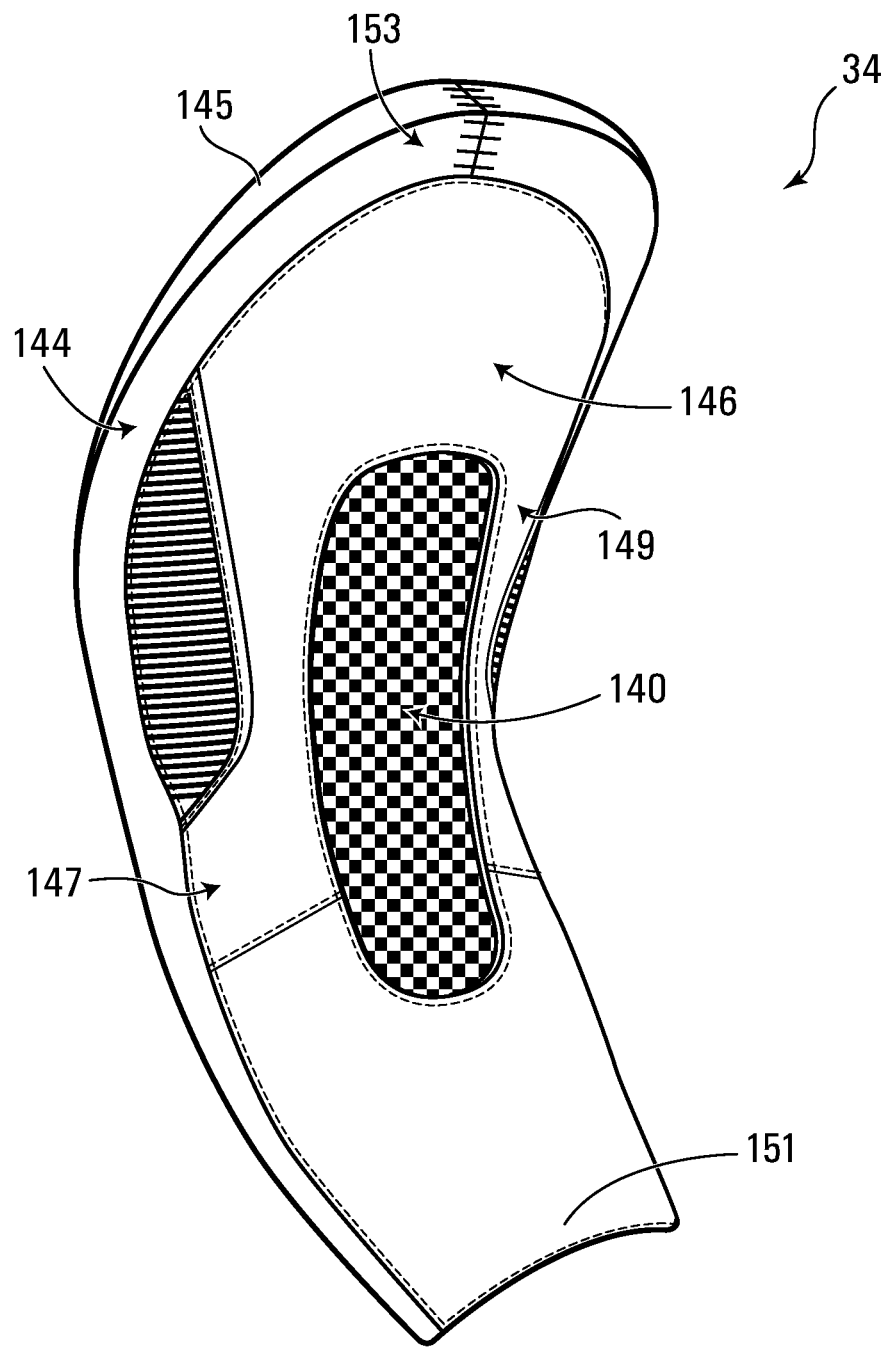
FIG. 75 is a perspective view of a tongue of the skate boot.

The tongue 34 extends upwardly and rearwardly from the toe cap 32 for overlapping the top surface TS of the player's foot 11. In this embodiment, as shown in FIG. 75, the tongue 34 comprises a core 140 defining a section of the tongue 34 with increased rigidity, a padding member (not shown) for absorbing impacts to the tongue 34, a peripheral member 144 for at least partially defining a periphery 145 of the tongue 34, and a cover member 146 configured to at least partially define a front surface of the tongue 34. The tongue 34 defines a lateral portion 147 overlying a lateral portion of the player's foot 11 and a medial portion 149 overlying a medial portion of the player's foot 11. The tongue 34 also defines a distal end portion 151 for affixing to the toe cap 32 (e.g., via stitching) and a proximal end portion 153 that is nearest to the player's shin S.

The tendon guard 35 extends upwardly from the rear portion 82 of the ankle portion 64 of the shell 30 in order to protect the player's Achilles tendon AT. As will be described in more detail below, in this embodiment, at least part (i.e., part or all) of the tendon guard 35 is integrally formed with the shell 30 of the skate boot 22. In other embodiments, the tendon guard 35 may be a separate component from the shell 30 such that the tendon guard 35 is fastened to the shell 30 via a mechanical fastener (e.g., via stitching, stapling, a screw, etc.) or in any other suitable way.

The skate boot 22 may be constructed in any other suitable way in other embodiments. For example, in other embodiments, various components of the skate boot 22 mentioned above may be configured differently or omitted and/or the skate boot 22 may comprise any other components that may be made of any other suitable materials and/or using any other suitable processes.

Figure 76:
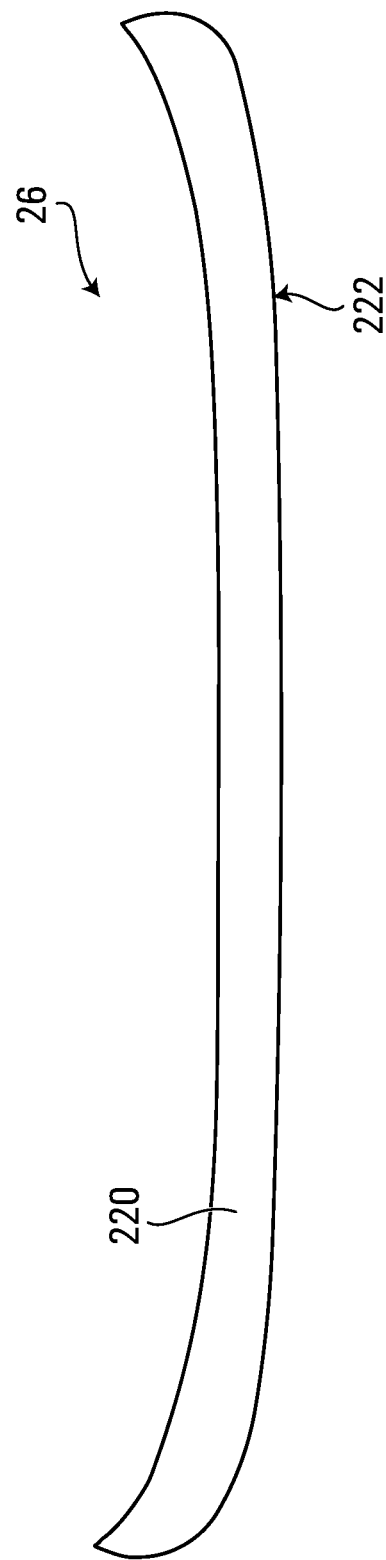
FIG. 76 is a side view of a blade of a skating device of the skate.

As shown in FIG. 76, the blade 26 comprises an ice-contacting material 220 including an ice-contacting surface 222 for sliding on the ice surface while the player skates. In this embodiment, the ice-contacting material 220 is a metallic material (e.g., stainless steel). The ice-contacting material 220 may be any other suitable material in other embodiments.

As shown in FIGS. 68, 69 and 71, the blade holder 24 comprises a body 132 including a lower portion 162 comprising a blade-retaining base 164 that retains the blade 26 and an upper portion 166 comprising a support 168 that extends upwardly from the blade-retaining base 164 towards the skate boot 22 to interconnect the blade holder 24 and the skate boot 22. A front portion 170 of the blade holder 24 and a rear portion 172 of the blade holder 24 define a longitudinal axis 174 of the blade holder 24. The front portion 170 of the blade holder 24 includes a frontmost point 176 of the blade holder 24 and extends beneath and along the player's forefoot in use, while the rear portion 172 of the blade holder 24 includes a rearmost point 178 of the blade holder 24 and extends beneath and along the player's hindfoot in use. An intermediate portion 180 of the blade holder 24 is between the front and rear portions 170, 172 of the blade holder 24 and extends beneath and along the player's midfoot in use. The blade holder 24 comprises a medial side 182 and a lateral side 184 that are opposite one another.

Figure 77:
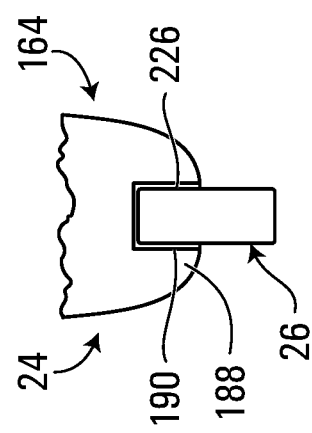
FIG. 77 shows embodiments in which the blade is affixed to a blade holder of the skating device of the skate.

The blade-retaining base 164 is elongated in the longitudinal direction of the blade holder 24 and is configured to retain the blade 26 such that the blade 26 extends along a bottom portion 186 of the blade-retaining base 164 to contact the ice surface 12. To that end, the blade-retaining base 164 comprises a blade-retention portion 188 to face and retain the blade 26. In this embodiment, as shown in FIG. 77, the blade-retention portion 188 comprises a recess 190 extending from the front portion 170 to the rear portion 172 of the blade holder 24 in which an upper portion of the blade 26 is disposed. The blade-retaining base 164 may be configured in any other suitable way in other embodiments.

The support 168 is configured for supporting the skate boot 22 above the blade-retaining base 164 and transmit forces to and from the blade-retaining base 164 during skating. In this embodiment, the support 168 comprises a front pillar 210 and a rear pillar 212 which extend upwardly from the blade-retaining base 164 towards the skate boot 22. The front pillar 210, which can be referred to as a front "pedestal", extends towards the front portion 56 of the skate boot 22 and the rear pillar 212, which can be referred to as a rear "pedestal", extends towards the rear portion 58 of the skate boot 22. The blade-retaining base 164 extends from the front pillar 210 to the rear pillar 212. More particularly, in this embodiment, the blade-retaining base 164 comprises a bridge 214 interconnecting the front and rear pillars 210, 212.

In this embodiment, at least part (i.e., part or all) of the body 132 of the blade holder 24 is integrally formed with the shell 30 of the skate boot 22. That is, at least part of the body 132 of the blade holder 24 and the shell 30 of the skate boot 22 constitute a monolithic one-piece structure. The body 132 of the blade holder 24 thus comprises a portion 215 that is integrally formed with the shell 30 of the skate boot 22 such that the portion 215 of the body 132 of the blade holder 34 and the shell 30 of the skate boot 22 are formed together as one-piece in the molding apparatus 150 during the molding process.

In this embodiment, the portion 215 of the body 132 of the blade holder 24 includes one or more of the polymeric materials $M_1$-$M_N$ of the subshells $85_1$-$85_L$ of the shell 30 of the skate boot 22. For instance, in this example, the portion 215 of the body 132 of the blade holder 24 includes the intermediate and external subshells $85_2$, $85_3$ and therefore comprises the polymeric materials $M_2$, $M_3$ associated therewith. In particular, in this example, a majority of the body 132 of the blade holder 24 is constituted by the polymeric material $M_2$ of the intermediate subshell $85_2$ such that the body 132 of the blade holder 24 consists primarily of a structural foam material. Alternatively, the portion 215 of the body 132 of the blade holder 24 may include one or more different materials.

In this embodiment, at least a majority (i.e., a majority or an entirety) of the body 132 of the blade holder 24 may be integrally formed with shell 30 of the skate boot 22. That is, the portion 215 of the body 132 of the blade holder 24 may be a major portion or the entirety of the body 132 of the blade holder 24. In this embodiment, an entirety of the body 132 of the blade holder 24 is integrally formed with the shell 30 of the skate boot 22.

Figure 79:
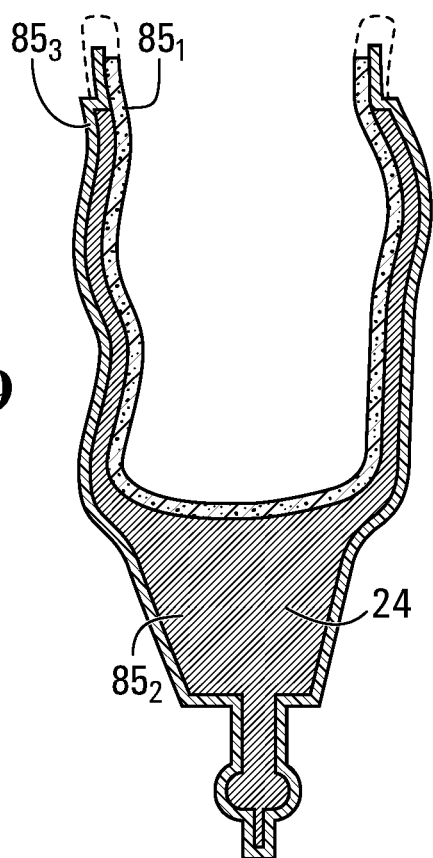
FIGS. 78 and 79 show an example of an embodiment in which an outermost one of the subshells makes up an outer surface of the shell and an outer surface of the blade holder.
Figure 78:
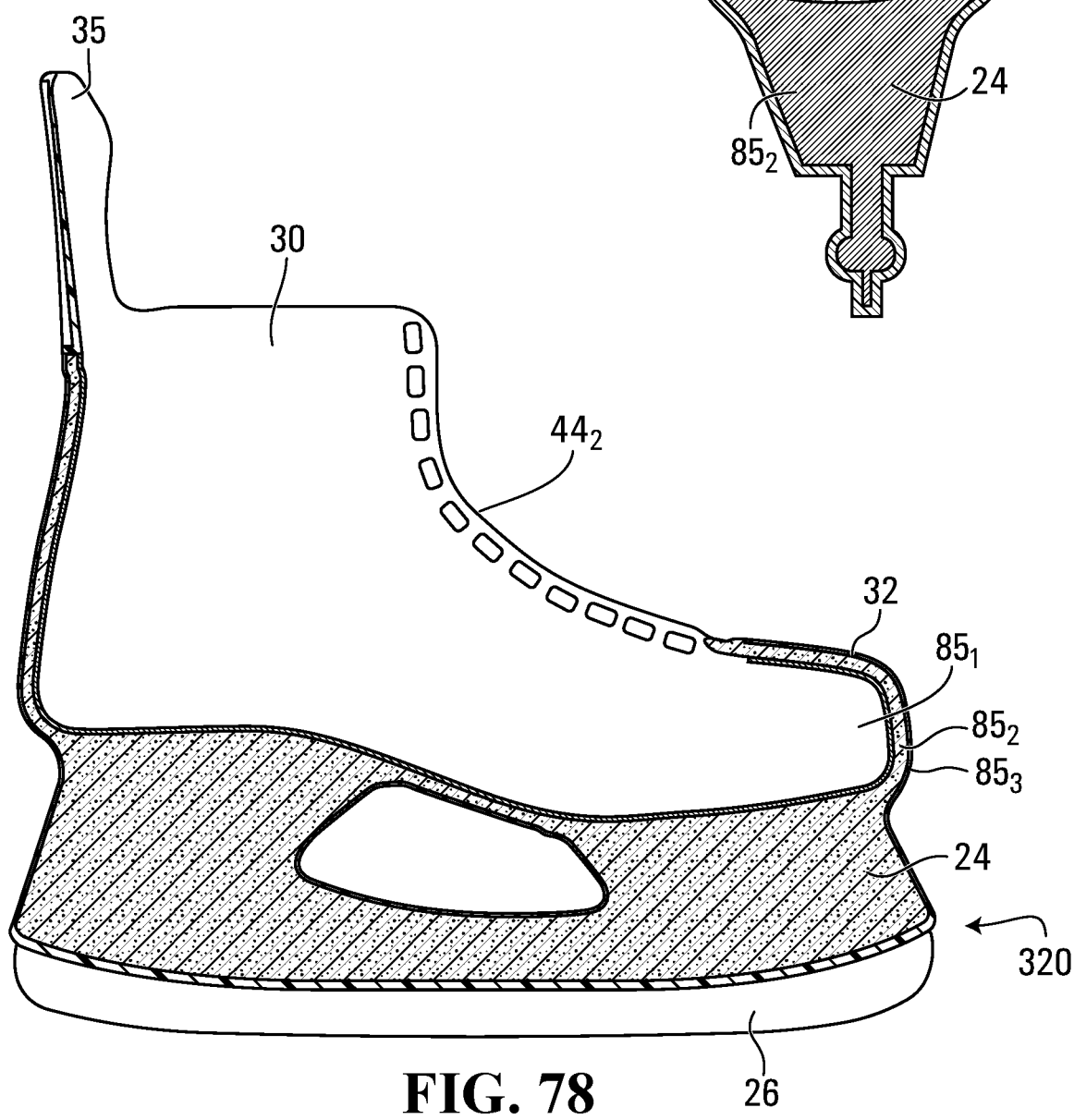
Figure 80:
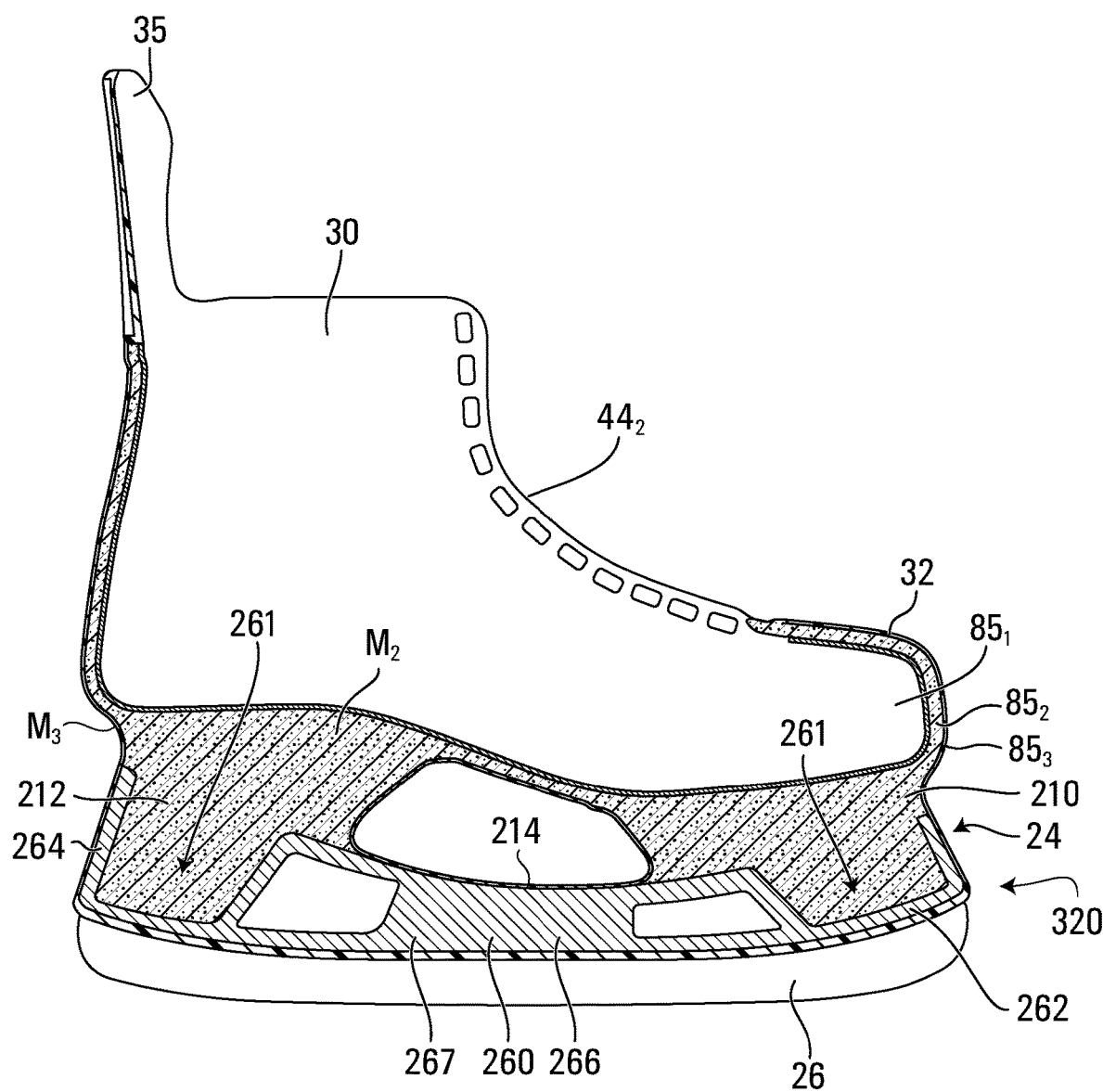
FIGS. 80 to 97 show variants in which the blade holder comprises a core.
Figure 81:
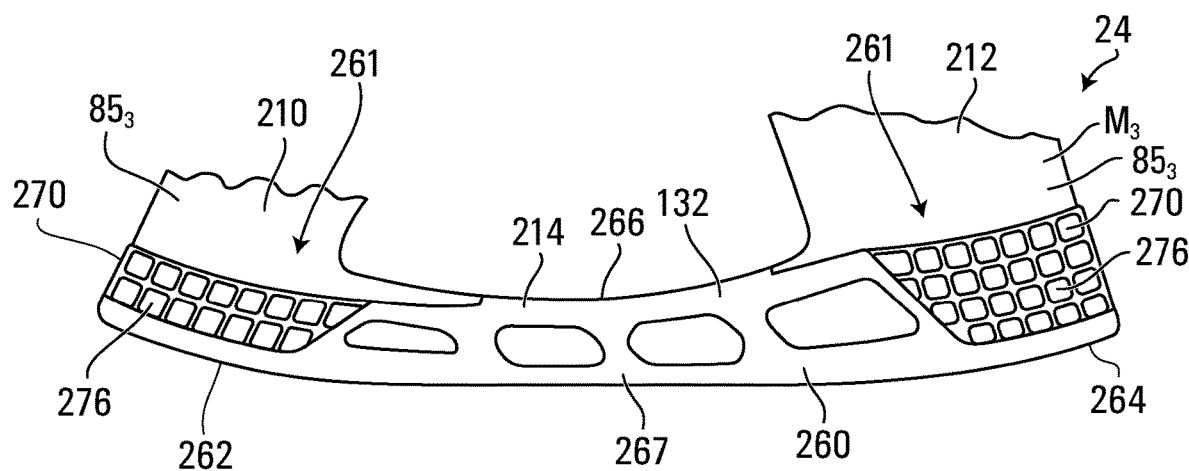
Figure 82:
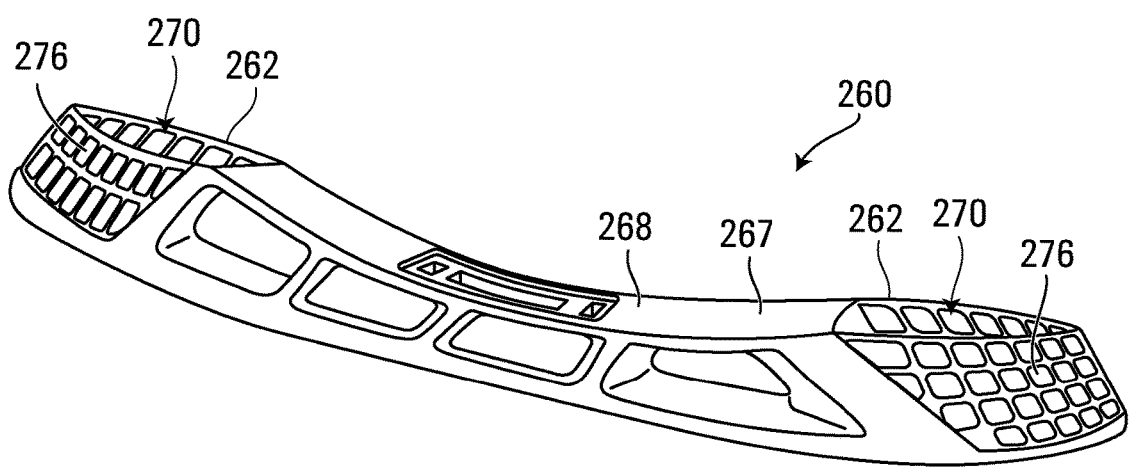
Figure 83:
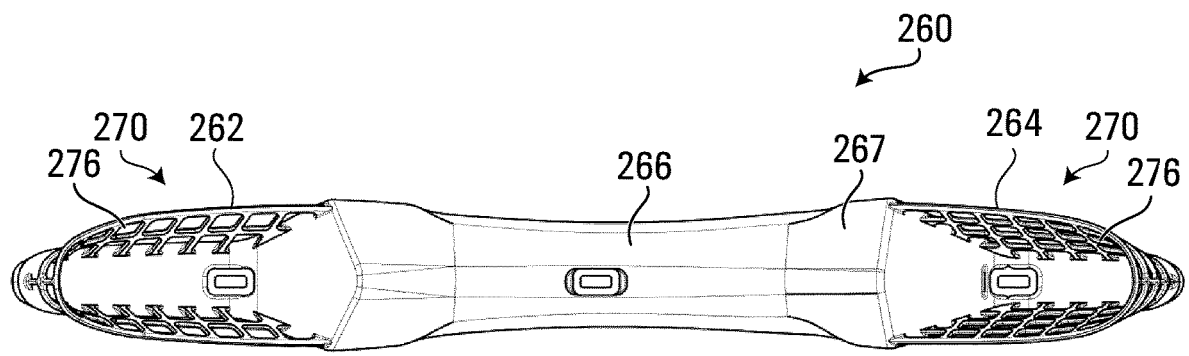
Figure 84:
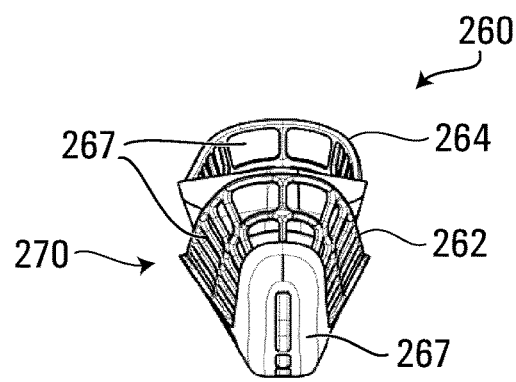
Figure 85:
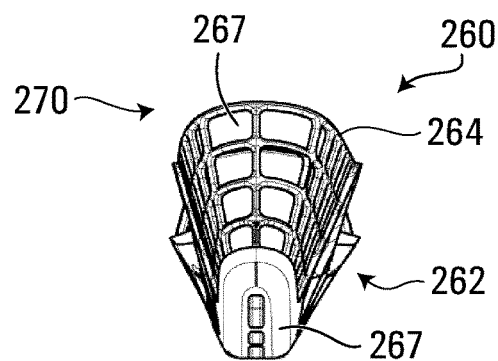

Therefore, in this embodiment, the body 132 of the blade holder 24 is formed with the shell 30 of the skate boot 22 in the molding apparatus 150 with the last 152. In particular, the body 132 of the blade holder 24 is initially formed during forming of the intermediate subshell $85_2$ of the shell 30 of the skate boot 22 and is completed by the forming of the external subshell $85_3$ of the shell 30 of the skate boot 22. That is, in this embodiment, as shown in FIGS. 78 and 79, the intermediate subshell $85_2$ is the innermost subshell of the body 132 of the blade holder 24 while the external subshell $85_3$ is the outermost subshell of the body 132 of the blade holder 24.

In some embodiments, with additional reference to FIGS. 80 to 93, the body 132 of the blade holder 24 comprises a core 260 which may be manufactured prior to the molding of the skate boot 22 and an adjacent part 261 of the body 132 of the blade holder 24 and which may be placed in the mold used during the molding process of the skate boot 22 and the adjacent part 261 of the body 132 of the blade holder 24, such that the skate boot 22 and the adjacent part 261 of the body 132 of the blade holder 24 are overmolded onto the core 260. This may, for instance, allow use of materials that could not be used during the molding process of the skate boot 22; reduce geometric tolerances and increase standardisation of the skate boot 22, increase stiffness of the blade holder 24, reduce energy losses during skating, etc.

As shown in FIGS. 80 to 85, in this embodiment, the core 260 constitutes at least a substantial part (e.g., a majority) of the blade-retaining base 164 and comprises a front portion 262 configured to be disposed in the front pillar 210 of the blade holder 24, a rear portion 264 configured to be in the rear pillar 212 of the blade holder 24 and a bridge portion 266 extending between the front and rear portions 262, 264 and configured to be at least part of the bridge 214 of the blade holder 24. In this embodiment, the bridge 266 of the core 260 defines the bridge 214 of the blade holder 24.

The core 260 has a structural geometry to enhance properties of the blade holder 24 such as lightness, stiffness and energy conservation during skating. In this embodiment, the core 260 also comprises interfaces 270 at the front and rear portions 262, 264 of the core 260 to interface with the intermediate and external subshells $85_2$, $85_3$ and with the polymeric materials $M_2$, $M_3$ associated therewith during and after the molding process. In particular, in this embodiment, the interfaces 270 are interlocking portions to mechanically interlock the intermediate and external subshells $85_2$, $85_3$ and the polymeric materials $M_2$, $M_3$ associated therewith. For instance, the interlocking portions 270 may comprise projections (e.g., ridges), recesses (e.g., grooves), and the like. During molding of the skate boot 22, the polymeric materials $M_2$, $M_3$ may fill recesses and/or engage projections to mechanically interlock the core 260 with the intermediate and external subshells $85_2$, $85_3$.

In this embodiment, each of the interlocking portions 270 comprises a grid structure 276 conforming to the periphery of the pillars 210, 212 of the blade holder 24.

Figure 86:
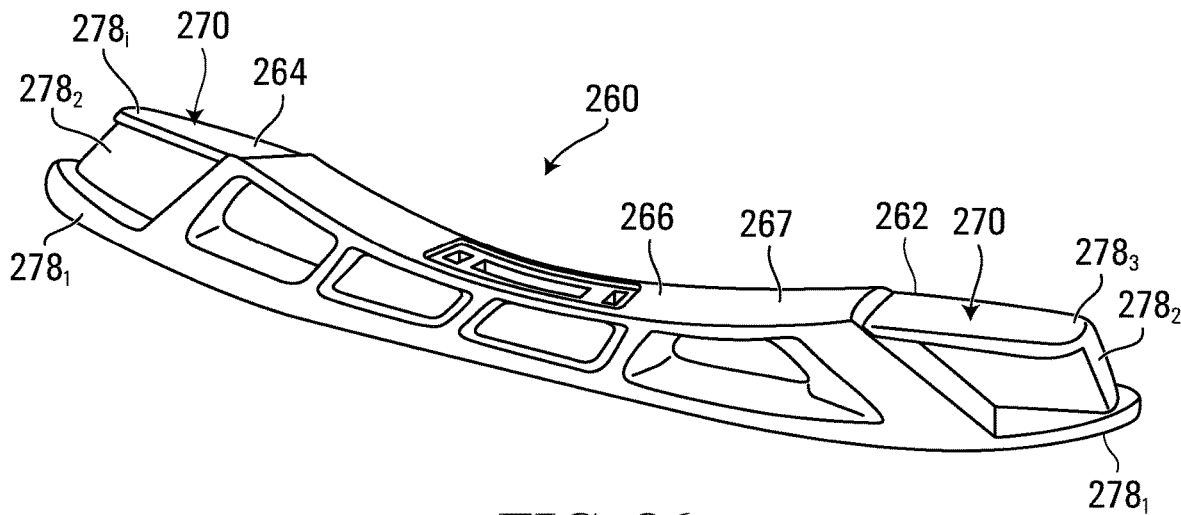
Figure 87:
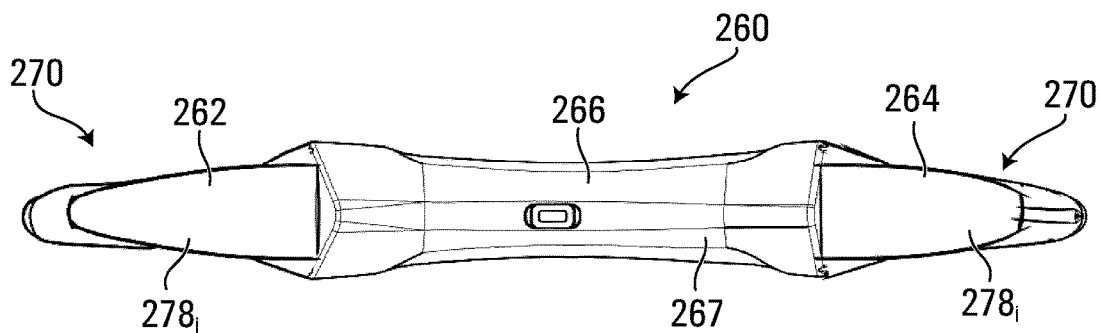
Figure 88:
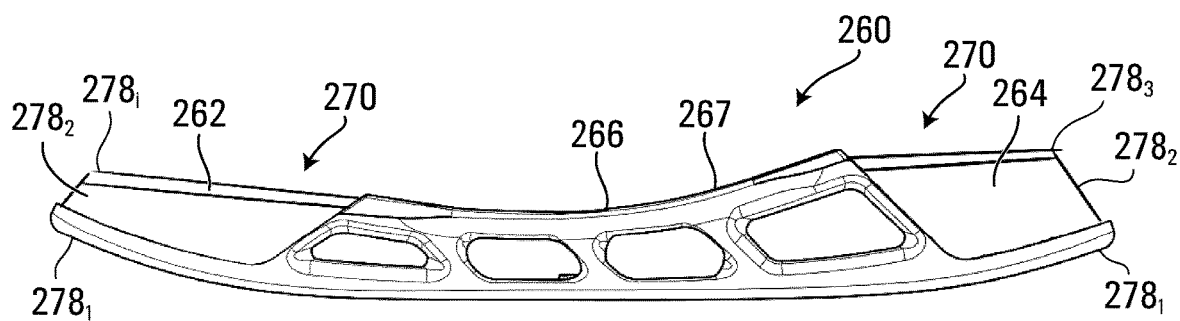

In another embodiment, with additional reference to FIGS. 86 to 88, the interlocking portions 270 comprise interlocking elements $278_1$-$278_3$. In particular, in this embodiment, the interlocking elements define an I-shape, the interlocking element $278_1$ acting as a lower flange, the interlocking element $278_2$ acting as a web, and the interlocking element $278_3$ acting as an upper flange, thereby creating an interlocking interface and increasing a flexural stiffness of the core 260.

Figure 89:
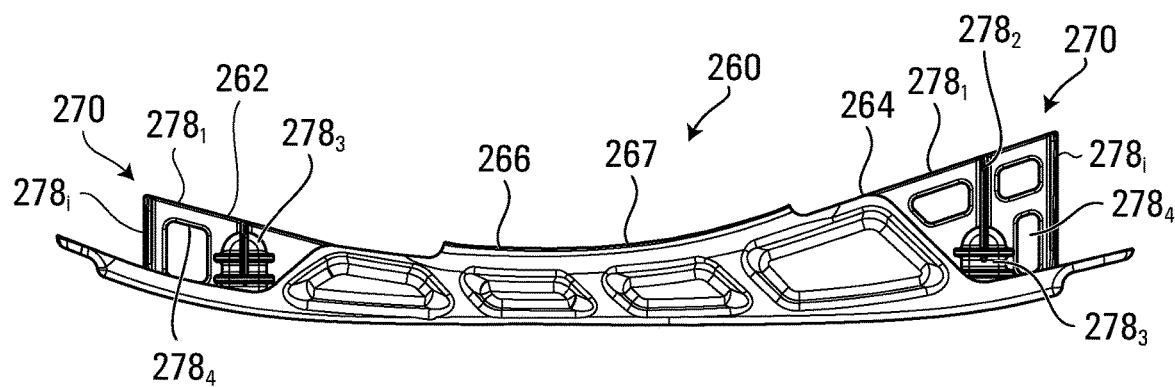
Figure 90:
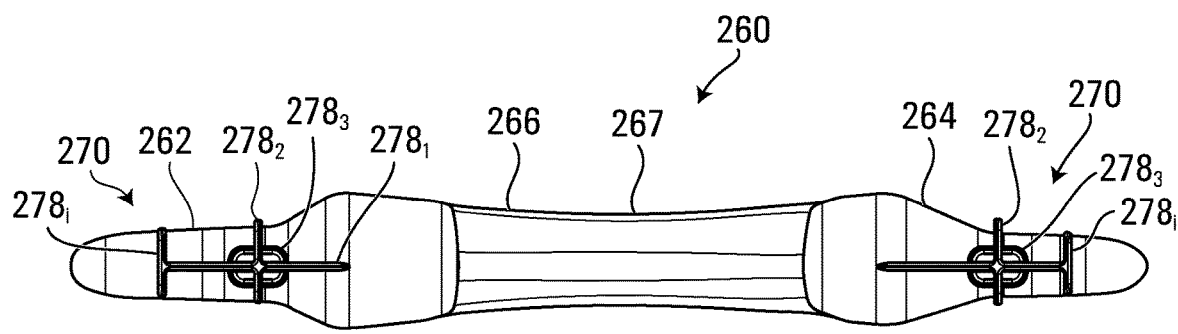

In another embodiment, with additional reference to FIGS. 89 and 90, the interlocking portions 270 comprise interlocking elements $278_1$-$278_i$ defining other shapes to increase flexural stiffness, torsional stiffness, or area of surface of the interlock.

The core 260 comprises a material 267 that may allow the core 260 to be light and stiff and limit energy losses in some embodiments. For instance, in some embodiments, a modulus of elasticity of the material 267 may be at least 1 GPa, in some embodiments at least 2 GPa, in some embodiments at least 3 GPa, in some embodiments at least 4 GPa, in some embodiments even more.

The material 267 of the core 260 may be of any suitable kind. In this embodiment, the material 267 comprises a polymeric material. More particularly, in this embodiment, the material comprises nylon.

Figure 91:
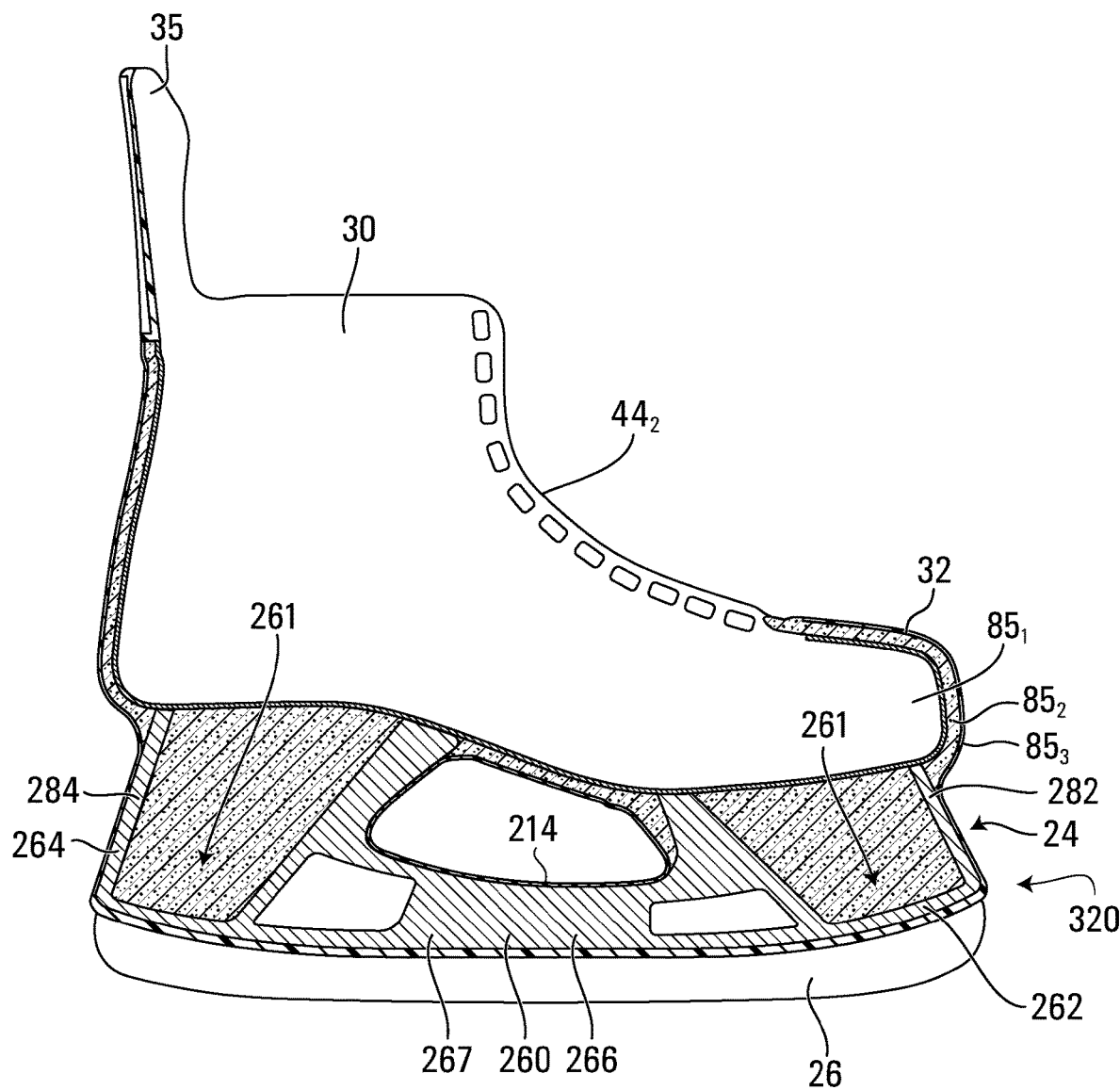
Figure 92:
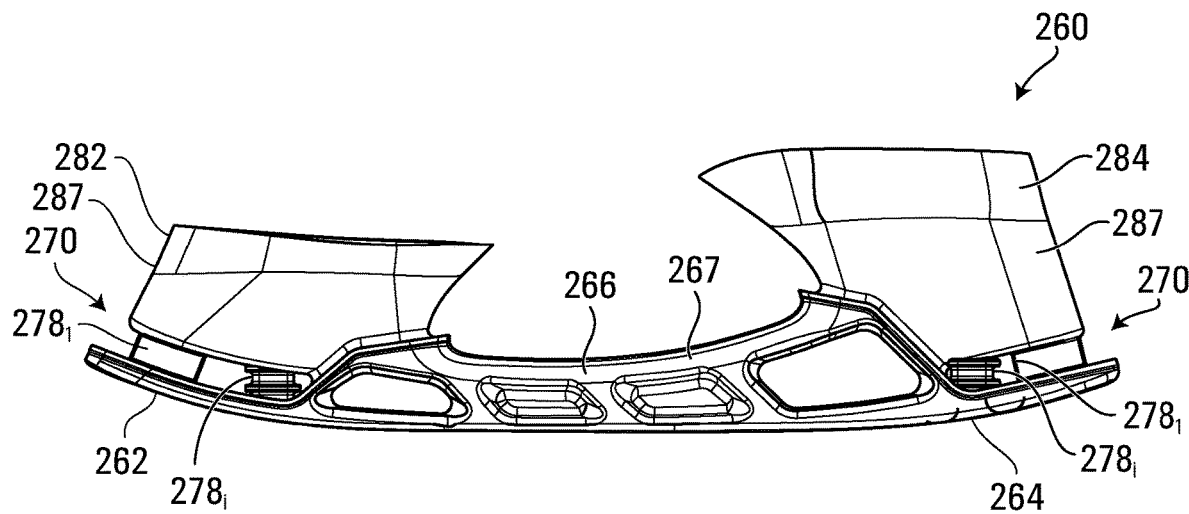
Figure 93:
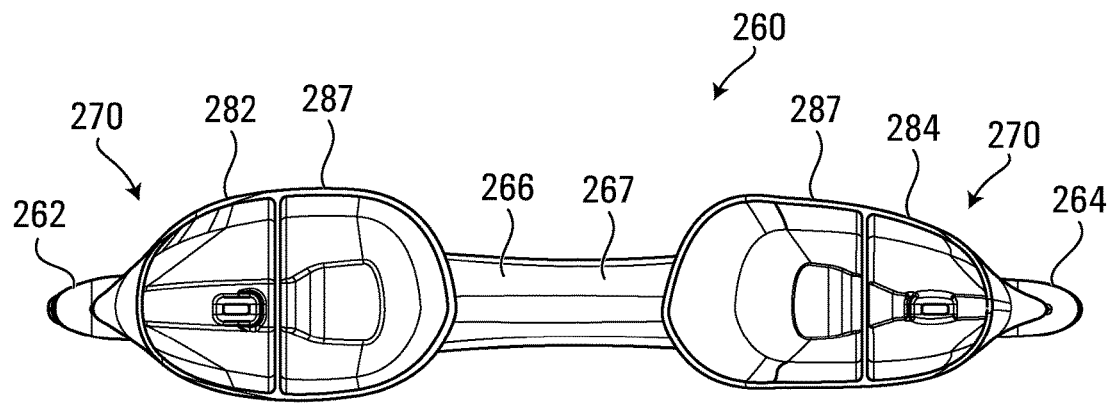

In some embodiments, with additional reference to FIGS. 91 to 93, the front and rear portions 262, 264 of the core 260 comprise upper portions 282, 284 extending to the sole portion 69 of the shell 30. Again, the upper portions 282, 284 may increase flexural stiffness, torsional stiffness, or area of surface of the interlock. In some embodiments, the upper portions 282, 284 may be integrally made with the front and rear portions 262, 264 (i.e., the portions 262, 282 may be unitary and the portions 264, 284 may also be unitary) or, in other embodiments, the upper portions 282, 284 may be affixed to respective ones of the front and rear portions 262, 264. Similarly, in some embodiments, the upper portions 282, 284 comprise a material 287 which may be identical to or different (e.g. having a higher or a lower modulus of elasticity) from the material 267 of the core 260.

Figure 94:
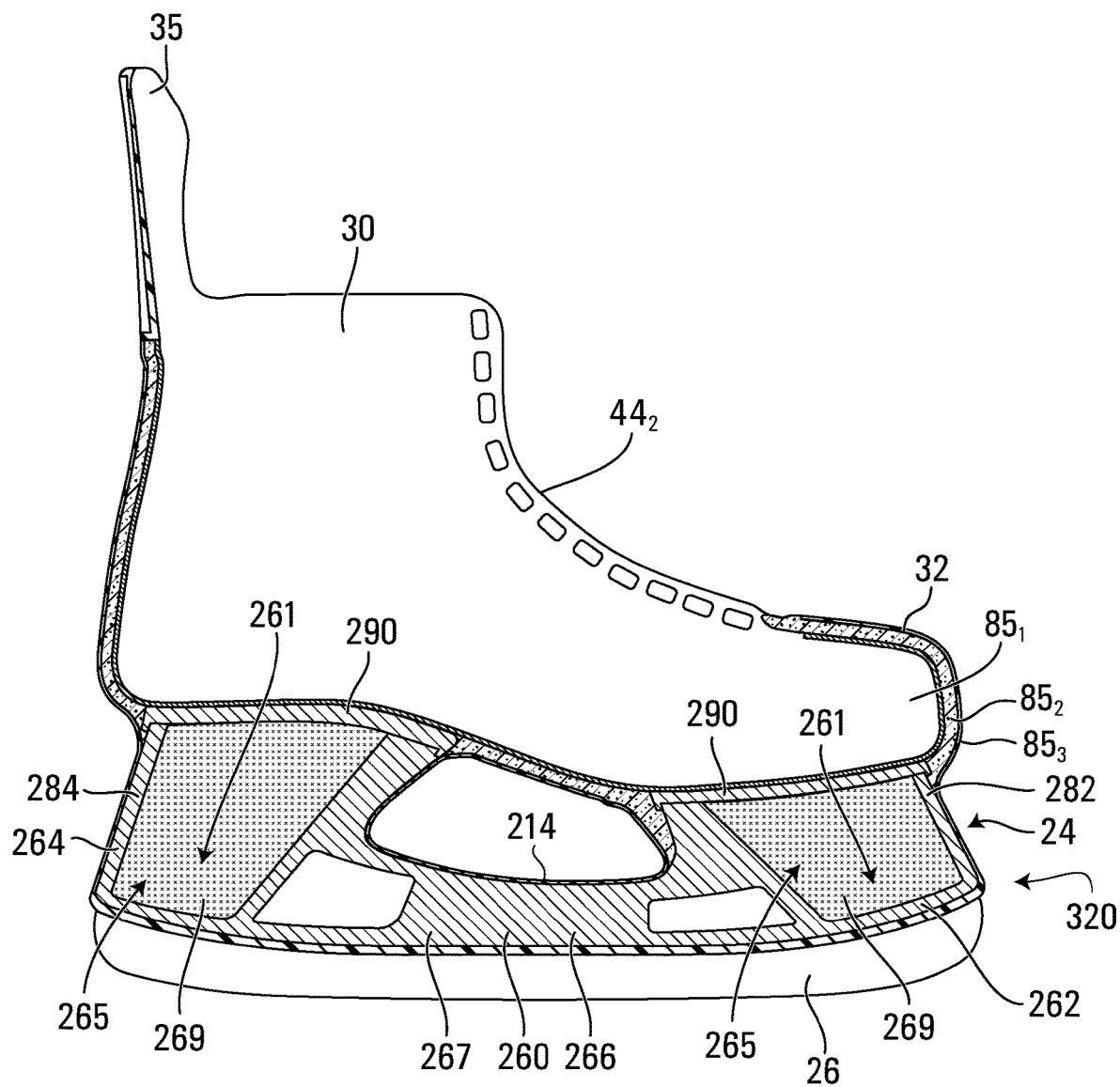
Figure 95:
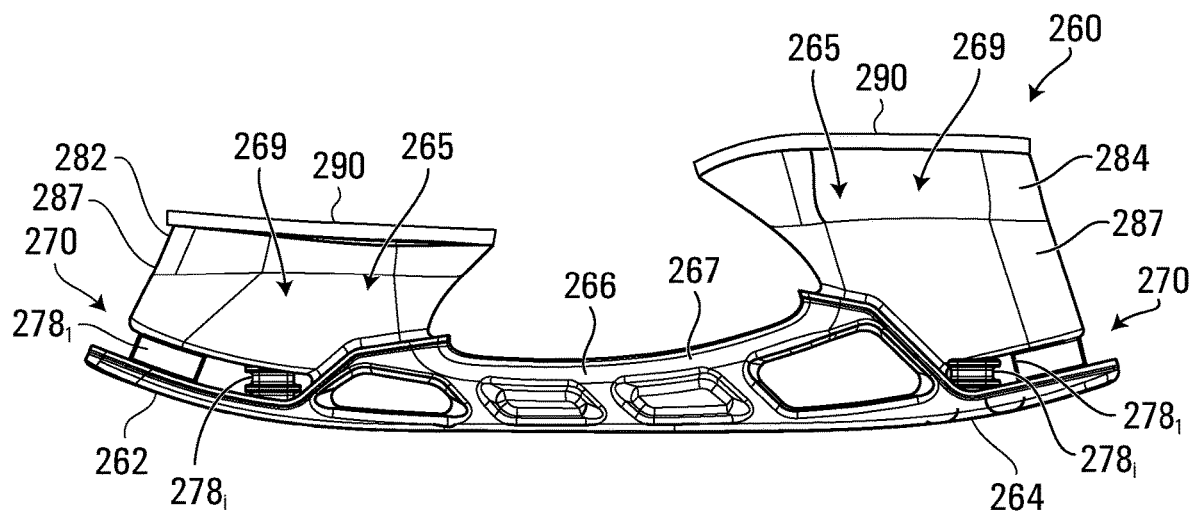
Figure 96:
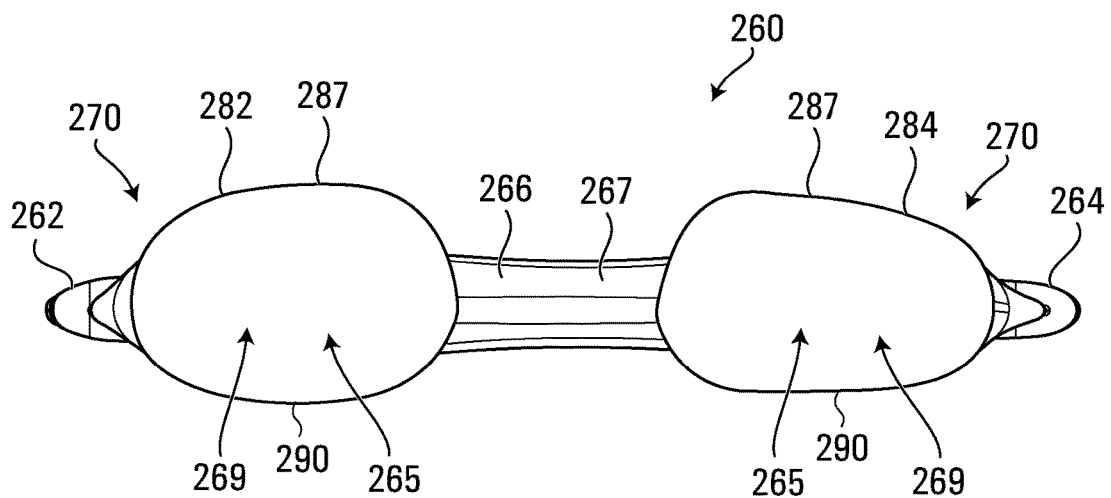
Figure 97:
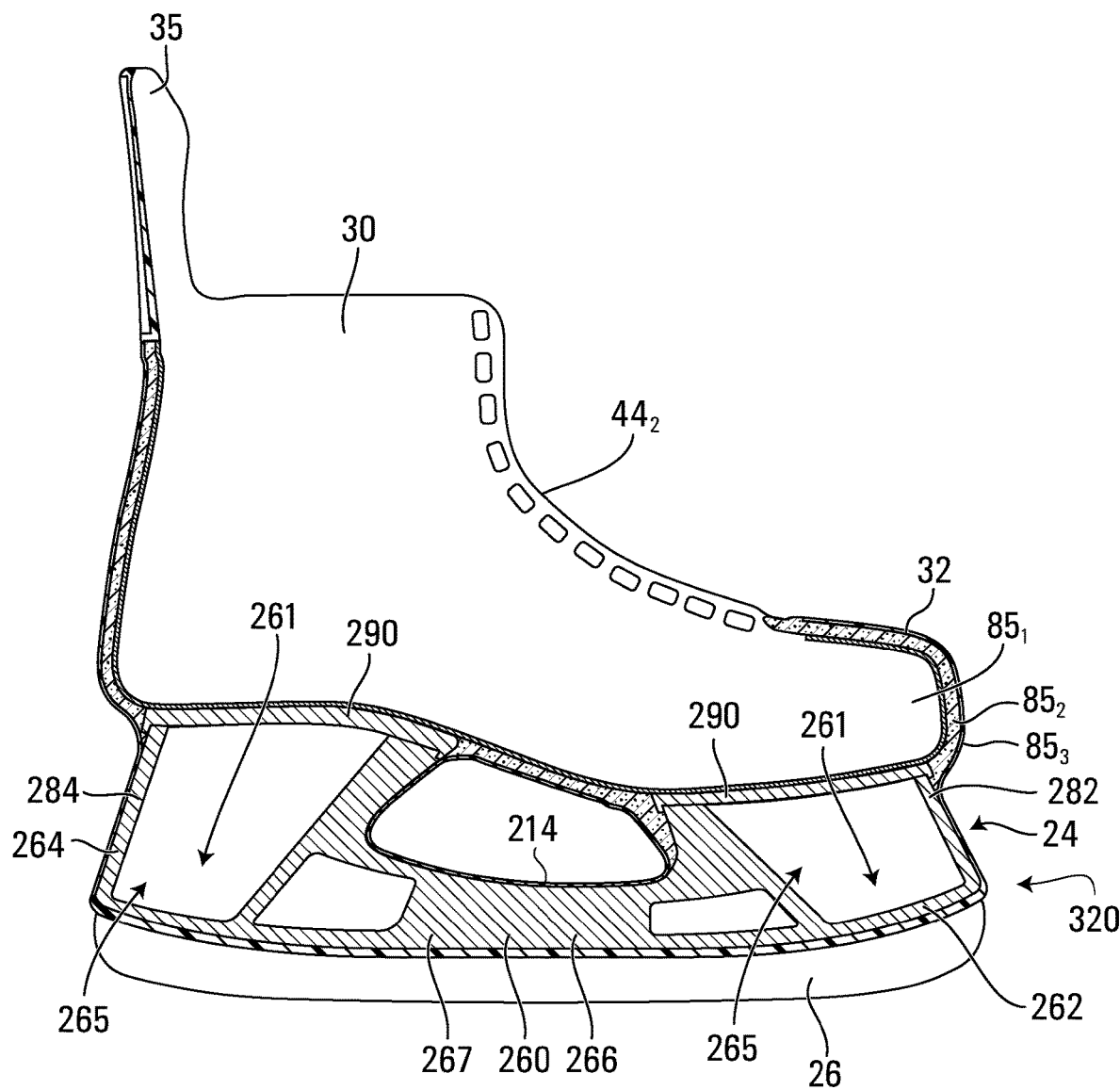
Figure 98:
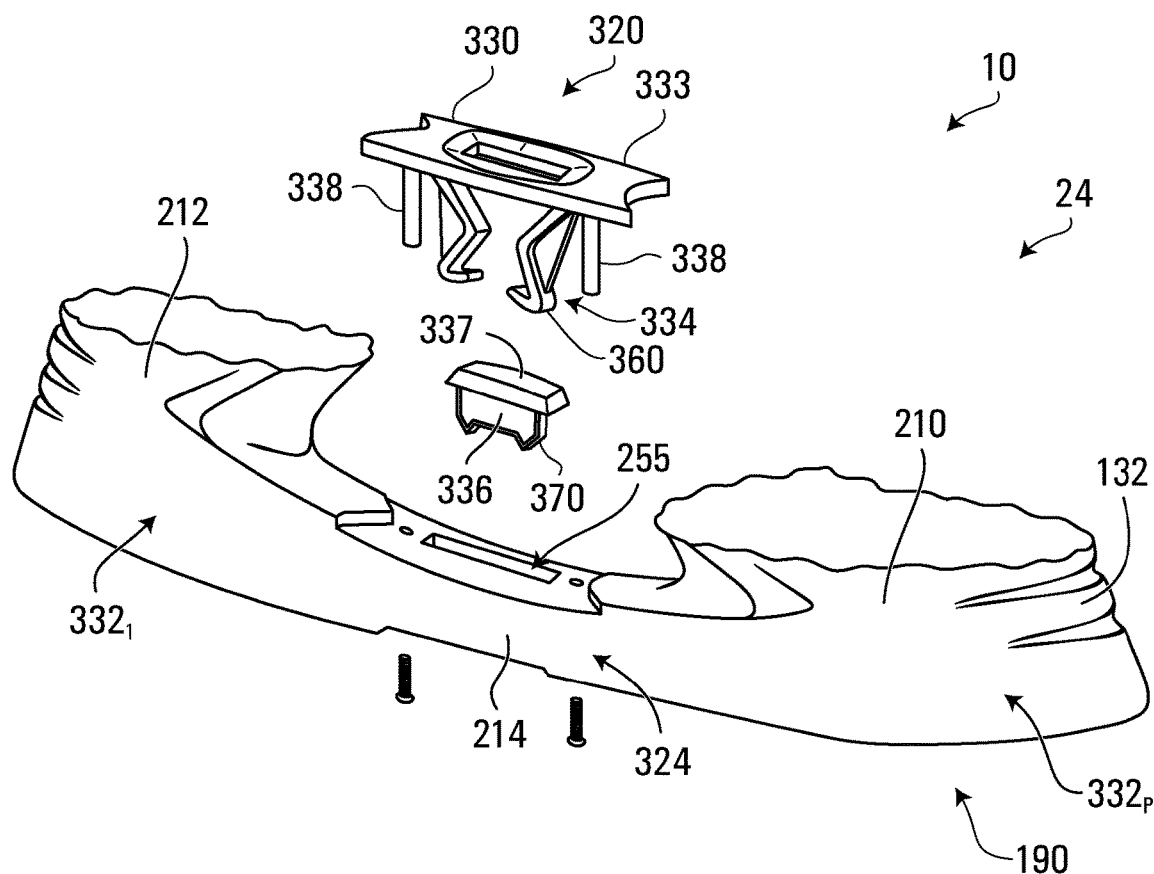
FIGS. 98 to 117 show an example of an embodiment in which the skate comprises a connection system to attach a blade to and detach the blade from the skate.

In some embodiments, with additional reference to FIGS. 94 to 96, each of the front and rear portions 262, 264 of the core 260 comprises a cap 290 to create an enclosure 265 which may be hermetic. In some cases, the enclosure 265 may be filled with a material 269. The material 269 may have a relatively low density to reduce weight of the blade holder 24. For instance, in this case, the material 269 is a polymeric material. More specifically, the material 269 comprises foam. In other cases, as shown in FIG. 97, the enclosure 265 may be left empty, i.e., may not be filled by another material, in order to reduce weight of the blade holder 24.

The front and rear portions 262, 264 of the core 260 may facilitate the manufacturing of the blade holder 24. For instance, in this embodiment, the front and rear portions 262, 264 of the core 260 have a shape configured for facilitating the flowing of liquid and/or viscous material during the molding by flowing process. More specifically, by occupying a significant volume of the pillars 210, 212, the front and rear portions 262, 264 of the core 260 may reduce the volume of material required for forming the pillars 210, 212 of the blade holder 24 and may also reduce an average thickness of the material required for forming the pillars 210, 212 of the blade holder 24, thereby reducing the occurrence of jams of material being flowed or any other irregularities. Moreover, a surface of the front and rear portions 262, 264 of the core 260 may facilitate the flowing of liquid and/or viscous material during the molding by flowing process by being smooth.

In this embodiment, with additional reference to FIGS. 98 to 107, the blade holder 24 comprises a connection system 320 configured to attach the blade 26 to and detach the blade 26 from the blade holder 24. The connection system 320 facilitates installation and removal of the blade 26, such as for replacement of the blade 26, assemblage of the skate 10, and/or other purposes.

More particularly, in this embodiment, the connection system 320 of the blade holder 24 is a quick-connect system configured to attach the blade 26 to and detach the blade 26 from the blade holder 24 quickly and easily.

Notably, in this embodiment, the quick-connect system 320 of the blade holder 24 is configured to attach the blade 26 to and detach the blade 26 from the blade holder 24 without using a screwdriver when the blade 26 is positioned in the blade holder 24. In this example, the quick-connect system 320 is configured to attach the blade 26 to and detach the blade 26 from the blade holder 24 screwlessly (i.e., without using any screws) when the blade 26 is positioned in the blade holder 24. It is noted that although the quick-connect system 320 is configured to attach the blade 26 to and detach the blade 26 from the blade holder 24 screwlessly, the quick-connect system 320 may comprise screws that are not used (i.e. manipulated) for attachment or detachment of the blade 26. Thus, in this embodiment, the quick-connect system 320 is configured to attach the blade 26 to and detach the blade 26 from the blade holder 24 without using a screwdriver and screwlessly when the blade 26 is positioned in the longitudinal recess 190 of the blade holder 24.

In this example, the quick-connect system 320 of the blade holder 24 is configured to attach the blade 26 to and detach the blade 26 from the blade holder 24 toolessly (i.e., manually without using any tool) when the blade 26 is positioned in the blade holder 24. That is, the blade 24 is attachable to and detachable from the blade holder 24 manually without using any tool (i.e., a screwdriver or any other tool). Thus, in this example, the quick-connect system 320 is configured to attach the blade 26 to and detach the blade 26 from the blade holder 24 toolessly when the blade 26 is positioned in the longitudinal recess 190 of the blade holder 24.

In this embodiment, the quick-connect system 320 of the blade holder 24 comprises a plurality of connectors 330, $332_1$-$332_P$ to attach the blade 26 to and detach the blade 26 from the blade holder 24. The blade 26 comprises a plurality of connectors 350, $352_1$-$352_P$ configured to engage respective ones of the connectors 330, $332_1$-$332_P$ of the quick-connect system 320 of the blade holder 24 to be attached to and detached from the blade holder 24. The connectors 330, $332_1$-$332_P$ of the quick-connect system 320 of the blade holder 24 are spaced apart in the longitudinal direction of the skate 10, and so are the connectors 350, $352_1$-$352_P$ of the blade 26.

In this embodiment, the connectors 330, 350 of the quick-connect system 320 of the blade holder 24 and the blade 26 are configured to preclude the blade 26 from moving in a distal direction, i.e., away from the blade holder 24, when the blade 26 is attached to the blade holder 24, and the connector 330 of the quick-connect system 320 of the blade holder 24 is disposed between the pillars 210, 212 of the blade holder 24. In order to be connectable with the connector 330 of the quick-connect system 320 of the blade holder 24, in some embodiments, the connector 350 of the blade 26 may be disposed within 30% of a length $L_{BL}$ of the blade 26 from a longitudinal center $C_{BL}$ of the blade 26, in some embodiments within 20% of the length $L_{BL}$ of the longitudinal center $C_{BL}$, in some embodiments within 10% of the length $L_{BL}$ of the longitudinal center $C_{BL}$, in some embodiments within 5% of the length $L_{BL}$ of the longitudinal center $C_{BL}$, in some embodiments at the longitudinal center $C_{BL}$.

In this example, the connector 330 of the quick-connect system 320 of the blade holder 24 is movable relative to the body 132 of the blade holder 24 to attach the blade 26 to and detach the blade 26 from the blade holder 24. That is, at least part of the connector 330 is configured to move relative to the body 132 of the blade holder 24 (e.g., be displaced in relation to or disconnected from the body 132 of the blade holder 24) while attaching the blade 26 to and detaching the blade 26 from the blade holder 24 to allow attachment and detachment of the blade 26.

In particular, in this embodiment, the connector 330 of the quick-connect system 320 remains connected to the body 132 of the blade holder 24 while at least partly moving relative to the body 132 of the blade holder 24 to attach the blade 26 to and detach the blade 26 from the blade holder 24. In this embodiment, the connector 330 of the quick-connect system 320 is threadless (i.e., without any thread required to attach the blade to the blade holder).

The connector 330 of the quick-connect system 320 may comprise a base 333 for affixing the connector 330 to the body 132 of the blade holder 24 and for connecting parts of the connector 330.

The connector 330 of the quick-connect system 320 may comprise a resilient portion 334 configured to resiliently deform (i.e., resiliently change in configuration from a first configuration to a second configuration in response to a load and to revert to the first configuration in response to the load ceasing to be applied) to allow the connector 330 to move relative to the body 132 of the blade holder 24 to attach the blade 26 to and detach the blade 26 from the blade holder 24. More specifically, in this example, the resilient portion 334 of the connector 330 of the quick-connect system 320 is configured to bias the connector 330 in a position to attach the blade 26 to the blade holder 24. The resilient portion 334 of the connector 330 of the quick-connect system 320 is also configured to exert a spring force during attachment of the blade 26 to and detachment of the blade 26 from the blade holder 24 and to resiliently deform when the blade 26 is placed in the blade holder 24 to attach the blade 26 to the blade holder 24 and when the blade 26 is removed from the blade holder 24 to detach the blade 26 from the blade holder 24. As such, at least part of the resilient portion 334 may be considered to form a clip configured to attach the blade 26 to the blade holder 24 by gripping, clasping, hooking or otherwise clipping a portion of the blade 26.

In this embodiment, the connector 330 of the quick-connect system 320 comprises a hand-engaging actuator 336 configured to be manually operated to move part of the connector 330 of the quick-connect system 320 relative to the body 132 of the blade holder 24. The hand-engaging actuator 336 of the connector 330 may be configured to be manually operated by manually pushing thereon. More specifically, the hand-engaging actuator 336 of the connector 330 may comprise a button 370. The base 333 may thus be viewed as a "button cage" as it receives and keeps the button 370 captive.

In this embodiment, the button 370 may have a width $W_B$ and a length $L_B$ allowing the quick-connect system 320 to be sufficiently tightly attached to the body 132 of the blade holder 24 such that, for instance, an impact between the blade holder 24 and a flying hockey puck would not eject any component (e.g., the button 370) from the blade holder 24. For instance, in some embodiments, the width $W_B$ of the button 370 may be between 0.25 inch and 1 inch, in some embodiments about 0.5 inch, while in some embodiments the length $L_B$ of the button 370 may be between 0.25 inch and 2 inches, in some embodiments between 0.75 inch and 1.5 inch, and in some embodiments about 1 inch. Thus, the hand-engaging actuator 336 may have a hand-engaging actuating surface 337 that is greater, therefore allowing the user to actuate the hand-engaging actuator 336 using a smaller pressure, thereby facilitating the use of the hand-engaging actuator. For example, in this embodiment, the hand-engaging surface 33 occupies at least a majority of a width of a cross-section of the blade holder 24 normal to the longitudinal direction of the blade holder 24 where the hand-engaging surface 337 is located. For instance, the hand-engaging surface 337 may occupy at least 60%, in some cases at least 70%, and in some cases at least 80% of the width of the cross-section of the blade holder 24 normal to the longitudinal direction of the blade holder 24 where the hand-engaging surface 337 is located. For example, in some embodiments, the hand-engaging actuating surface 337 may be of at least 0.0625 in$^2$, in some embodiments of at least 0.125 in$^2$, in some embodiments of at least 0.5 in$^2$, in some embodiments of at least 1 in$^2$, in some embodiments of at least 2 in$^2$, in some embodiments even more.

In this embodiment, the quick-connect system 320 comprises a frame 324 affixed to the body 132 of the blade holder 24 and supporting the connector 330 of the quick-connect system 320. For instance, in some cases, at least part of the frame 324 is fastened to the body 132 of the blade holder 24 by at least one fastener, such as a screw, a bolt, or any other threaded fastener, an adhesive, or any other fastener. In some cases, at least part of the body 132 of the blade holder 24 is overmolded on the frame 324. The frame 324 may be concealed by material of the body 132 of the blade holder 24. In some cases, the frame 324 may comprise two apertures 385 and the base 333 may comprise two posts 338 extending through the apertures 385 of the frame 324 and secured to the frame 324 by any suitable means, for instance using screws or bolts, thereby affixing the base 333 to the frame 324.

In this embodiment, the connector 350 of the blade 26 comprises a connecting projection 390 projecting from an upper surface 356 of the blade 26. The connecting projection 390 of the blade 26 comprises two hooks 392. Each hook 392 is configured to engage the connector 330 of the blade holder 24 to hold the blade 26 and comprises an upper end 394 configured to enlarge the resilient portion 330 of the connector 330 while the blade 26 is being attached to the blade holder 24. For instance, in this embodiment, the upper end 394 of the projection 390 defines a width of the projection 390 progressively diminishing as the projection 390 projects from the upper surface 356 of the blade 26.

In this embodiment, the connectors $332_1$-$332_P$ of the blade holder 24 are voids of pre-determined shapes and the connectors $352_1$-$352_P$ of the blade 26 are projections projecting from the upper surface 356 of the blade 26 to engage the voids $332_1$-$332_P$ and stabilize the blade 26 in longitudinal and widthwise directions of the skate 10.

Figure 99:
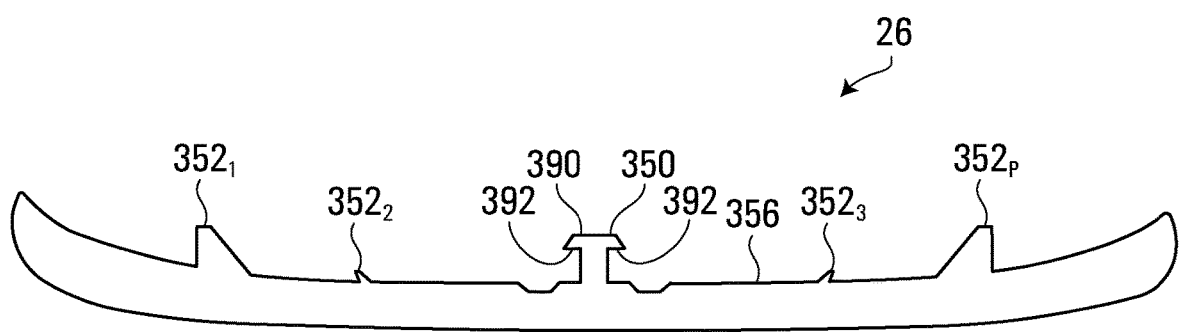
Figure 100:
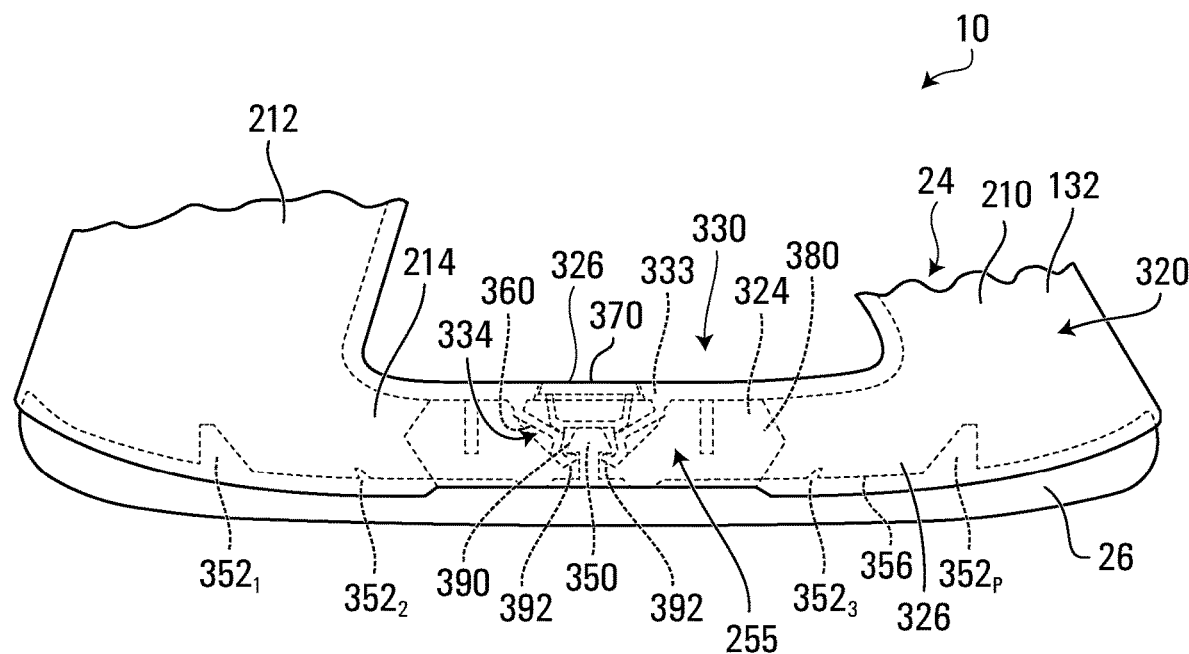
Figure 101:
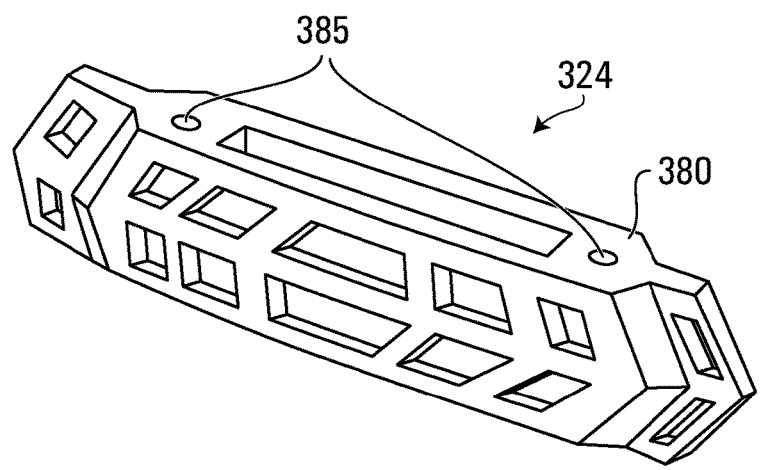
Figure 102:
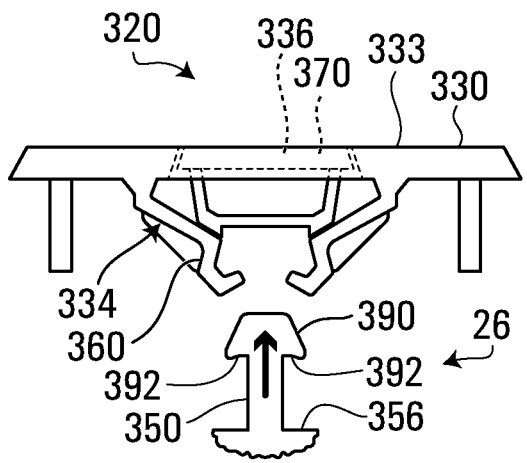
Figure 103:
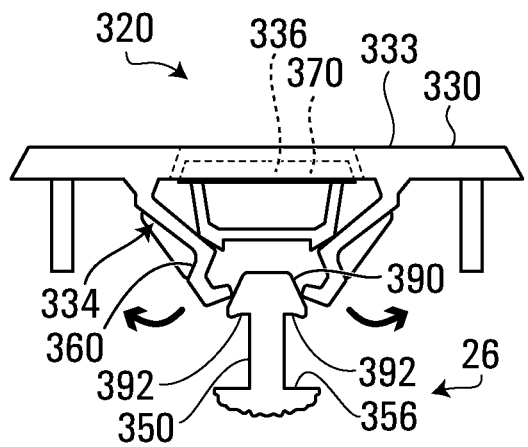
Figure 104:
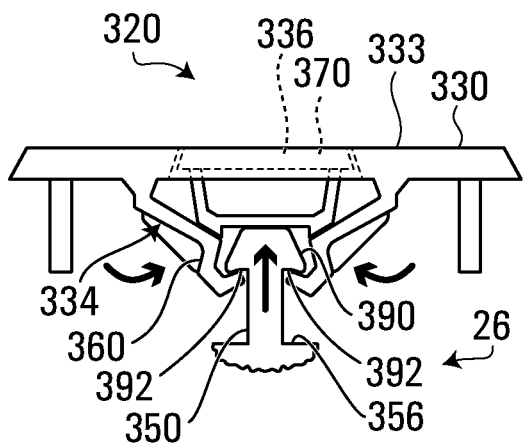
Figure 105:
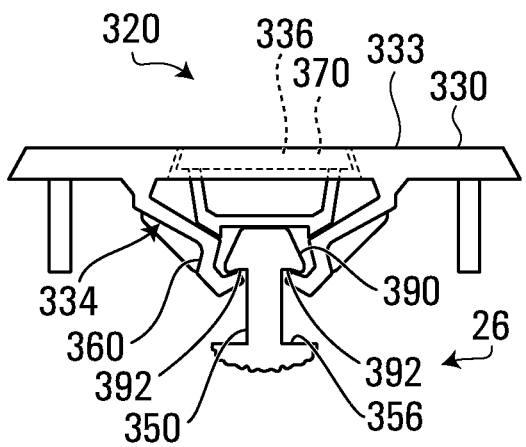
Figure 106:
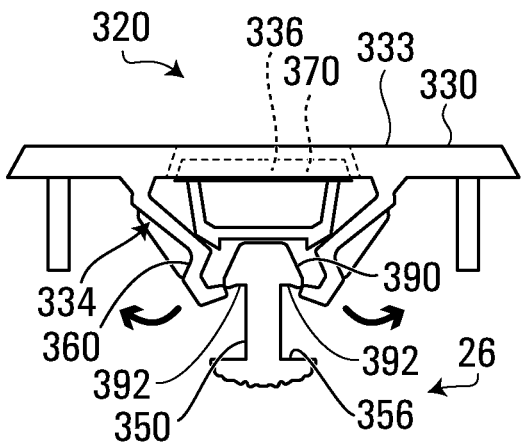
Figure 107:
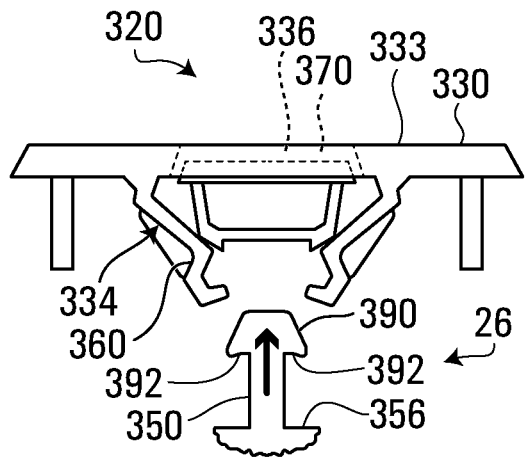
Figure 108:
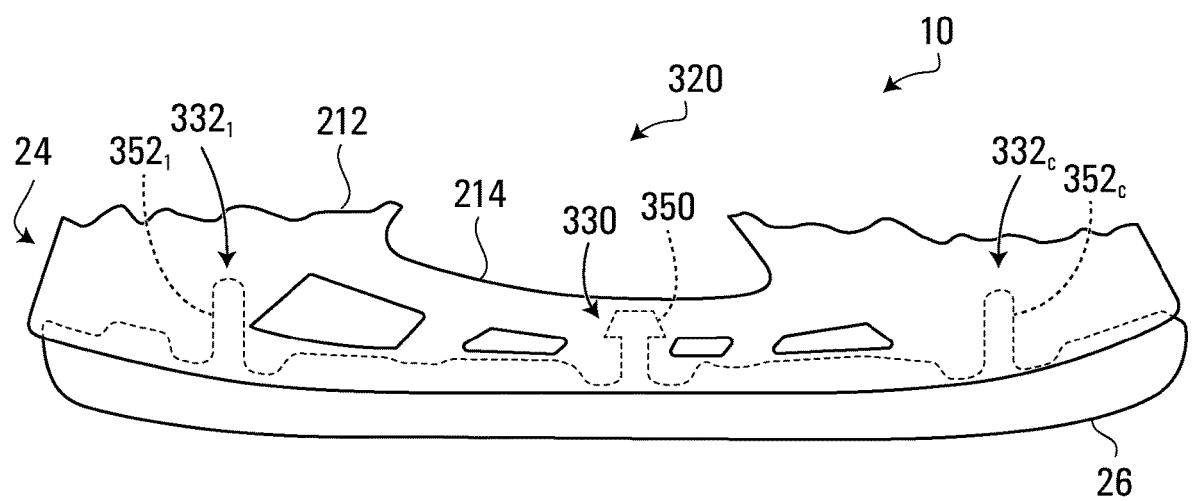
Figure 109:
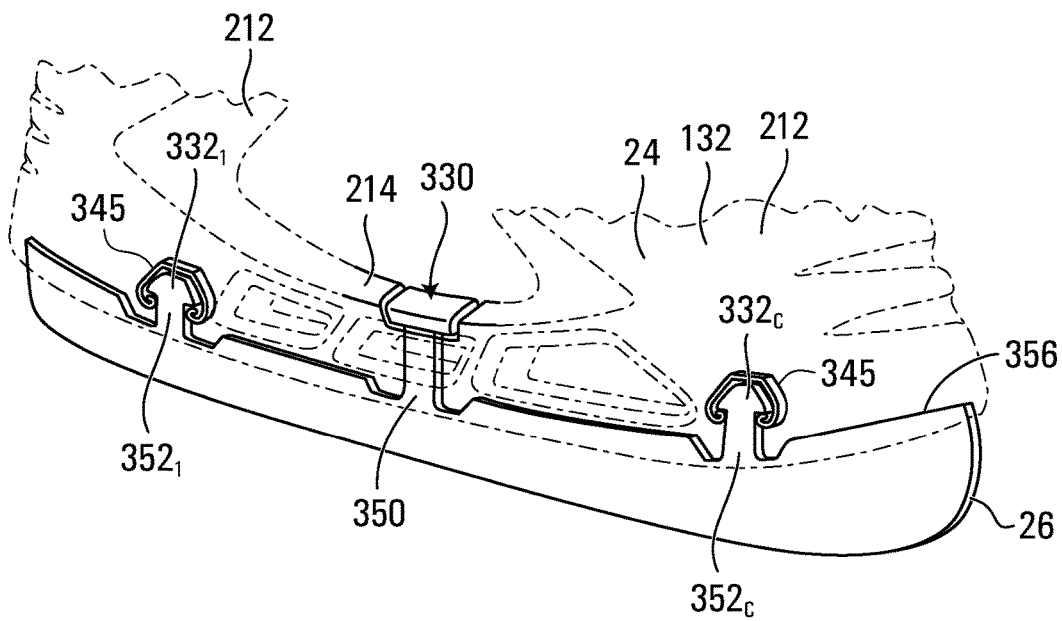
Figure 110:
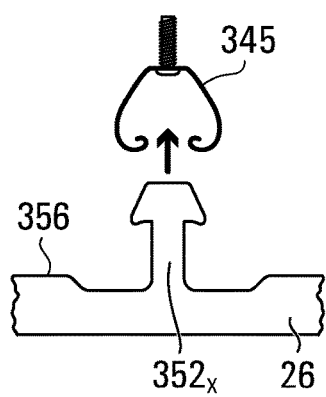
Figure 111:
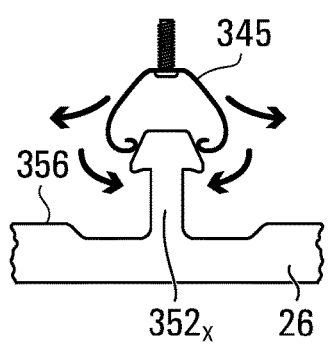
Figure 112:
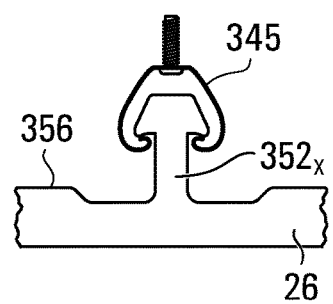
Figure 113:
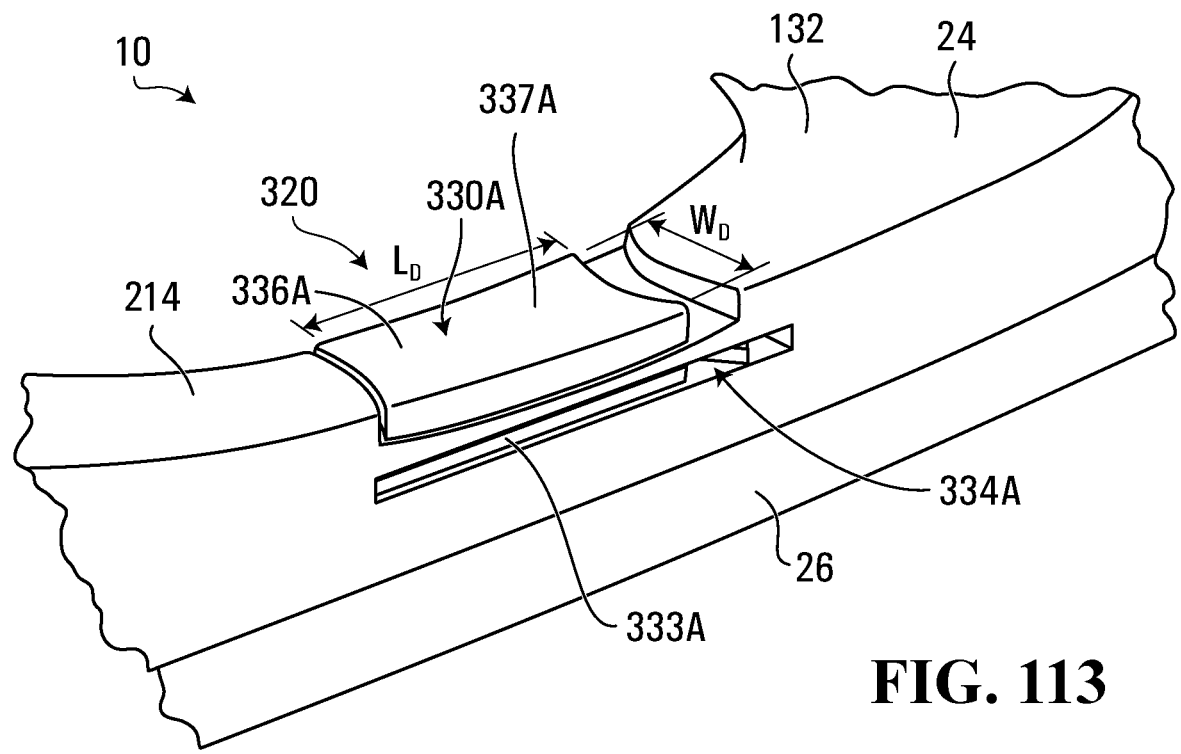
Figure 114:
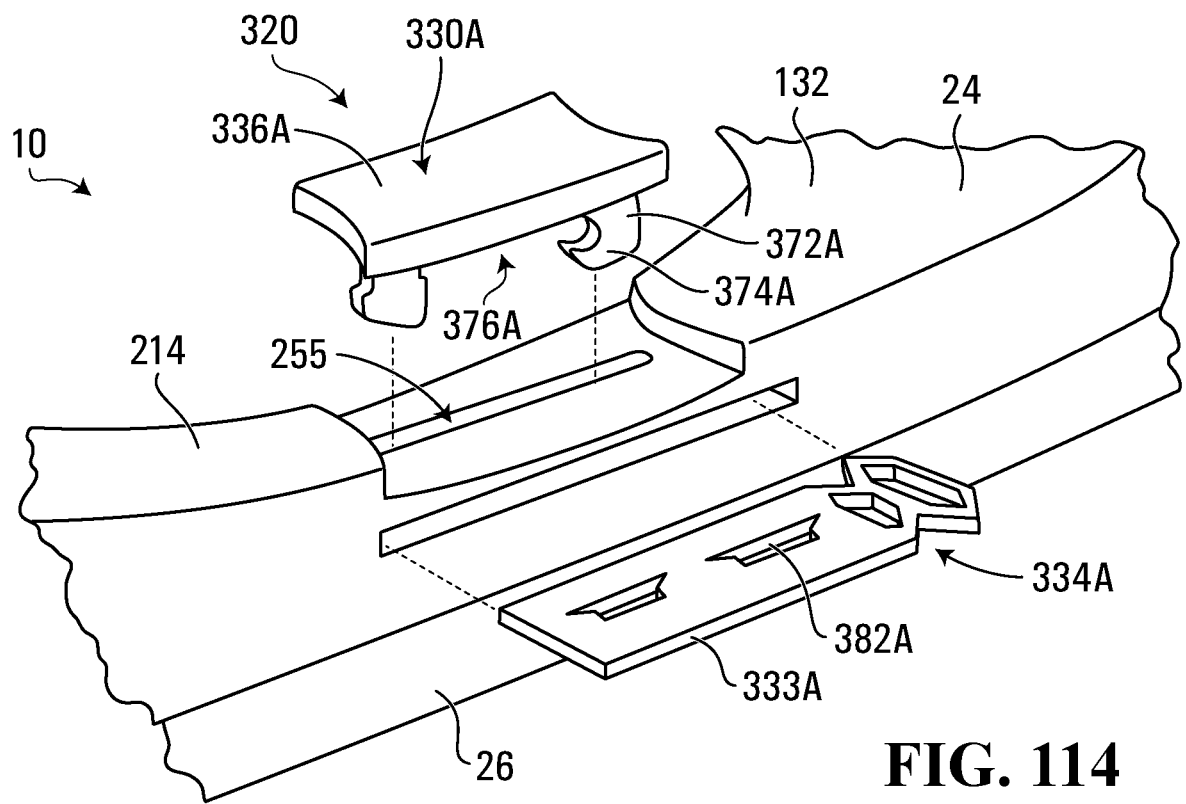
Figure 115:
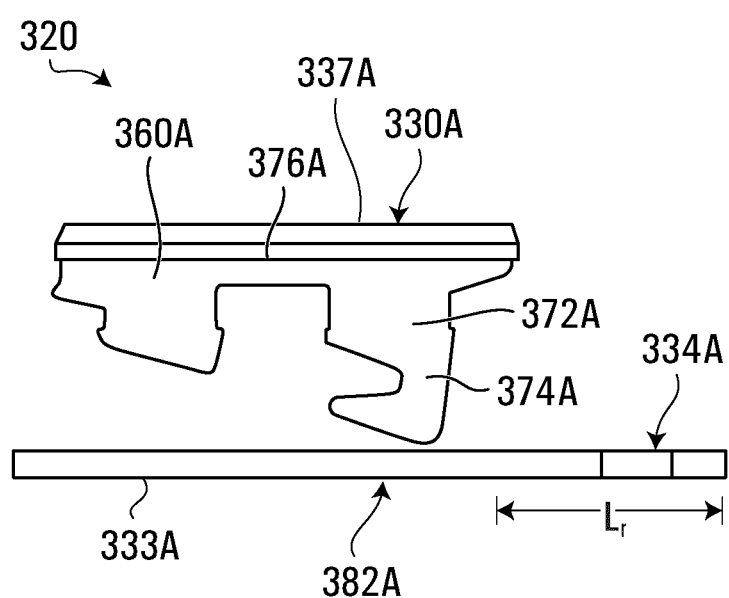
Figure 116:
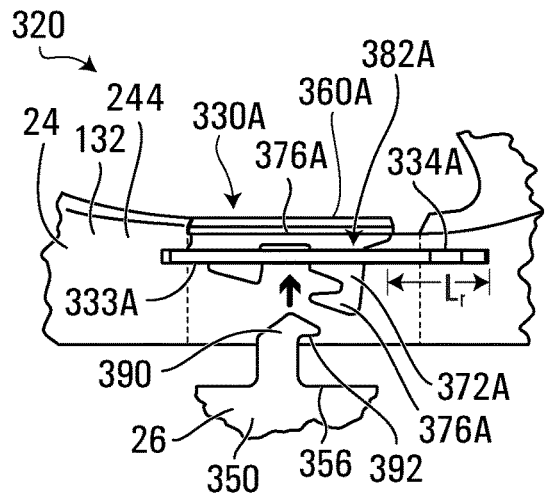
Figure 117:
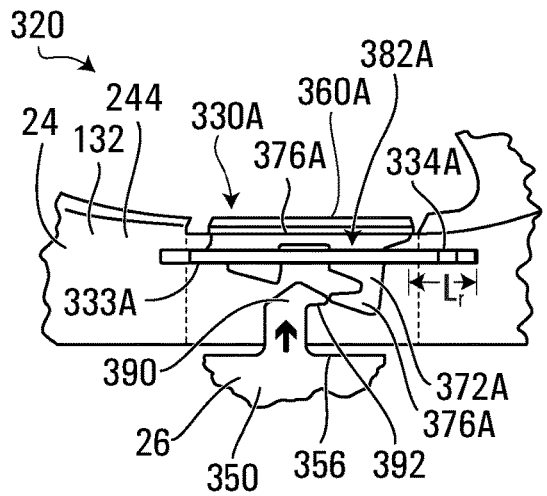
Figure 118:
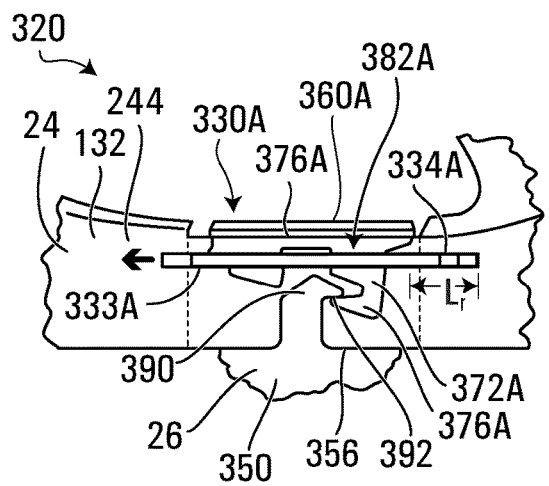
Figure 119:
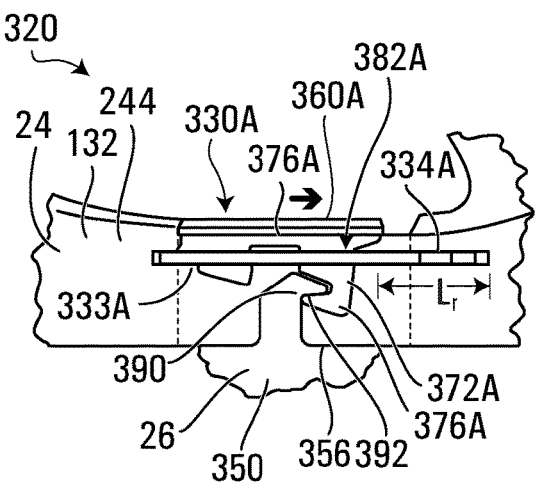
Figure 120:
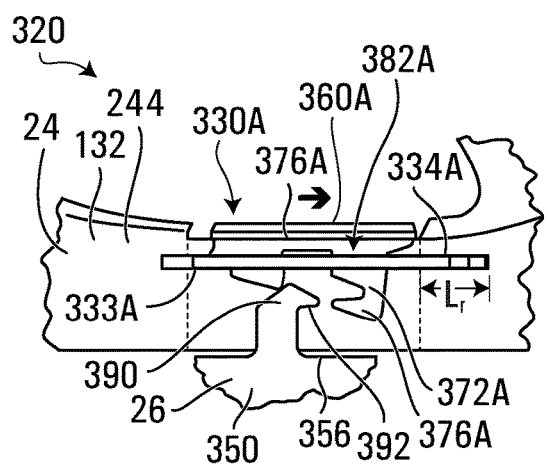
Figure 121:
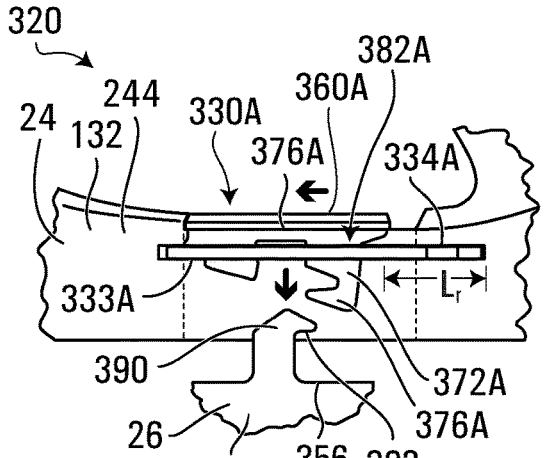
Figure 122:
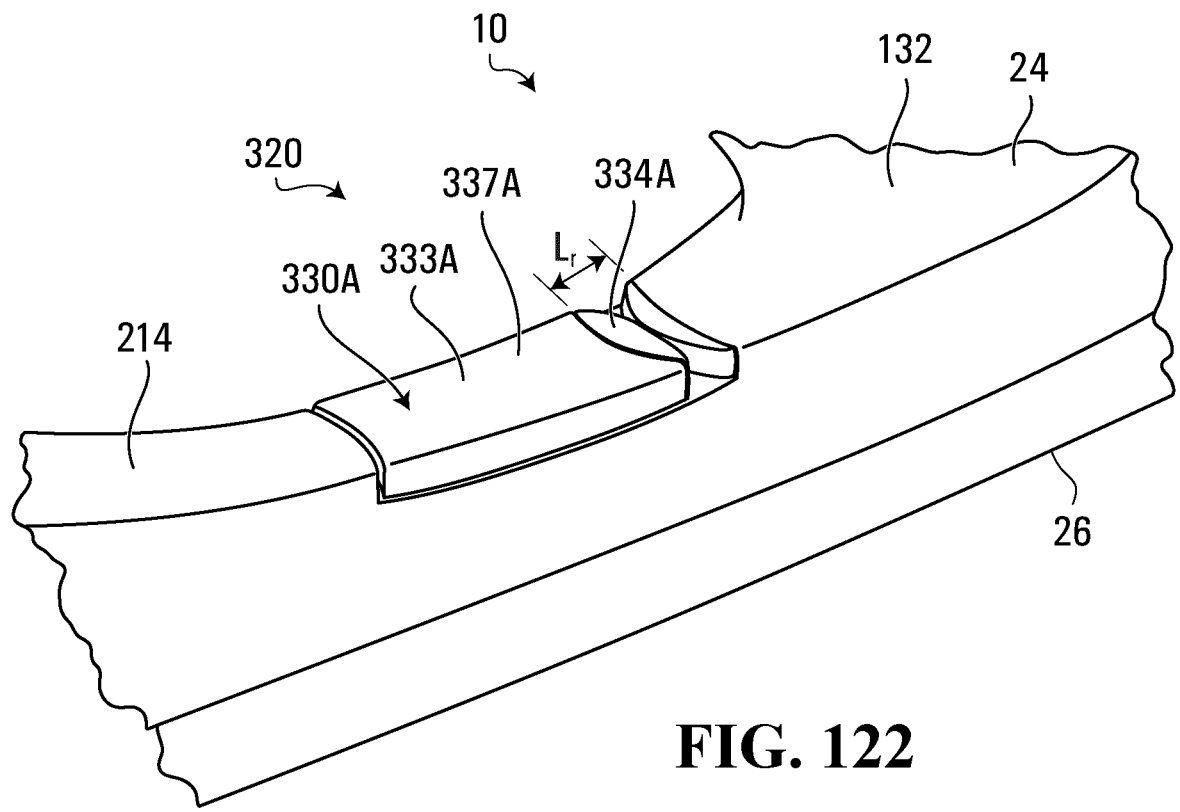
Figure 123:
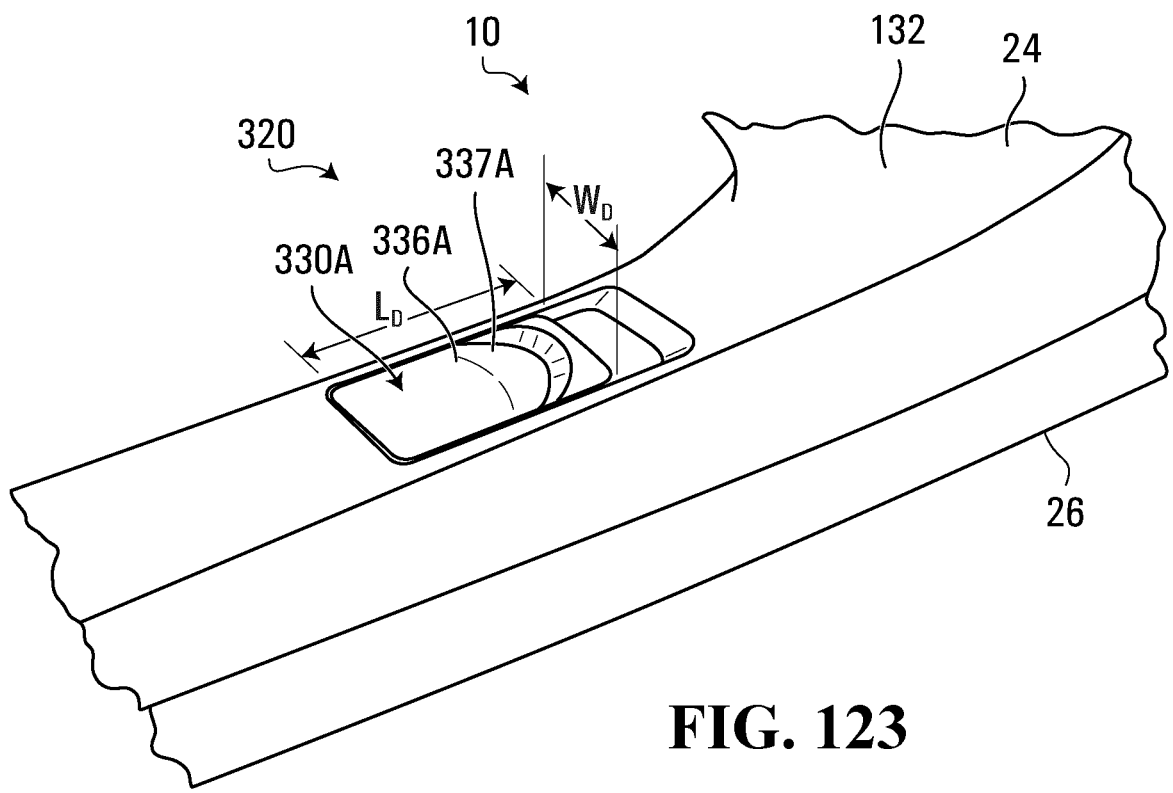
Figure 124:
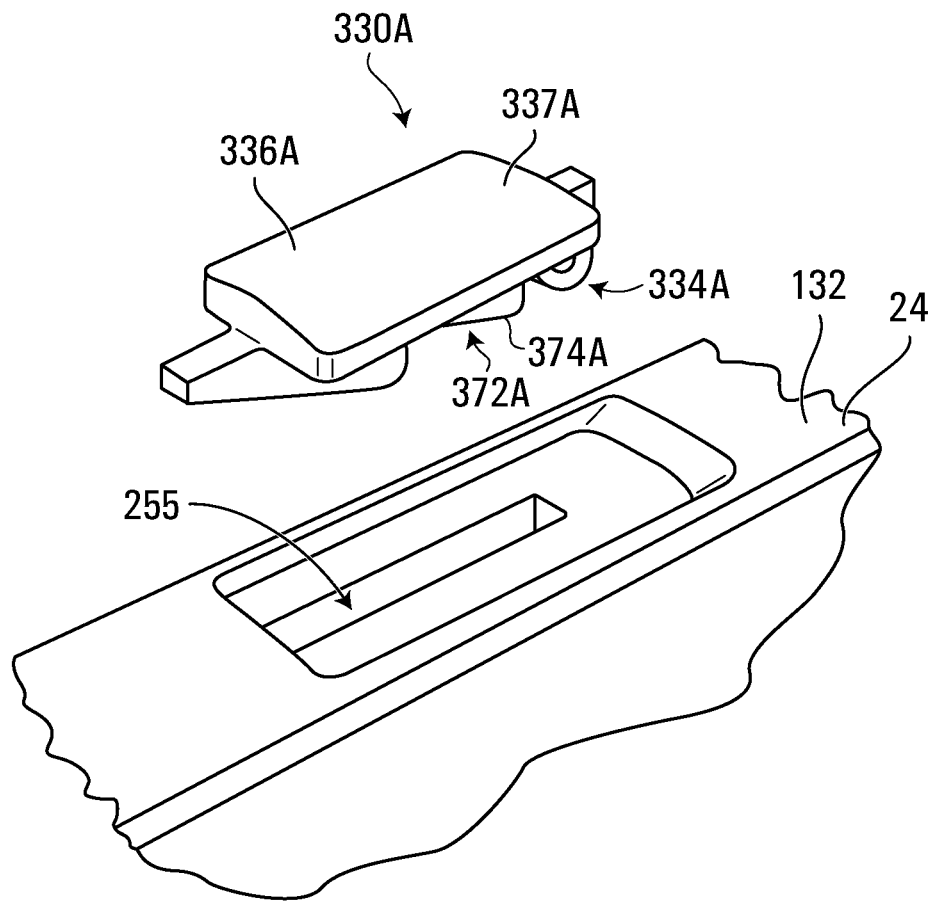
Figure 125:
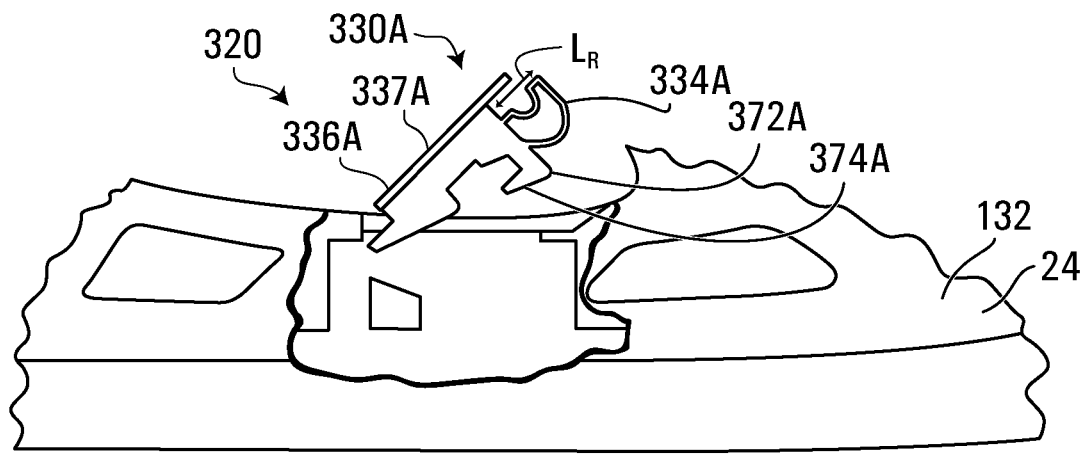
Figure 126:
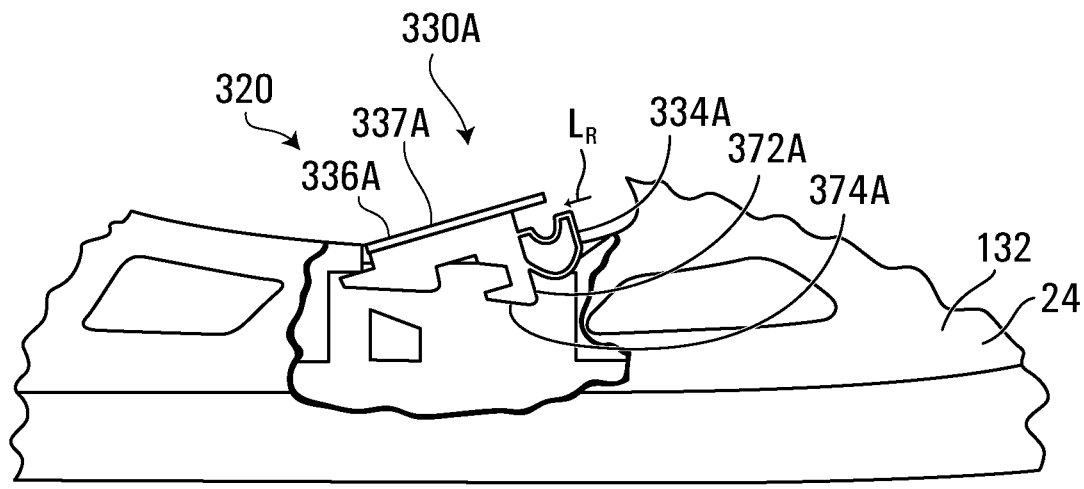
Figure 127:
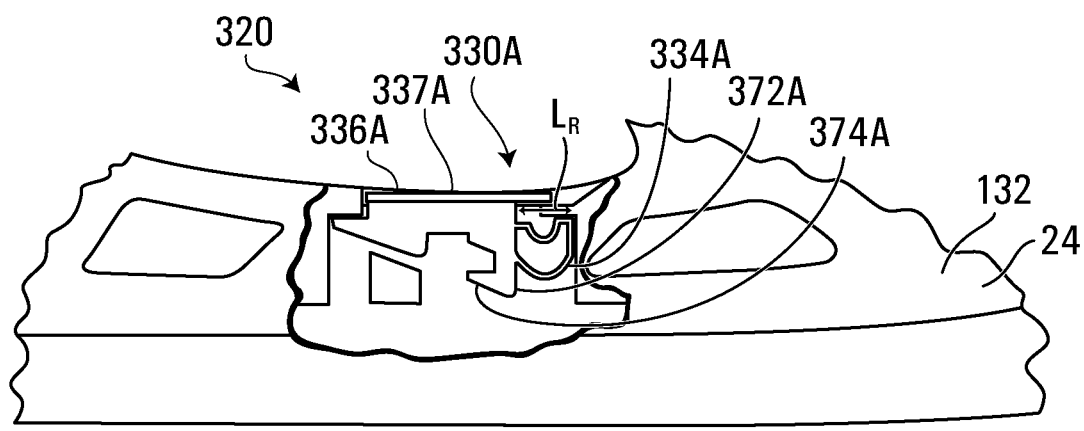

In this embodiment, the quick-connect system 320 is configured such that the blade 26 is attachable to and detachable from the blade holder 24 by a single translation of the blade 26 relative to the blade holder 24 in a heightwise direction of the skate. In other words, the quick-connect system 320 may be configured such that the blade 26 is attachable to and detachable from the blade holder 24 without rotating the blade 26 relative to the blade holder 24. Although this may be achieved by having connectors $352_1$-$352_C$ of the blade 26 having edges that may be oblique relative to a longitudinal direction of the blade 26, as shown in FIG. 99, in some embodiments, the connectors $352_1$-$352_C$ of the blade 26 may project from the blade 26 in a straight manner and perpendicularly relative to the longitudinal direction of the blade 26, as shown in FIG. 108.

In other embodiments, the connectors $332_1$-$332_P$ of the blade holder 24 are structurally substantially similar to the connector 330 of the blade holder 24 and the connectors $352_1$-$352_P$ of the blade 26 are structurally substantially similar to the connector 350 of the blade 26.

In other embodiments, as shown in FIGS. 109 to 112, the connectors $352_1$-$352_P$ of the blade 26 comprises two hooks to engage the connectors $332_1$-$332_P$ of the blade holder 24, each comprising a clip 345. Each clip 345 may be attached to the body 132 of the blade holder 24 and may be made of a resiliently deformable material such that the clip 345 is configured to retain a given one of the connectors $352_1$-$352_C$ of the blade 26 from being attached to or detached from the clip 345, but when an attaching or detaching force exceeds a pre-determined threshold, the clip 345 resiliently deforms to allow the given one of the connectors $352_1$-$352_C$ of the blade 26 to be attached to or detached from the clip 345 and returns to its original shape after the attachment or detachment.

The quick-connect system 320 of the blade holder 24 may be connected to the body 132 of the blade holder 24 in any suitable way. The body 132 of the blade holder 24 may comprise a void 255 (e.g., a cavity) receiving the quick-connect system 320 of the blade holder 24. The void 255 may be open at a periphery of the blade holder 24. The quick-connect system 320 of the blade holder 24 may be secured to the body 132 of the blade holder 24 by one or more fasteners (e.g., screws, bolts, and/or other threaded fasteners; rivets; adhesive; etc.), overmolding, ultrasonic welding, and/or any other suitable means.

In this embodiment, one or more other components (e.g., the toe cap 32, the tendon guard 35, the lace members $44_1$, $44_2$, the tongue 34, the footbed 38, etc.) of the skate boot 22 may be molded integrally with the shell 30 in the molding apparatus 150 during the molding process. The shell 30 and these one or more other components of the skate boot 22 may thus constitute a monolithic one-piece structure.

For example, in this embodiment, the toe cap 32, the tendon guard 35, and the lace members $44_1$, $44_2$ are molded integrally with the shell 30 in the molding apparatus 150 during the molding process.

For instance, in this embodiment, the toe cap 32 comprises a portion 217 that is integrally formed with the shell 30 such that the portion 217 of the toe cap 32 of the skate boot 22 and the shell 30 of the skate boot 22 are formed together as one-piece in the molding apparatus 150 during the molding process. As such, the portion 217 of the toe cap 32 of the skate boot 22 may include one or more of the polymeric materials $M_1$-$M_N$ of the subshells $85_1$-$85_L$ of the shell 30 of the skate boot 22.

In this embodiment, the portion 217 of the toe cap 32 includes one or more of the polymeric materials $M_1$-$M_N$ of the subshells $85_1$-$85_L$ of the shell 30 of the skate boot 22. For instance, in this example, the portion 217 of the toe cap 32 includes the internal, intermediate and external subshells $85_1$, $85_2$, $85_3$ and therefore comprises the polymeric materials $M_1$, $M_2$, $M_3$ associated therewith. Alternatively, the portion 217 of the toe cap 32 may include one or more different materials.

Moreover, in this embodiment, the tendon guard 35 comprises a portion 219 that is integrally formed with the shell 30 such that the portion 219 of the tendon guard 35 of the skate boot 22 and the shell 30 of the skate boot 22 are formed together as one-piece in the molding apparatus 150 during the molding process. As such, the portion 219 of the tendon guard 35 of the skate boot 22 may include one or more of the polymeric materials $M_1$-$M_N$ of the subshells $85_1$-$85_L$ of the shell 30 of the skate boot 22. For instance, in this example, the portion 219 of the tendon guard 35 includes solely the external subshell $85_3$ and therefore comprises the polymeric material $M_3$ associated therewith. Alternatively, the portion 219 of the tendon guard 35 may include one or more different materials. For example, in some embodiments, the portion 219 of the tendon guard 219 may also comprise the internal subshell $85_1$ and/or the intermediate subshell $85_2$ such that the portion 219 of the tendon guard 35 also comprises the polymeric material $M_1$ and/or the polymeric material $M_2$ associated therewith.

Moreover, in this embodiment, each of the lace members $44_1$, $44_2$ comprises a portion 221 that is integrally formed with the shell 30 such that the portion 221 of each of the lace members $44_1$, $44_2$ of the skate boot 22 and the shell 30 of the skate boot 22 are formed together as one-piece in the molding apparatus 150 during the molding process. As such, the portion 221 of each lace member $44_i$ of the skate boot 22 may include one or more of the polymeric materials $M_1$-$M_N$ of the subshells $85_i$-$85_L$ of the shell 30 of the skate boot 22. For instance, in this example, the portion 221 of the lace member $44_i$ includes solely the external subshell $85_3$ and therefore comprises the polymeric material $M_3$ associated therewith. Alternatively, the portion 221 of the lace member $44_i$ may include one or more different materials. For example, in some embodiments, the portion 221 of the lace member $44_i$ may also comprise the internal subshell $85_1$ and/or the intermediate subshell $85_2$ such that the portion 221 of the lace member $44_i$ also comprises the polymeric material $M_1$ and/or the polymeric material $M_2$ associated therewith. Moreover, in this embodiment, the apertures 48 that extend through the lace members $44_1$, $44_2$ are formed during the molding process by appropriate structures (e.g., projections) of the last 152 and an associated female mold $154_i$.

The skate 10 may be implemented in any other suitable manner in other embodiments.

For instance, the quick-connect system 320 of the blade holder 24 and the blade 26 may configured in any other suitable way to attach the blade 26 to and detach the blade 26 from the blade holder 24.

For example, in some embodiments, as shown in FIGS. 113 to 121, the connector 330 of the quick-connect system 320 of the blade holder 24, which is designated 330A in this variant, may be movable relative to the body 132 of the blade holder 24 by sliding relative to the body 132 of the blade holder 24 to attach the blade 26 to and detach the blade 26 from the blade holder 24. For instance, in this embodiment, the hand-engaging actuator 336 of the connector 330A of the quick-connect system 320, which is designated 336A in this variant, is configured to be manually operated by manually sliding relative to the body 132 of the blade holder 24 in the longitudinal direction of the skate 10.

In this embodiment, the connector 330A of the quick-connect system 320 comprises a catch 372A to engage and hold immovable the blade 26 relative to the connector 330. For instance, in this example, the catch 372A comprises a hook 374A projecting from a lower surface 376A of the hand-engaging actuator 336A and configured to engage the connector 350 of the blade 26.

In this embodiment, the hand-engaging actuator 336A is a detent operable manually to retain the blade 26 onto the blade holder 24 and release the blade 26 from the blade holder 24. The base 333 of the connector 330A of the quick-connect system 320 of the blade holder 24, which is designated 333A in this variant, may be an insert and may comprise a void 382A to let a portion of the hook 374A through the insert 380A. The resilient portion 334A is a portion of the insert 333A and is configured to resiliently deform and spring back into its original shape when no load is applied onto the insert 333A. In particular, the resilient portion 334A has in dimension $L_r$ which can be diminished by operating (i.e., sliding) the hand-engaging actuator 336 of the connector 330A. When operating the hand-engaging actuator 336 of the connector 330A, the dimension $L_r$ diminishes and the catch 372A moves to allow the blade 26 to be attached or detached from the catch 372A.

In this embodiment, the detent 336A may have a width $W_D$ and a length $L_D$ allowing the quick-connect system 320 to be sufficiently tightly attached to the body 132 of the blade holder 24 such that, for instance, an impact between the blade holder 24 and a flying hockey puck would not eject any component (e.g., the detent 336A) from the blade holder 24. For instance, in some embodiments, the width $W_D$ of the detent 336A may be between 0.25 inch and 1 inch, in some embodiments about 0.5 inch, while in some embodiments the length $L_D$ of the detent 336A may be between 0.25 inch and 2 inches, in some embodiments between 0.75 inch and 1.5 inch, and in some embodiments about 1 inch. Thus, the hand-engaging actuator 336A may have a hand-engaging actuating surface 337A that is greater, therefore allowing the user to actuate the hand-engaging actuator 336A using a smaller pressure, thereby facilitating the use of the hand-engaging actuator. For example, in this embodiment, the hand-engaging surface 337A occupies at least a majority of the width of a cross-section of the blade holder 24 normal to the longitudinal direction of the blade holder 24 where the hand-engaging surface 337A is located. For instance, the hand-engaging surface 337A may occupy at least 60%, in some cases at least 70%, and in some cases at least 80% of the width of the cross-section of the blade holder 24 normal to the longitudinal direction of the blade holder 24 where the hand-engaging surface 337 is located. For instance, in some embodiments, the hand-engaging actuating surface 337A may be of at least 0.0625 $in^2$, in some embodiments of at least 0.125 $in^2$, in some embodiments of at least 0.5 $in^2$, in some embodiments of at least 1 $in^2$, in some embodiments of at least 2 $in^2$, in some embodiments even more.

Figure 128:
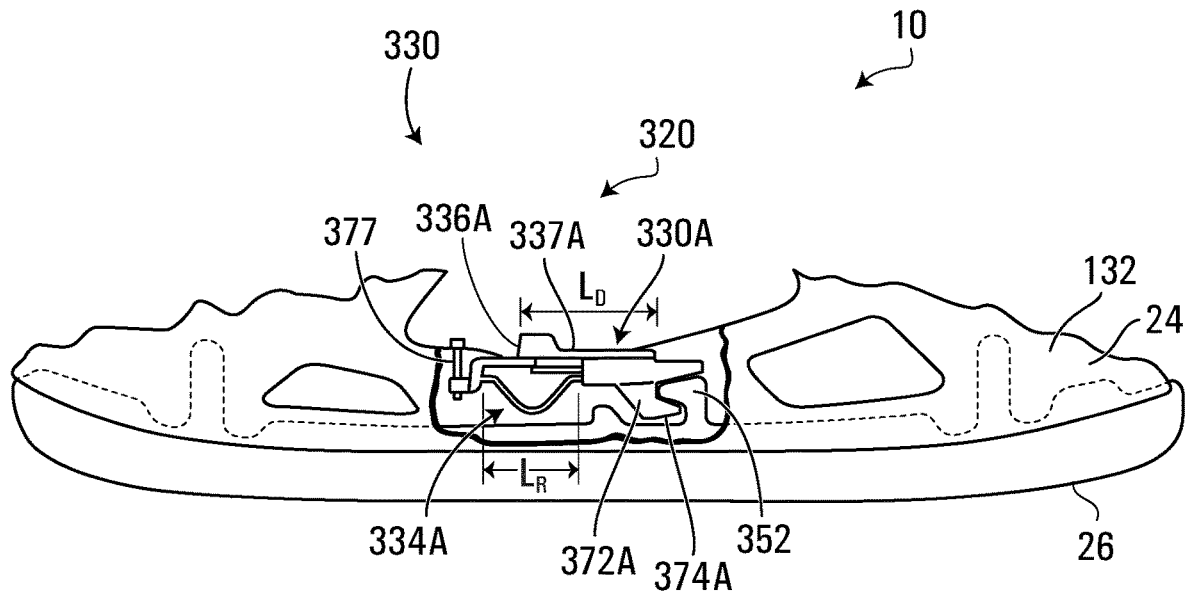

In other embodiments, as shown in FIGS. 122 to 128, the base 333A of the connector 330A of the quick-connect system 320 of the blade holder 24, is not an insert. In the example of FIG. 108, in the example of FIGS. 123 to 127 and in the example of FIG. 114, the hand-engaging actuator 336A and the resilient portion 334A are two portions of the base 333A. The working principle of the connector 330A of this example is otherwise similar to the working principle of the connector 330A described earlier. In some embodiments, as shown in FIG. 128, the connector 330A may be affixed at one end to the body 132 of the blade holder 24 by a screw 377.

Figure 129:
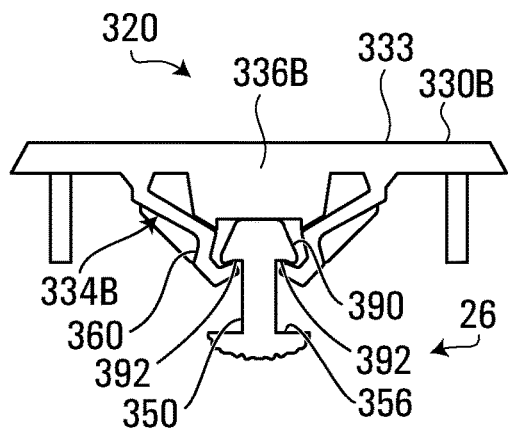
Figure 130:
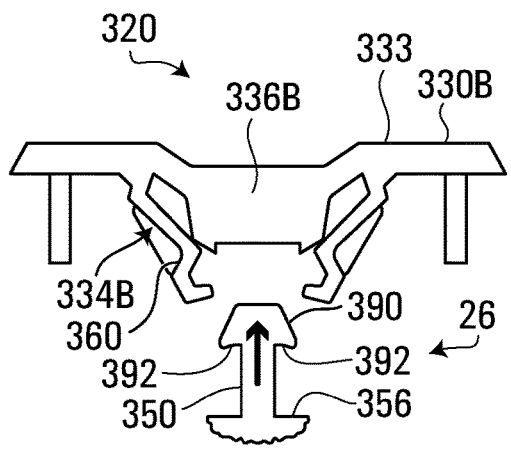
Figure 131:
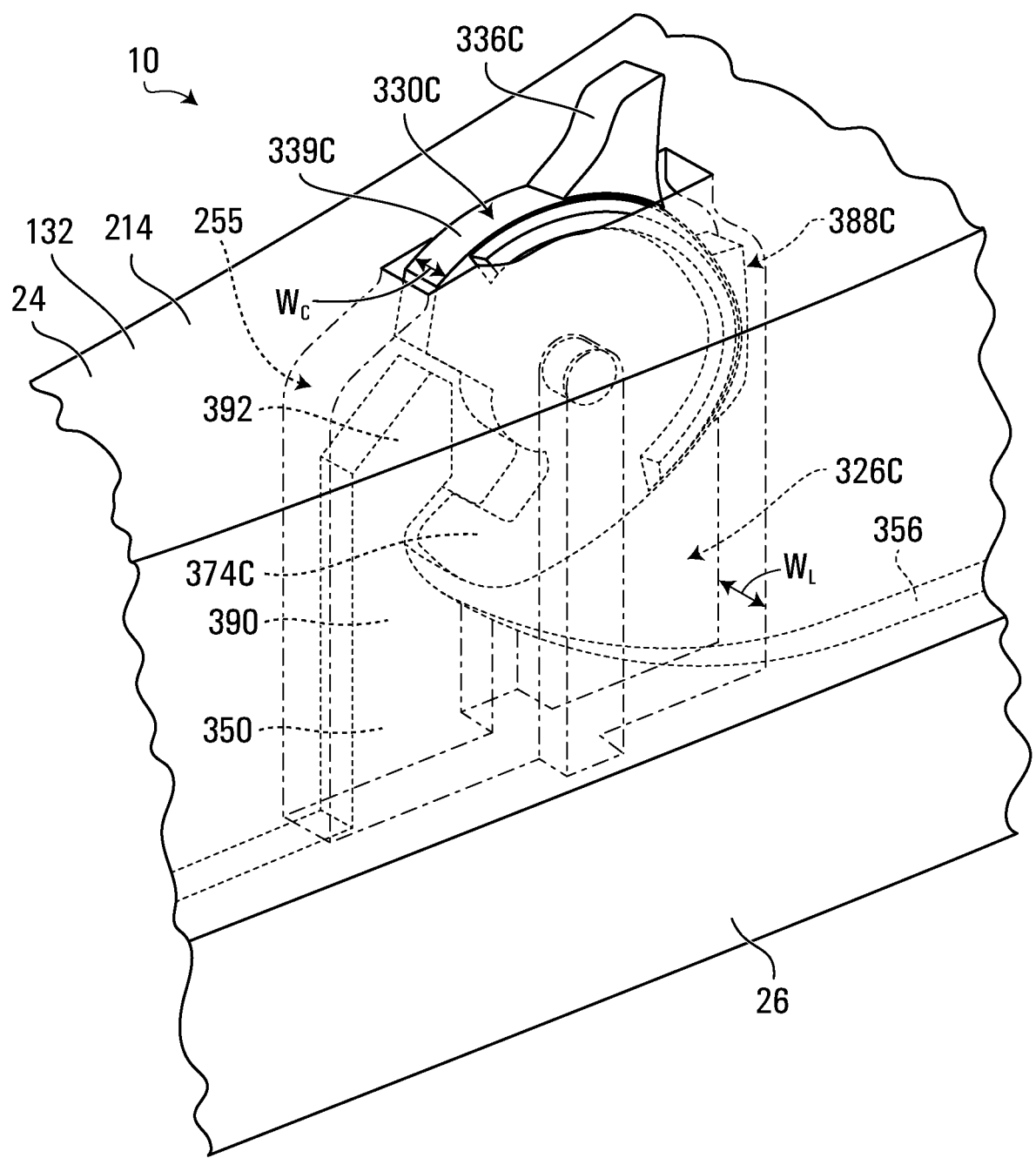
Figure 132:
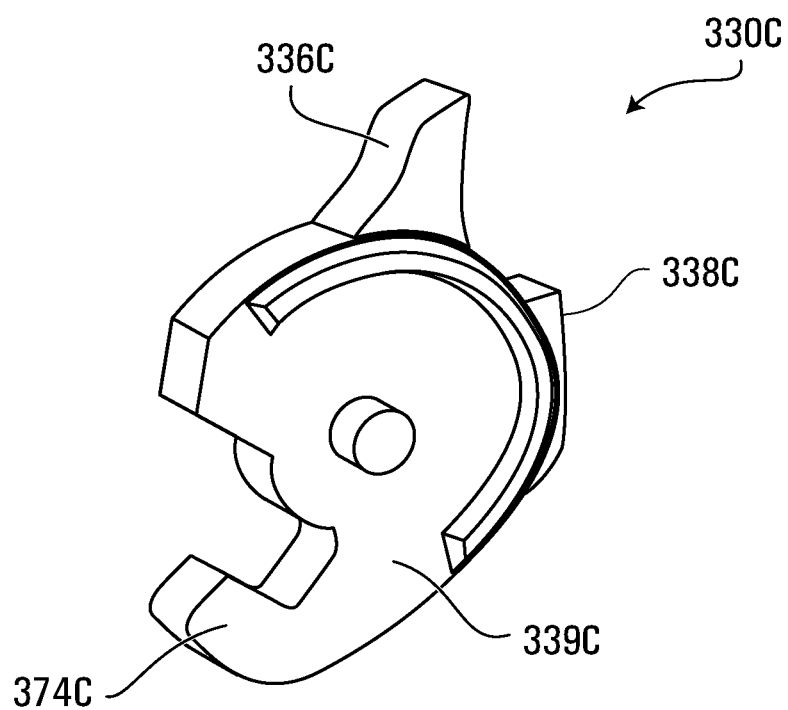
Figure 133:
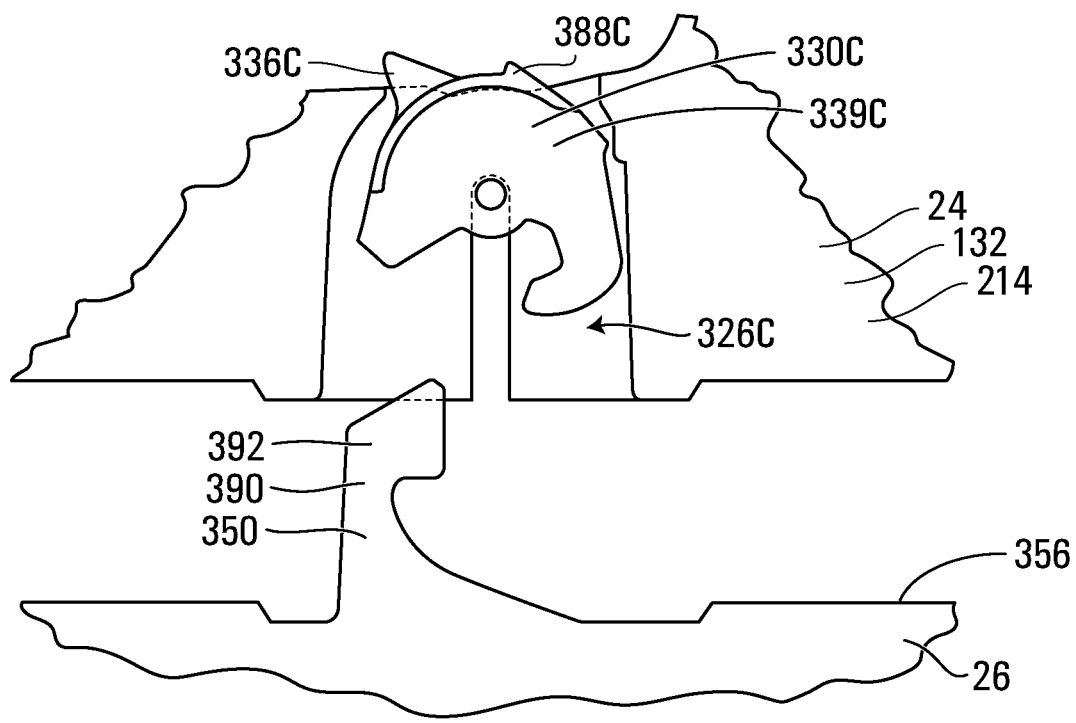
Figure 134:
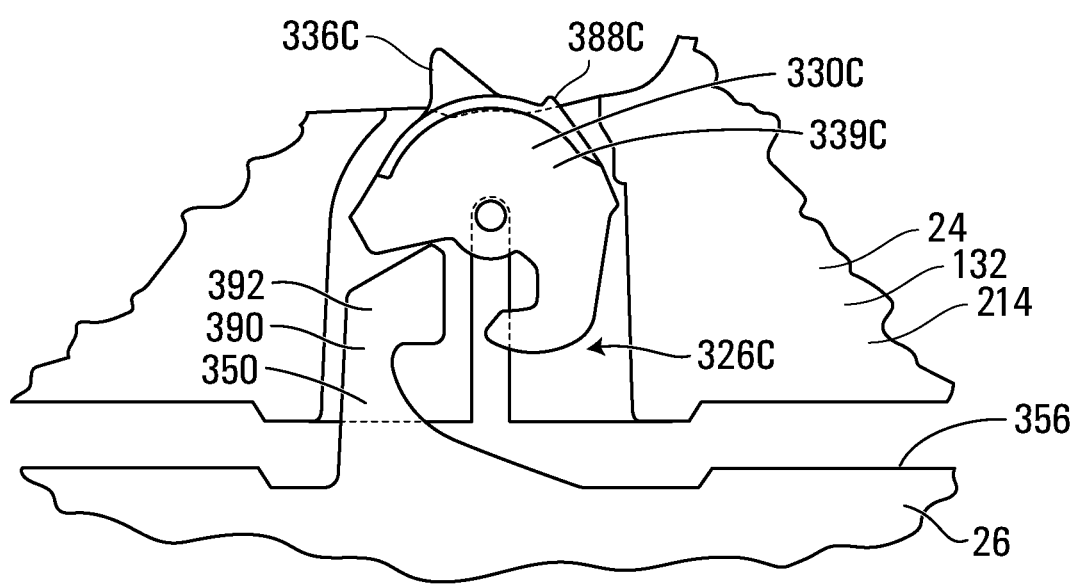
Figure 135:
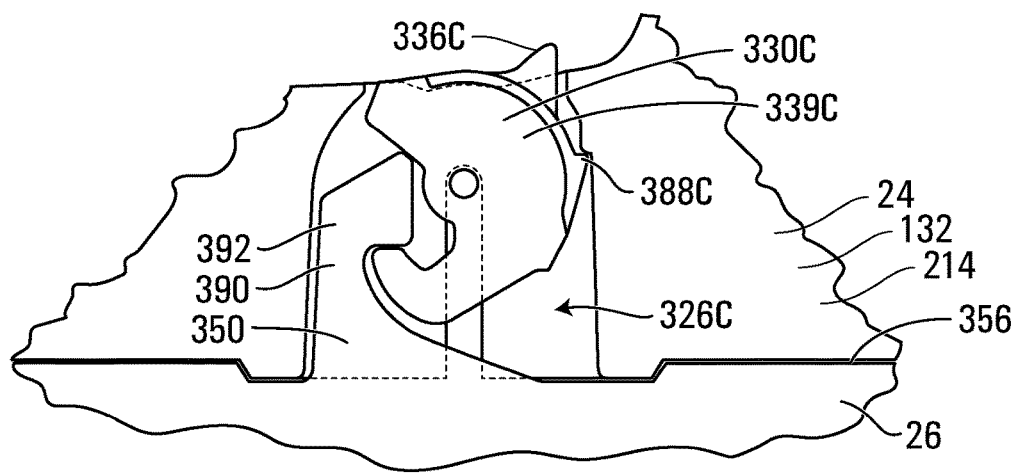

As another example, in some embodiments, as shown in FIGS. 129 and 130, the connector 330B of the blade holder may be resiliently deformable and the actuator 336B of the connector 330B is a resiliently deformable portion of the connector 330B. When a sufficient load is applied on the actuator 336B, the connector 330B deforms such as to allow attachment and/or detachment of the blade 26 to and from the blade holder 24.

As another example, in some embodiments, as shown in FIGS. 131 to 138, the connector 330 of the quick-connect system 320, which is designated 330C in this variant, comprises a rotatable portion 339C configured to rotate to allow the connector 330C to move relative to the body 132 of the blade holder 24 to attach the blade 26 to and detach the blade 26 from the blade holder 24. The rotatable portion 339C of the connector 330 is configured to rotate by a partial-turn (i.e., less than a full 360°-rotation) to allow the connector 330 to move relative to the body 132 of the blade holder 24 to attach the blade 26 to and detach the blade 26 from the blade holder 24.

For instance, in this embodiment, the hand-engaging actuator 336 of the connector 330C of the quick-connect system 320, which is designated 336C in this variant, is configured to be manually operated by manually rotating relative to the body 132 of the blade holder 24 in the longitudinal direction of the skate 10. More particularly, the actuator 336C of the connector 330C of the blade holder 24 is a projection facilitating the rotation of the connector 330C by the user. The actuator 336C may enable the user to rotate the connector 330C from a first locked position, where the connector 330C prevents the connector 350 of the blade 26 from engaging or disengaging the connector 336C, to a second unlocked position, where the connector 330C allows connector 350 of the blade 26 to engage or disengage the connector 330C

In this embodiment, the connector 330C may comprise a hook 374C for engaging the connector 350 of the blade 26. More specifically, the hook 374C projects in a radial direction of the connector 330C over a pre-determined dimension to cooperate with the connector 350 of the blade 26 in order to attach the blade 26 to the blade holder 24 or to detach the blade 26 from the blade holder 24.

The connector 330C may comprise a projection 388C configured to cooperate with the body 132 of the blade holder 24 to retain the rotatable portion 339C of the connector 330C into the first locked position during play. The projection 388C may have a dimension such as a height that is suitable (i.e., sufficiently great) to interfere with the body 132 of the blade holder 24 and to avoid accidental rotation of the connector 330C from the first locked position to the second unlocked position. For instance, the projection 388C may retain the connector 330C into the first locked position during play. In some embodiments, the load required to actuate the actuator 336C may be between 50 N and 300 N, in some embodiments between 100 N and 200 N, in some embodiments about 150 N. In some embodiments, the connector 330C may also be spring loaded, i.e., the connector 330C may comprise a spring to force the connector 330C to recover the first locked position when no force is applied on the actuator 336C.

Figure 138:
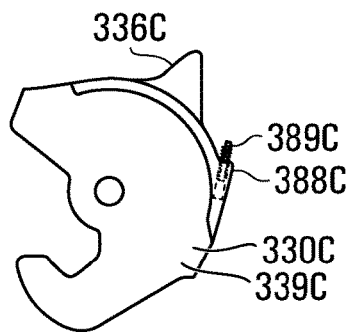

As shown in FIG. 138, in some embodiments, the projection 388C may be adjustable, i.e., the user may adjust the projection 388C to adjust the load required to actuate the actuator 339C and thereby rotate the connector 330C from the first locked position to the second unlocked position. More particularly, in this example, the projection 388C comprises a screw 389C.

Figure 136:
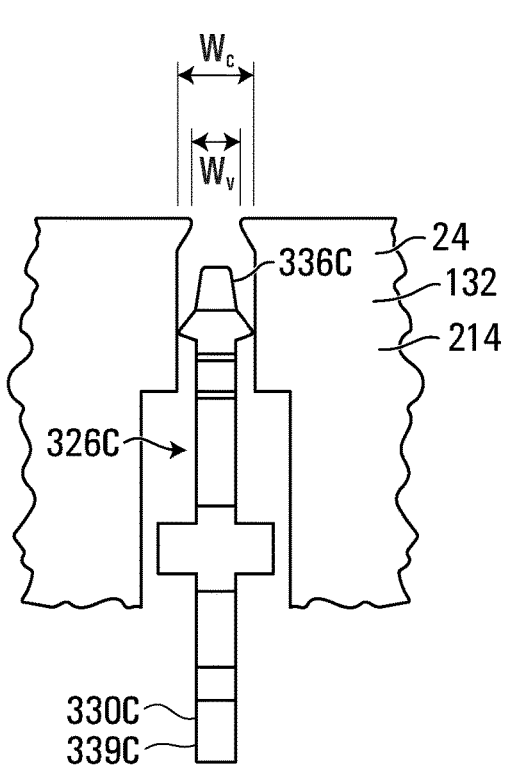
Figure 137:
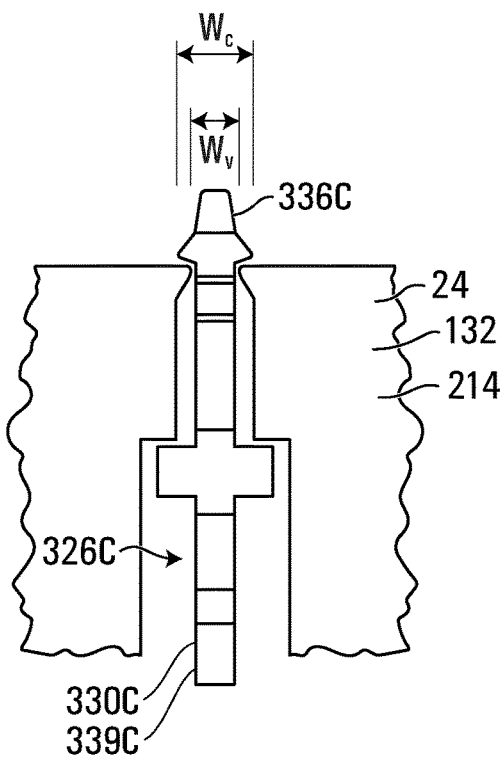
Figure 139:
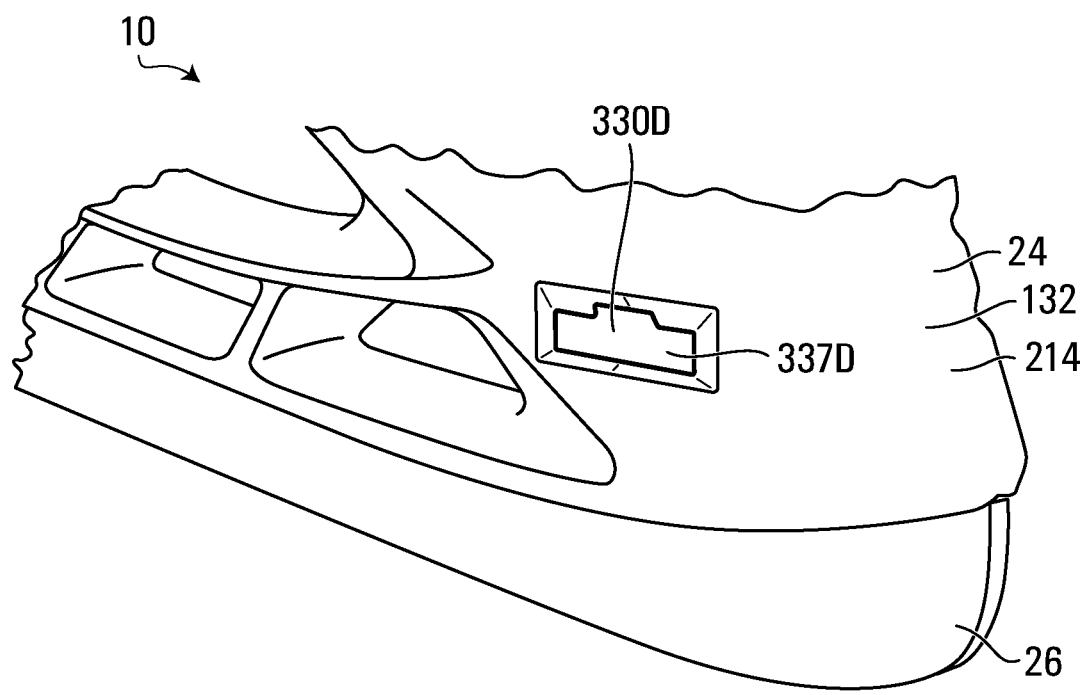
Figure 140:
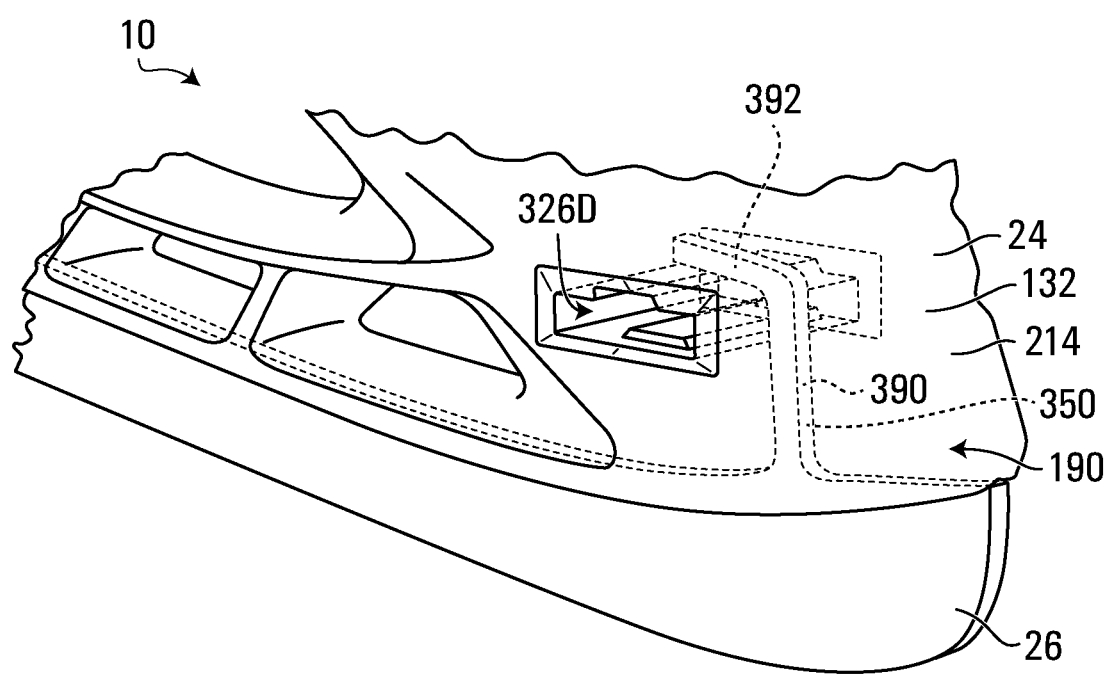
Figure 141:
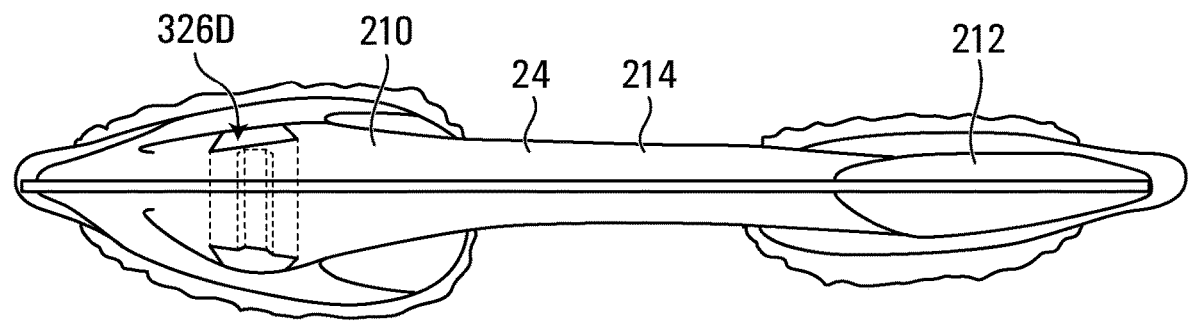
Figure 142:
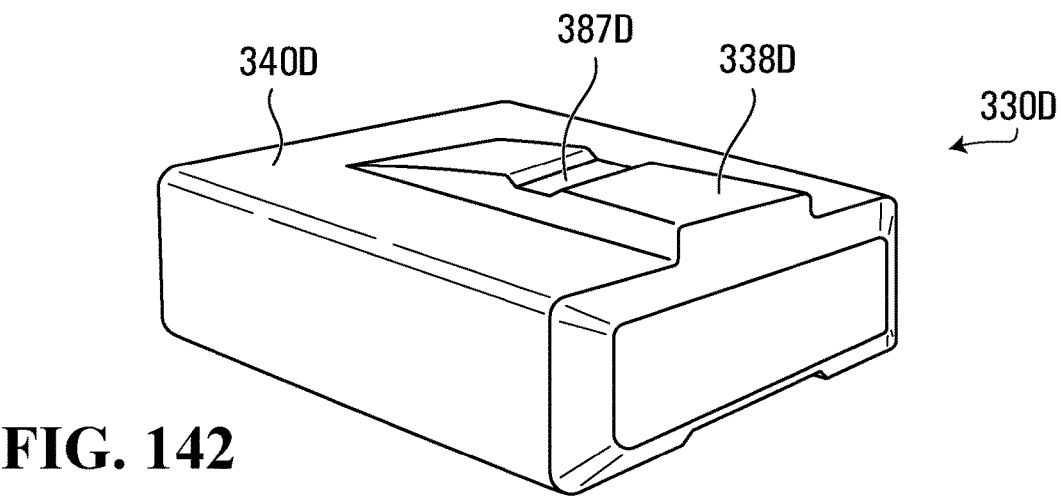
Figure 143:
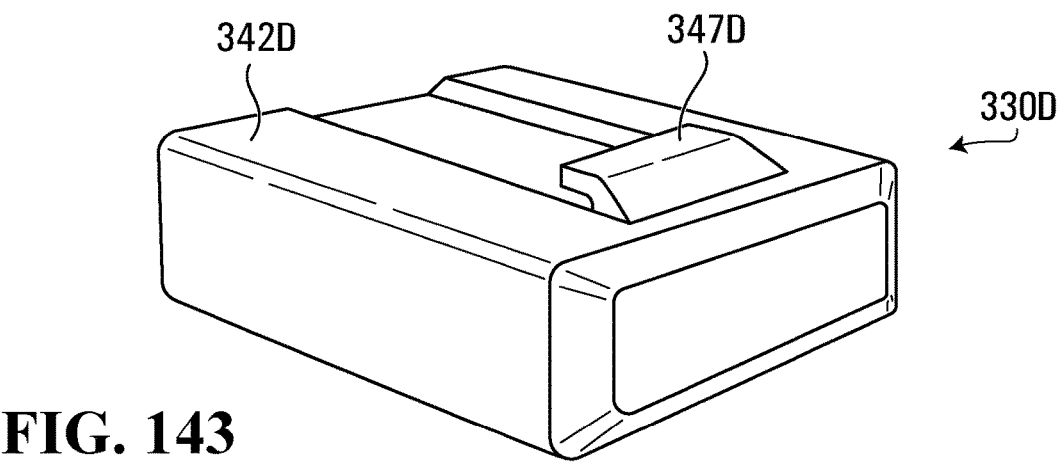
Figure 144:
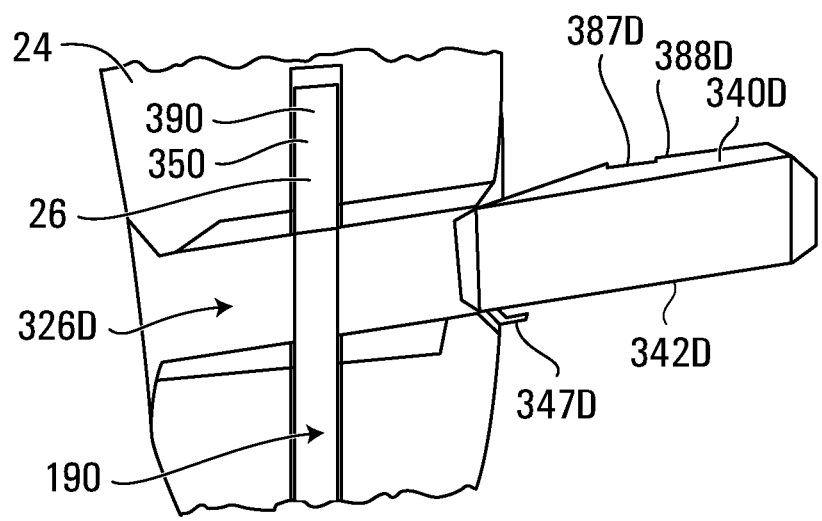
Figure 145:
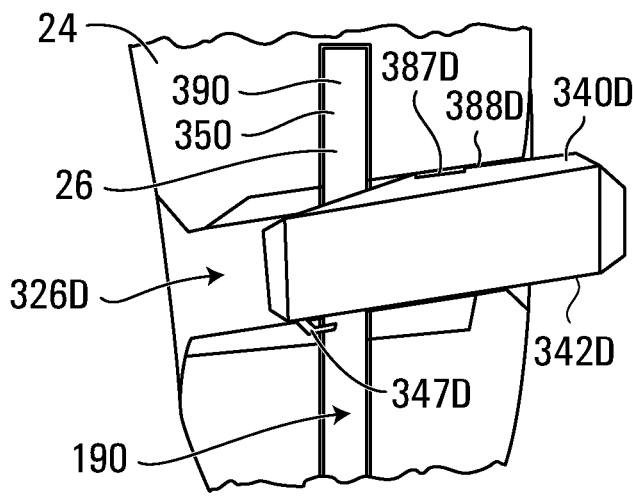
Figure 146:
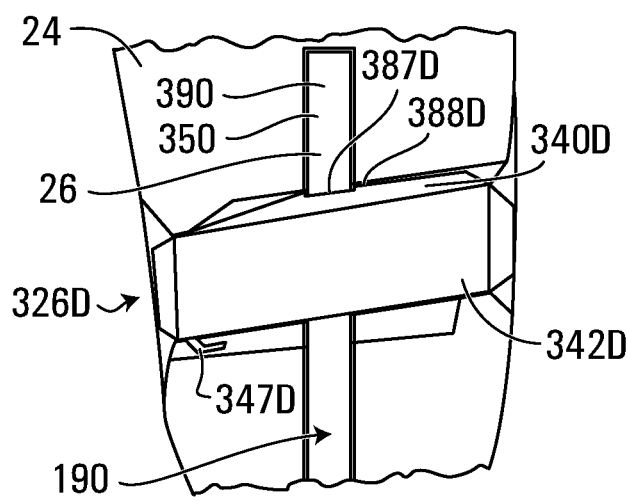
Figure 147:
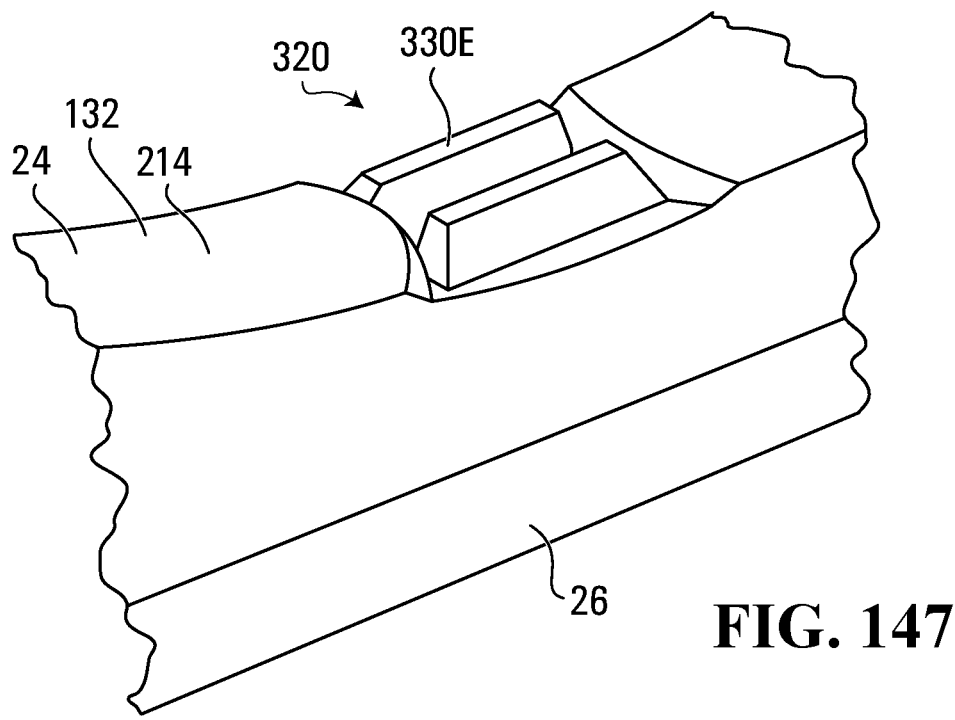
Figure 148:
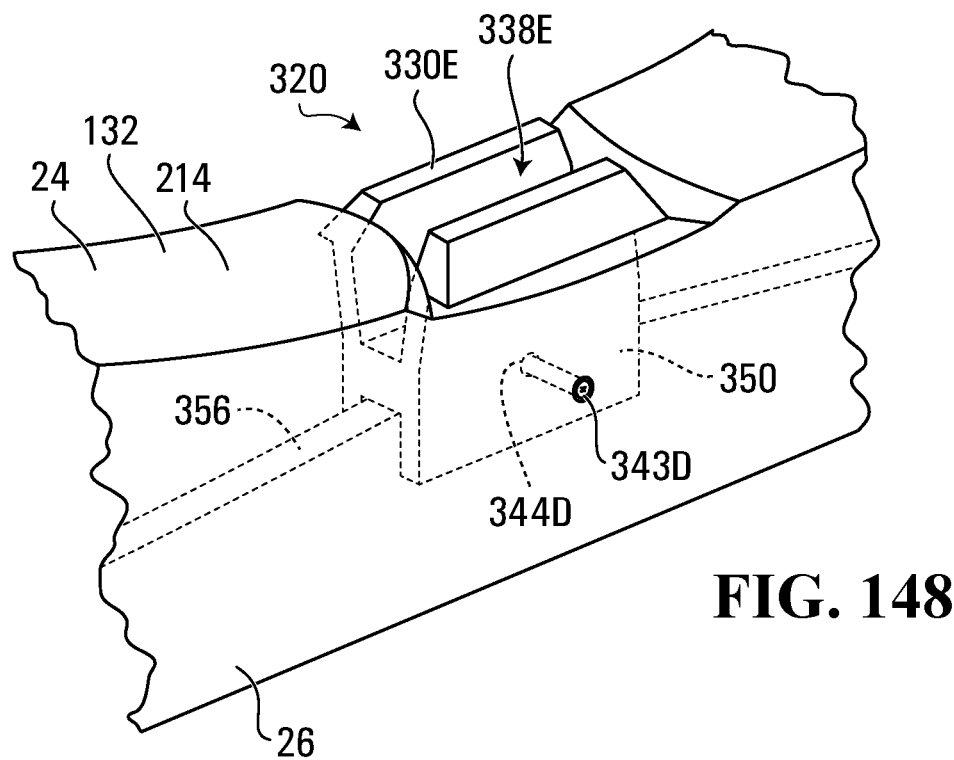
Figure 153:
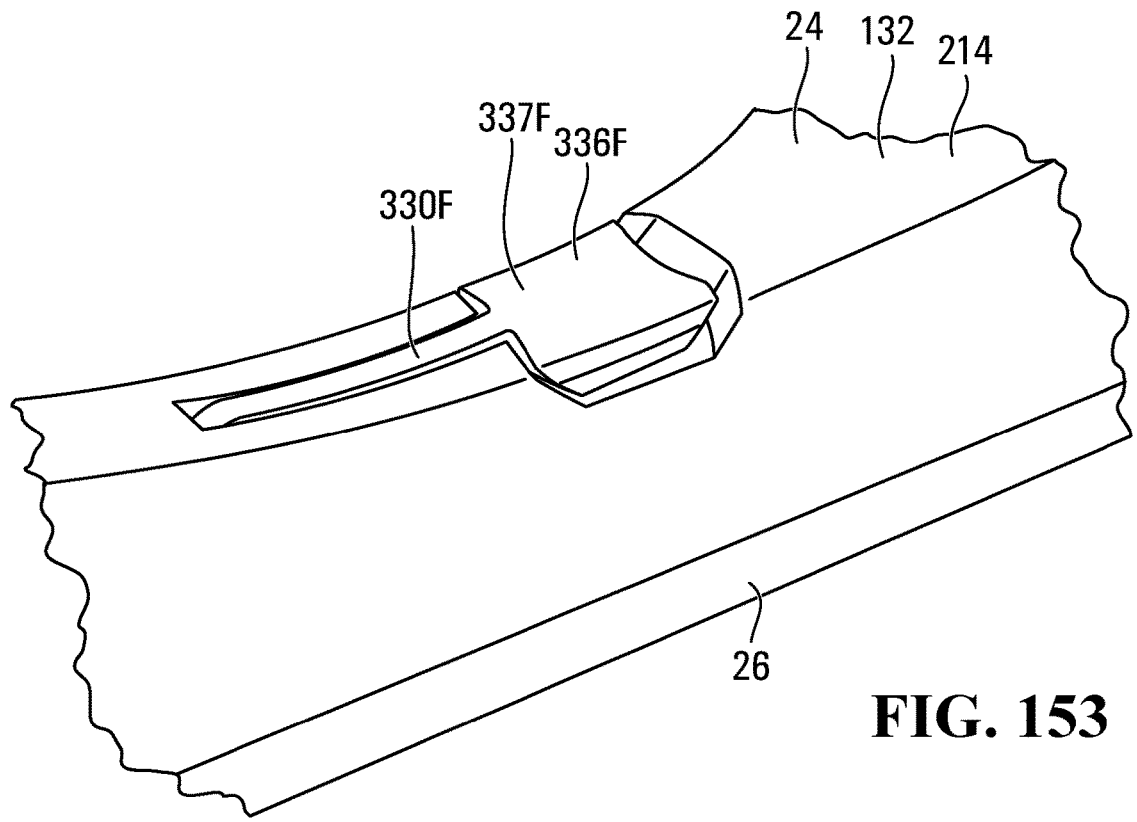
Figure 154:
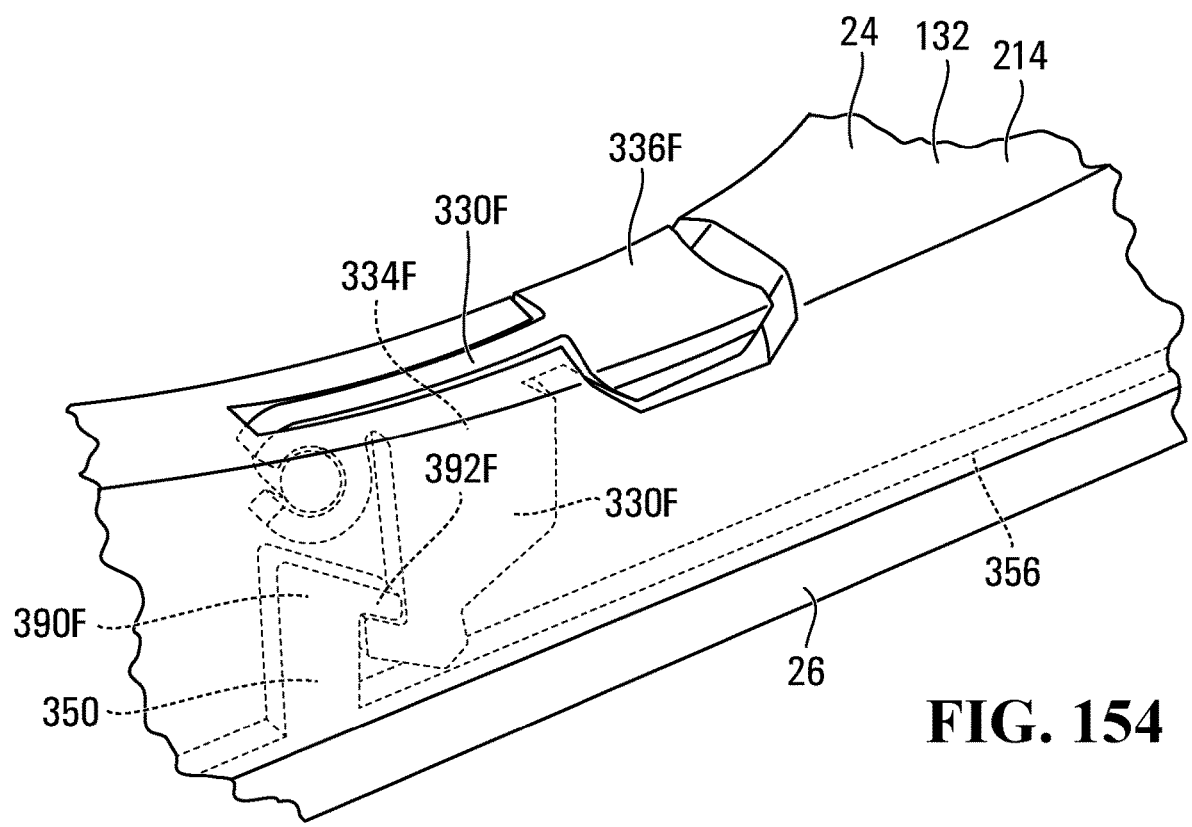
Figure 155:
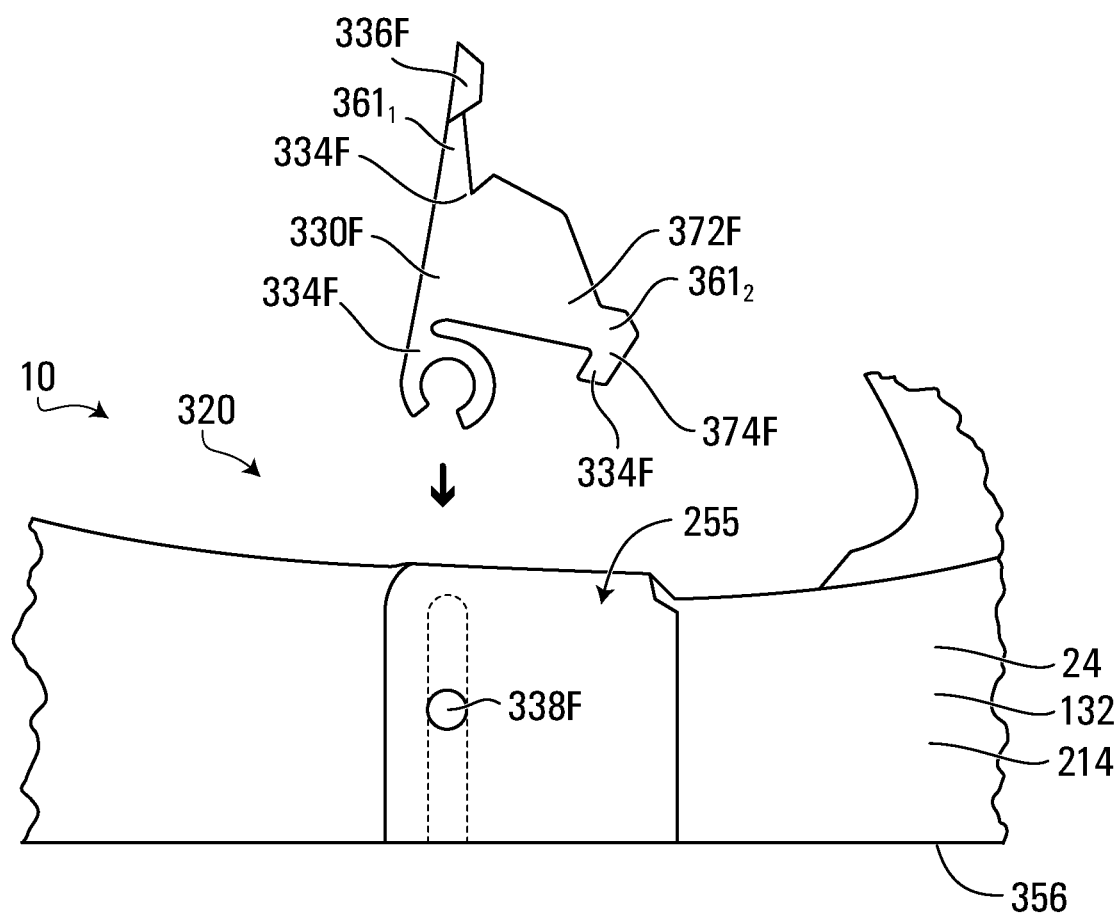
Figure 156:
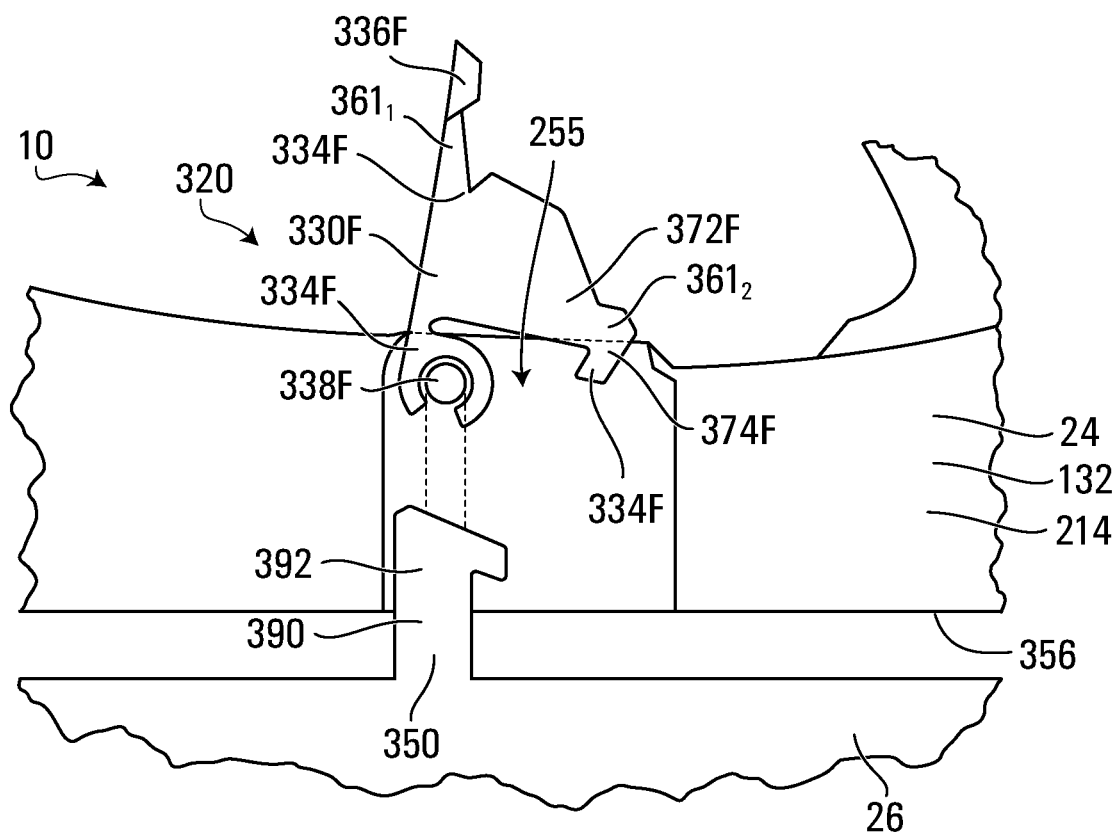
Figure 157:
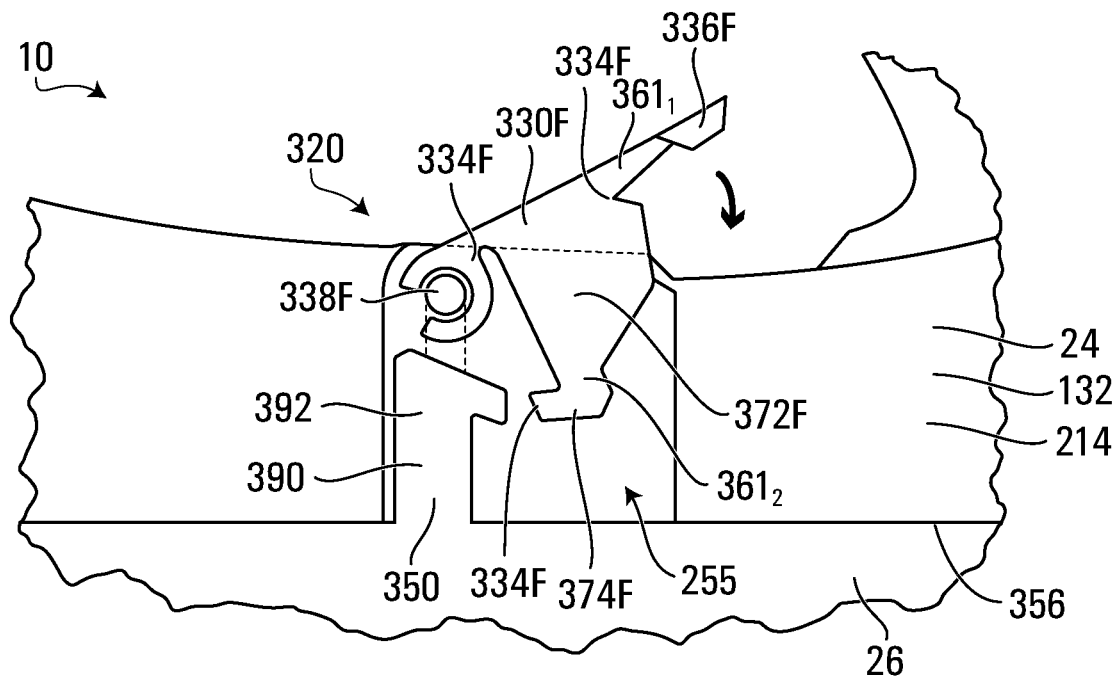
Figure 158:
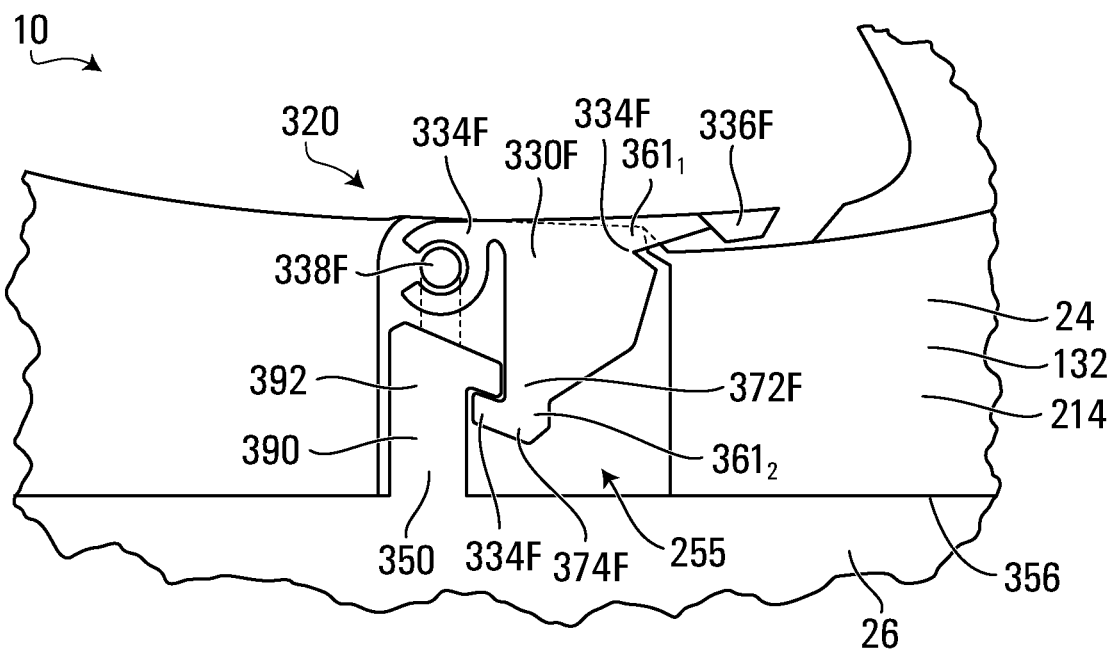
Figure 159:
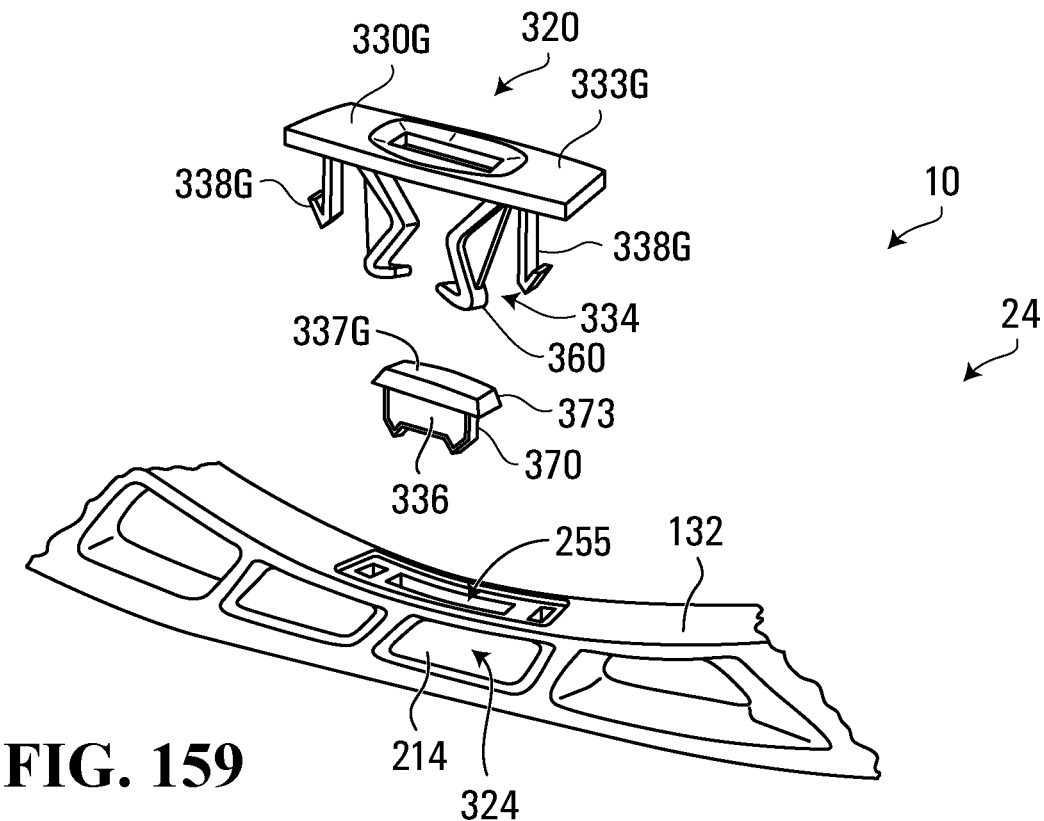
Figure 160:
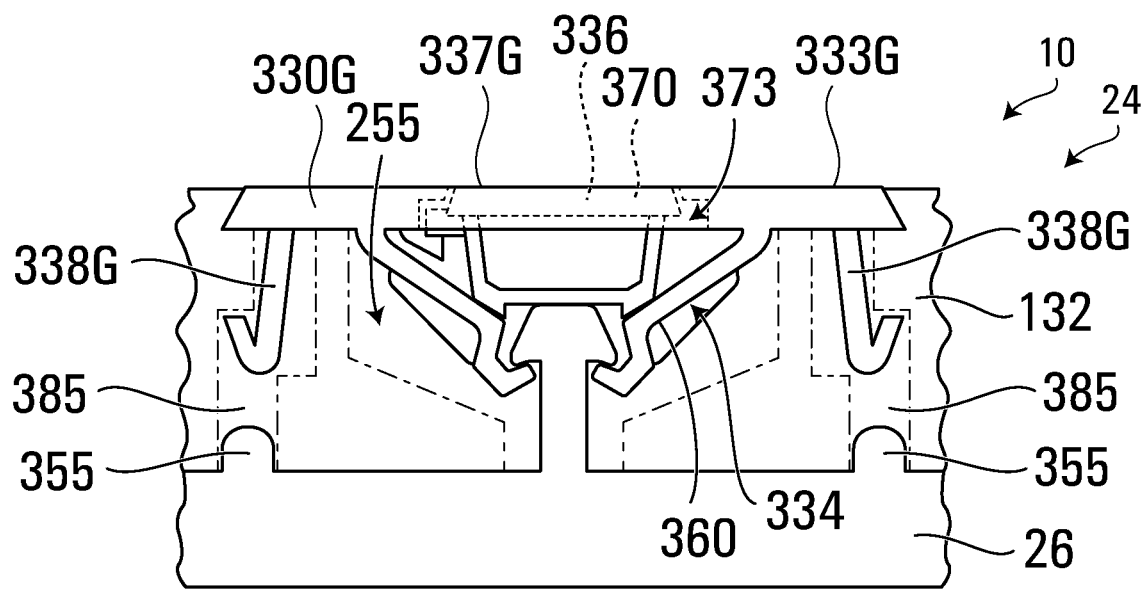
Figure 161:
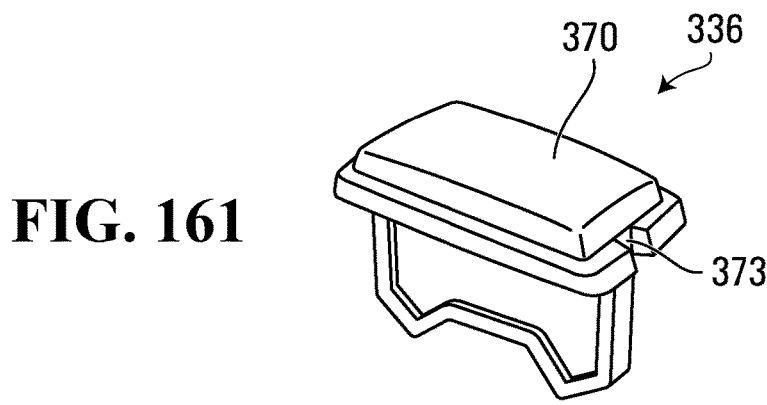
Figure 162:
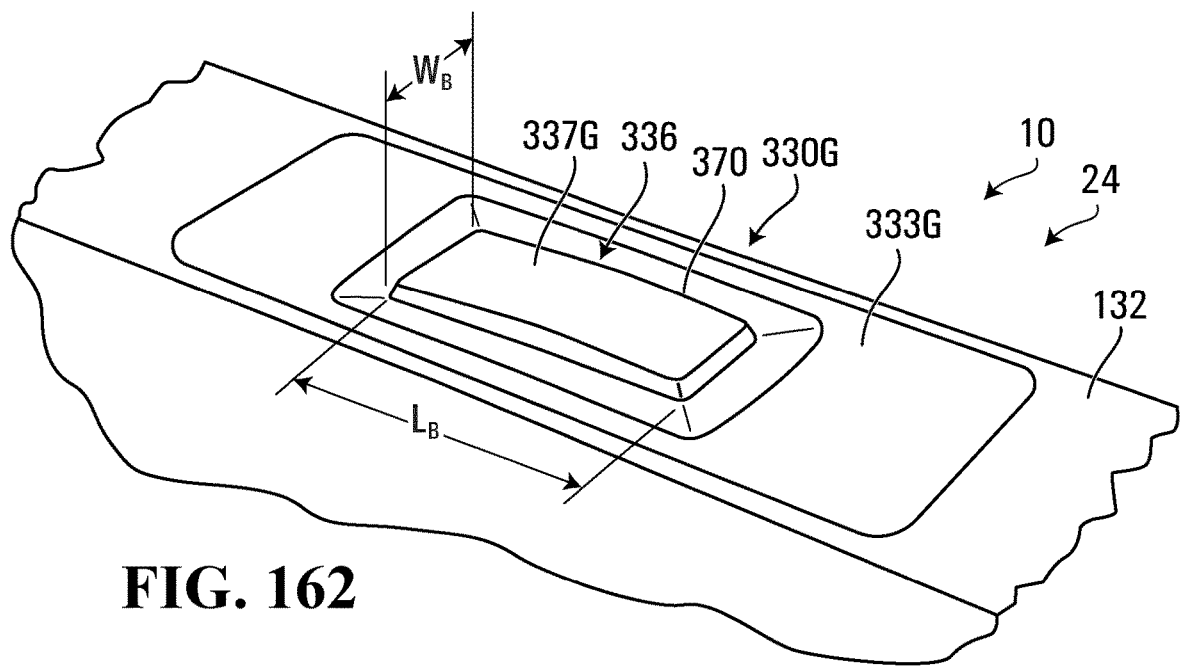
Figure 163:
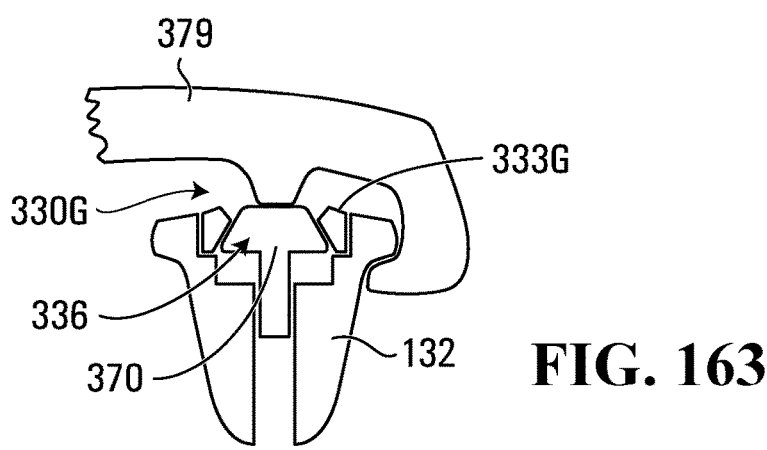

As shown in FIGS. 136 and 137, the connector 330C may by inserted in a void 326C of the body 132 of the blade holder 24. The connector 330C may have a width $W_c$ varying along its radius, the void 326C may have a width $W_v$, and the width $W_c$ of a portion of the connector 330C may be greater that the width $W_v$ of the void 326C, such as to retain the connector 330C into the void 326C. The connector 330C may also comprise beveled edges to facilitate insertion of the connector 330C into the void 326C.

In some embodiments, the connector 330 may be removable, i.e., the connector 330 may be removed from and replaced onto the blade holder 24. For instance, this may allow the user to replace a connector 330 that is broken or does not work properly by another connector 330. This may also allow the user to customize the connector 330, for example by choosing a connector 330 of a pre-determined color, by choosing a connector holding more or less into place (i.e., offering more or less resistance to attach the blade 26 to and detach the blade 26 from the blade holder 24), etc.

For instance, in some embodiments, as shown in FIGS. 139 to 146, the connector 330 of the quick-connect system 320 of the blade holder 24, which is designated 330D in this variant, may be movable relative to the body 132 of the blade holder 24 by sliding relative to the body 132 of the blade holder 24 to attach the blade 26 to and detach the blade 26 from the blade holder 24. For instance, in this embodiment, the connector 330D is slidable in the widthwise direction of the blade holder 24 to engage or disengage the connector 350 of the blade 26. Optionally, the connector 330D is removable, i.e., can be entirely taken out from and replaced in the quick-connect system 320.

In this embodiment, the longitudinal recess 190 of the blade holder configured to receive the blade 26 extends relatively high in the body 132 of the blade holder and the connector 350 of the blade 26 is configured to extend in the longitudinal recess 190 when the blade 26 is being attached to the blade holder 24. The body 132 of the blade holder 24 comprises a void 326D extending in the widthwise direction of the blade holder 24 and through the longitudinal recess 190 of the blade holder 24. The void 326D is configured to receive the connector 330D.

When the blade 26 occupies the longitudinal recess 190 of the blade holder and the connector 330D of the quick-connect system 320 of the blade holder 24 is in the void 326D, the connector 330D retains the blade 26, i.e., the blade 26 is attached to the blade holder. When the connector 330D is disengaged from the void 326D by being slid away, the blade 26 may be detached from the blade holder 24.

More particularly, in this embodiment, the connector 330D comprises a projection 388D projecting from an upper surface 340D of the connector 330D to affix the blade 26 to the blade holder. The projection 388D comprises a groove 387D to lock the connector 330D relative to the blade holder 24 in the widthwise direction of the blade holder 24 as the blade 26 is attached to the blade holder 24.

In this embodiment, the connector comprises a projection 347D projecting from a lower surface 342D of the connector 330D to prevent the connector 330D to accidentally completely exit the void 326D of the blade holder 24, i.e., to prevent the connector 330D to be accidentally removed from the quick-connect system 320. More particularly, in this example, the projection 347D is a hook.

As another example, in some embodiments, as shown in FIGS. 147 to 152, the connector 330 of the quick-connect system 320 of the blade holder 24, which is designated 330E in this variant, may be movable relative to the body 132 of the blade holder 24 in a heightwise direction of the blade holder 24. For instance, the connector 330E may first be affixed to the connector 350 of the blade 26 by any suitable means. For instance, the connector 330E may be affixed to the connector 350 of the blade 26 by fastening via a screw, a screw and a bolt, by being adhesively affixed to the connector 350 of the blade 26, by being overmolded on the connector 350 of the blade 26, etc. In this example, the connector 330e is affixed to the connector 350 of the blade 26 by a screw and bolt 343E, 344E. The blade holder 24 may comprise a void 338E having a pre-determined width $W_v$, that is slightly inferior to a width $W_c$ of the connector 330E and the connector 330E may comprise a resiliently deformable material, such that when the connector 330E of the blade holder 24 is inserted in the void 338E, the connector 330E resiliently deforms such has to have a width $W_c$ equal to the width $W_v$ of the void 338E and where the connector 338E of the blade holder 24 is fully engaged into the void 338E, the connector 338E snaps back into its original form and regains the original width $W_c$, which holds the connector 330E and the blade 26 into place.

To detach the blade 26 from the blade holder 24, the user can pinch (i.e., deform) the connector 330E to reduce its width $W_c$ such that the width $W_c$ is no greater than the width $W_v$ of the void 326E and the user can withdraw the connector 330 and the blade 26 from the void 326E.

As another example, in some embodiments, as shown in FIGS. 153 to 158, the connector 330 of the quick-connect system 320 of the blade holder 24, which is designated 330F in this variant, is rotatable relative to the body 132 of the blade holder 24 about a pivot 338F. The actuator 336F may be configured to ease the manipulation and the rotation of the connector 330F. More specifically, in this embodiment, the actuator 336F is a handle that can be lifted from the bridge 214 of the blade holder 24 to rotate the connector 330F and release the blade 26, or pressed onto the bridge 214 of the blade holder 24 to attach the blade 26.

In this embodiment, the connector 330F of the quick-connect system 320 comprises a catch 372F to engage and hold immovable the blade 26 relative to the connector 330. For instance, in this example, the catch 372F comprises a hook 374F projecting from a lower surface 376F of the hand-engaging actuator 336F and configured to engage the connector 350 of the blade 26.

In this embodiment, the connector 330F comprises a clip 346F. In particular, the connector 330F comprises two clipping areas $362_1$, $362_2$ that interfere with the body 132 of the blade holder 24 and with the connector 350 of the blade 26 to hold the blade 26 and the connector 330F in place when in first locked position. To this end, the connector 330F may comprise a first resilient portion 334F about the hook 374F to facilitate clipping the hook 374F with the connection 350 of the blade 26; a second resilient portion 334F near the actuator 334F to hold the connector 330F in place relative to the body 132 of the blade holder 132 when in first locked position; and a third resilient portion 334F near the pivot 338F to facilitate the clipping operation.

The connector 330F is removable, i.e., can be forced out of the pivot 338F and onto the pivot 338F.

As another example, in some embodiments, as shown in FIGS. 159 to 163, the connector 330 of the quick-connect system 320 of the blade holder 24, which is designated 330G in this variant, comprises a base 333G having two hooks 338G instead of the posts 338 snapping in the apertures 385 to affix the base 333 to the frame 324. In this embodiment, the blade 26 also comprises projections 355 configured to extend into the apertures 385 to additionally secure the blade 26 to the blade holder 24. The button 370 may comprise a groove 373 interfacing with a ridge of the base 333G to stabilize the button 370 relative to the base 333G and guide the button 373 during actuation of the hand-engaging actuator 336. Alternatively, the button 370 may comprise a ridge interfacing with a groove of the base 333G.

In this embodiment, although the quick-connect system 320 is toollessly operable to attach and detach the blade 26 to and from the blade holder 24, a tool 379 may be used to facilitate the operation of the quick-connect system 320. For instance, the tool 379 may act as a lever to facilitate actuation of the hand-engaging actuator 336.

In this embodiment, the button 370 may have a width $W_B$ and a length $L_B$ allowing the quick-connect system 320 to be sufficiently tightly attached to the body 132 of the blade holder 24 such that, for instance, an impact between the blade holder 24 and a flying hockey puck would not eject any component (e.g., the button 370) from the blade holder 24. For instance, in some embodiments, the width $W_B$ of the button 370 may be between 0.25 inch and 1 inch, in some embodiments about 0.5 inch, while in some embodiments the length $L_B$ of the button 370 may be between 0.25 inch and 2 inches, in some embodiments between 0.75 inch and 1.5 inch, and in some embodiments about 1 inch. Thus, the hand-engaging actuator 336 may have a hand-engaging actuating surface 337G that is greater, therefore allowing the user to actuate the hand-engaging actuator 336 using a smaller pressure, thereby facilitating the use of the hand-engaging actuator. For instance, in some embodiments, the hand-engaging actuating surface 337G may be of at least 0.0625 $in^2$, in some embodiments of at least 0.125 $in^2$, in some embodiments of at least 0.5 $in^2$, in some embodiments of at least 1 $in^2$, in some embodiments of at least 2 $in^2$, in some embodiments even more.

Figure 164:
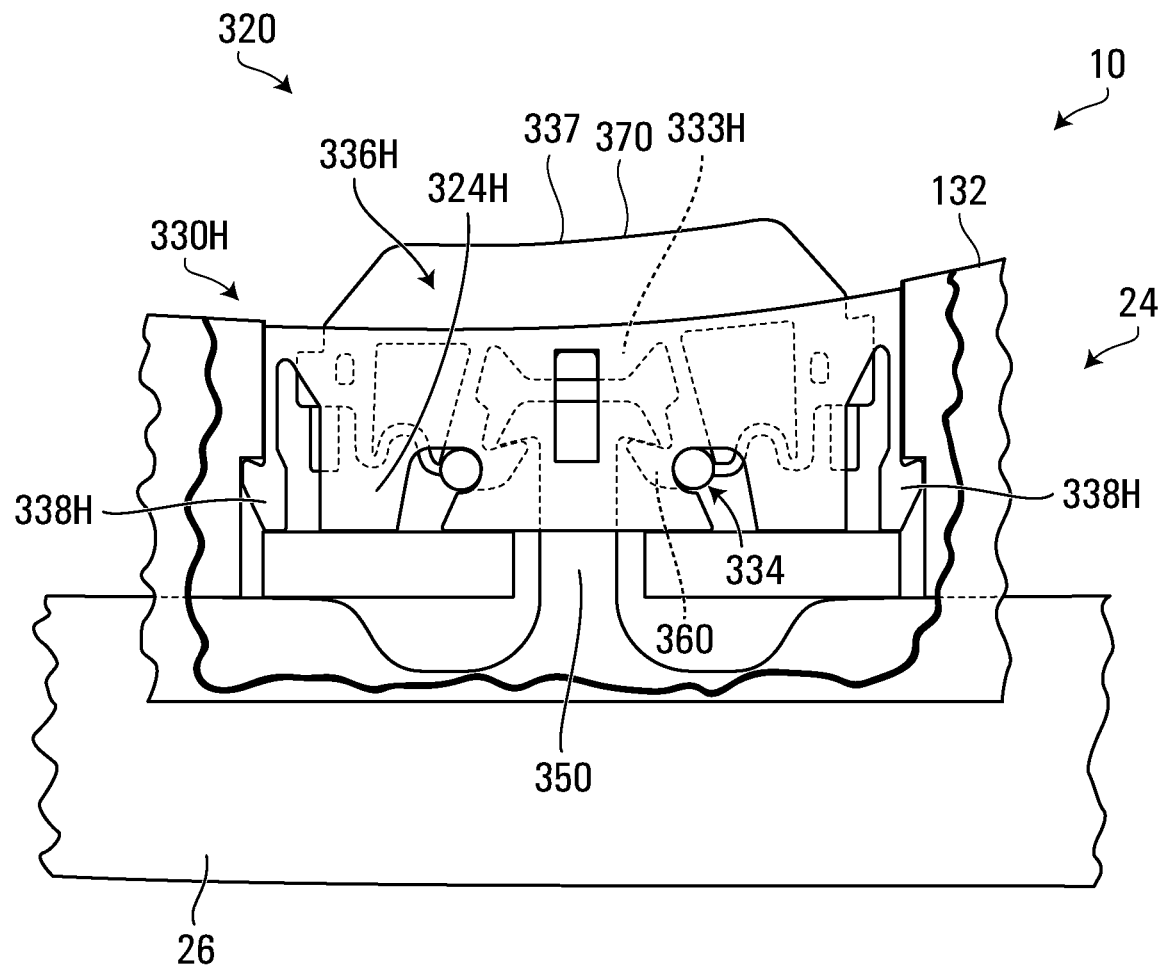
Figure 165:
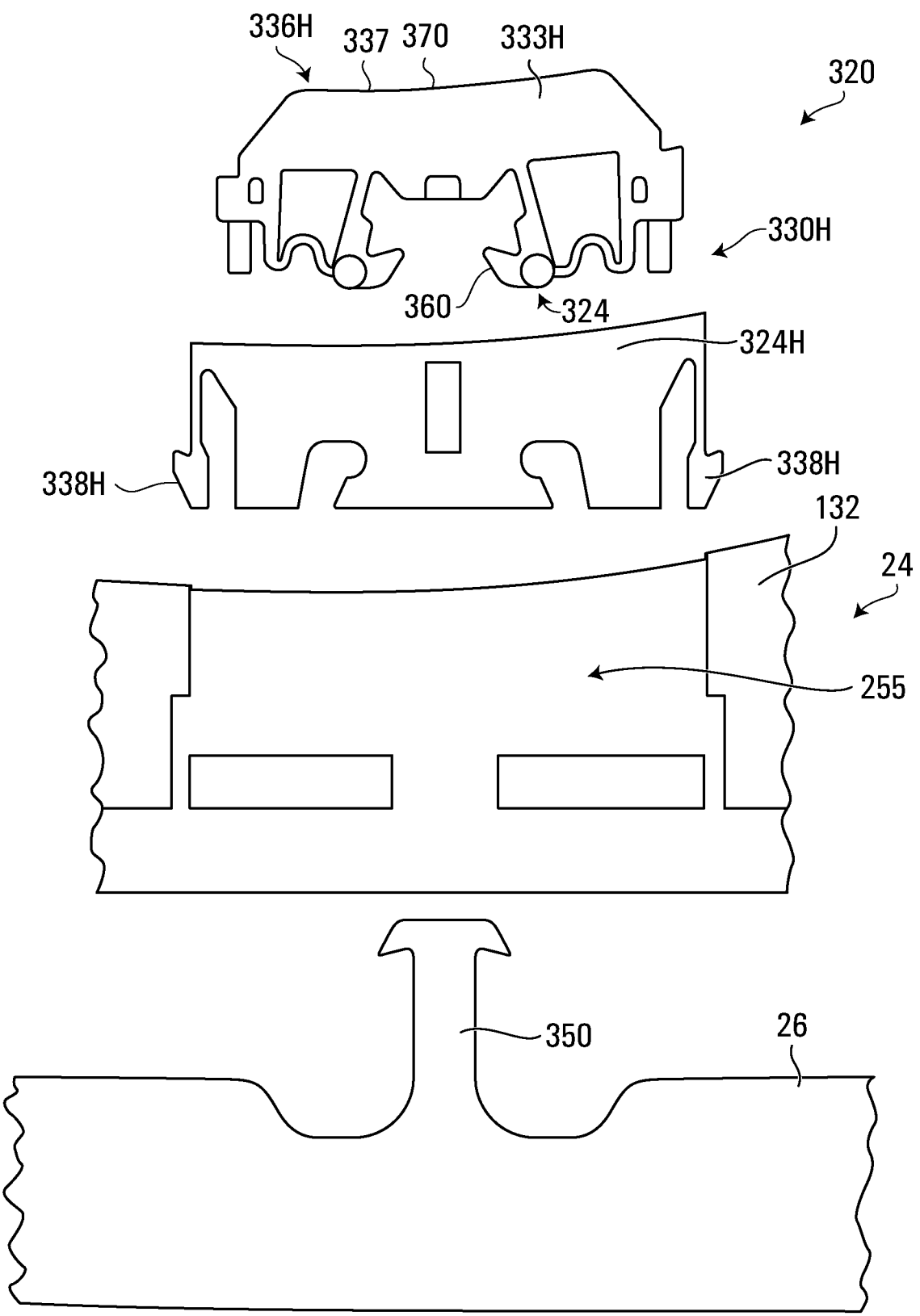

As another example, in some embodiments, as shown in FIGS. 164 and 165, the connector 330 of the quick-connect system 320 of the blade holder 24, which is designated 330H in this variant, comprises a frame 324H having two hooks 338H to removably attach the frame 324H to the body 132 of the blade holder via apertures in the body 132 of the blade holder 24. In this embodiment, a base 333H is connected to the frame 324H by mechanical interlock, e.g., by being clipped to the frame 324H. The base 324H is integrally formed with an actuator 336H of the connector 330H and is resiliently deformable. When a sufficient load is applied on the actuator 336H, the connector 330H deforms such as to allow attachment and/or detachment of the blade 26 to and from the blade holder 24.

Figure 166:
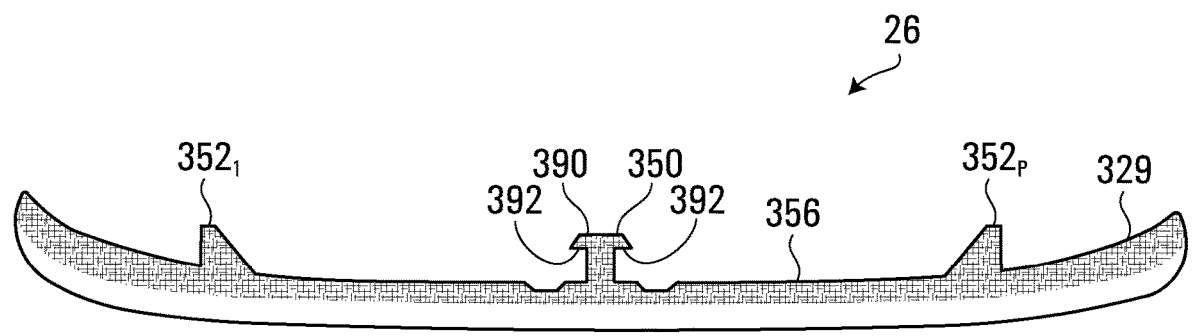

With additional reference to FIG. 166, in some embodiments, the upper portion of the blade 26 may comprise a silkscreen 329 that may serve as a visual indicator of the adjustment and alignment of the blade 26 relative to the blade holder 24 to ease attachment of the blade 26 to the blade holder 24.

In some embodiments, a lower portion of the blade 26 may also comprise the silkscreen 329, for example as a visual indicator of the use and condition of the blade 26. For instance, when the blade 26 is used for play, it needs to be sharpened and sharpening of the blade 26 reduces height of the blade 26 and the ice-contacting surface 222 of the blade 26 gets closer to the upper portion of the blade 26. In this example, the silkscreen 329 may comprise a mark indicating that the blade 26 needs to be changed for a new blade when the ice-contacting surface 222 meets the mark.

In some embodiments, the silkscreen 329 may be three-dimensional. As such, the silkscreen 329 may help reducing lateral movements of the blade 26 relative to the blade holder 24 and reduce loss of energy caused by these movements. For instance, the silkscreen 329 may comprise a material of the blade 26. In other cases, the silkscreen 329 may comprise a material that is softer and/or less rigid than the material of the blade 26, for instance aluminium or polymeric material. In some cases, the polymeric material may comprise an adhesive material.

Figure 167:
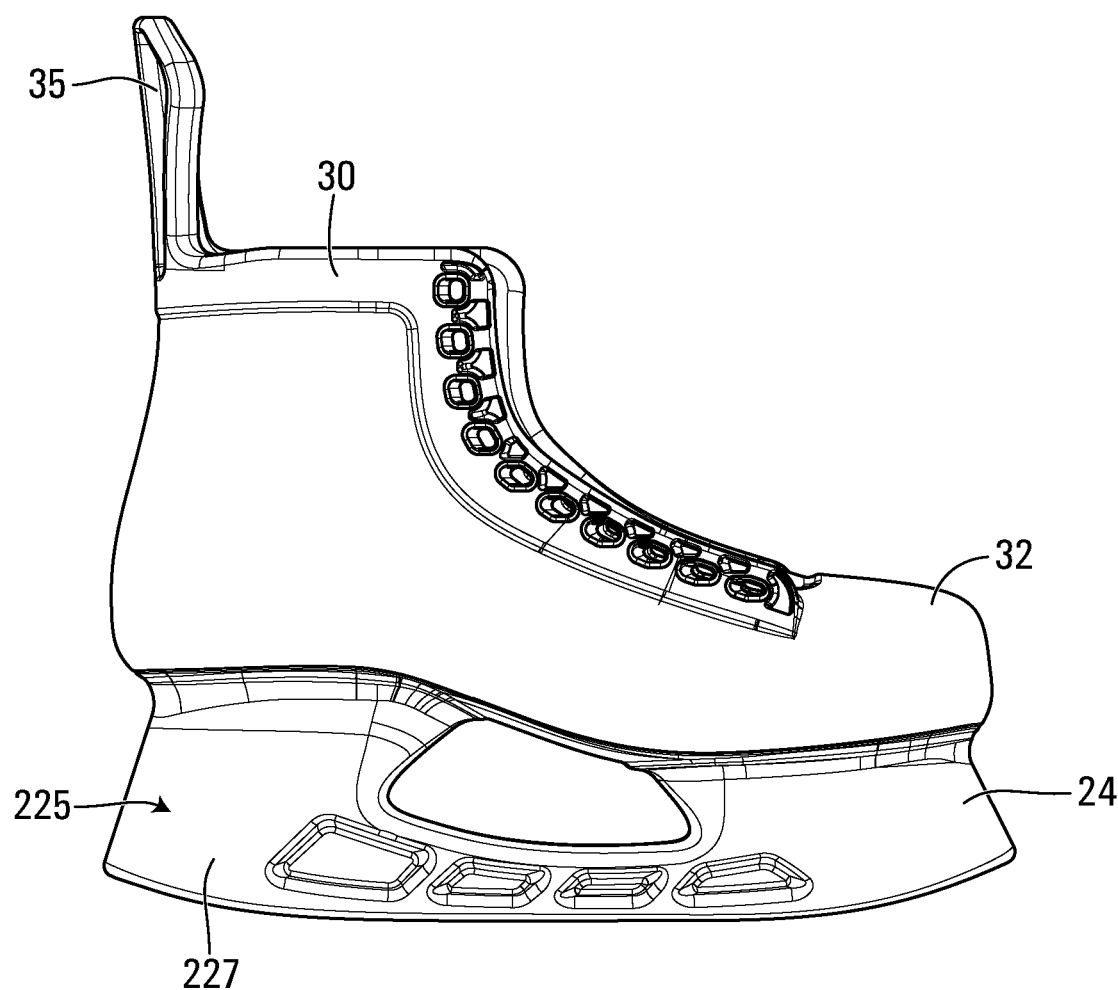
FIG. 167 is a side view of the shell in an embodiment in which a limited part of the blade holder is molded integrally with the shell.
Figure 168:
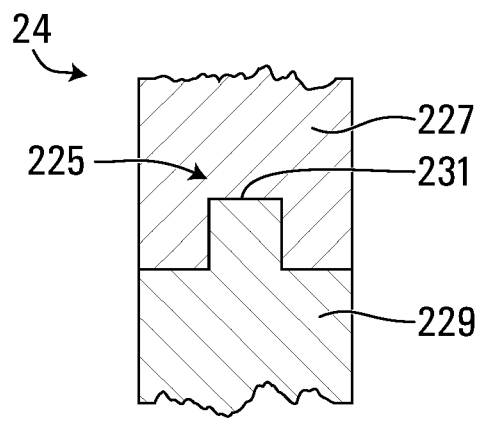
FIGS. 168 and 169 are cross-sectional views of examples of securing the limited part of the blade holder which is molded integrally with the shell with another part of the blade holder.
Figure 169:
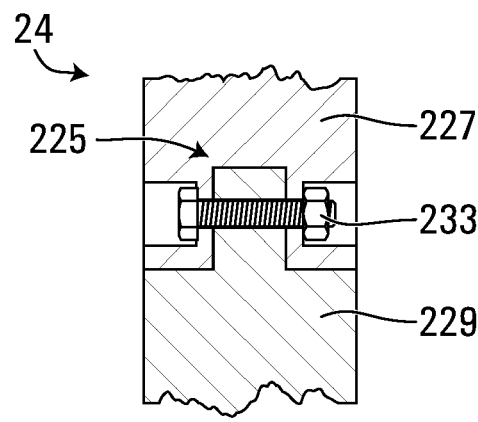

As another example, in some embodiments, as shown in FIGS. 167 to 169, only a limited part 225 of the blade holder 24 may be integrally formed with the shell 30. For instance, in some embodiments, the part 225 of the blade holder 24 may comprise a projection 227 projecting from an underside of the shell 30 to which another part 229 of the blade holder 24 may be secured. As shown in FIGS. 168 and 169, the projection 227 of the part 225 of the blade holder 24 may be secured to the other part 229 of the blade holder 24 via an adhesive 231 that is applied between the two parts 225, 229 or in some cases via mechanical fasteners such as a nut and bolt assembly 233 that traverses the parts 225, 229 to secure them together. The parts 225, 229 of the blade holder 24 may be secured to one another in any other suitable way in other embodiments. In other embodiments, a substantial part of the blade holder 24 may be molded integrally with the shell 30. For example, in some cases, at least a majority of the blade holder 24 may be molded together with the shell 30. In some case, substantially an entirety of the blade holder 24 may be molded integrally with the shell 30.

Figure 170:
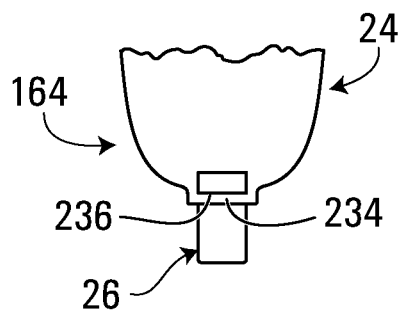
FIGS. 170 to 174 show different examples of embodiments in which the blade is affixed to a blade holder of the skating device of the skate.

For instance, in some embodiments, the blade holder 24 may retain the blade 26 in any other suitable way. For example, in some embodiments, the blade 26 may be permanently affixed to the blade holder 24 (i.e., not intended to be detached and removed from the blade holder 24). For example, as shown in FIG. 170, the blade 26 and the blade-retaining base 164 of the blade holder 24 may be mechanically interlocked via an interlocking portion 234 of one of the blade-retaining base 164 and the blade 26 that extends into an interlocking void 236 of the other one of the blade-retaining base 164 and the blade 26. For instance, in some cases, the blade 26 can be positioned in a mold used for molding the blade holder 24 such that, during molding, the interlocking portion 234 of the blade-retaining base 164 flows into the interlocking void 236 of the blade 26 (i.e., the blade holder 24 is overmolded onto the blade 26). For example, in some embodiments, the blade 26 may be attached to the blade holder 24 during the molding process by including the blade 26 in a given mold $154_i$ such that the blade holder 24 overmolds the blade 26 during the molding process. For instance, the mold $154_i$ may be designed specifically to hold the blade 26 during the molding process prior to the forming of the intermediate subshell $85_2$.

Figure 171:
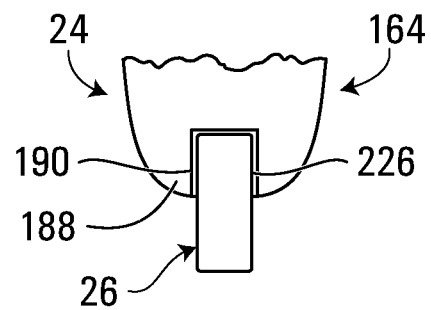
Figure 172:
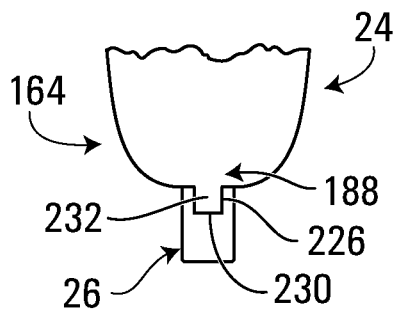
Figure 173:
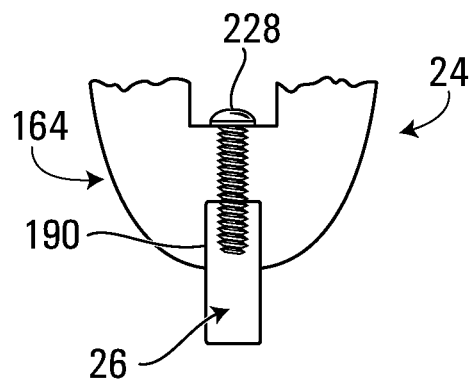
Figure 174:
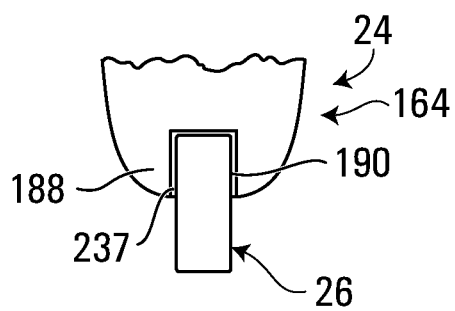

In some embodiments, as shown in FIGS. 171 and 172, the blade holder 24 may retain the blade 26 using an adhesive 226 and/or one or more fasteners 228. For instance, in some embodiments, as shown in FIG. 171, the recess 190 of the blade holder 24 may receive the upper portion of the blade 26 that is retained by the adhesive 226. The adhesive 226 may be an epoxy-based adhesive, a polyurethane-based adhesive, or any suitable adhesive. In some embodiments, instead of or in addition to using an adhesive, as shown in FIG. 173, the recess 190 of the blade holder 24 may receive the upper part of the blade 26 that is retained by the one or more fasteners 228. Each fastener 228 may be a rivet, a screw, a bolt, or any other suitable mechanical fastener. In some embodiment, the blade holder 24 may retain the blade 26 via a press fit. For example, as shown in FIG. 174, the recess 190 of the blade holder 24 may be configured (e.g., sized) such as to enter into a press fit with the blade 26. More particularly, in this example of implementation, the blade 26 comprises an elastomeric coating 237 including an elastomeric material (e.g., polyurethane, rubber, or any other suitable elastomeric material) that forms at least part of an outer surface of the blade 26. The elastomeric coating 237 has a greater friction coefficient than the ice-contacting material 220 of the blade 26 when interacting with the blade holder 24 such as to improve retention of the blade 26 by the blade holder 24 in a press fit. Alternatively or additionally, in some embodiments, as shown in FIG. 172, the blade-retention portion 188 of the blade holder 24 may extend into a recess 230 of the upper part of the blade 26 to retain the blade 26 using the adhesive 226 and/or the one or more fasteners 228. For instance, in some cases, the blade-retention portion 188 of the blade holder 24 may comprise a projection 232 extending into the recess 230 of the blade 26.

Figure 175:
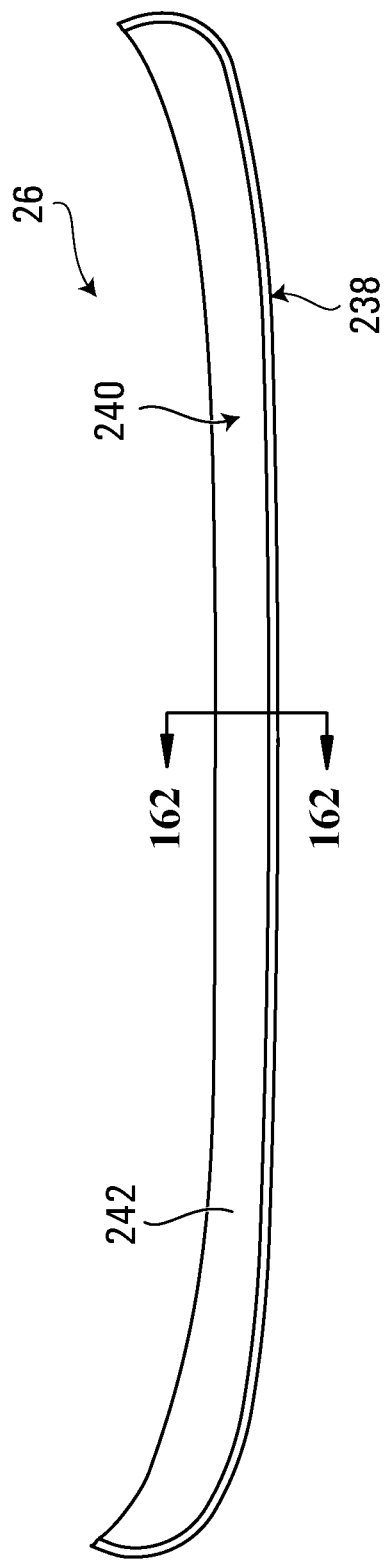
FIG. 175 is a side view of the blade of the skating device.
Figure 176:
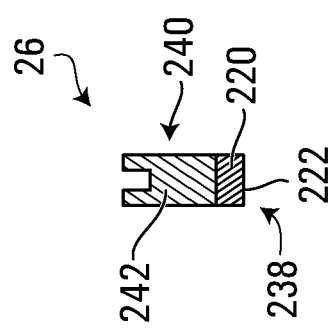
FIG. 176 is a cross-sectional view of the blade taken along line 162-162 of FIG. 161.

The blade 26 may be implemented in any other suitable way in other embodiments. For example, in some embodiments, as shown in FIGS. 175 and 176, the blade 26 may comprise a runner 238 that is made of the ice-contacting material 220 and includes the ice-contacting surface 222 and a body 240 connected to the runner 238 and made of a material 242 different from the ice-contacting material 220. The runner 238 and the body 240 of the blade 26 may be retained together in any suitable way. For example, in some cases, the runner 238 may be adhesively bonded to the body 240 using an adhesive. As another example, in addition to or instead of being adhesively bonded, the runner 238 and the body 240 may be fastened using one or more fasteners (e.g., rivets, screws, bolts, etc.). As yet another example, the runner 238 and the body 240 may be mechanically interlocked by an interlocking portion of one of the runner 238 and the body 240 that extends into an interlocking space (e.g., one or more holes, one or more recesses, and/or one or more other hollow areas) of the other one of the runner 238 and the body 240 (e.g., the body 240 may be overmolded onto the runner 238).

In some embodiments, one or more other components (e.g., the tongue 34, the footbed 38, etc.) of the skate boot 22 may be molded integrally with the shell 30 in the molding apparatus 150 during the molding process. The shell 30 and these one or more other components of the skate boot 22 may thus constitute a monolithic one-piece structure. A given component of the skate boot 22 may therefore comprise a portion 235 that is integrally formed with the shell 30 such that the portion 235 of the given component of the skate boot 22 and the shell 30 of the skate boot 22 are formed together as one-piece in the molding apparatus 150 during the molding process.

As such, the portion 235 of the given component of the skate boot 22 may include one or more of the polymeric materials $M_1$-$M_N$ of the subshells $85_1$-$85_L$ of the shell 30 of the skate boot 22. For instance, the portion 235 of the given component may include one or more of the internal, intermediate and external subshells $85_1$, $85_2$, $85_3$ and therefore may comprise one or more of the polymeric materials $M_1$, $M_2$, $M_3$ associated therewith. Alternatively, the portion 235 of the given component may include one or more different materials.

Figure 177:
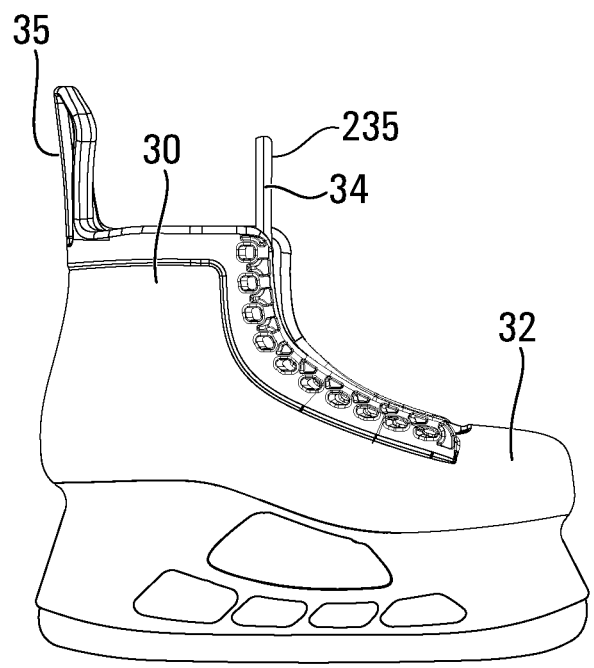
FIG. 177 is a side view of the skate in an embodiment in which a toe cap, a tongue, a tendon guard, a footbed and a pair of lace members of the skate boot are molded integrally with the shell.

For example, in some embodiments, with additional reference to FIG. 177, the toe cap 32, the tongue 34, the tendon guard 35, the footbed 38 and the lace members $44_1$, $44_2$ may be molded integrally with the shell 30 of the skate boot 22. That is, at least a portion of (i.e., a part or an entirety of) each of the toe cap 32, the tongue 34, the tendon guard 35, the footbed 38 and the lace members $44_1$, $44_2$ may be formed integrally with the shell 30 as one-piece in the molding apparatus 150 during the molding process.

Figure 178:
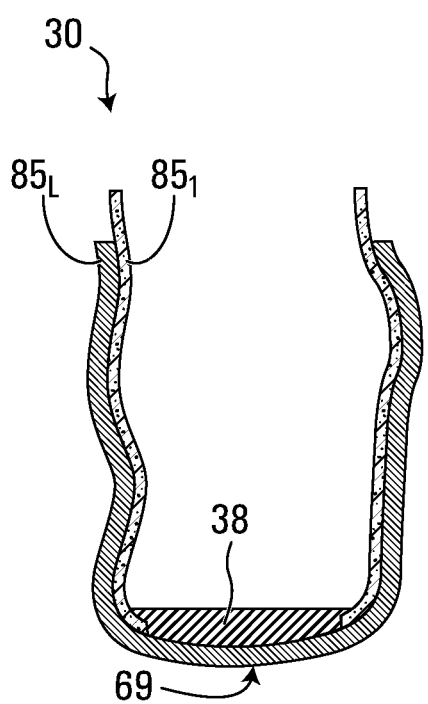
FIGS. 178 and 179 are cross-sectional views of the shell in embodiments in which a footbed of the skate boot is formed integrally with the shell of the skate boot.
Figure 179:
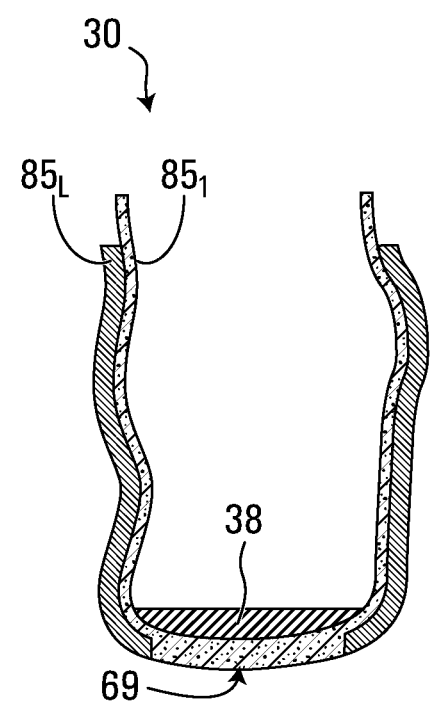

As shown in FIG. 11, in some embodiments, when the footbed 38 is formed integrally with the shell 30 during the molding process, one or more the subshells $85_1$-$85_L$ may form the footbed 38. Moreover, in some embodiments, as shown in FIGS. 178 and 179, when the footbed 38 is formed integrally with the shell 30 during the molding process, a portion of the footbed 38 may project outwardly such as to fill a gap of a subshell $85_i$ in the sole portion 69 of the shell 30.

Figure 180:
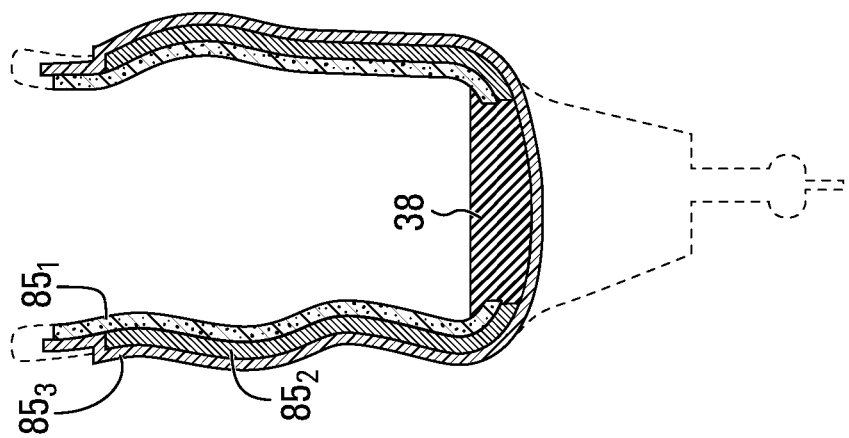
FIG. 180 is a cross-sectional view of the shell in an embodiment in which the footbed of the skate boot is formed integrally with the shell and is in contact with the external subshell of the shell.

In some embodiments, as shown in FIG. 180, when the footbed 38 is formed integrally with the shell 30 during the molding process, the footbed 38 may be configured to project outwardly such as to fill respective gaps of the internal and intermediate subshells $85_1$, $85_2$ in the sole portion 69 of the shell 30.

Figure 181:
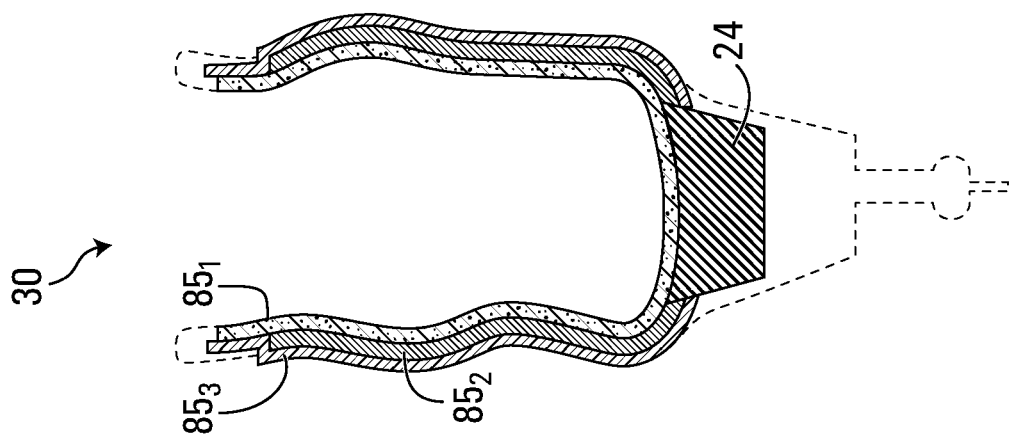

In some embodiments, at least a portion of (i.e., part or an entirety of) the blade holder 24 may be attached to a given one of the subshells $85_1$-$85_L$ of the shell 30. For instance, the portion of the blade holder 24 may be joined to the given one of the subshells $85_1$-$85_L$ during forming of the shell 30. For example, as shown in FIG. 181, the portion of the blade holder 24 may be affixed to an exterior surface of the internal subshell $85_1$ and the intermediate and external subshells $85_2$, $85_3$ may be formed around the portion of the blade holder 24.

Figure 182:
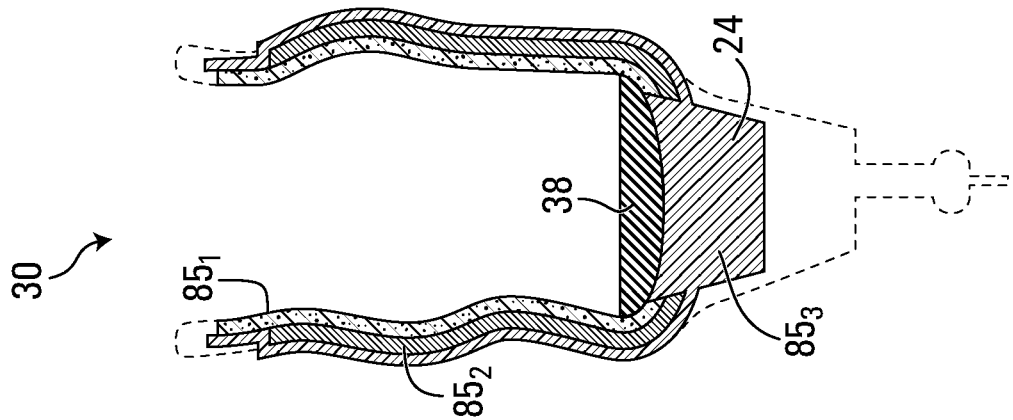
FIGS. 181 and 182 are cross-sectional views of the shell in embodiments in which a limited part of the blade holder is molded integrally with the shell.

In other embodiments, as discussed above, the portion of the blade holder 24 may be formed during the molding process of the shell 30. For example, as shown in FIG. 182, a majority or an entirety of the portion of the blade holder 24 may be constituted by the external subshell $85_3$. Moreover, the footbed 38 may be formed or affixed directly on the portion of the blade holder 24 (i.e., on the external subshell $85_3$ that makes up a majority or an entirety of the portion of the blade holder 24).

In some embodiments, as shown in FIG. 183, the footbed 38 may be formed integrally with the shell 30 so as to project outwardly into a gap of the internal subshell $85_1$ in the sole portion 69 of the shell 30.

In some embodiments, as shown in FIG. 184, when the blade holder 24 is formed integrally with the shell 30 during the molding process, the portion of the blade holder 24 that is formed integrally with the shell 30 (e.g., a part or an entirety of the blade holder 24) may be constituted by the intermediate subshell $85_2$ such that the intermediate subshell $85_2$ is exposed at the blade holder 24. In other embodiments, as shown in FIG. 185, when the blade holder 24 is formed integrally with the shell 30 during the molding process, a given one of the subshells $85_1$-$85_L$ may be formed to envelop the blade holder 24. That is, a given one of the subshells $85_1$-$85_L$ may be formed around the blade holder 24 but not around the shell 30.

Figure 186:
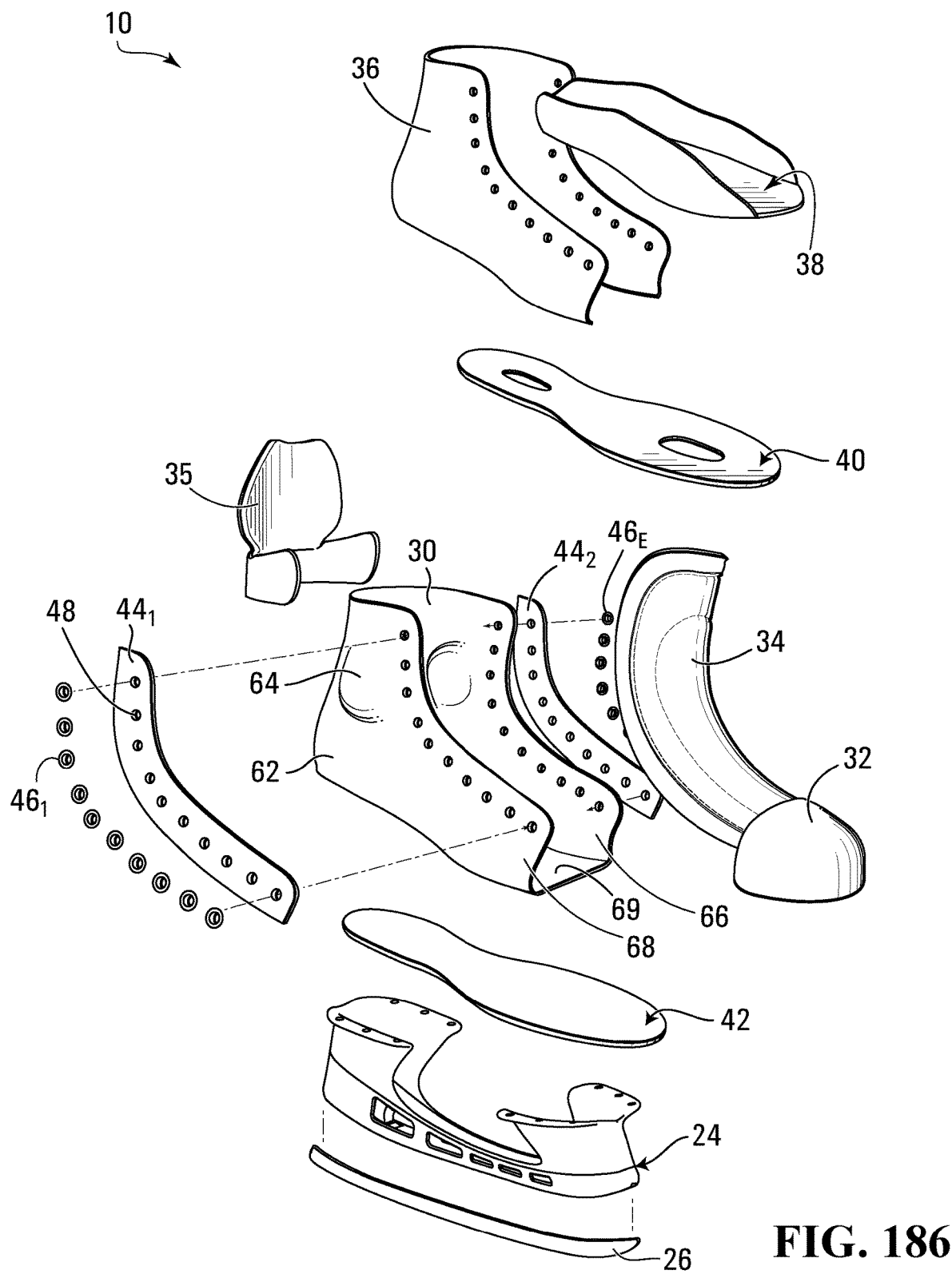
FIG. 186 is an exploded view of the skate in an embodiment in which the shell is molded separately from the blade holder and from other components of the skate boot, notably the toe cap, the tongue, the tendon guard, the footbed and the lace members of the skate boot.

In some embodiments, with additional reference to FIG. 186, the shell 30 and possibly one or more other components of the skate boot 22 may be manufactured separately from the blade holder 24, which may be manufactured separately and attached to the skate boot 22.

Figure 187:
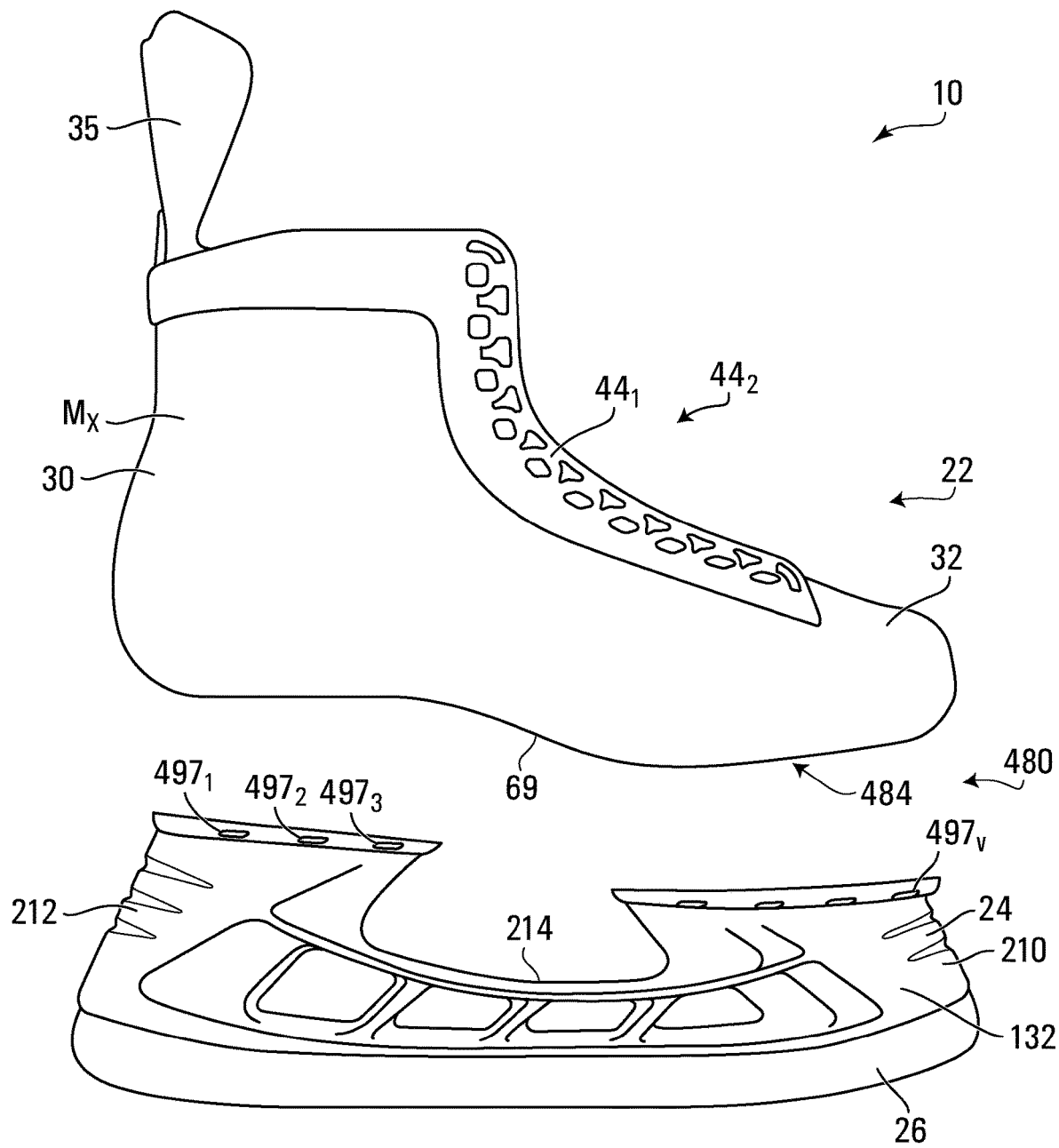
FIGS. 187 to 189 show an example of an embodiment in which the skate comprises a connection system to attach the blade holder to and detach the blade holder from the skate boot.
Figure 188:
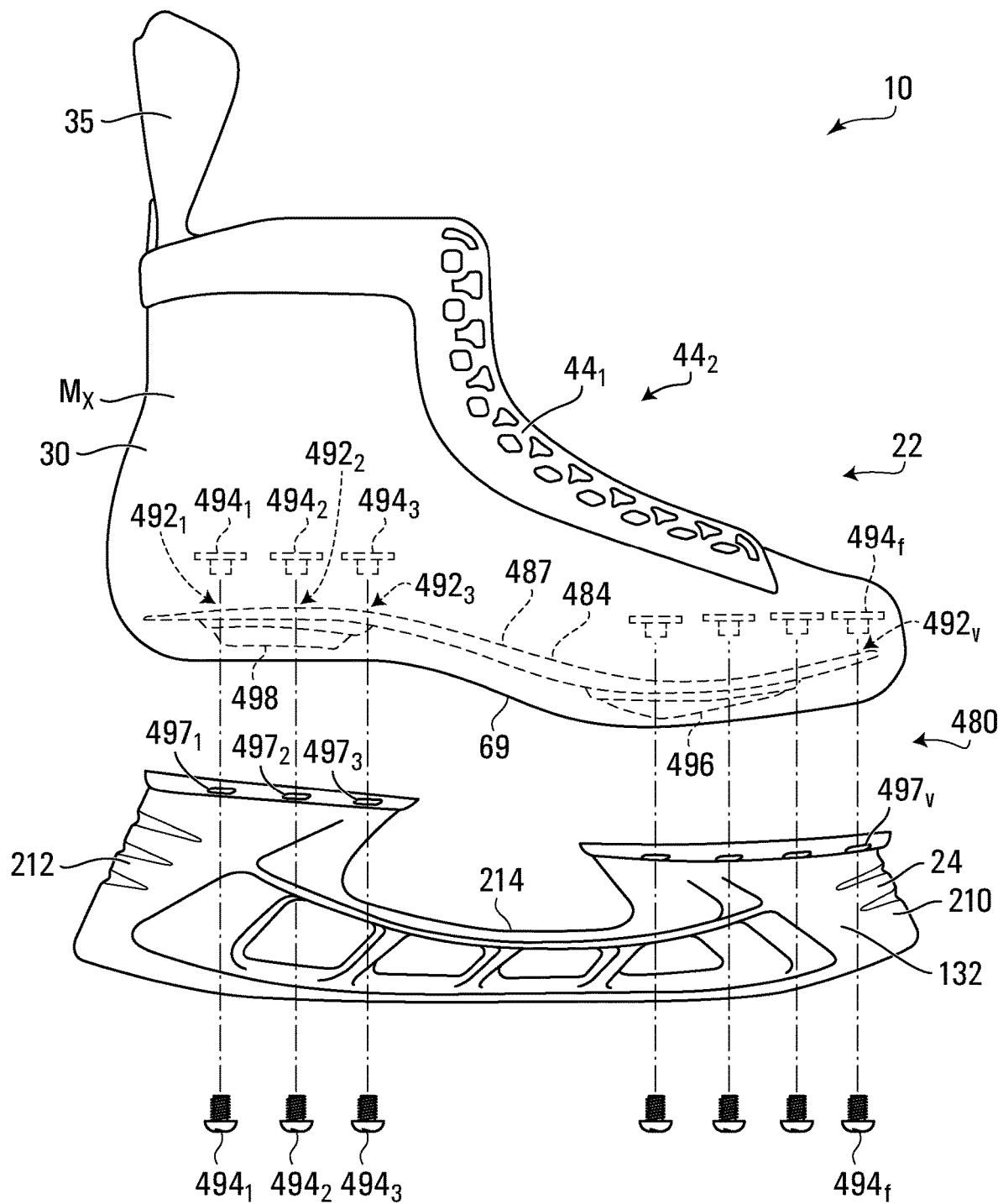
Figure 189:
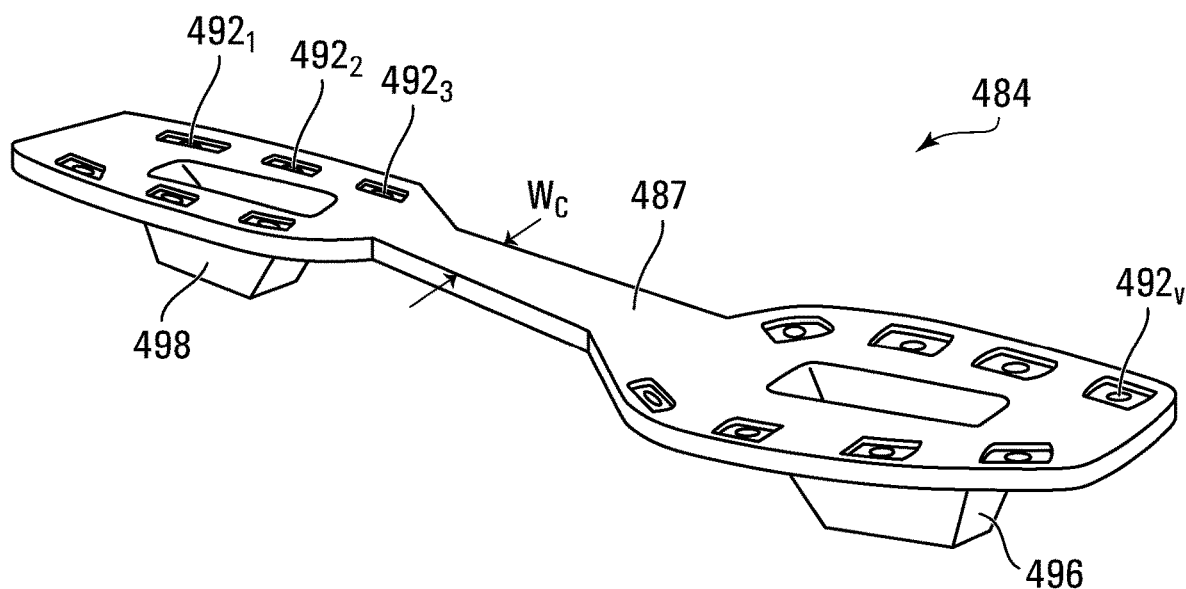

For example, in some embodiments, as shown in FIGS. 187 to 189, the shell 30 of the skate boot 22, the tendon guard 35, the lace members $44_1$, $44_2$, the toe cap 32 and the tongue 34 may be formed integrally with one another in the molding apparatus 150, while the blade holder 24 may be manufactured separately and connected to the skate boot 22 after the shell 30 of the skate boot 22 and these other components have been molded together in the molding apparatus 150. To that end, the skate boot 22 comprises a connection system 480 configured to attach the blade holder 24 to the skate boot 22.

In this embodiment, the connection system 480 comprises a connecting member 484 that is an insert placed in the molding apparatus 150 to mold the shell 30 of the skate boot 22 onto the connecting member 484 and configured to be fastened to the blade holder 24. The connecting member 484 is therefore retained in the skate boot 22 by molding of the shell 30 of the skate boot 22 over it, i.e., the shell 30 of the skate boot 22 is overmolded on the connecting member 484. More specifically, in this example, the sole portion 69 of the skate boot 22 is molded on the connecting member 484. In this case, the connecting member 484 extends from a heel region of the skate boot 22 to a toe region of the skate boot 22.

In some embodiments, the overmolding of the shell 30 of the skate boot 22 over the connecting member 484 covers a portion only of the connecting member 484, while in other embodiments, the overmolding of the shell 30 of the skate boot 22 over the connecting member 484 covers an entirety of the connecting member 484, i.e., the connecting member 484 is entirely enclosed within the shell 30.

In this embodiment, the connecting member 484 comprises a plurality of fastening voids $492_1$-$492_V$ to receive a plurality of fasteners $494_1$-$494_f$ to fasten the blade holder 24 to the skate boot 22. In this example, the fastening voids $492_1$-$492_V$ are enlarged adjacent to an inner surface 488 of the connecting member 484, the inner surface 488 being configured to face the user's foot. More specifically, the fastening voids $492_1$-$492_V$ may be countersunk or counterbore holes. The blade holder 24 may also comprise a plurality of fastening voids $497_1$-$497_V$ to receive the plurality of fasteners $494_1$-$494_f$ to fasten the blade holder 24 to the skate boot 22.

In this embodiment, a dimension $W_C$ of the connecting member 484 in a widthwise direction of the skate boot 22 may vary along the longitudinal direction of the skate boot 22. The connecting member 484 may be larger in the widthwise direction of the skate boot 22 where the connecting member overlies the front pedestal 210 and the rear pedestal 212 of the blade holder 24 than where the connecting member 484 overlies the bridge 214 of the blade holder 24. Also, in this example, the connecting member 484 is larger in the widthwise direction of the skate boot 22 where the connecting member 484 overlies the front pedestal 210 than where the connecting member 484 overlies the rear pedestal 212.

The connecting member 484 may be relatively rigid to provide a relatively rigid connection between the skate boot 22 and the blade holder 24. This may allow the ice skate 10 to be more reactive and to more effectively transmit forces between the ice 12 and the user's foot. As such, the connecting member 484 may comprise a material 487 that is stiffer, i.e., more rigid, than the material $M_X$ of the skate boot 22. For instance, in some embodiments, a ratio of a modulus of elasticity of the material 487 of the connecting member 484 over the modulus of elasticity of the material $M_X$ of the skate boot 22 may be at least 1.5, in some embodiments at least 2, in some embodiments at least 3, in some embodiments even more.

In this embodiment, the connecting member 484 may comprise a front projection 496 configured to project downwardly towards the front pedestal 210 and a rear projection 498 configured to project downwardly towards the rear pedestal 212, for reinforcing connection between the skate boot 22 and the blade holder 24.

Figure 190:
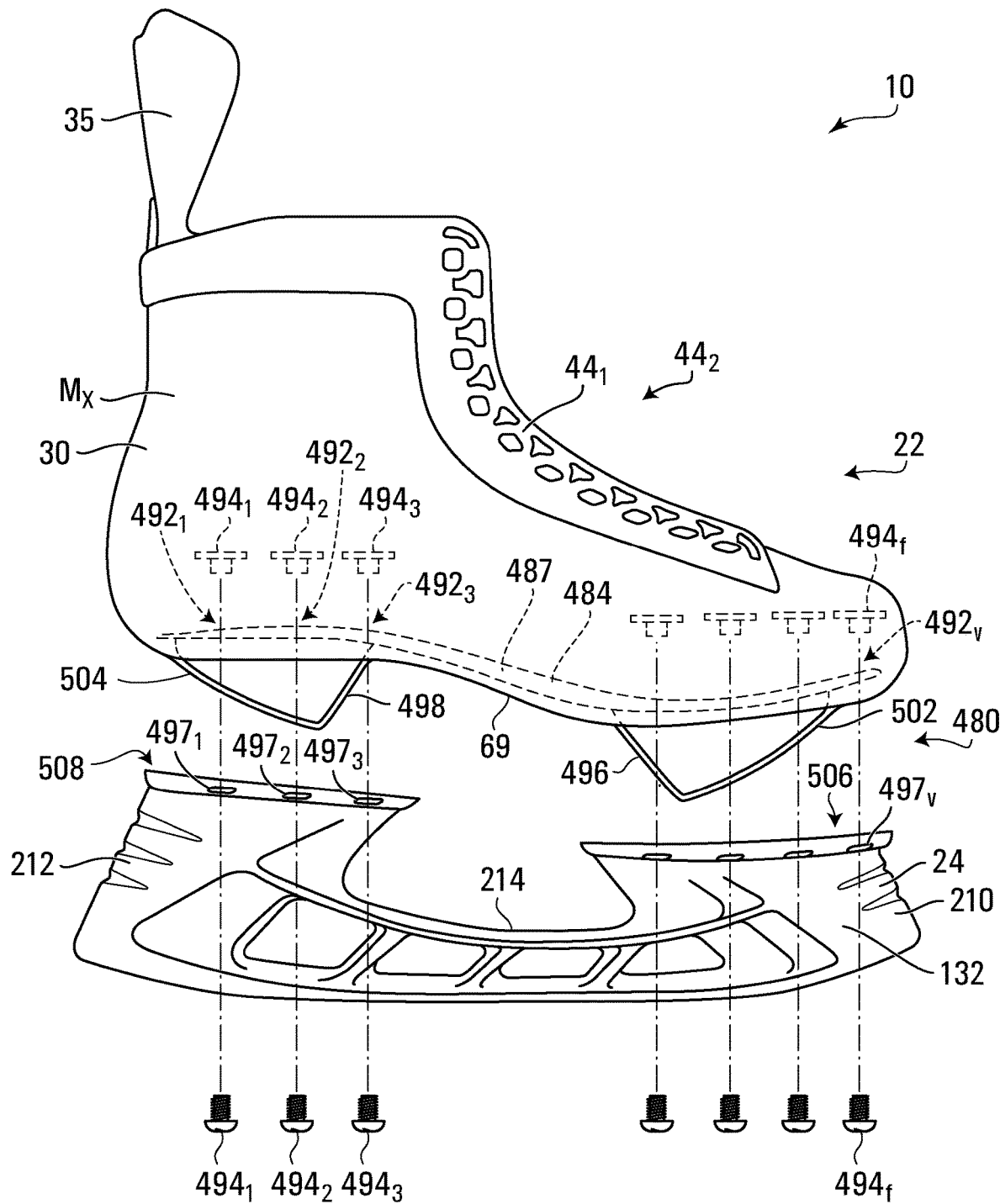
FIGS. 190 to 194 show variants of the connection system.
Figure 191:
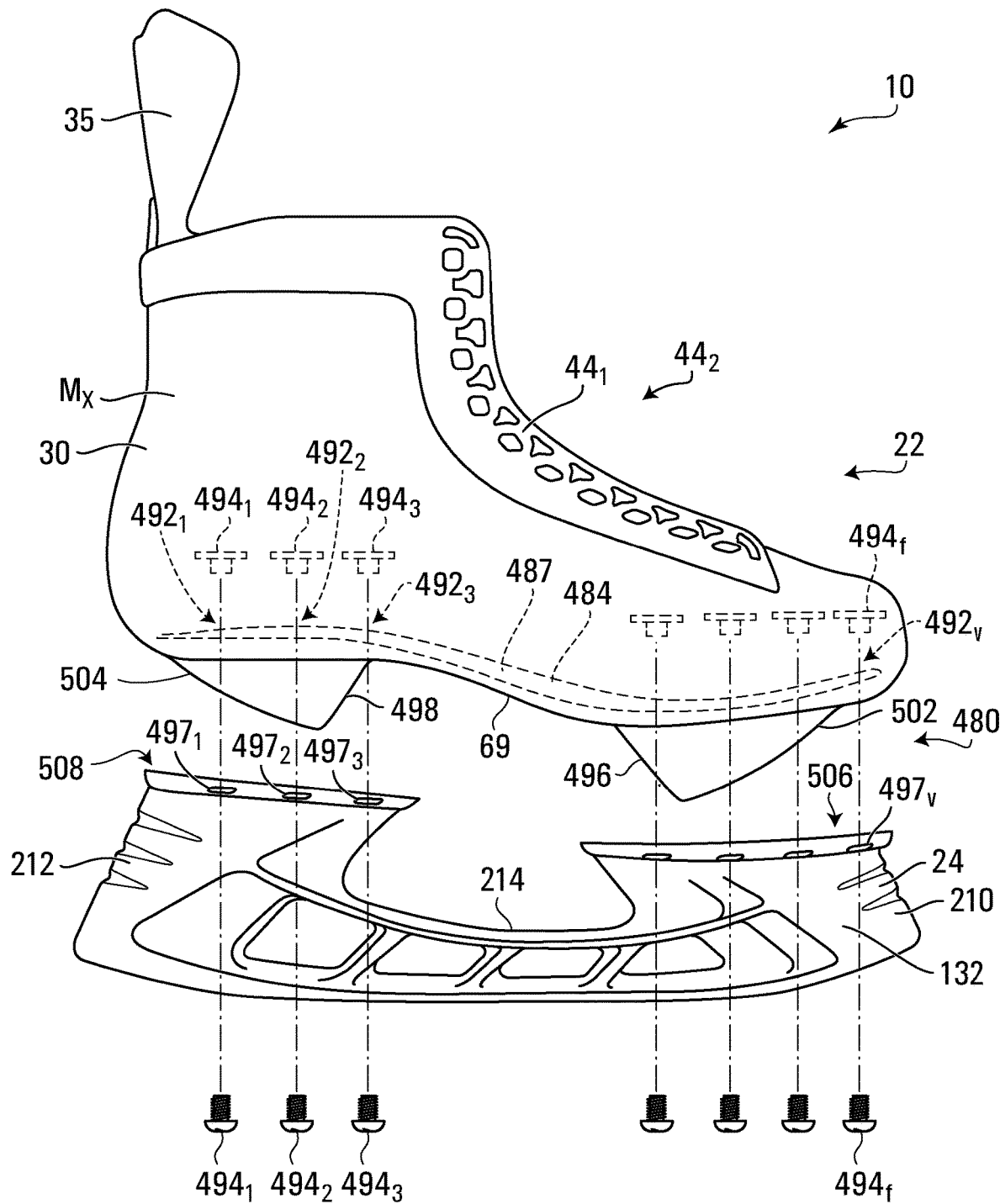

In some embodiments, as shown in FIGS. 190 and 191, the front projection 496 may be configured to project downwardly into the front pedestal 210 and the rear projection 498 may be configured to project downwardly into the rear pedestal 212. The projections 496, 498 may underlie a front projection 502 of the skate boot 22 configured to project downwardly into the front pedestal 210 and a rear projection 504 of the skate boot 22 configured to project downwardly into the rear pedestal 212.

The projections 496, 498 may be configured to position the connecting member 484 relative to the blade holder 24. Because the projections 496, 498 are overmolded by the skate boot 22, the projections 496, 498 may also be configured to position the skate boot 22 relative to the blade holder 24. For instance, the blade holder 24 may comprise a front void 506 at the front pillar 210 and a rear void 508 at the rear pillar 212 and the projections 496, 498, may be configured to project into respective ones of the voids 506, 508 in a relatively tight fit. In some embodiments, the connecting member 484 and the blade holder 24 may be affixed to one another at the projections 496, 498 and voids 506, 508 by being pressed into and over one another, fastened to one another, glued to one another, etc.

The connecting member 484 may be configured to allow the shell 30 of the skate boot 22 to be molded in different positions relative to the connecting member 484 in the molding apparatus 150, thereby allowing the blade holder 24 to be connected to the skate boot 22 in accordance with these different positions and/or allowing the user to choose between different sizes of the blade holder 24 to be connected to the skate boot 22, based on preferences of the user. For example, in some embodiments, these different positions may be offset in the longitudinal direction of the skate 10 and/or the widthwise direction of the skate 10. As another example, in some embodiments, these different positions allow the user to select a smaller or larger blade holder 24, compared to the blade holder 24 that would normally be used with the skate boot 22.

Figure 192:
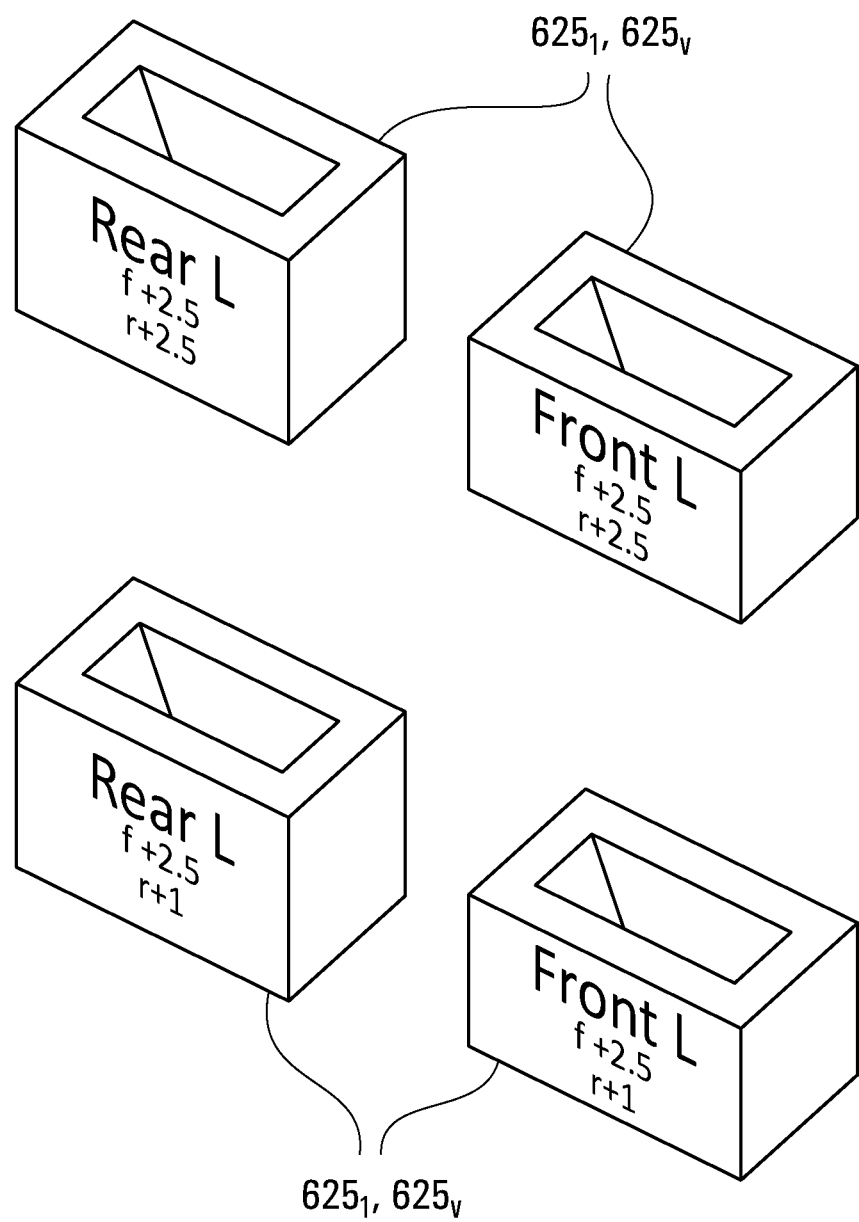
Figure 193:
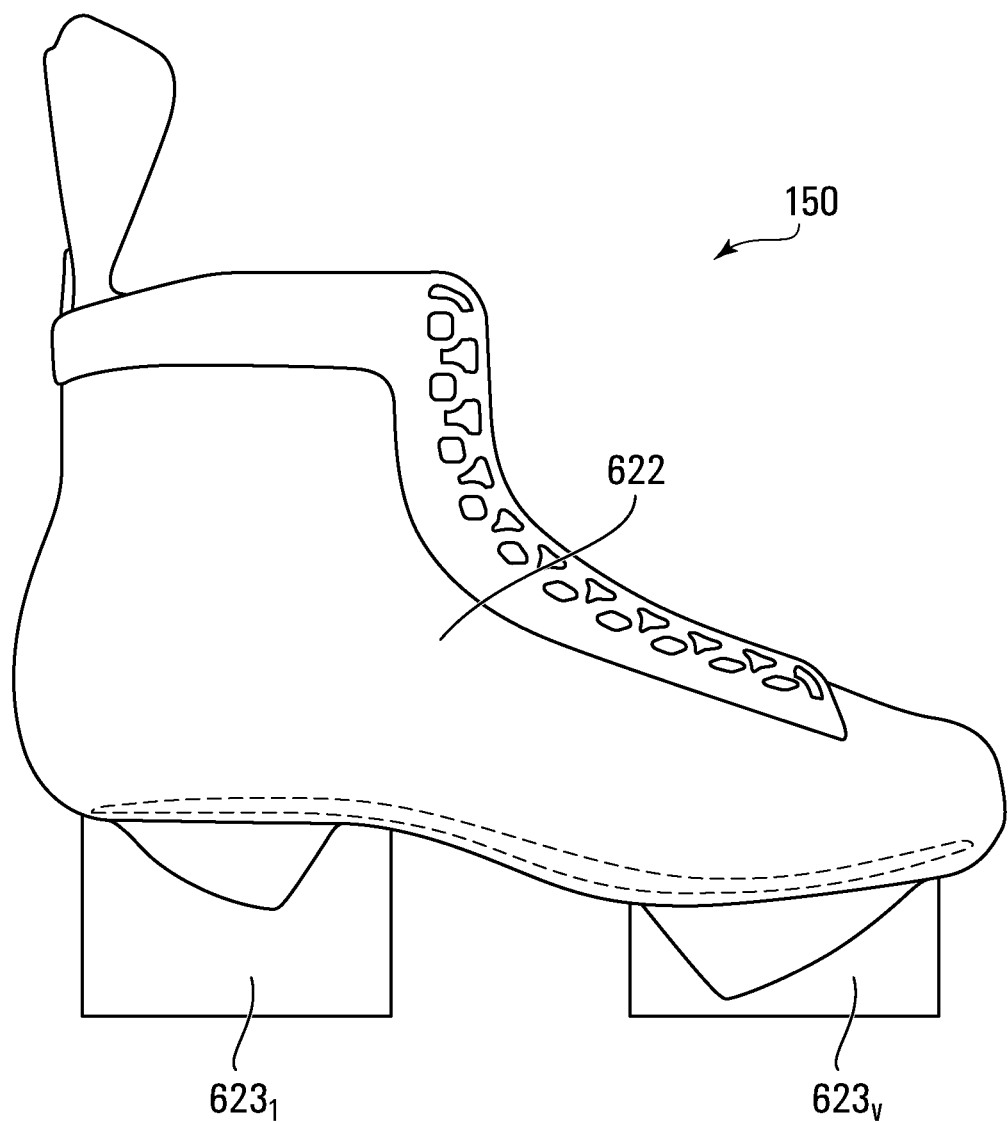
Figure 194:
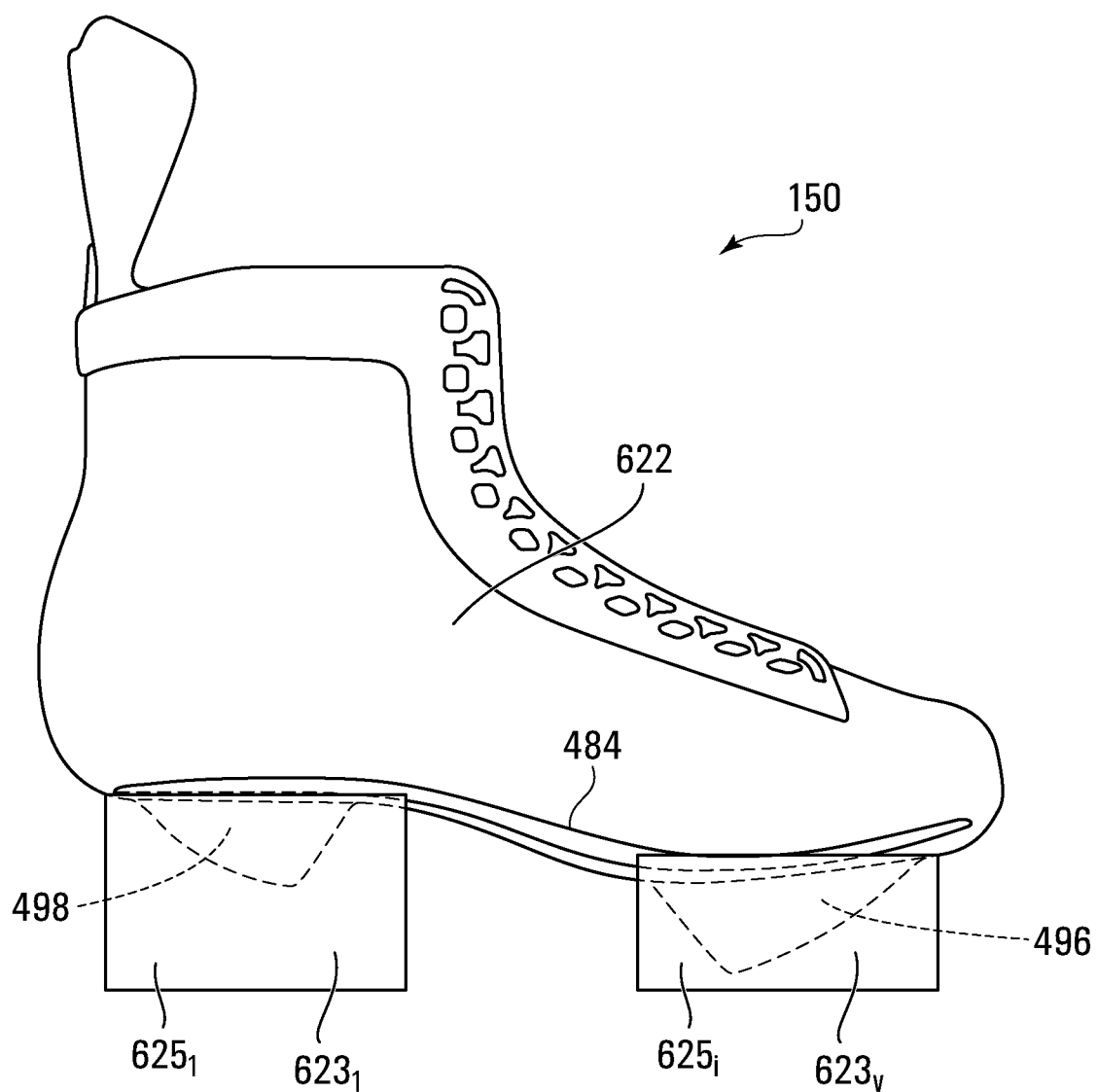

In some embodiments, wherein the projections 496, 498 are configured to position the connecting member 484 relative to the blade holder 24, this may be achieved by using inserts $625_1$-$625_S$ placeable in the molding apparatus 150 to allow the shell 30 of the skate boot 22 to be molded in a desirable position relative to the connecting member 484 in the molding apparatus 150, as shown in FIGS. 192 to 194. For instance, the inserts may determine a position of the connecting member 484 relative to the skate boot 22 in the molding apparatus. The molding apparatus 150 may comprise a void 622 having a shape that corresponds to the shape of the skate boot 22 and voids $623_1$-$623_v$ to receive each one of the inserts $625_1$-$625_S$. During the molding process, inserts $625_1$-$625_S$ may be chosen according to preferences of the user and placed in the respective ones of the voids $623_1$-$623_v$. The connecting member 484 may be placed in the molding apparatus 150 and may engage partially or completely a surface of the inserts $625_1$-$625_S$. The molding by flowing may then proceed to form the skate boot 22 comprising the connecting member 484, thereby overmolded by the shell 30.

In other embodiments, wherein the positioning of the fastening voids $492_1$-$492_v$ are configured to position the connecting member 484 relative to the blade holder 24, this may be achieved by using a connecting member 484 that has fastening voids $492_1$-$492_v$ positioned and configured to fit with the blade holder 24 of the desired size and at the desired position relative to the skate boot.

In some embodiments, the fastening voids $497_1$-$497_v$ of the blade holder 24 may be oversized, e.g., oblong, to allow a given blade holder 24 of a pre-determined size to be used with skate boots 22 of different sizes.

In this embodiment, the connection system 480 may be configured for removably attaching the blade holder 24 to the skate boot 22, i.e., once the blade holder 24 is attached to the skate boot 22, the user may detach the blade holder 24 from the skate boot 22, such that when the blade holder 24 is used, broken or needs to be changed for any reason, it may be changed for another blade holder 24. In other embodiments, the connection system 480 may be configured for attaching the blade holder 24 to the skate boot 22 in a manner such that the user may not be able to detach the blade holder 24 from the skate boot 22, but such an operation may be doable by re-manufacturing the skate boot 22 in a manufacture facility. This could be achieved, notably, by using rivets as fasteners $494_1$-$494_f$. In other embodiments, the connection system 480 may be configured for attaching the blade holder 24 to the skate boot 22 in a permanent manner.

Figure 195:
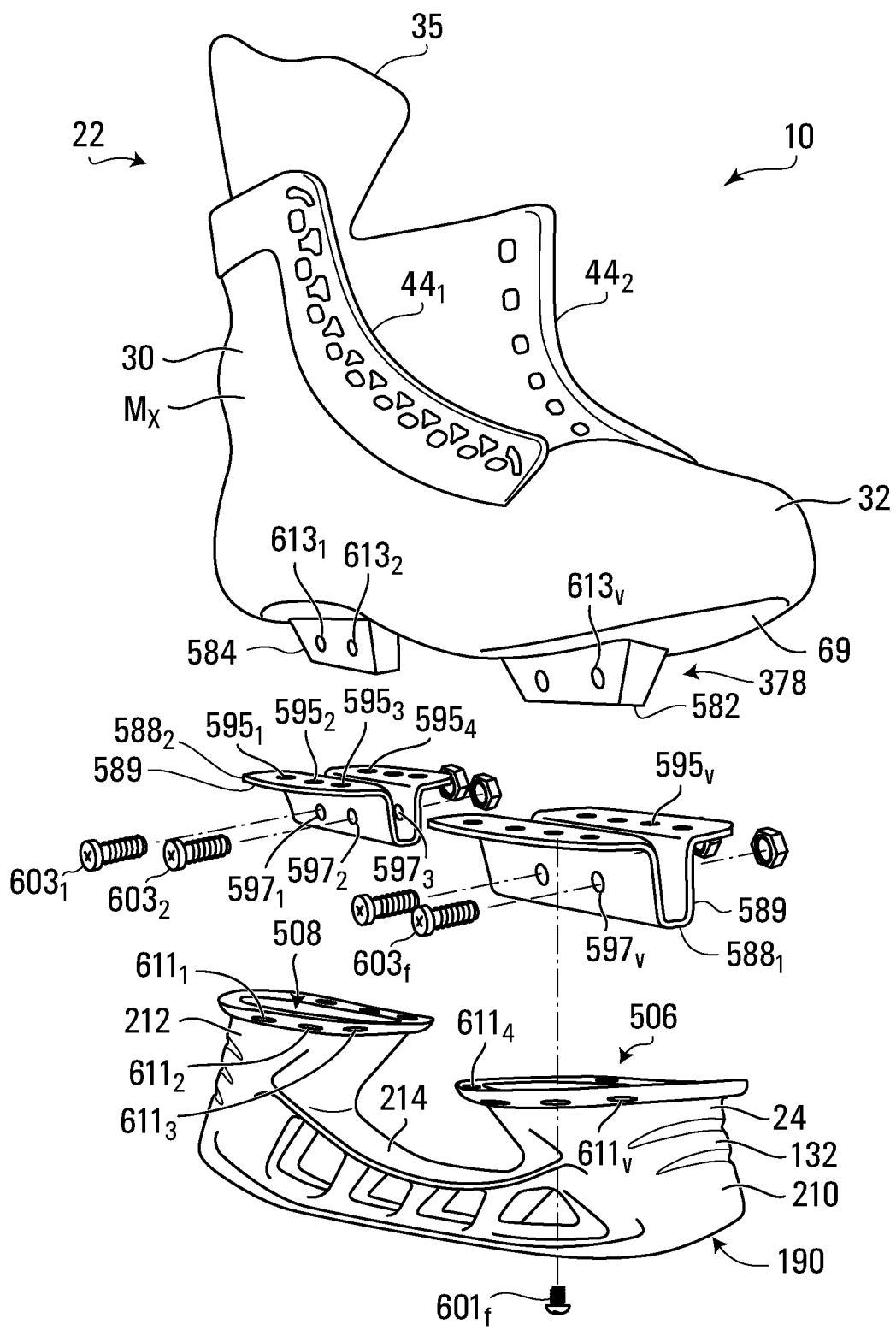
FIGS. 195 to 197 show an example of an embodiment in which the skate comprises a blade-holder-connecting portion to attach the blade holder to and detach the blade holder from the skate boot.
Figure 196:
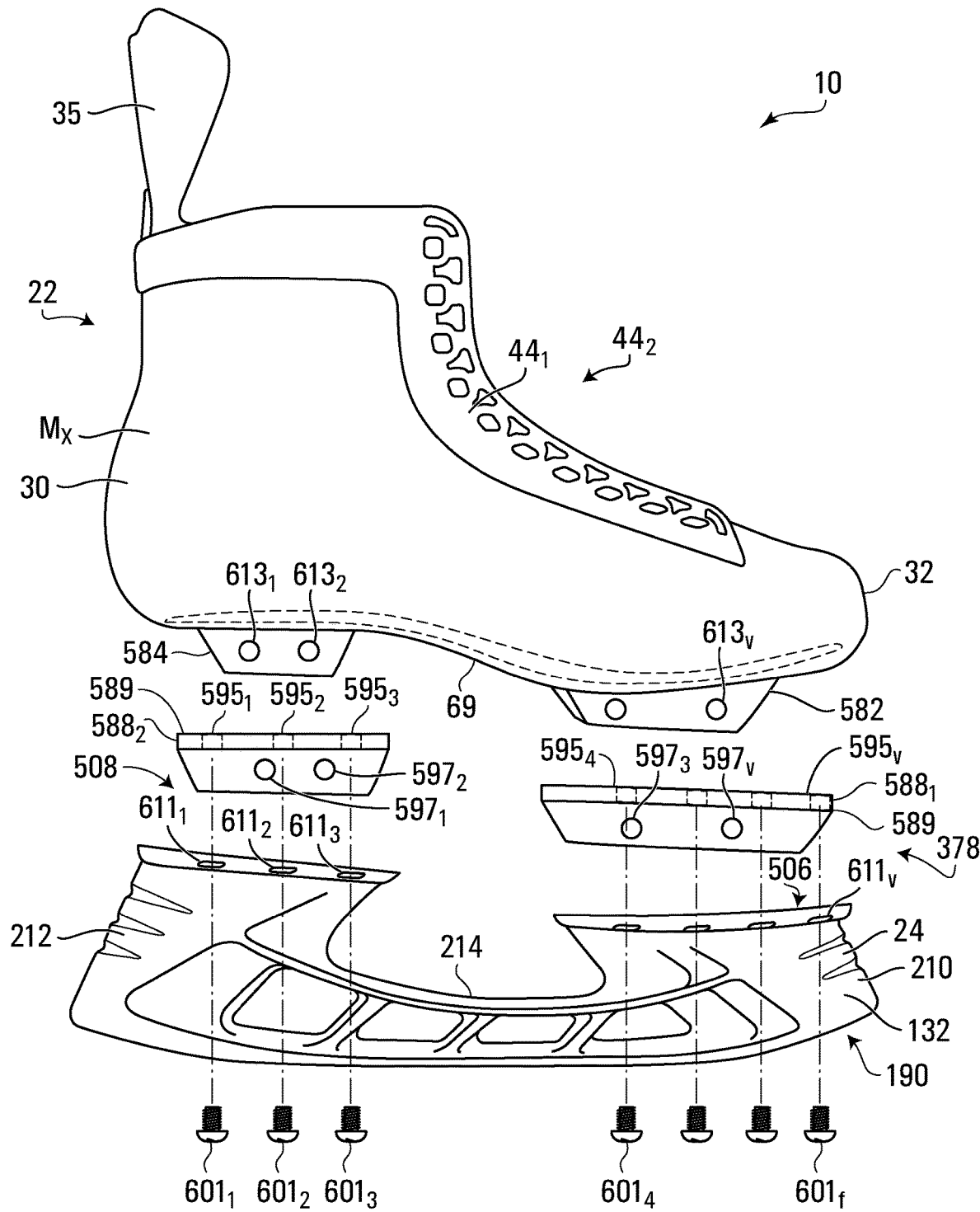
Figure 197:
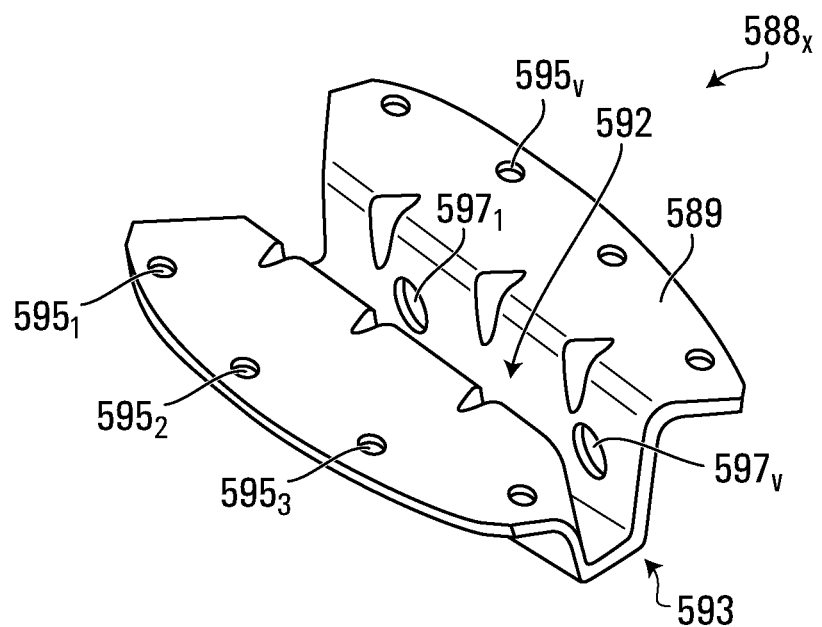

As another example, in some embodiments, as shown in FIGS. 195 to 197, the shell 30 of the skate boot 22 may comprise a blade-holder-connecting portion 378 projecting downwardly from and formed integrally with the sole portion 69, while the skate boot 22 comprises a plurality of connecting member $588_1$, $588_2$ disposed between the blade holder 24 and the blade-holder-connecting portion 378 of the shell 30 of the skate boot 22 to fasten the blade holder 24 to the skate boot 22.

In this embodiment, the connecting member $588_1$, $588_2$ are separated from one another and spaced apart in the longitudinal direction of the skate boot 22. The blade-holder-connecting portion 378 of the shell 30 of the skate boot 22 comprises a front projection 582 configured to project downwardly towards the void 506 of the front pedestal 210 and a rear projection 584 configured to project downwardly into towards void 508 of the rear pedestal 212 of the blade holder 24. The front projection 582 is configured to connect with the first connecting member $588_1$ and the rear projection 584 is configured to connect with the second connecting member $588_2$. The first connecting member $588_1$ is configured to engage the front projection 582 of the blade-holder-connecting portion 378 of the shell 30 and the second connecting member $588_2$ is configured to engage the rear projection 584 of the blade-holder-connecting portion 378 of the shell 30.

In other embodiments, the connecting members $588_1$, $588_2$ may be integrally formed with one another, i.e., may form one connecting member.

The connecting members $588_1$, $588_2$ may be relatively rigid to provide a relatively rigid connection between the skate boot 22 and the blade holder 24. This may allow the ice skate 10 to be more reactive and to more effectively transmit forces between the ice 12 and the user's foot. As such, the connecting members $588_1$, $588_2$ may comprise a material 589 that is stiffer, i.e., more rigid, than the material $M_X$ of the skate boot 22. For instance, in some embodiments, a ratio of a modulus of elasticity of the material 589 of the connecting members $588_1$, $588_2$ over the modulus of elasticity of the material $M_X$ of the skate boot 22 may be at least 1.5, in some embodiments at least 2, in some embodiments at least 3, in some embodiments even more.

In this embodiment, the connecting members $588_1$, $588_2$ comprise a plurality of fastening voids $595_1$-$595_v$, $597_1$-$597_v$ to receive a plurality of fasteners $601_1$-$601_f$, $603_1$-$603_f$ to fasten the blade holder 24 to the skate boot 22. More particularly, each of the fastening voids $595_1$-$595_v$, $597_1$-$597_v$ is disposed to receive a corresponding one of the fasteners $601_1$-$601_f$, $603_1$-$603_f$. For example, a first fastening void $595_1$ may be disposed to receive a first fastener $601_1$ extending from the blade holder 24 to the connecting members $588_1$, $588_2$; and a second fastening void $597_1$ may be disposed to receive a second fastener $603_1$ extending from the blade holder 24 to the blade-holder-connecting portion 378 of the shell 30. The first and second fasteners $601_1$, $603_1$ are oriented orthogonally to one another. As another example, the first ones of the fastening voids $595_1$-$595_v$, $597_1$-$597_v$ may be disposed to receive first ones of the fasteners $601_1$-$601_f$, $603_1$-$603_f$ extending from the blade holder 24 to the connecting members $588_1$, $588_2$; and second ones of the fastening voids $595_1$-$595_v$, $597_1$-$597_v$ may be disposed to receive second ones of the fasteners $601_1$-$601_f$, $603_1$-$603_f$ extending from the blade holder 24 to the blade-holder-connecting portion 378 of the shell 30.

In this example, the connecting members $588_1$, $588_2$ comprise a recess 592 to receive the blade-holder-connecting portion 378 of the shell 30. The connecting members $588_1$, $588_2$ comprise an extension 593 projecting away from the recess 592. The first fastening voids $595_1$-$595_v$ are disposed in the extension 593 of the connecting members $588_1$, $588_2$ to receive the first fasteners $601_1$-$601_f$ extending from the blade holder 24 to the connecting members $588_1$, $588_2$; and the second fastening voids $597_1$-$597_v$ open into the recess 592 to receive the second fasteners $603_1$-$603_f$ extending from the blade holder 24 to the blade-holder-connecting portion 378 of the shell 30 of the skate boot 22.

In this embodiment, the blade holder 24 comprises fastening voids $611_1$-$611_v$ configured to receive the fasteners $601_1$-$601_f$ extending from the blade holder 24 to the connecting members $588_1$, $588_2$. The projections 582, 584 of the blade-holder-connecting portion 378 of the shell 30 of the skate boot 22 comprise fastening voids $613_1$-$613_v$ configured to receive the fasteners $603_1$-$603_f$ extending from the blade holder 24 to the blade-holder-connecting portion 378 of the shell 30.

In this embodiment also, the connecting members $588_1$, $588_2$ may be configured to connect the blade holder 24 to the skate boot 22 in a specific position desirable by the user and/or may allow the user to choose between different sizes of the blade holder 24 to be connected to the skate boot 22, based on preferences of the user. In some embodiments, the connecting members $588_1$, $588_2$ may be preselected from a selection of connecting members $588_1$, $588c$, each pair of connecting members $588_1$, $588_2$ corresponding to a size of blade holder or skate boot, and/or corresponding to a position of the blade holder 24 relative to the skate boot 22. In some embodiments, the fastening voids $611_1$-$611_v$ of the blade holder 24 may be oversized, e.g., oblong, to allow a given blade holder 24 of a pre-determined size to be used with skate boots 22 of different sizes.

In this embodiment, the blade-holder-connecting portion 378 and the connecting member $588_1$, $588_2$ may be configured for removably attaching the blade holder 24 to the skate boot 22, i.e., once the blade holder 24 is attached to the skate boot 22, the user may detach the blade holder 24 from the skate boot 22, such that when the blade holder 24 is used, broken or needs to be changed for any reason, it may be changed for another blade holder 24. In other embodiments, the blade-holder-connecting portion 378 and the connecting member $588_1$, $588_2$ may be configured for attaching the blade holder 24 to the skate boot 22 in a manner such that the user may not be able to detach the blade holder 24 from the skate boot 22, but such an operation may be doable in by re-manufacturing the skate boot 22 in a manufacture facility. This could be achieved, notably, by using rivets as fasteners $601_1$-$601_f$. In other embodiments, the blade-holder-connecting portion 378 and the connecting member $588_1$, $588_2$ may be configured for attaching the blade holder 24 to the skate boot 22 in a permanent manner.

Figure 198:
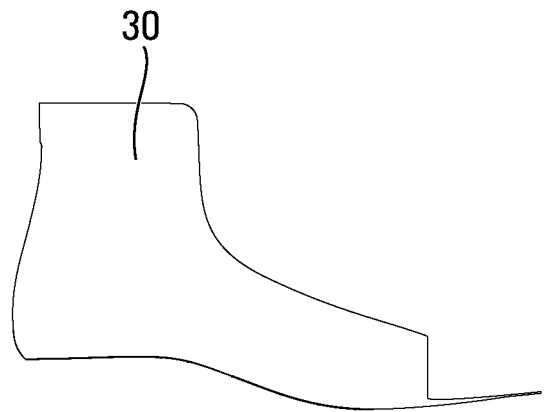
FIG. 198 is a side of the skate in an embodiment in which the shell of the skate boot is molded alone (i.e., separately from the toe cap, the tongue, the tendon guard, the footbed and the lace members of the skate boot)
Figure 199:
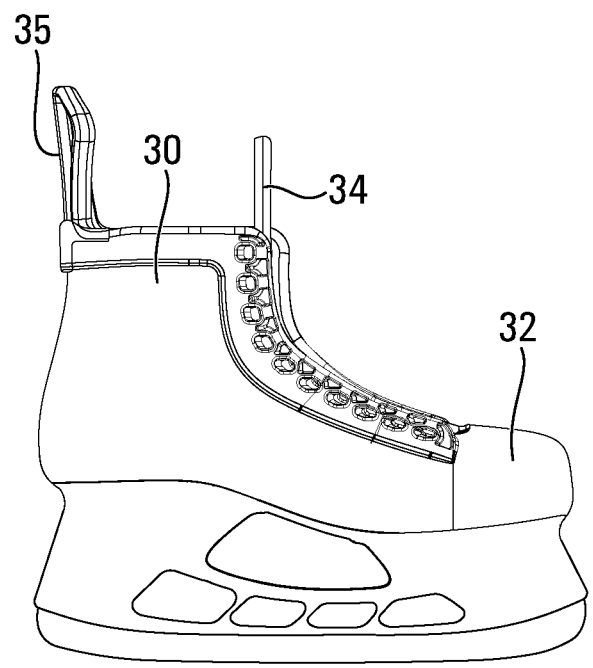
FIG. 199 is a side view of the skate in an embodiment in which any of the toe cap, the tongue, the tendon guard, the footbed and the lace members are molded integrally with the shell of the skate boot.

As another example, in some embodiments, as shown in FIG. 198, the shell 30 of the skate boot 22 may be formed alone in the molding apparatus 150, i.e., separately from the toe cap 32, the tongue 34, the tendon guard 35, the footbed 38 and the lace members $44_1$, $44_2$. As shown in FIG. 199, the toe cap 32, the tongue 34, the tendon guard 35, the footbed 38 and the lace members $44_1$, $44_2$ may be attached to the shell 30 after the shell 30 has been formed. For instance, any given one of the toe cap 32, the tongue 34, the tendon guard 35, the footbed 38 and the lace members $44_1$, $44_2$ may be formed on the shell 30 in a separate molding process similar to the one described above in respect of the shell 30. For example, the given one of the toe cap 32, the tongue 34, the tendon guard 35, the footbed 38 and the lace members $44_1$, $44_2$ may be overmolded onto the shell 30. In some cases, the given one of the toe cap 32, the tongue 34, the tendon guard 35, the footbed 38 and the lace members $44_1$, $44_2$ may be formed separately from the shell 30 during another molding process (e.g., a thermoforming process) and attached to the shell 30 via a fastener (e.g., stitching, stapling, etc.) or via gluing (e.g., using an adhesive).

In other embodiments, as shown in FIG. 200, the footbed 38 may be an insert that is placed between the internal subshell $85_1$ and the intermediate subshell $85_2$ and/or between the internal subshell $85_1$ and the external subshell $85_3$ during forming of the shell 30 in a manner similar to that described above in respect of the reinforcement 115 for example. In such embodiments, the player's foot 11 does not contact the footbed 38 directly, however the footbed 38 may still provide comfort to the player's foot 11 by interacting between the subshells.

As shown in FIGS. 201 and 202, in some embodiments, the blade holder 24 may be formed separately from the internal, intermediate and external subshells $85_1$, $85_2$, $85_3$ of the shell 30.

In such embodiments where the shell 30 and possibly one or more other components of the skate boot 22 are manufactured separately from the blade holder 24, the skate boot 22 may comprise an outsole 42, as shown in in FIG. 186. The outsole 42 is affixed to an underside of the shell 30 for forming the skate boot 22. The outsole 42 comprises a rigid material for imparting rigidity to the outsole 42. More particularly, in this embodiment, the rigid material of the outsole 42 comprises a composite material. For example, the composite material may be a fiber-matrix composite material that comprises a matrix in which fibers are embedded. The matrix may include any suitable polymeric resin, such as a thermosetting polymeric material (e.g., polyester, vinyl ester, vinyl ether, polyurethane, epoxy, cyanate ester, etc.), a thermoplastic polymeric material (e.g., polyethylene, polypropylene, acrylic resin, polyether ether ketone, polyethylene terephthalate, polyvinyl chloride, polymethyl methacrylate, polycarbonate, acrylonitrile butadiene styrene, nylon, polyimide, polysulfone, polyamide-imide, self-reinforcing polyphenylene, etc.), or a hybrid thermosetting-thermoplastic polymeric material. The fibers may be made of any suitable material such as carbon fibers, polymeric fibers such as aramid fibers, boron fibers, glass fibers, ceramic fibers, etc. In other embodiments, the rigid material may comprise any other suitable material (e.g., nylon, polycarbonate materials, polyurethane, thermoplastics, thermosetting resins, reinforced thermoplastics, reinforced thermosetting resins, polyethylene, polypropylene, high density polyethylene).

Figure 203:
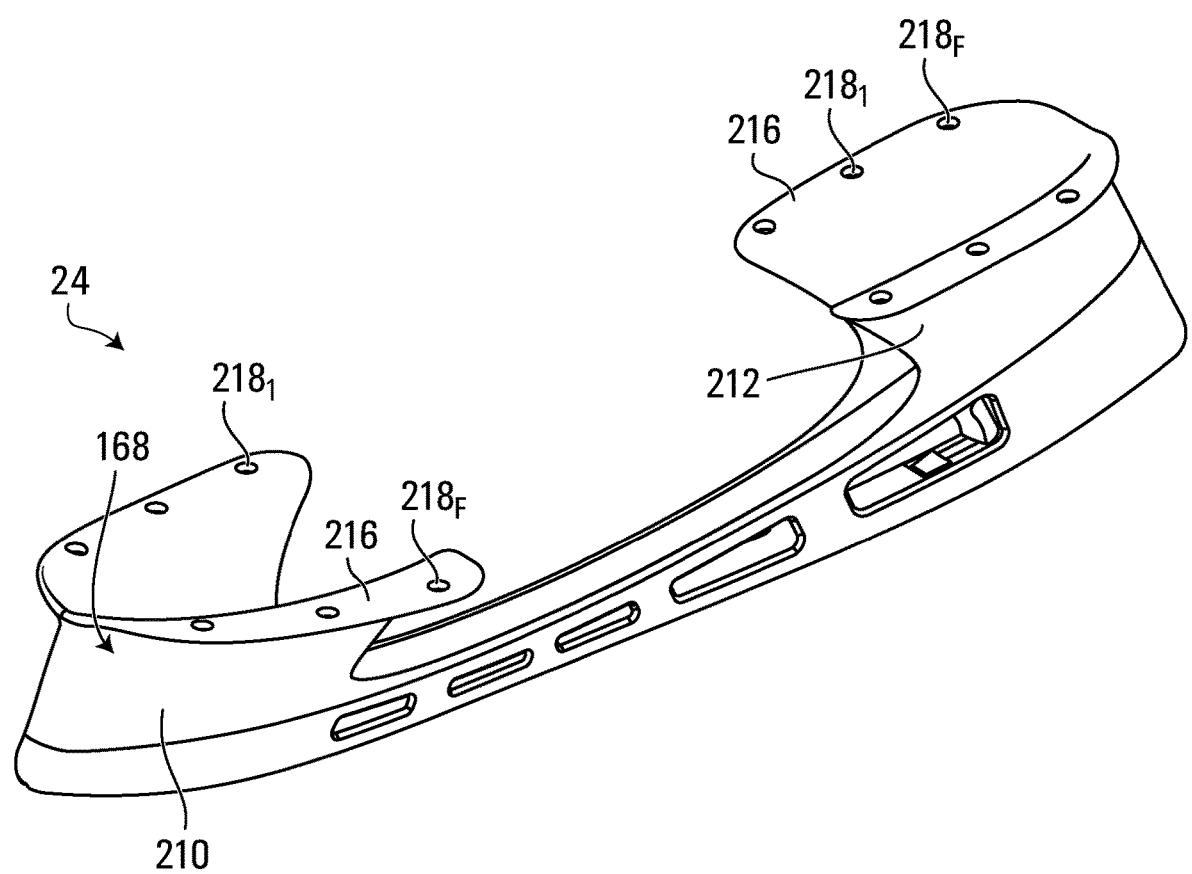
FIG. 203 is a perspective view of the blade holder in an embodiment in which the blade holder is formed separately from the shell of the skate boot.

Moreover, in such embodiments where the skate boot 22 and the blade holder 24 are manufactured separately, the support 168 of the blade holder 24 and the skate boot 22 may be affixed to one another in any suitable way. For example, in some embodiments, as shown in FIG. 203, the front and rear pillars 210, 212 are fastened to the skate boot 22 by fasteners (e.g., rivets, screws, bolts). In this example, each of the front and rear pillars 210, 212 comprises a flange 216 including a plurality of apertures $218_1$-$218_F$ to receive respective ones of the fasteners that fasten the blade holder 24 to the skate boot 22. The support 168 may be affixed to the skate boot 22 in any other suitable manner in other embodiments (e.g., by an adhesive).

Figure 204:
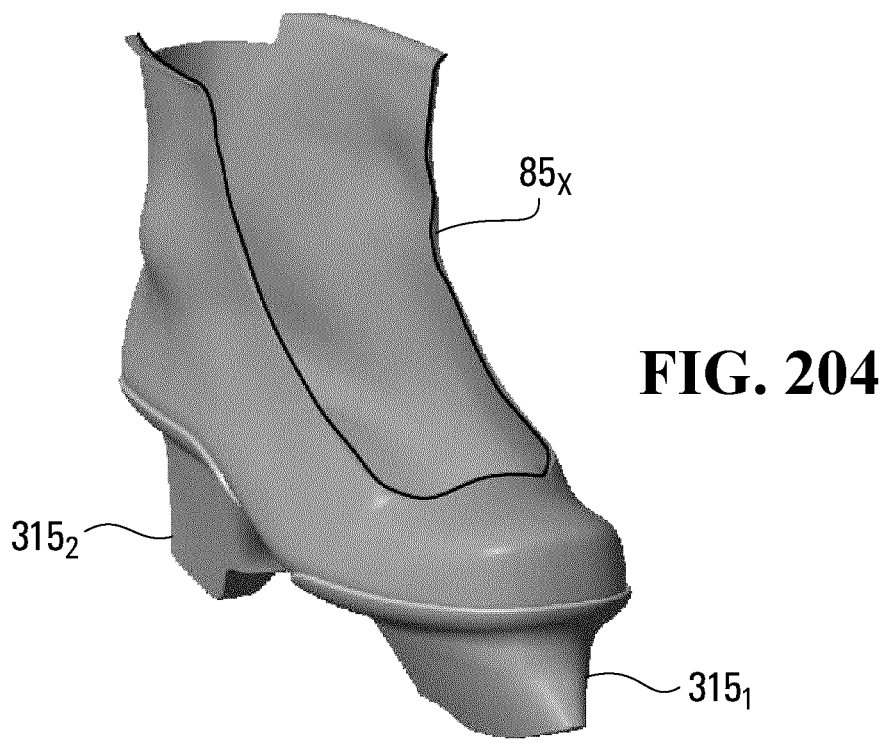
FIGS. 204 and 205 show an example of a variant in which the shell and/or the blade holder comprises one or more inserts over which a subshell is molded.
Figure 205:
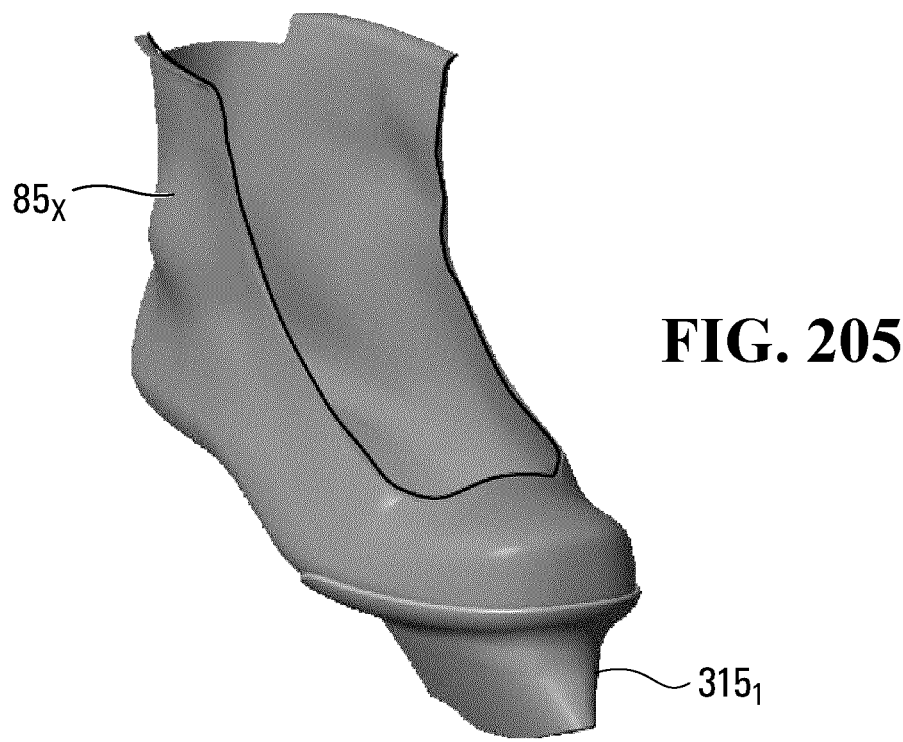
Figure 206:
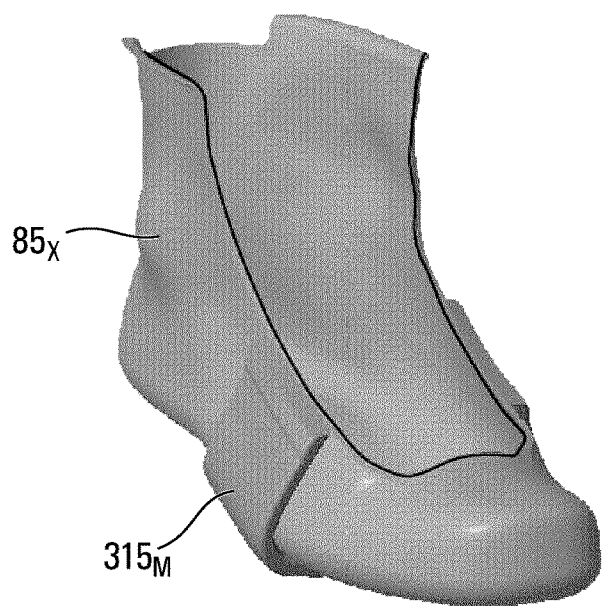
FIGS. 206 to 208 show other examples of the variant of FIG. 176 in which the inserts form a part of the shell.

In another variant, the shell 30 and/or the blade holder 24 and/or another component of the skate boot 22 that is made integrally with the shell 30 may comprise one or more inserts $315_1$-$315_N$ over which one or more of the subshells $85_1$-$85_L$ may be molded. For instance, as shown in FIG. 204, in this example, the blade holder 24 comprises a front insert $315_1$ and a rear insert $315_2$ which respectively make up a part of the front and rear pillars 210, 212. More particularly, in this example of implementation, the front and rear inserts $315_1$, $315_2$ make up at least a majority (i.e., a majority or an entirety) of the front and rear pillars 210, 212 of the support 168 of the blade holder 24. In this example, the front and rear inserts $315_1$, $315_2$ are affixed to the shell 30 during the molding process of the shell 30 in order to make the blade holder 24 integrally with the shell 30. For example, once a given number of the subshells $85_1$-$85_L$ are molded, the front and rear inserts $315_1$, $315_2$ are affixed to the formed subshells $85_1$-$85_L$ (e.g., by gluing, taping, or any other suitable way) and one or more other ones of the subshells $85_1$-$85_L$, in this case the exterior subshell $85_3$, is molded over the front and rear inserts $315_1$, $315_2$ and the formed subshells $85_1$-$85_L$ such as to form a continuous subshell $85_3$ extending from the shell 30 to the blade holder 24. In other cases, as shown in FIG. 206, the blade holder 24 may comprise a single one of the inserts $315_1$, $315_2$ (e.g., only the front insert $315_1$ or only the rear insert $315_2$).

Figure 207:
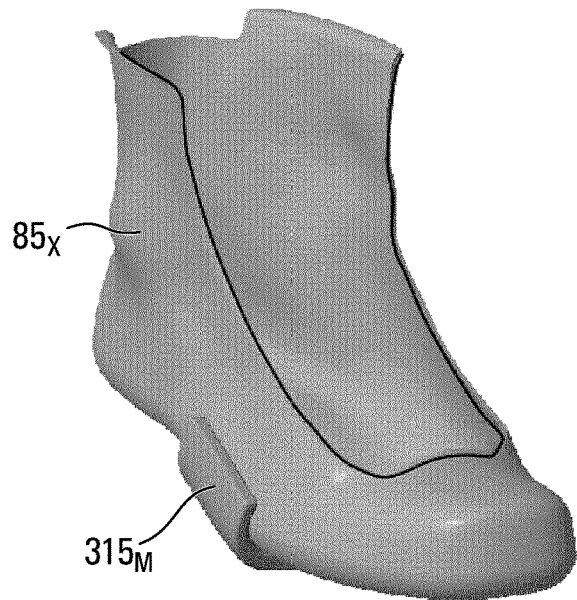
Figure 208:
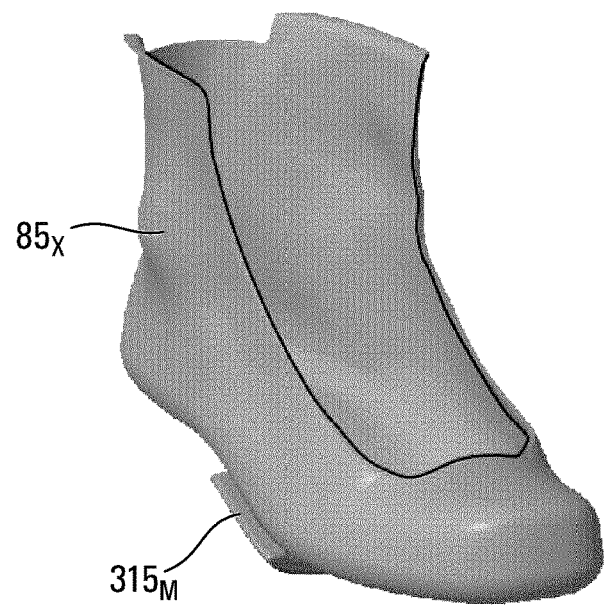

In other examples, the inserts $315_1$-$315_N$ may not be part of the blade holder 24 but may instead form part of the shell 30. For instance, as shown in FIG. 206, in this example, the shell 30 comprises an insert $315_M$ disposed between given ones of the subshells $85_1$-$85_L$. For example, the insert $315_M$ may be disposed on an outer surface of the intermediate subshell $85_2$ such that the exterior subshell $85_3$ may be molded over the insert $315_M$ and the intermediate subshell $85_2$. The insert $315_M$ may be disposed at any portion of the shell 30. In this example, the insert $315_M$ is disposed at a middle portion of the shell 30 corresponding to the intermediate portion 68 of the skate boot 22. In particular, the insert $315_M$ is disposed such as to extend from the lateral side portion 66 of the shell 30 to the medial side portion 68 of the shell 30 and wrapping around under the sole portion 69 of the shell 30. As shown in FIG. 207, the insert $315_M$ may extend to various heights on the medial and lateral side portions 66, 68 of the shell 30. In some cases, the insert $315_M$ may extend substantially a full height of each of the lateral and medial side portions 66, 68. As shown in FIG. 208, in some cases, the insert $315_M$ may not extend to the lateral and medial side portions 66, 68 of the shell 30 but may rather be confined to be disposed under the sole portion 69 of the shell 30.

Figure 209:
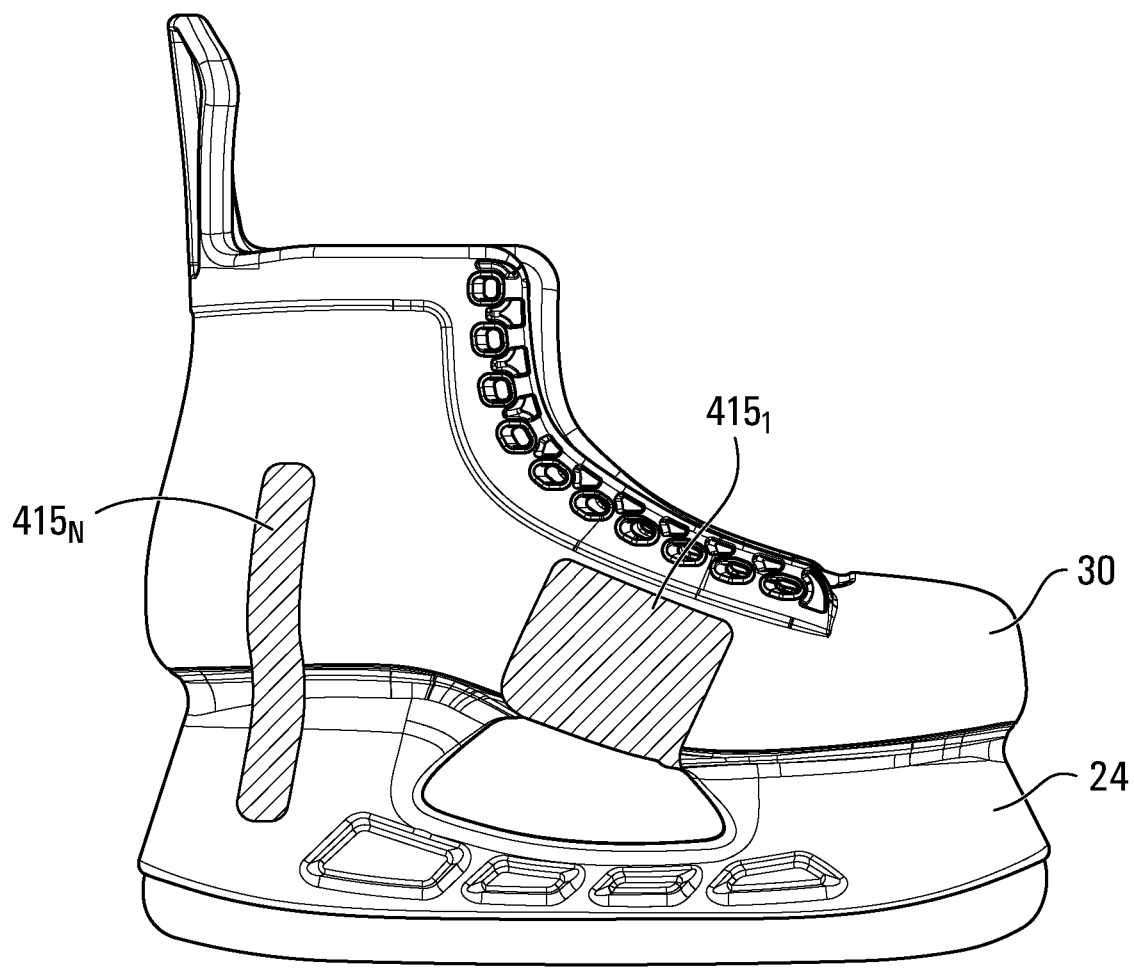
FIG. 209 shows an example of a variant in which one or more of the subshells comprises a filled portion comprising a different material.

In this example, the inserts $315_1$-$315_N$ comprise a foam material. In particular, the foam material of the inserts $315_1$-$315_N$ has a density that is less than the density of the exterior subshell $85_3$. This may be helpful to reduce the weight of the skate 10. In another variant, as shown in FIG. 209, a given subshell $85_x$ (or more than one of the subshells) may comprise one or more filled portions $415_1$-$415_N$ made of a material $M_z$ different from the material Mx of the subshell $85_x$. The filled portions $415_1$-$415_N$ constitute a portion of an other subshell $85_y$ that was formed such as to fill a void in the given subshell $85_x$. As such the filled portions $415_1$-$415_N$ can be said to be "inserted" into voids formed in the subshell $85_x$ and may thus be referred to as "inserts". To implement the inserts $415_1$-$415_N$, the subshell $85_x$ is first molded to include a void. This may be achieved in various ways. For example, the void of the subshell $85_x$ may be formed by placing a molding insert in the mold during molding of the subshell $85_x$. Once the subshell $85_x$ has been demolded, the molding insert is removed, leaving a void in the subshell $85_x$. Alternatively or additionally, the void of the subshell $85_x$ may be formed by removing (e.g., cutting out) a portion of the subshell $85_x$ to form a void. The subshell $85_x$, which now includes a void, is then re-inserted into a corresponding mold and the material $M_z$ is injected to fill in the void in the subshell $85_x$, effectively resulting in the subshell $85_x$ comprising distinct materials. This can be useful to replace the material $M_x$ of the subshell $85_x$ at selected locations with another material with desired characteristics such as to modify characteristics of the subshell $85_x$. For example, the material $M_z$ may have a stiffness that is different (e.g., greater or less than) from a density of the material $M_x$ of the subshell $85_x$. In this example, the material $M_z$ is stiffer than the material $M_x$ of the subshell $85_x$. Moreover, the material $M_z$ may have a density that is different (e.g., greater or less than) from a density of the material $M_x$ of the subshell $85_x$. In this example, the material $M_z$ is denser than the material $M_x$ of the subshell $85_x$. In particular, the inserts $415_1$-$415_N$ may modify the torsional characteristics of the skate boot 22 such that the skate boot 22 responds to torsional forces differently than if the subshell $85_x$ did not comprise the inserts $415_1$-$415_N$.

The inserts $415_1$-$415_N$ may thus be distributed to achieve a desired performance of the skate boot 22. For example, FIGS. 210 to 215 show different potential distributions of the inserts $415_1$-$415_N$. It is understood that the inserts $415_1$-$415_N$ may be positioned differently in other embodiments.

Figure 216:
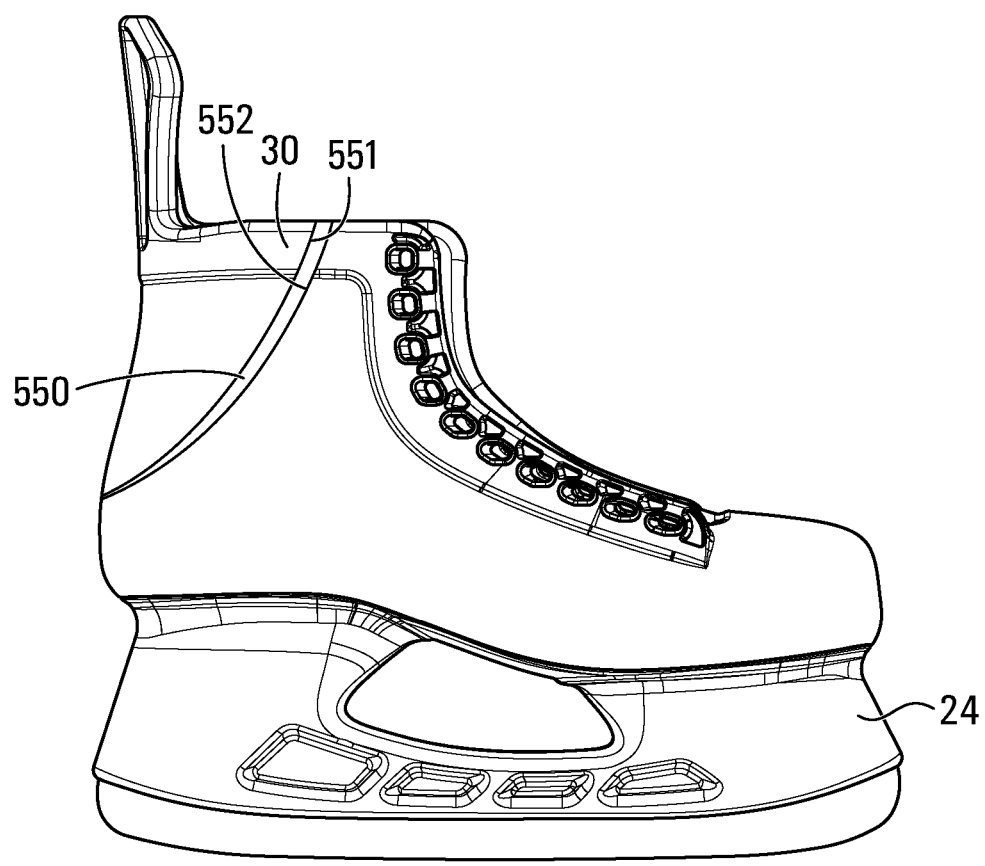
FIG. 216 shows an example of a variant in which the shell and/or the blade holder and/or other components made integrally with the shell comprises an opening configured to modify a performance of the skate boot.

In some cases, rather than filling the void formed in the subshell $85_x$, the void may be left unfilled. This may modify the torsional characteristics of the skate boot 22. For example, as shown in FIG. 216, the void left in the subshell $85_x$ may form an opening 550 that can extend to an edge of the shell 30, such as the lateral or medial edges 45, 47 of the shell 30. The opening 550 comprises opposite edges 551, 552 which converge towards one another at a proximal end and are distanced from one another at a distal end. In some cases, the torsional behavior of the skate boot 22 modified by the opening 550 may allow the opposite edges 551, 552 to contact one another at the distal end. The act of contacting one another may act as a limit to the movement of the shell 30 allowed by the opening 550 which was otherwise not possible by the shell 30 without the opening 550.

Figure 217:
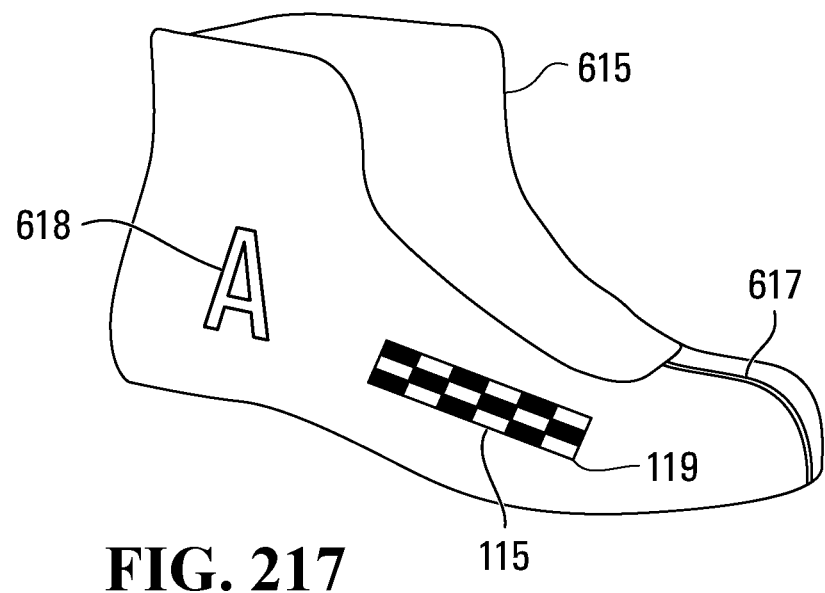
FIGS. 217 and 218 show an example of a variant in which a sheet is used during molding of the shell.
Figure 218:
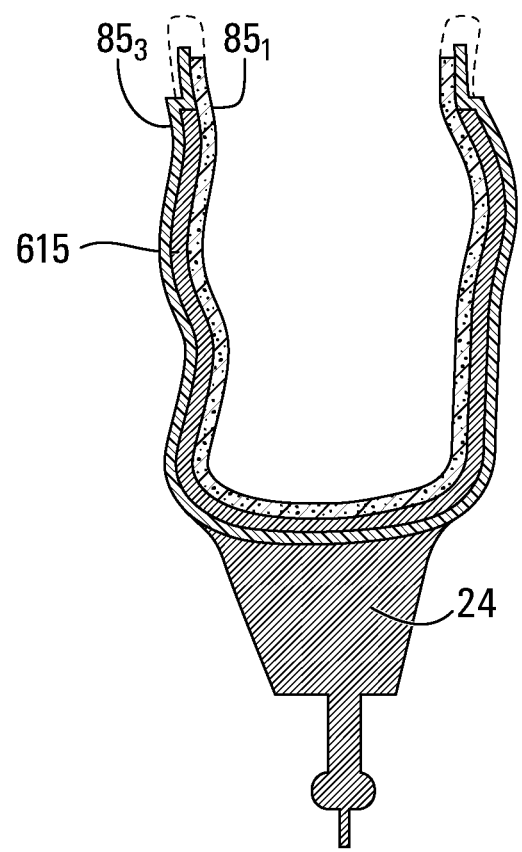

In another variant, with reference to FIGS. 217 and 218, the molding process of the shell 30 (and other components that are integrally made with the shell 30) may include using a sheet 615 (e.g., a film) which may be helpful to facilitate the molding process and/or to facilitate the addition of aesthetic features (e.g, designs) to the skate boot 22. In this embodiment, the sheet 615 is a polymeric sheet comprising a polymeric material such as a polycarbonate, polypropylene, polyethylene or any other suitable polymeric material. Moreover, in this example, the sheet 615 is a clear sheet (e.g., transparent or translucid) through which a person can see. In other examples, the sheet 615 may be opaque, colored (e.g., black, white or any other color), partially transparent, homogenous, and/or different at different areas.

In an example, the sheet 615 is overlaid on one or more of the formed subshells $85_1$-$85_L$ such as to acquire a shape of the underlying subshell $85_x$ (e.g., by thermoforming the sheet 615). In this example, the sheet 615 extends over at least a majority of the subshell $85_x$. In some cases, the sheet 615 may extend over substantially an entirety of the subshell $85_x$. The sheet 615 may then be sealed (e.g., heat sealed) to form a seam 617. A female mold $154_x$ is then installed over the formed subshells $85_1$-$85_L$ and a material $M_y$ of the subsequent subshell $85_y$ is injected between the sheet 615 and the underlying subshell $85_x$. Once the subshell $85_y$ has cured a desired amount, the subshell $85_y$ is demolded from the mold $154_x$. The sheet 615 may allow the molding process of the subshell $85_y$ to be faster than if no sheet was used.

Notably, the presence of the sheet 615 between the material $M_y$ and the female mold $154_x$ may allow faster removal of the subshell $85_y$ therefrom as the subshell $85y$ can be removed from the mold $154_x$ without the material $M_y$ having to have gone through its full polymerization. In contrast, if no sheet was used during the molding process, early removal of the subshell $85_y$ from the mold $154_x$ may compromise the quality of the subshell $85_y$ (e.g., it may be deformed). Furthermore, due to the presence of the sheet 615 between the material $M_y$ and the female mold $154_x$, the molding process may not require the addition of a mold release agent on surfaces of the mold $154_x$ which is typically included to facilitate demolding. As such, the presence of the sheet 615 facilitates demolding of the subshells $85_1$-$85_L$ from the female mold $154_x$ without using a mold release agent. This may also decrease imperfections in the subshell $85_y$ since mold release agents, while useful, have a tendency to introduce imperfections in a molded product. Moreover, if fewer imperfections are formed, this may improve bonding between a subsequent subshell $85_z$ (that is molded over the subshell $85_y$) and the subshell $85_y$.

Once the subshell $85_y$ is molded, the sheet 615 may be disposed of and a new sheet 615 used in a similar manner to mold a subsequent subshell if any. Due to the relatively low cost of manufacturing the sheet 615, using the sheet 615 in the molding process may inexpensively increase quality of the subshells $85_1$-$85_L$ formed therewith.

In another example, the sheet 615 may not be disposed of after molding. Instead, as shown in FIG. 218, the sheet 615 may be affixed to the shell 30 such as, for example, being integrated as a layer between given ones of the subshells $85_1$-$85_L$. In this example, the sheet 615 is formed over the subshell $85_1$ and the subshell $85_3$ is molded over the sheet 615. In examples where the subshell $85_3$ overlying the sheet 615 is a clear subshell (e.g., transparent or translucent), this may be useful to display the sheet 615 in the finished product. Notably, the sheet 615 may comprise one or more design elements 618. The design element 618 may constitute a graphic, a color, a pattern, a word, a letter, a symbol or any other desired visual element. The design element 618 may be provided on the sheet 615 in any suitable way. For example, the design element 618 may be provided on the sheet 615 via silk-screening, pad printing, flexo printing or offset printing, or any other printing (e.g., jet print, water decal, sublimation, ink transfer, laser, airbrushing, etc.). The presence of the design element 618 may on the sheet 615 may allow to hide or otherwise obscure visual imperfections in the subshells $85_1$-$85_L$ which do not affect the mechanical properties of the subshells $85_1$-$85_L$. The use of the sheet 615 may also allow the skate 10 to have a design element without adding significant material to the skate 10, thus reducing the weight of the skate compared to other skates that have a design element. In some cases, the sheet 615 with the design element 618 may be implemented as a permanent film. In other cases, the sheet 615 with the design element 618 may be implemented as a release film having a releasable layer that is removable and ink constituting the design element 618 that remains on the shell 30. Alternatively or additionally, the sheet 615 may comprise the reinforcement 115 (such as the ribs $117_1$-$117_R$ or the reinforcing sheet 119) which may be affixed thereto in any suitable way (e.g., gluing, stitching, welding, mechanical interlock, etc.).

In another example, the sheet 615 is formed over the subshell $85_1$ and the subshell $85_3$ is molded over the sheet 615 and the subshell $85_1$ is a clear subshell, such that the design element 918 of the sheet 915 appears on the inner side of the skate boot 22.

Figure 219:
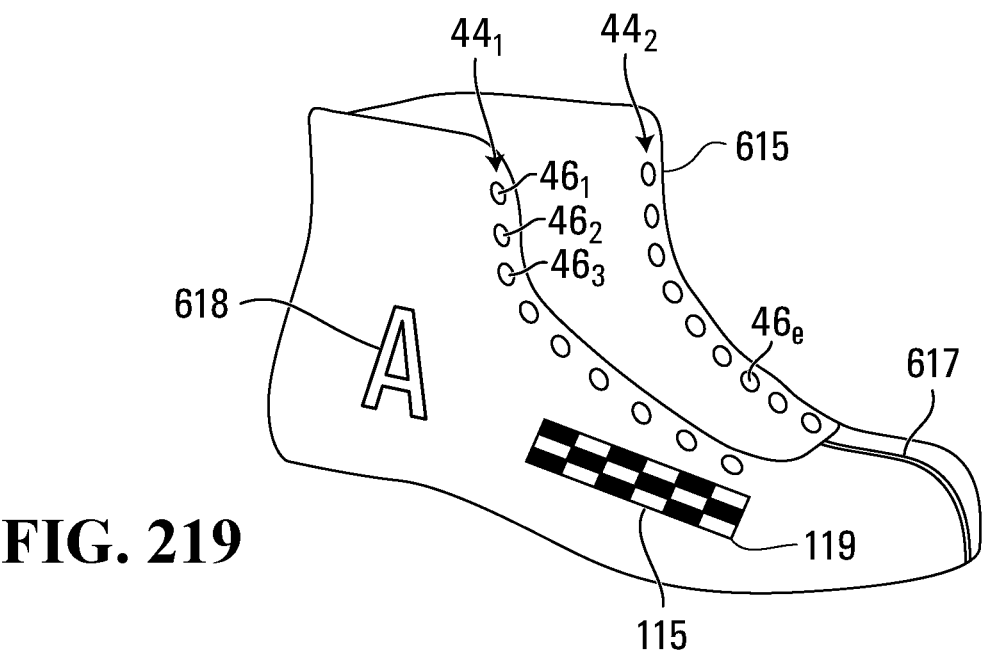
FIG. 219 shows show an example of a variant in which the sheet comprises lace members and eyelets.

As shown in FIG. 219, the sheet 615 may cover various portions of the skate boot 22, including the lace members $44_1$, $44_2$, the eyelets $46_1$-$46_e$, and so on.

In the example of FIGS. 217 and 218, the sheet 615 is configured to span the shell 30 and the toe cap 32. In other examples, the sheet 615 may be configured to span the shell 30, the blade holder 24, the toe cap 32, the lace members $44_1$, $44_2$ or any other components of the skate boot 22. Furthermore, the sheet 615 may constitute at least part of an external surface of the skate boot 22. In other words, the sheet 615 may be exposed, not only visually, but physically (i.e., it can be touched). Moreover, in some cases, the sheet 615 may constitute a majority of the external surface of the skate boot 22. For example, the sheet 615 may constitute substantially an entirety of the external surface of the skate boot 22.

While in the examples given, the sheet 615 has been shown as being disposed between the subshells $85_1$-$85_L$, in other examples the sheet 615 may be disposed between the inner liner 36 and the internal subshell $85_1$.

As another example, in some embodiments, the sheet 615 may be placed in the cavity 156 of the female mold $154_1$ on the inner surface of the female mold $154_1$ before molding the polymeric material $M_1$ on the last 152 to form the internal subshell $85_1$ of the shell 30. This may allow molding of the polymeric material $M_1$ to form the internal subshell $85_1$ and subsequent demolding without using a mold release agent.

As yet another example, in some embodiments, the sheet 615 may be placed on the last 152 before molding the polymeric material $M_1$ to form the internal subshell $85_1$ of the shell 30.

In some cases, the sheet 615 may be applied in planar form onto the last 152 or a given one of the subshells $85_1$-$85_L$ that is already molded to acquire the shape of the last 152 or that given one of the subshells $85_1$-$85_L$. In other cases, the sheet 615 may be preformed in a non-planar form conforming to the shape of the last 152 or a given one of the subshells $85_1$-$85_L$ before being placed on the last 152 or the given one of the subshells $85_1$-$85_L$.

The sheet 615 may reduce or eliminate parting lines on the shell 30 (i.e., internal and/or external parting lines). For example, the sheet 615 may be configured to avoid at least one parting line on the shell 30 that would otherwise result because of the portions 155, 157 of a given one of the female molds $154_1$-$154_3$ if the sheet 615 was omitted. This allows one or more parting lines to be avoided as the sheet 615 overlies where these one or more parting lines would otherwise be located.

Figure 220:
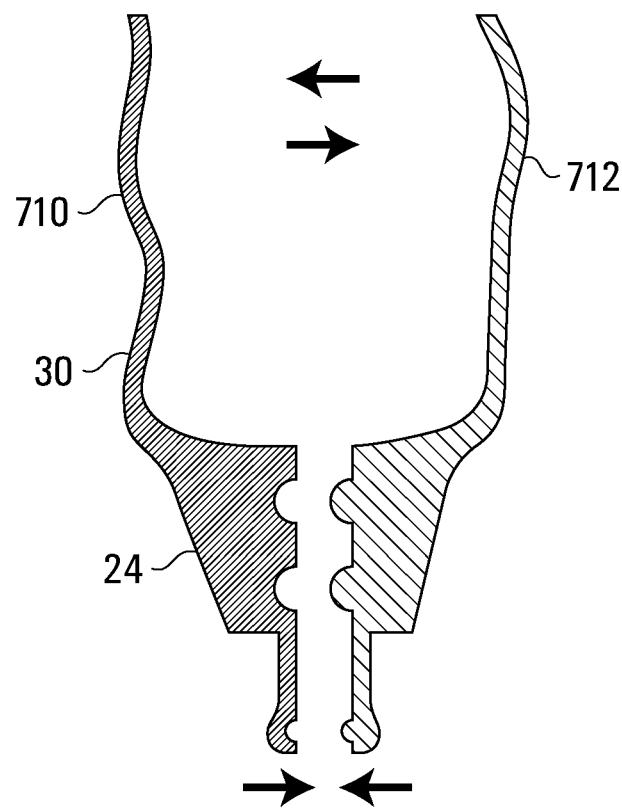
FIGS. 220 to 223 show examples of a variant in which the shell and/or blade holder and/or other components made integrally with the shell are molded as separate pieces which are then assembled together.
Figure 221:
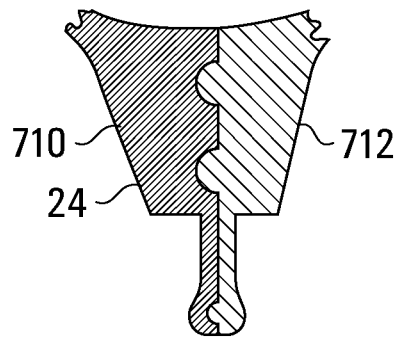
Figure 222:
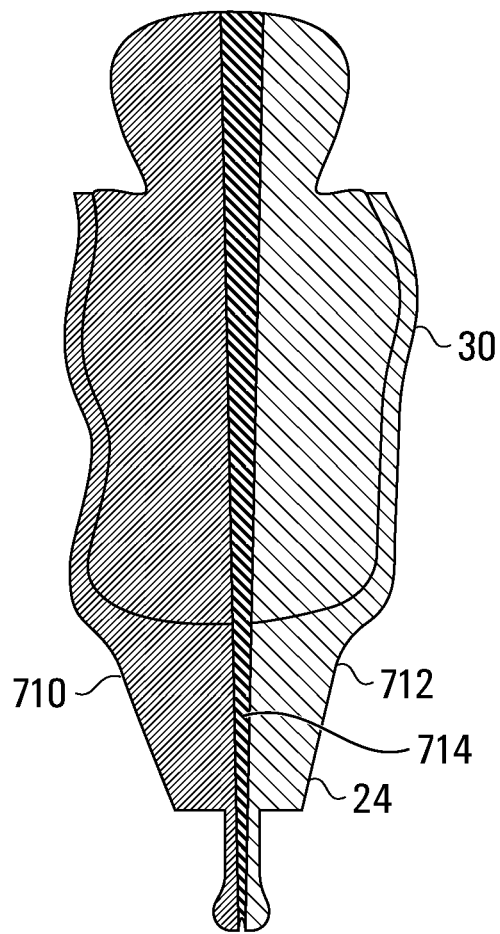
Figure 223:
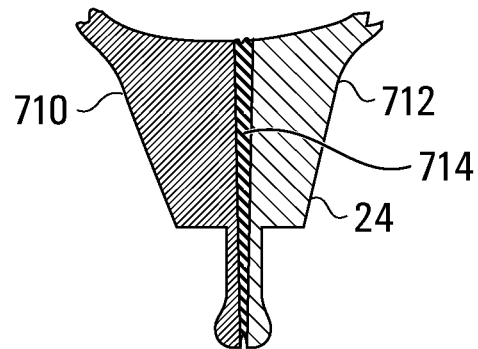

In a variant, as shown in FIGS. 220 to 223, rather than integrally molding the shell 30 as a single piece, the shell 30 may be molded in a plurality of pieces 710, 712 and the pieces may then be joined together. For example, this may allow using processes other than injection molding, notably such as casting or other molding methods. Moreover, the pieces 710, 712 may be configured to interlock with one another. Notably, the pieces 710, 712 may comprise protrusions and corresponding recesses for fitting the protrusions such as to interlock the pieces 710, 712 with one another. An adhesive may be applied between the pieces 710, 712 to permanently affix the pieces 710, 712 to one another. As shown in FIG. 220, each of the pieces 710, 712 may constitute a part of the shell 30 and the blade holder 24. In some cases, as shown in FIG. 221, each of the pieces 710, 712 may constitute a part of only the shell 30 or only the blade holder 24. As shown in FIGS. 222 and 223, the pieces may include three or more pieces 710, 712, 714.

In another variant, one or more of the subshells $85_1$-$85_L$ may be sprayed or painted rather than injection molded. For instance, this may allow to more easily form thinner subshells $85_1$-$85_L$ (e.g., of 0.1 mm). Similarly, in another variant, material may be applied between some of the subshells $85_1$-$85_L$ to enhance bonding of the subshells $85_1$-$85_L$. For instance, in some embodiments, the material comprises an adhesive which may be sprayed over a given one of the subshells $85_1$-$85_L$ before a subsequent one of the subshells $85_1$-$85_L$ is molded. For instance, the subshell $85_3$ may be a coating and the adhesive may be sprayed over the subshell $85_2$ before the subshell $85_3$ is formed to enhance bonding of the coating $85_3$. In this example, the adhesive is compatible with polyurethane plastics. More specifically, the adhesive may be compatible with thermoplastic polyurethanes and may comprise relatively low solvent contents. In some embodiments, the adhesive comprises a primer.

Figure 224:
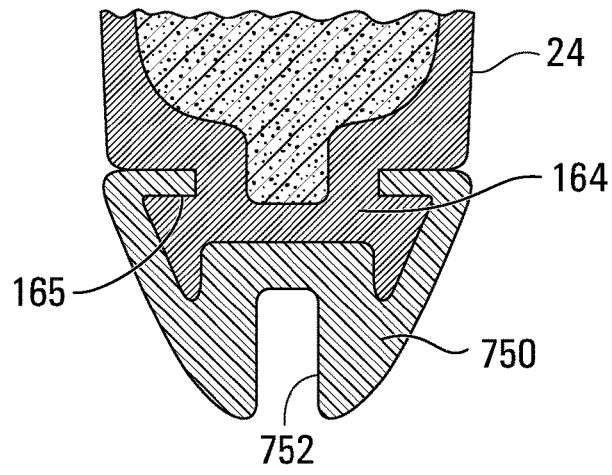
FIG. 224 shows an example of a variant in which the blade holder comprises an insert for receiving the blade.

In another variant, as shown in FIG. 224, the blade holder 24 may comprise an insert 750 configured to receive the blade 26. The insert 750 is affixed to the lower portion 162 of the blade holder 24 in any suitable manner. In this example, the insert 750 comprises projections that interlock into recesses 165 of the blade holder 24. The insert 750 further comprises a recess 752 configured to receive the blade 26. The insert 750 may be made integral with the lower portion 162 of the blade holder 24 by inserting it into a corresponding mold during molding of the blade holder 24. Alternatively, the insert 750 may be affixed to the lower portion 162 of the blade holder 24 after the lower portion 162 has already been formed. The insert 750 comprises a reinforced material that is stronger and/or stiffer than a material of the lower portion 162 of the blade holder 24. For example, the reinforced material may be a composite material (e.g., a carbon fiber material).

Figure 225:
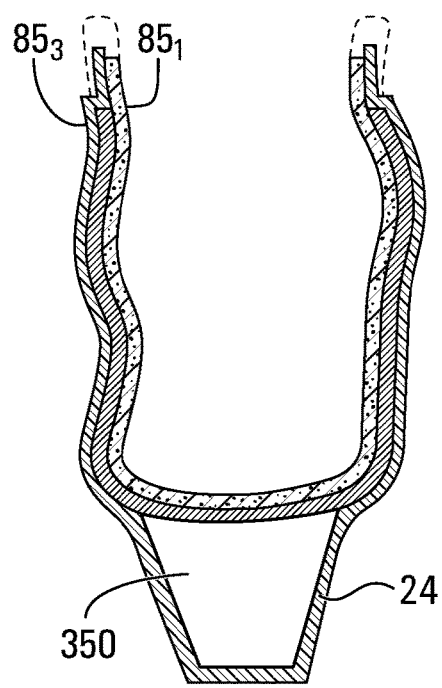
FIG. 225 shows an example of a variant in which the blade holder comprises a void.

In another variant, as shown in FIG. 225, the blade holder 24 may comprise a void 350 in one of its front and rear pillars 210, 212. More particularly, in this example, the void 350 of the blade holder 24 may be formed by separately molding the blade holder 24 with a molding insert, and removing the molding insert after molding the blade holder 24 to obtain a cavity in the blade holder 24. Thus, once the blade holder 24 is assembled with the shell 30, the blade holder 24 comprises the void 350 which is contained between surfaces of the blade holder 24 and the sole portion 69 of the shell 30. In another example, rather than leaving the cavity of the blade holder 24 as a void, an insert, such as the insert $315_1$, may be placed in the cavity and the blade holder 24 secured to the shell 30 such that the insert $315_1$ is contained between inner surfaces of a body of the blade holder 24 and a surface of the sole portion 69 of the shell 30.

In another variant, the exterior subshell $85_3$ may be configured to extend into the recess 190 of the blade-retention portion 188 of the blade-retaining base 164 of the blade holder 24. As such, the subshell $85_3$ may contact the blade 26 as it is inserted into the recess 190. This may be useful in examples where the exterior subshell $85_3$ is relatively rigid as it may provide compaction resistance when the blade 26 is inserted in the recess 190.

Figure 226:
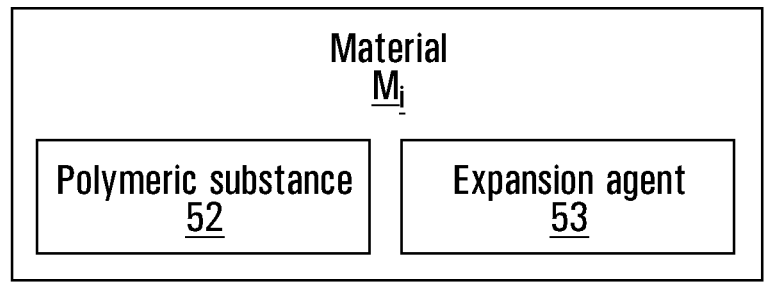
FIG. 226 shows an example of an embodiment in which a material of a given subshell comprises a polymeric substance and an expansion agent.
Figure 227:
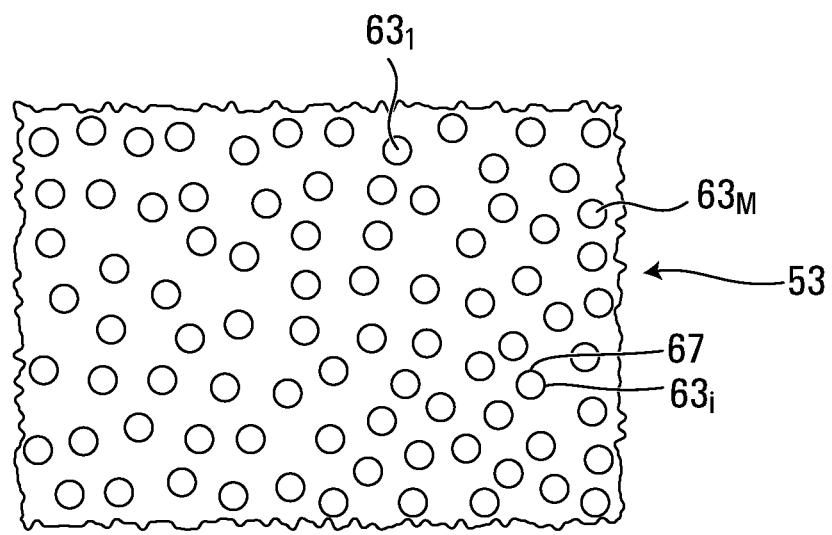
FIG. 227 shows an example of the expansion agent of FIG. 226.
Figure 228:
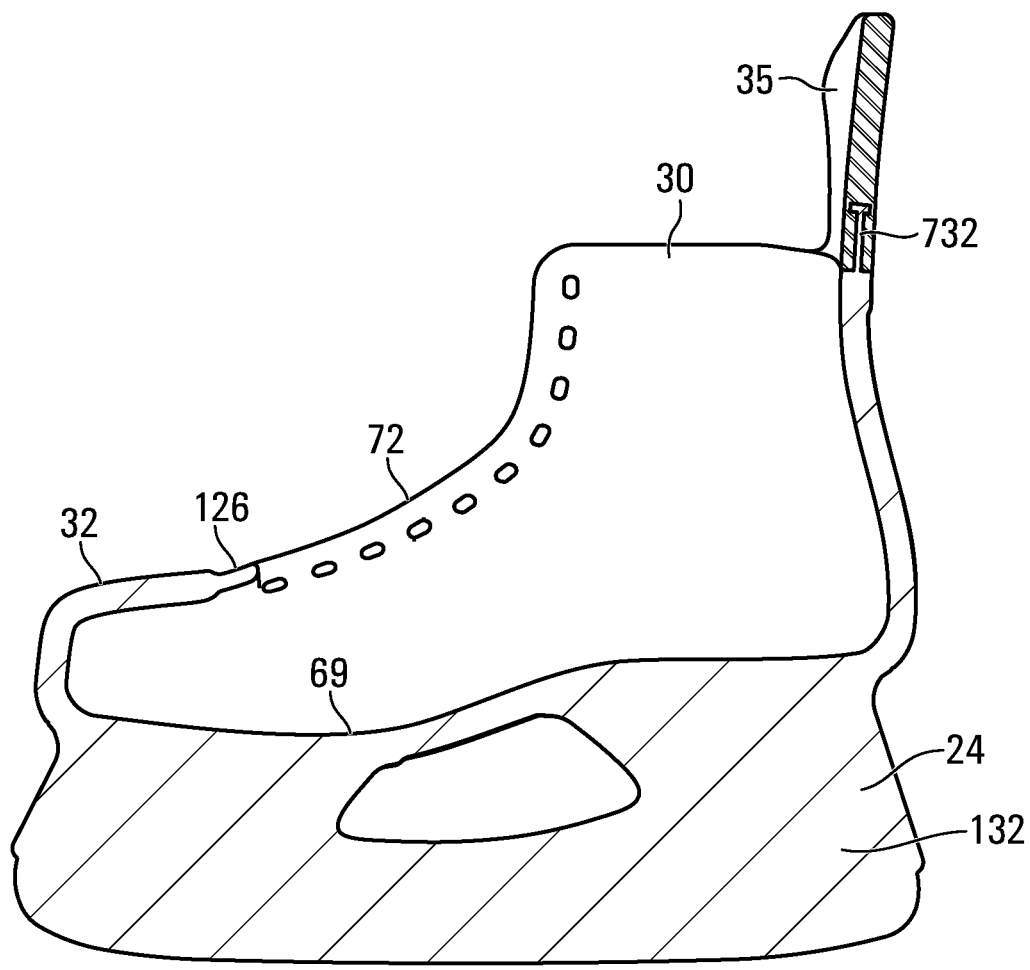
FIGS. 228 to 230E show examples of variants in which the tendon guard is overmolded on the shell.
Figure 229A:
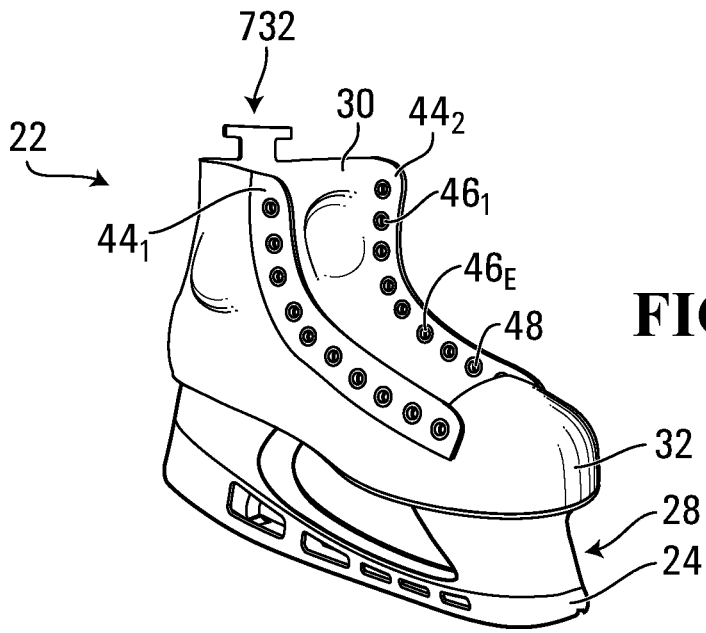
Figure 229B:
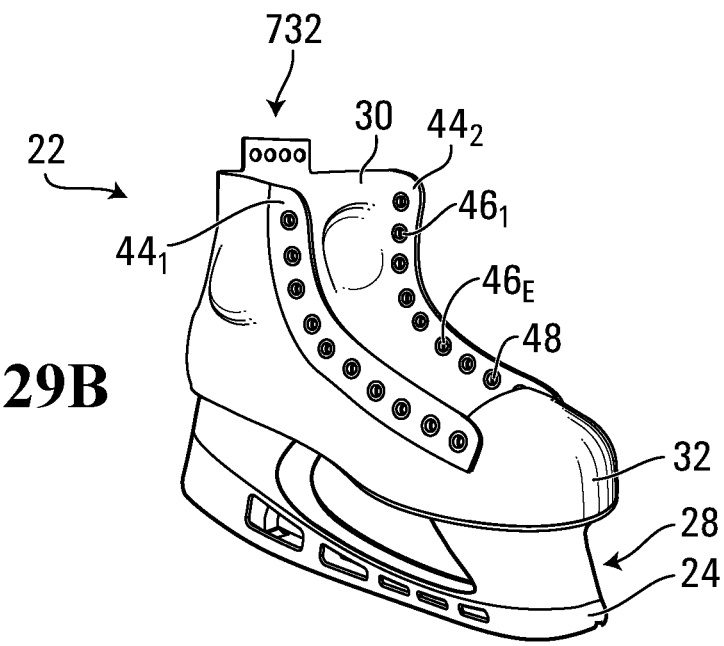

In some embodiments, as shown in FIGS. 226 and 227, the material $M_i$ of a subshell $85_x$ of the skate boot 22 may comprise a mixture of a polymeric substance 52 and an expansion agent 53. This may help the material $M_i$ to have desirable properties, such as being more shock-absorbent than it if was entirely made of the expansion agent 53 and/or being lighter than if it was entirely made of the polymeric substance 52.

The polymeric substance 52 constitutes a substantial part of the material $M_i$ and substantially contributes to structural integrity to the subshell $85_x$. For instance, in some embodiments, the polymeric substance 52 may constitute at least 40%, in some cases at least 50%, in some cases at least 60%, in some cases at least 70%, in some cases at least 80%, and in some cases at least 90% of the material $M_i$ by weight. In this example of implementation, the polymeric substance 52 may constitute between 50% and 90% of the material $M_i$ by weight.

In this embodiment, the polymeric substance 52 may be an elastomeric substance. For instance, the polymeric substance 52 may be a thermoplastic elastomer (TPE) or a thermoset elastomer (TSE).

More particularly, in this embodiment, the polymeric substance 52 comprises polyurethane. The polyurethane 52 may be composed of any suitable constituents such as isocyanates and polyols and possibly additives. For instance, in some embodiments, the polyurethane 52 may have a hardness in a scale of Shore 00, Shore A, Shore C or Shore D, or equivalent. For example, in some embodiments, the hardness of the polyurethane 52 may be between Shore 5A and 95A or between Shore 40D to 93D. Any other suitable polyurethane may be used in other embodiments.

The polymeric substance 52 may comprise any other suitable polymer in other embodiments. For example, in some embodiments, the polymeric substance 52 may comprise silicon, rubber, etc.

The expansion agent 53 is combined with the polyurethane 52. In some cases, this may be done to enhance properties of the material $M_i$. Alternatively or additionally, in some cases, this may be done to enable expansion of the material $M_i$ to a final shape of the subshell $85_x$ in the mold $154_x$. For instance, in some embodiments, the expansion agent 54 may constitute at least 10%, in some cases at least 20%, in some cases at least 30%, in some cases at least 40%, in some cases at least 50%, in some cases at least 60%, of the material $M_i$ by weight and in some cases even more. In this example of implementation, the expansion agent 54 may constitute between 15% and 50% of the material $M_i$ by weight.

In this embodiment, as shown in FIG. 227, the expansion agent 53 comprises an amount of expandable microspheres $63_1$-$63_M$. Each expandable microsphere $63_i$ comprises a polymeric shell 67 expandable by a fluid encapsulated in an interior of the polymeric shell 67. In this example of implementation, the polymeric shell 67 of the expandable microsphere $63_i$ is a thermoplastic shell. The fluid encapsulated in the polymeric shell 67 is a liquid or gas (in this case a gas) able to expand the expandable microsphere $63_i$ when heated during manufacturing of the subshell $85_x$. In some embodiments, the expandable microspheres $63_1$-$63_M$ may be Expancel™ microspheres commercialized by Akzo Nobel. In other embodiments, the expandable microspheres $63_1$-$63_M$ may be Dualite microspheres commercialized by Henkel; Advancell microspheres commercialized by Sekisui; Matsumoto Microsphere microspheres commercialized by Matsumoto Yushi Seiyaku Co; or KUREHA Microsphere microspheres commercialized by Kureha. Various other types of expandable microspheres may be used in other embodiments.

In this example of implementation, the expandable microspheres $63_1$-$63_M$ include dry unexpanded (DU) microspheres when combined with the polymeric substance 52 to create the material $M_i$ before the material $M_i$ is molded. For instance, the dry unexpanded (DU) microspheres may be provided as a powder mixed with one or more liquid constituents of the polymeric substance 52.

The expandable microspheres $63_1$-$63_M$ may be provided in various other forms in other embodiments. For example, in some embodiments, the expandable microspheres $63_1$-$63_M$ may include dry expanded, wet and/or partially-expanded microspheres. For instance, wet unexpanded microspheres may be used to get better bonding with the polymeric substance 52. Partially-expanded microspheres may be used to employ less of the polymeric substance 52, or mix with the polymeric substance 52 in semi-solid form.

In some embodiments, the expandable microspheres $63_1$-$63_M$ may constitute at least 10%, in some cases at least 20%, in some cases at least 30%, in some cases at least 40%, in some cases at least 50%, and in some cases at least 60% of the material $M_i$ by weight and in some cases even more. In this example of implementation, the expandable micropsheres $63_1$-$63_M$ may constitute between 15% and 50% of the material $M_1$ by weight.

The subshell $85_x$ comprising the material $M_i$ with the polymeric substance 52 and the expandable microspheres $63_1$-$63_M$ may have various desirable qualities.

For instance, in some embodiments, the subshell $85_x$ may be less dense and thus lighter than if it was entirely made of the polyurethane 52, yet be more shock-absorbent and/or have other better mechanical properties than if it was entirely made of the expandable microspheres $63_1$-$63_M$.

For example, in some embodiments, a density of the material $M_i$ may be less than a density of the polyurethane 52 (alone). For instance, the density of the material $M_i$ of the subshell $85_x$ may be no more than 70%, in some cases no more than 60%, in some cases no more than 50%, in some cases no more than 40%, in some cases no more than 30%, in some cases no more than 20%, in some cases no more than 10% and in some cases no more than 5% of the density of the polyurethane 52 and in some cases even less. For example, in some embodiments, the density of the material $M_i$ may be between 2 to 75 times less than the density of the polyurethane 52 (i.e., the density of the material $M_i$ may be about 1% to 50% of the density of the polyurethane 52).

The density of the material $M_i$ may have any suitable value. For instance, in some embodiments, the density of the material $M_i$ may be no more than 0.7 g/cm$^3$, in some cases no more than 0.4 g/cm$^3$, in some cases no more than 0.1 g/cm$^3$, in some cases no more than 0.080 g/cm$^3$, in some cases no more than 0.050 g/cm3, in some cases no more than 0.030 g/cm$^3$, and/or may be at least 0.010 g/cm$^3$. In some examples of implementation, the density of the material $M_i$ may be between 0.015 g/cm$^3$ and 0.080 g/cm$^3$, in some cases between 0.030 g/cm$^3$ and 0.070 g/cm$^3$, and in some cases between 0.040 g/cm$^3$ and 0.060 g/cm$^3$.

As another example, in some embodiments, a stiffness of the material $M_i$ may be different from (i.e., greater or less than) a stiffness of the expandable microspheres $63_1$-$63_M$ (alone). For instance, a modulus of elasticity (i.e., Young's modulus) of the material $M_i$ may be greater or less than a modulus of elasticity of the expandable microspheres $63_1$-$63_M$ (alone). For instance, a difference between the modulus of elasticity of the material $M_i$ and the modulus of elasticity of the expandable microspheres $63_1$-$63_M$ may be at least 20%, in some cases at least 30%, in some cases at least 50%, and in some cases even more, measured based on a smaller one of the modulus of elasticity of the material $M_i$ and the modulus of elasticity of the expandable microspheres $63_1$-$63_M$. In some cases, the modulus of elasticity may be evaluated according to ASTM D-638 or ASTM D-412.

As another example, in some embodiments, a resilience of the material $M_i$ may be less than a resilience of the expandable microspheres $63_1$-$63_M$ (alone). For instance, in some embodiments, the resilience of the material $M_i$ may no more than 70%, in some cases no more than 60%, in some cases no more than 50%, in some cases no more than 40%, in some cases no more than 30%, and in some cases no more than 20%, and in some cases no more than 10% of the resilience of the expandable microspheres $63_1$-$63_M$ according to ASTM D2632-01 which measures resilience by vertical rebound. In some examples of implementation, the resilience of the material $M_i$ may be between 20% and 60% of the resilience of the expandable microspheres $63_1$-$63_M$. Alternatively, in other embodiments, the resilience of the material $M_i$ may be greater than the resilience of the expandable microspheres $63_1$-$63_M$.

The resilience of the material $M_i$ may have any suitable value. For instance, in some embodiments, the resilience of the material $M_i$ may be no more than 40%, in some cases no more than 30%, in some cases no more than 20%, in some cases no more than 10%, and in some cases even less (e.g., 5%), according to ASTM D2632-01, thereby making the subshell $85_x$ more shock-absorbent. In other embodiments, the resilience of the material $M_i$ may be at least 60%, in some cases at least 70%, in some cases at least 80% and in some cases even more, according to ASTM D2632-01, thereby making the material $M_i$ provide more rebound.

As another example, in some embodiments, a tensile strength of the material $M_i$ may be greater than a tensile strength of the expandable microspheres $63_1$-$63_M$ (alone). For instance, in some embodiments, the tensile strength of the material $M_i$ may be at least 120%, in some cases at least 150%, in some cases at least 200%, in some cases at least 300%, in some cases at least 400%, and in some cases at least 500% of the tensile strength of the expandable microspheres $63_1$-$63_M$ according to ASTM D-638 or ASTM D-412, and in some cases even more.

The tensile strength of the material $M_i$ may have any suitable value. For instance, in some embodiments, the tensile strength of the material $M_i$ may be at least 0.9 MPa, in some cases at least 1 MPa, in some cases at least 1.2 MPa, in some cases at least 1.5 MPa and in some cases even more (e.g., 2 MPa or more).

As another example, in some embodiments, an elongation at break of the material $M_i$ may be greater than an elongation at break of the expandable microspheres $63_1$-$63_M$ (alone). For instance, in some embodiments, the elongation at break of the expandable material $M_i$ may be at least 120%, in some cases at least 150%, in some cases at least 200%, in some cases at least 300%, in some cases at least 400%, and in some cases at least 500% of the elongation at break of the expandable microspheres $63_1$-$63_M$ according to ASTM D-638 or ASTM D-412, and in some cases even more.

The elongation at break of the material $M_i$ may have any suitable value. For instance, in some embodiments, the elongation at break of the material $M_i$ may be at least 20%, in some cases at least 30%, in some cases at least 50%, in some cases at least 75%, in some cases at least 100%, and in some cases even more (e.g. 150% or more).

In some embodiments, a material of the shell 30 (e.g., a given one of the materials $M_1$-$M_N$) may be a composite material. For example, the composite material may be a fiber-matrix composite material that comprises a matrix in which fibers are embedded. The matrix may include any suitable polymeric resin, such as a thermosetting polymeric material (e.g., polyester, vinyl ester, vinyl ether, polyurethane, epoxy, cyanate ester, etc.), a thermoplastic polymeric material (e.g., polyethylene, polyurethane, polypropylene, acrylic resin, polyether ether ketone, polyethylene terephthalate, polyvinyl chloride, polymethyl methacrylate, polycarbonate, acrylonitrile butadiene styrene, nylon, polyimide, polysulfone, polyamide-imide, self-reinforcing polyphenylene, etc.), or a hybrid thermosetting-thermoplastic polymeric material. The fibers may be made of any suitable material such as carbon fibers, polymeric fibers such as aramid fibers, boron fibers, glass fibers, ceramic fibers, etc.

As another example, as shown in FIGS. 228 to 230E, in some embodiments, the tendon guard 35 may be affixed to the shell 30 of the skate boot 22 by overmolding. This may provide various advantages, such as: allowing the use of a material for the tendon guard 35 that is different from the materials of the shell 30 of the skate boot 22; allowing the tendon guard 35 to have a stiffness that is more appropriate (e.g., lower) for its use; enhancing durability and reducing occurrence of breakage of the tendon guard 35; etc. In this example, the tendon guard 35 is overmolded on a portion 732 of the shell 30 of the skate boot 22. More specifically, the body 30 of the skate boot 22 comprises the portion 732 having a shape facilitating overmolding such as by being configured for creating a mechanical interlock after overmolding. In this example, the portion 732 is an interlocking hollow space and the tendon guard 35 comprises an interlocking part extending in the interlocking hollow space 732 to interlock the tendon guard 35 and the shell 30. More specifically, in some embodiments, the portion 732 of the shell 30 comprises recesses and projection creating a mechanical interlock holding the tendon guard 35 and the shell 30 together after the tendon guard 35 is overmolded on the shell 30, as shown in FIG. 229A. In some embodiments, also, the portion 732 of the shell 30 comprises voids or holes creating the mechanical interlock holding the tendon guard 35 and the shell 30 together after the tendon guard 35 is overmolded on the shell 30, as shown in FIG. 229B.

Figure 230A:
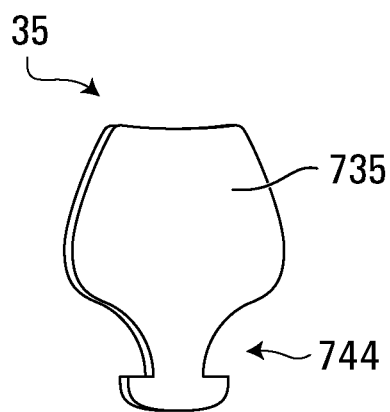
Figure 230B:
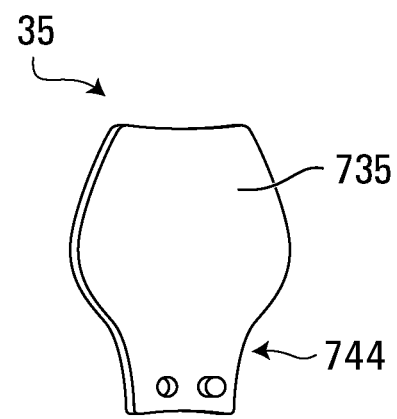
Figure 230C:
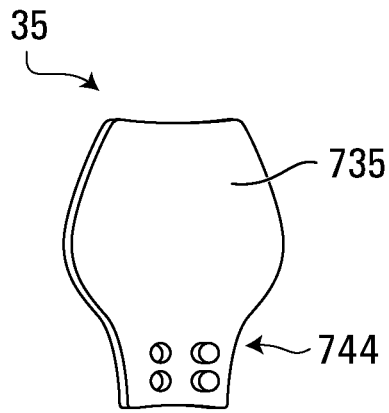

In some embodiments, instead of having the tendon guard 35 being overmolded on the shell 30 of the skate boot 22, the shell 30 of the skate boot 22 is overmolded onto the tendon guard 35. More specifically, in this embodiment, respective ones of the subshells $85_1$-$85_3$ are overmolded onto the tendon guard 35. For instance, the tendon guard 35 may comprise a portion 744 having a shape facilitating overmolding such as by being configured for creating a mechanical interlock after overmolding. In this example, the portion 744 is an interlocking hollow space and the shell 30 of the skate boot 22 comprises an interlocking part extending in the interlocking hollow space to interlock the tendon guard 35 and the shell 30. More specifically, in some embodiments, the portion 744 of the tendon guard 35 comprises recesses and projection creating a mechanical interlock holding the tendon guard 35 and the shell 30 together after the respective ones of the subshells $85_1$-$85_3$ of the shell 30 are overmolded on the tendon guard 35. In some embodiments, also, the portion 744 of the tendon guard 35 comprises voids or holes creating the mechanical interlock holding the tendon guard 35 and the shell 30 together after the tendon guard 35 is overmolded on the shell 30, as shown in FIGS. 230B and 230C.

In this embodiment, the portion 744 is a lower portion affixed to the shell 30 by overmolding of the at least one of the subshells $85_1$-$85_3$ and the tendong guard 35 also comprises an upper portion free of overmolding.

In this embodiment, the tendon guard 35 comprises a material 734 that is different from the materials $M_1$-$M_L$ of the shell 30 of the skate boot 22 at the overmold. The material 734 may be more flexible (i.e., less stiff) to increase comfort of the skate boot 22 and to increase durability. For instance, in some embodiments, a ratio of a modulus of elasticity of the material 734 over a modulus of elasticity of a given one of the materials $M_1$-$M_L$ of the shell 30 of the skate boot 22 may be no more than 0.9, in some embodiments no more than 0.7, in some embodiments no more than 0.5, in some embodiments even less.

The material 734 of the tendon guard 35 may be implemented in any suitable way. In this embodiment, the material 734 may be a polymeric material. For example, in this embodiment, the material 734 is a polyester elastomer including is a thermoplastic resin. Any other suitable polymer may be used in other embodiments (e.g., polypropylene, ethylene-vinyl acetate (EVA), nylon, polyurethane (PU), vinyl, polyvinyl chloride, polycarbonate, polyethylene, an ionomer resin (e.g., Surlyn®), styrene-butadiene copolymer (e.g., K-Resin®) etc.), self-reinforced polypropylene composite (e.g., Curve®), or any other thermoplastic or thermosetting polymer).

Figure 230D:
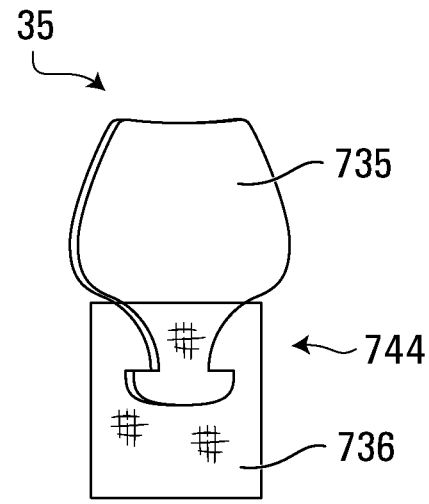
Figure 230E:
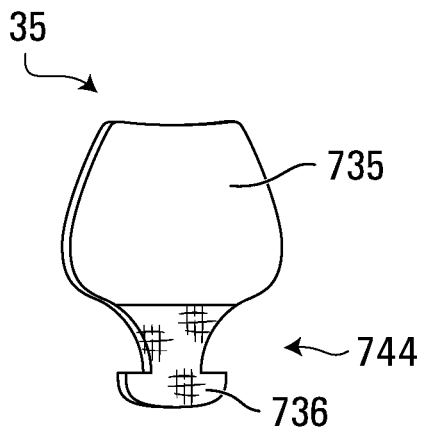

In some embodiments, as shown in FIGS. 230D and 230E, the material 734 of the tendon guard 35 may comprise one or more layers 736 of fabric to enhance overmolding, such as by creating a relief on a surface of the portion 744 of the tendon guard 35. In some embodiments, the layer 736 may be a woven layer, while in other embodiments, the layer 736 may be a non-woven layer. For instance, the fabric of the layer of fabric 736 may comprise nylon, cotton, polyester, glass fibers, carbon fibers and/or any suitable material.

Figure 231:
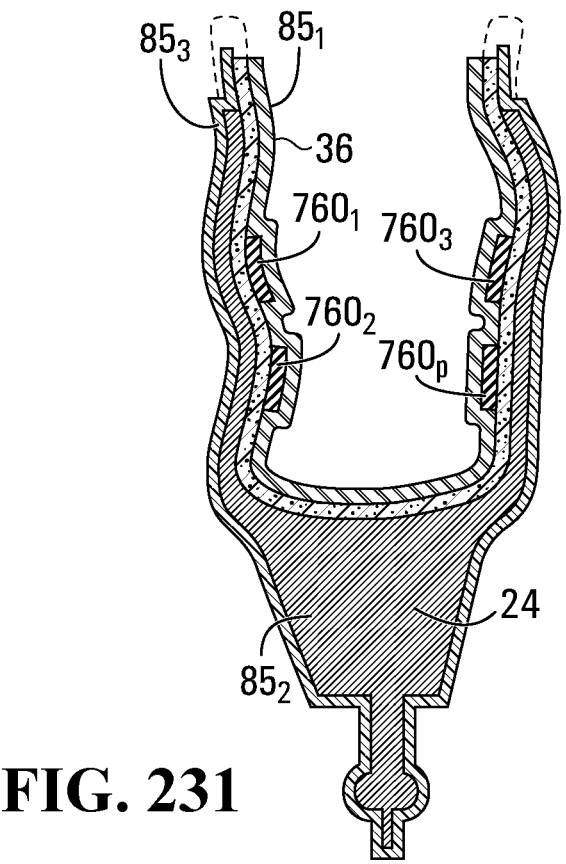
FIGS. 231 to 233 show examples of variants in which the skate boot comprises padding between the shell and the inner liner.

As another example, as shown in FIG. 231, in some embodiments, the shell 30 may comprise pads $760_1$-$760_P$ disposed at the ankle portion of the skate boot 22 and/or at any suitable portion of the skate boot 22 (e.g., at the medial side portion, at the lateral side portion, at the heel portion, etc.) to customize the inner shape of the skate boot 22 receiving the foot 11 of the user, to enhance comfort and fit, and/or for other purposes.

The shell 30 may comprise any suitable number (e.g., one, two or more) of pads $760_1$-$760_P$ spaced from one another. In some embodiments, the pads $760_1$-$760_P$ may be disposed between the shell 30 and the liner 36 of the skate boot 22. In some cases, the pads $760_1$-$760_P$ and the liner 36 may be integrated into the skate boot 22 during molding of the skate boot 22. For instance, during molding, the liner 36 may be applied over the last and the pads $760_1$-$760_P$ may be affixed to the liner 36 before the molding of the shell 30 to impart a customized shape to the molded shell 30. In some cases, also, the pads $760_1$-$760_P$ and the liner 36 may be integrated into the skate boot 22 after molding of the shell 30. For instance, the shell 30 of the skate boot 22 may be molded without the liner 36. The pads $760_1$-$760_P$ may then be affixed to the inner surface of the shell 30 by any suitable means, such as by being adhesively bonded to and/or being stitched to the shell 30. Optionally, the liner 36 may be affixed to the inner surface of the shell 30 and to the pads $760_1$-$760_P$ by any suitable means, such as by being adhesively bonded to and/or being stitched to the shell 30 and/or the pads $760_1$-$760_P$.

In other embodiments, the pads $760_1$-$760_P$ may be disposed between other elements of the skate boot 22, such as between adjacent ones of the subshells $85_1$-$85_I$ (e.g., between the intermediate subshell $85_2$ and the external subshell $85_3$ of the skate boot 22). For instance, after molding of some but not all of the subshells $85_1$-$85_I$, the pads $760_1$-$760_P$ may be affixed to the molded subshells $85_1$-$85_I$, and molding of remaining ones of the subshells $85_1$-$85_I$ may be achieved subsequently.

In this embodiment, the pads $760_1$-$760_P$ are shaped, manufactured and located based on information about a shape of the user's foot 11 to customize the skate boot 22 for the shape of the user's foot 11. For instance, information about a shape of a user's foot 11 may be measured manually or provided by an imaging system such as described in U.S. Patent Application No. 62/692,057, which is incorporated herein.

The pads $760_1$-$760_P$ may comprise lateral and medial ankle pads $760_1$, $760_2$ disposed between the liner 36 and the ankle portion 64 of the skate boot 22.

The pads $760_1$-$760_P$ may comprise any suitable material. For instance, a material of the pads $760_1$-$760_P$ may be soft enough (e.g., so that it can deform and does not prevent the foot 11 of the user from entering the cavity of the skate boot 22 and does not cause excessive pressure in use). In some embodiments, the material of the pads $760_1$-$760_P$ may be softer or less stiff than a foam or another material of an underlying one of the subshells $85_1$-$85_I$ of the skate boot 22. For instance, the material of the pads $760_1$-$760_P$ may comprise foam.

The pads $760_1$-$760_P$ may have any suitable shape. For instance, a thickness of the pads $760_1$-$760_P$ may be greater than a thickness of a given one of the subshells $85_1$-$85_I$ such that the pads $760_1$-$760_P$ have a significant impact on the inner shape of the skate boot 22 and/or on the cavity of the skate boot 22. For example, in some embodiments, a ratio of the thickness of a given one of the pads $760_1$-$760_P$ over the thickness of the internal subshell $85_1$ at the location of the given one of the pads $760_1$-$760_P$ may be at least 1.1, in some embodiments at least 1.5, in some embodiments at least 2, in some embodiments at least 3, in some embodiments even more. In some embodiments, also, the thickness of the pads $760_1$-$760_P$ may vary in order to conform to the shape of the user's foot 11.

Figure 232:
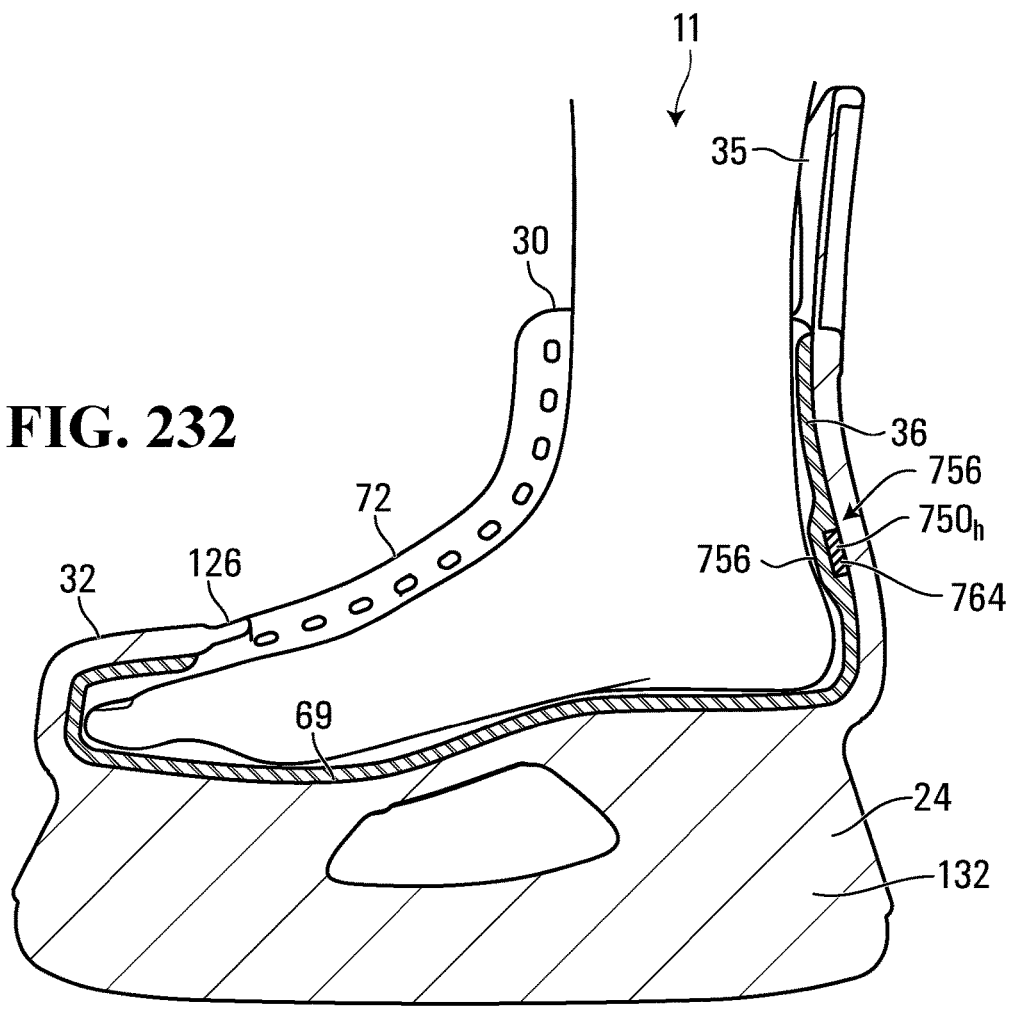
Figure 233:
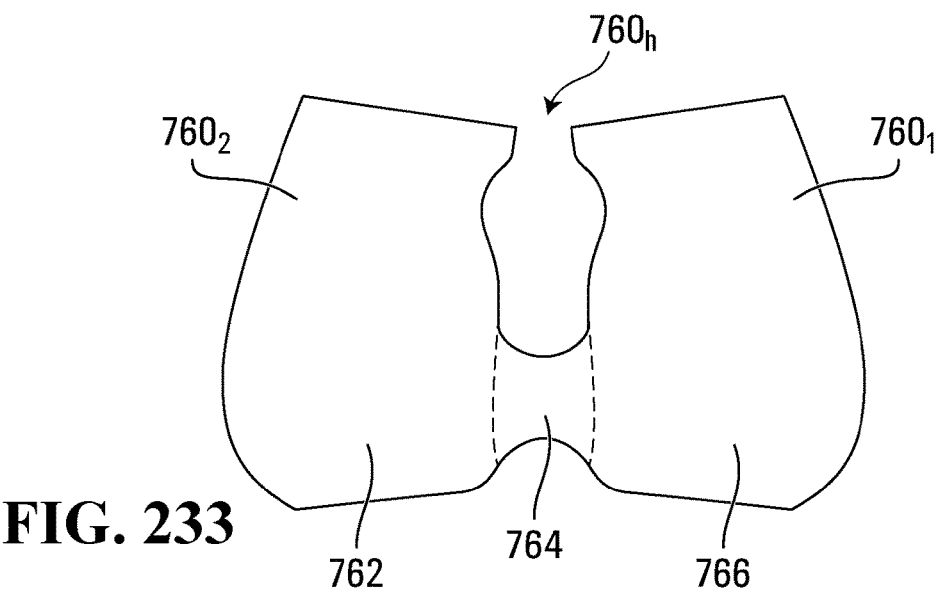

In some embodiments, as shown in FIGS. 232 and 233, the skate boot 22 may comprise a heel-locking member 756 projecting forwardly above a rearwardly-projecting part of the heel HL of the foot 11 to keep the heel HL of the user in place in the skate boot 22. The heel-locking member 756 creates a protuberance 766 in the cavity receiving the foot 11 of the user above the heel HL and helps keeping the foot 11 of the user tightly into place.

In this example, the heel-locking member 756 comprises a heel-locking pad $760_h$. In some embodiments, the heel-locking pad $760_h$ may have a dimension in a heightwise direction of the skate boot 22 that is sufficiently low to create a sort of cup to keep the heel HL of the user in place in the skate boot 22, while the ankle pads $760_1$, $760_2$ may have a dimension in the heightwise direction of the skate boot 22 that is sufficiently great to provide padding to the ankle of the user. For instance, in this embodiment, the dimension of the heel-locking pad $760_h$ in the heightwise direction of the skate boot 22 may be less than the dimension of the lateral ankle pad $760_1$ in the heightwise direction of the skate boot 22 and less than the dimension of the medial ankle pad $760_2$ in the heightwise direction of the skate boot 22.

The heel-locking pad $760_h$ may be integrally made with the lateral and medial ankle pad $760_1$, $760_2$, such that the heel-locking pad $760_h$ and the ankle pads $760_1$, $760_2$ constitute a single continuous padding member. In this embodiment, the heel locking pad $760_h$ comprising a medial portion 762, a lateral portion 766 and a bridge portion 764 linking the portions 762 and 766 to one another and configured to form the protuberance above the heel HL of the user.

In other embodiments, the heel-locking pad $760_h$, the lateral ankle pad $760_1$ and the medial ankle pad $760_2$ are separate from one another.

A material of the heel-locking pad $760_h$ may be soft enough (e.g., so that it can deform and does not prevent the foot 11 of the user from entering the cavity of the skate boot 22 and does not cause excessive pressure in use). In some embodiments, the material of the heel-locking pad $760_h$ may be softer or less stiff than a foam or other material of an underlying one of the subshells $85_1$-$85_I$ of the skate boot 22. For instance, the material of the heel-locking pad $760_h$ may comprise foam.

In other embodiments, the heel locking padding may have other configurations, e.g., the heel locking pad $760_h$ may be devoid of any one of the portions 762 and 766, and the heel locking padding may comprise more than one heel locking pad.

As another example, in some embodiments, instead of being injection molded in the molding apparatus 150 as discussed above, one or more of the subshells $85_1$-$85_L$ of the shell 30 of the skate boot 22 may be formed differently in the molding apparatus. For instance, one or more of the subshells $85_1$-$85_L$ of the shell 30 of the skate boot 22 may be molded in a mold of the molding apparatus 150 using pellets (e.g., beads) of polymeric material (e.g., polypropylene, polyethylene, etc.) that are expanded and cured in the mold to create foam. In order to form a subshell $85_i$, the beads may be combined with a blowing agent and/or comprise two or more constituents of a given polymeric material $M_x$ which chemically react when combined to polymerize and optionally release heat. In some cases, to initiate and/or to maintain an expansion and/or polymerization reaction, heat, such as by steaming, electromagnetic radiation and/or acoustic radiation, may be applied to the beads to make them foam. After expansion and/or polymerization, the subshell $85_i$ is formed and has a shape generally corresponding to the shape of the mold. In this example, the mold cavity is filled with a pre-determined quantity of beads and the mold may be closed prior to polymerisation, such that there is substantially no flow. In other examples, the beads may be injected into the mold through a mold injection gate, prior to or during polymerization of the beads.

As another example, in some embodiments, as shown in FIGS. 234 to 241, the skate boot 22 may comprise zones $810_1$-$810_z$ comprising different materials $M_{i1}$-$M_{im}$ which have different characteristics (e.g., stiffness, density, etc.) and thus imparting different characteristics to these zones $810_1$-$810_z$ of the skate boot 22.

Figure 234:
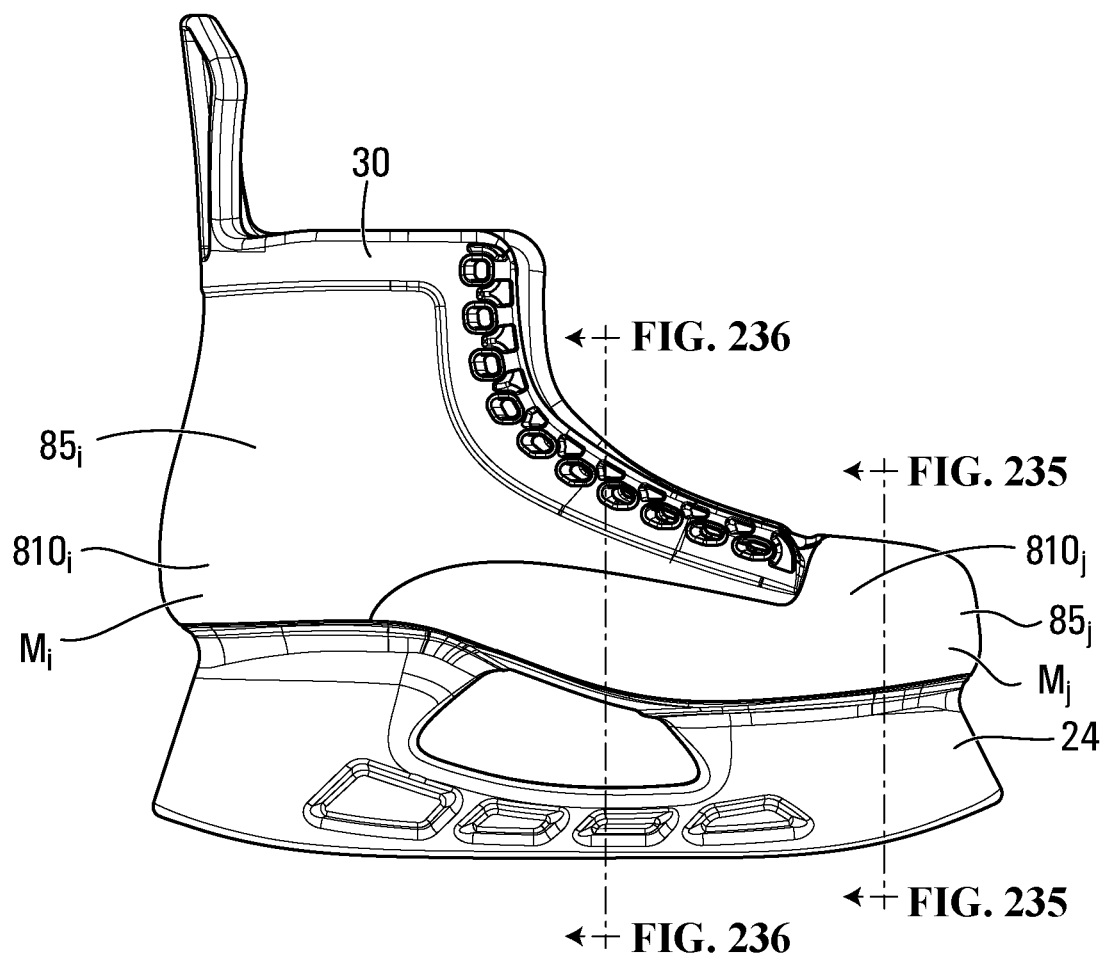
FIGS. 234 to 236 show an example of variant in which a given subshell covers a zone of the shell but does not cover another zone of the shell.
Figure 235:
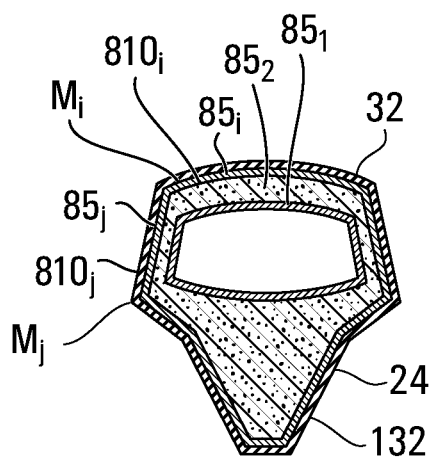
Figure 236:
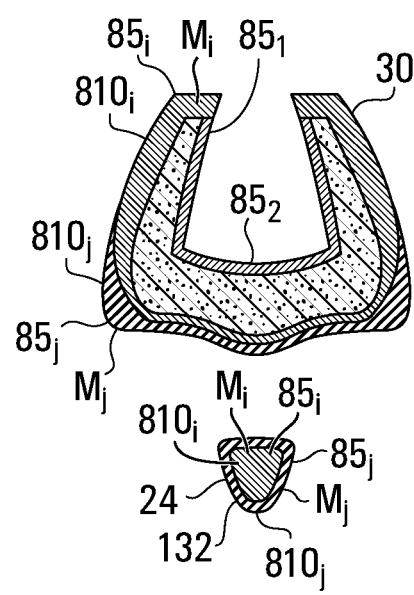

For instance, in some embodiments, as shown in FIGS. 234 to 236, a subshell $85_i$ may only cover a given zone $810_j$ of the skate boot 22. This may be achieved, for instance, by using a female mold that prevents material $M_j$ of the subshell $85_j$ from flowing to the zones that are not covered by the subshell 85i during manufacturing of the skate 10.

Figure 237:
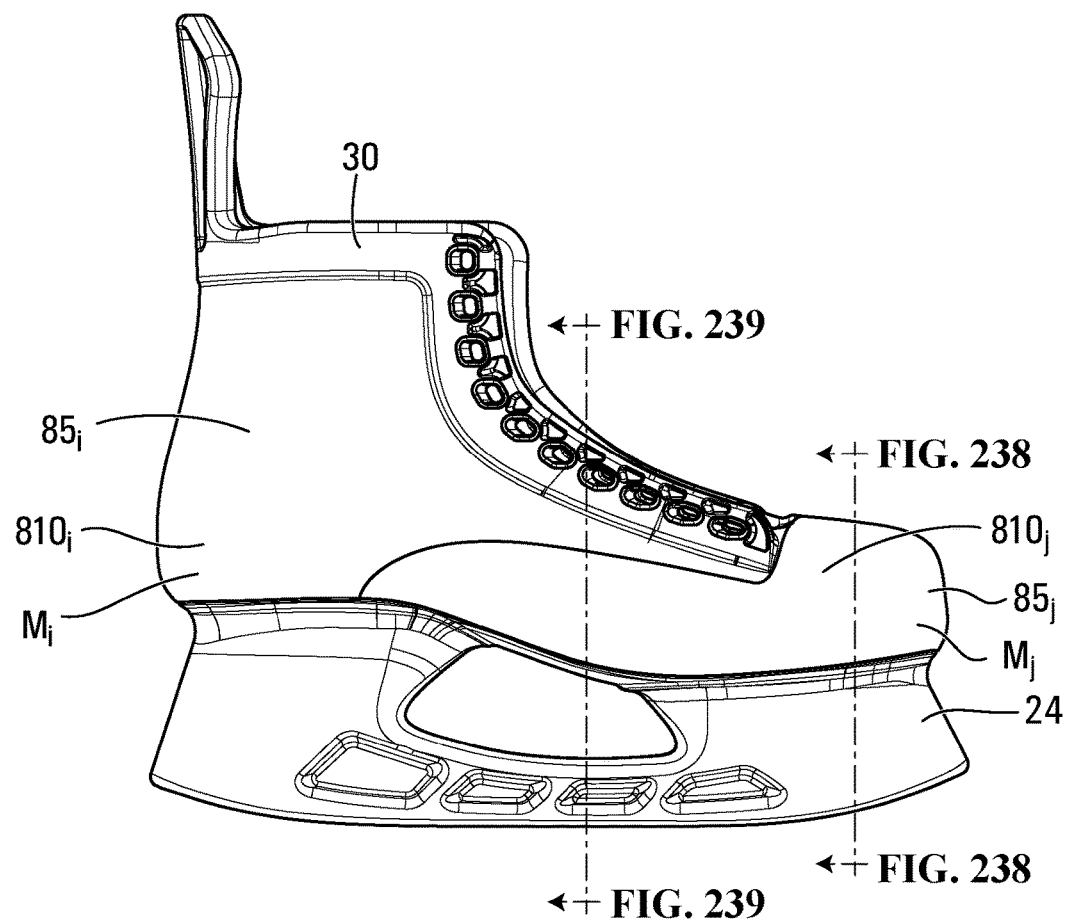
FIGS. 237 to 239 show an example of variant in which a given subshell comprises a plurality of different materials covering different zones of the subshell.
Figure 238:
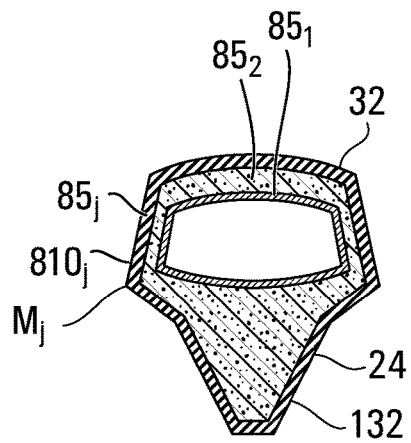
Figure 239:
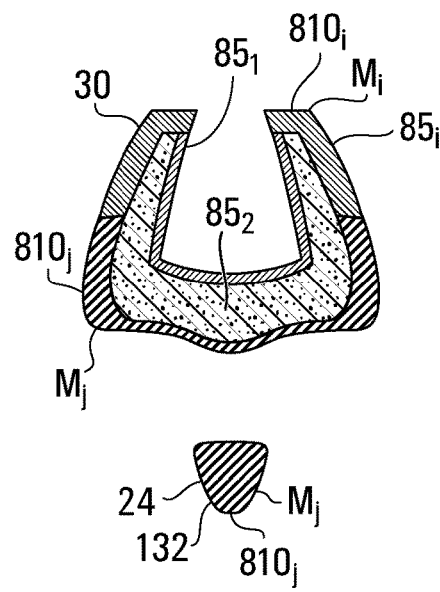
Figure 240:
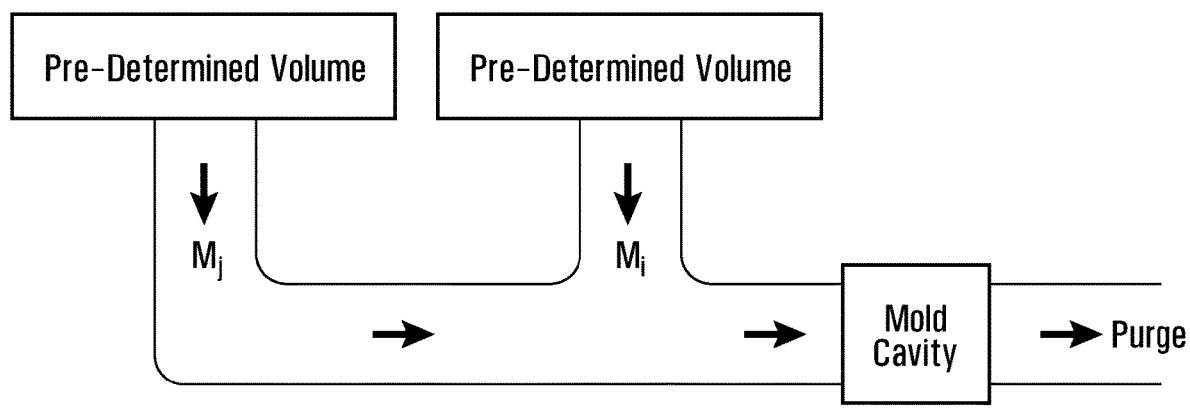
FIGS. 240 and 241 show examples of apparatus for manufacturing the given subshell of FIGS. 237 to 239.
Figure 241:
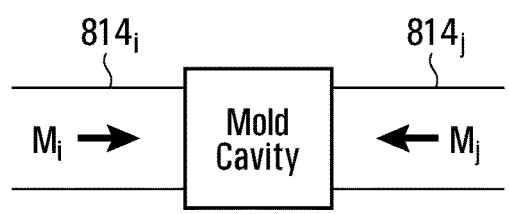

In some embodiments, as shown in FIGS. 237 to 239, a subshell $85_i$ may comprise different materials $M_1$-$M_m$ covering different zones $810_1$-$810_z$ of the skate boot 22. In this example, the different materials $M_1$-$M_m$ of the subshell $85_i$ are disposed adjacent to one another in a direction of extent of the subshell $85_i$ that is normal to a thicknesswise direction of the subshell $85_i$. For example, the subshell $85_i$ may comprise the materials $M_i$, $M_j$ covering the zones $810_i$, $810_j$ of the subshell $85_i$. This may be achieved, for instance, by subsequently injecting predetermined volumes of materials $M_i$, $M_j$ in the mold cavity, such the first injected material $M_i$ gets pushed by the subsequently injected material $M_j$ to the zone $810_i$ of the subshell $85_i$, while the material $M_j$ remains in the zone $810_j$ of the subshell $85_i$, as shown in FIG. 240. In other embodiments, this may be achieved by injecting the materials $M_i$, $M_j$ simultaneously in the zones $810_i$, $810_j$ of the subshell $85_i$ using different input channels $814_i$, $814_j$ located towards the respective zones $810_i$, $810_j$ of the subshell $85_i$, as shown in FIG. 241.

The materials $M_i$, $M_j$ covering the zones $810_i$, $810_j$ may provide characteristics (e.g., stiffness, weight, etc.) to the skate boot 22 by having properties (e.g., rigidity, density, color, etc.) varying more or less amongst the materials $M_i$, $M_j$. For instance, in some embodiments, a ratio of a density of the material $M_i$ over a density of the material $M_j$ may be less than 0.25, in some embodiments between 0.25 and 0.5, in some embodiments between 0.5 and 0.75, in some embodiments between 0.75 and 1, in some embodiments between 1 and 2, in some embodiments between 2 and 4, in some embodiments even more. Similarly, in some embodiments, a ratio of a modulus of elasticity of the material $M_i$ over a modulus of elasticity of the material $M_j$ may be less than 0.25, in some embodiments between 0.25 and 0.5, in some embodiments between 0.5 and 0.75, in some embodiments between 0.75 and 1, in some embodiments between 1 and 2, in some embodiments between 2 and 4, in some embodiments even more.

The materials $M_i$, $M_j$ may be any suitable materials. For instance, in some embodiments, the materials $M_i$, $M_j$ are polymeric materials. More particularly, in some embodiments, the materials $M_i$, $M_j$ are foams. In some embodiments, the materials $M_i$, $M_j$ may be composite materials, resins, plastics, and so on. In some embodiments, also, the materials $M_i$, $M_j$ may be different kind of materials (e.g. a foam and a plastic material).

As another example, in some embodiments, one or more of the subshells $85_1$-$85_3$ may be formed differently than by molding by flowing. For instance, the one or more of the subshells $85_1$-$85_3$ may be thermoformed. For example, one or more of the subshells $85_1$-$85_3$ may be formed using a sheet of material that is heated and molded over (e.g., pressed onto) a last. The one or more of the subshells $85_1$-$85_3$ may be affixed to underlying ones and/or overlying ones of the subshells $85_1$-$85_3$ by any suitable means, such as may mechanical interlock, by fastening, etc. As another example, one or more of the subshells $85_1$-$85_3$ may be formed using a sheet of material that is heated and molded over an underlying one of the subshells $85_1$-$85_3$ that is already formed.

In some embodiments, the thermoformed subshell $85_i$ may cover an entirety of the surface of the shell 30. In this case, the thermoformed subshell $85_i$ substantially covers every portion of the user's foot 11 that is covered by the shell 30. In other embodiments, the thermoformed subshell $85_i$ may cover a portion of the skate boot 22; that is, the thermoformed subshell $85_i$ covers some, but not all, portions of the user's foot 11 that are covered by the shell 30. For instance, the thermoformed subshell $85_i$ may comprise a toe cap that is thermoformed and incorporated in the shell 30 while the remainder of the shell 30 is molded by flowing.

The thermoformed subshell $85_i$ may be provided at any stage of the manufacturing process of the skate boot 22. For instance, in some embodiments, the thermoformed subshell $85_i$ is provided and attached to the last 152 (e.g., by fastening) before the internal subshell $85_1$ is produced. In some embodiments, the thermoformed subshell $85_i$ is provided and attached to the remainder of the shell 30 after the remainder of the shell 30 is produced (e.g., by a molding by flowing process) by any suitable means, such as by being stitched or fastened to an underlying subshell $85_y$. In some embodiments, the thermoformed subshell $85_i$ is provided after some, but not all, of the subshells $85_1$-$85_L$ are produced (e.g., by a molding by flowing process). In this example, the thermoformed subshell $85_i$ may be attached to (e.g., by being stitched to, by being fastened to) an underlying one of the subshells $85_1$-$85_L$ already molded.

For instance, in some embodiments, the thermoformed subshell $85_i$ may be the insole 40, as shown in FIGS. 62 to 64.

Figure 242:
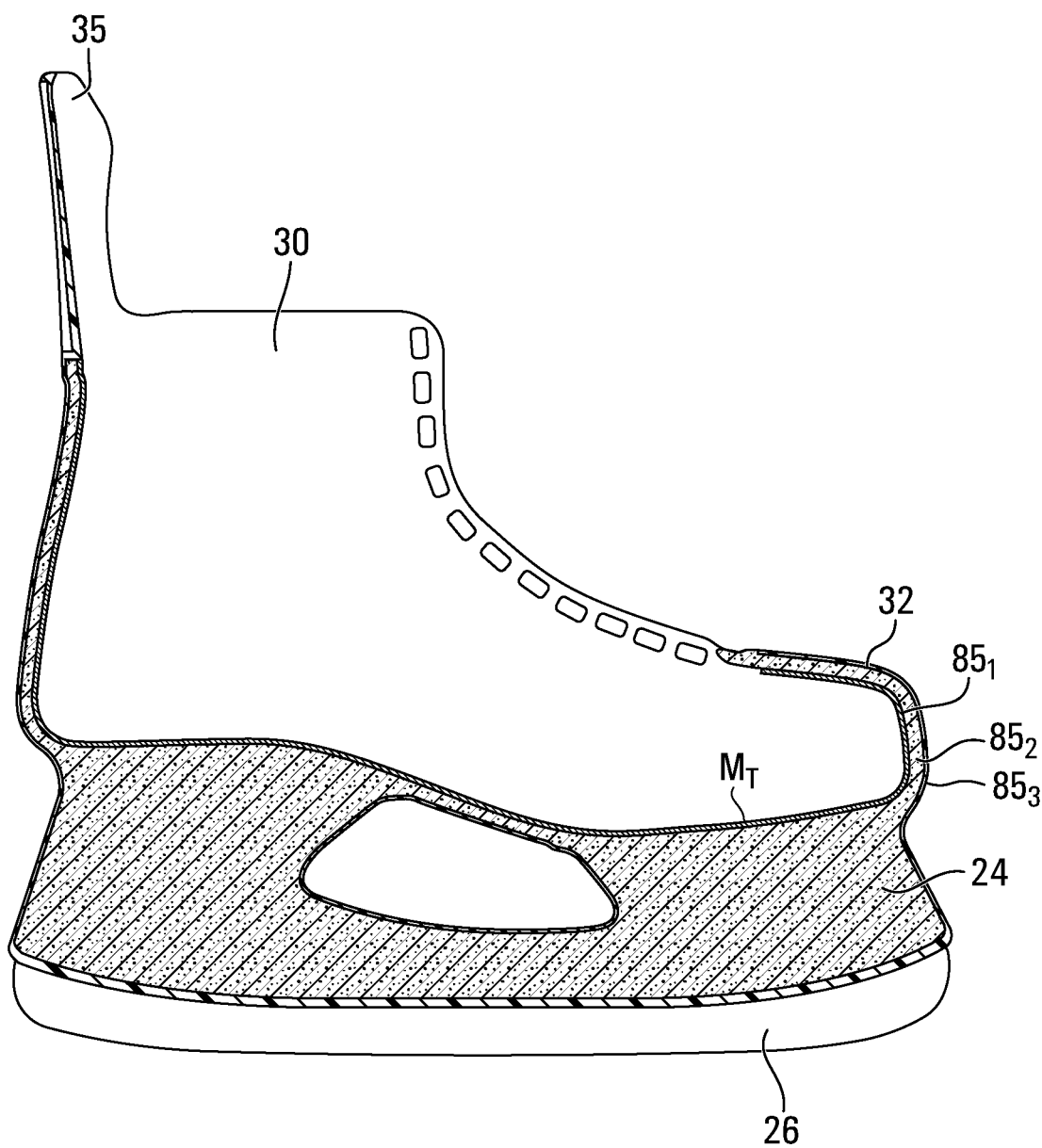
FIG. 242 shows an example of a variant in which one or more of the subshells comprises a thermoformable memory-shape material.

As another example, in some embodiments, as shown in FIG. 242 one or more of the subshells $85_1$-$85_3$ may be thermoformable, as described in U.S. patent application Ser. No. 14/867,962, which is incorporated herein. For instance, one or more of the polymeric materials $M_1$-$M_N$ of the shell 30 may be thermoformable such that, prior to use, the skate boot 22 may be heated to a first temperature $T_1$, the user may wear the heated skate boot 22 in a relatively tight manner such that the user's foot 11 compresses and impart its shape to the skate boot 22 and the polymeric materials $M_1$-$M_N$ of the shell 30. This may allow, notably, a more customizable fit.

In this embodiment, the thermoformable material $M_T$ might preserve physical properties such as rigidity after the thermoformable material $M_T$ is thermoformed to conform to the user's foot 11. For instance, after the thermoformable material $M_T$ is thermoformed to conform to the user's foot 11, the thermoformable material $M_T$ may have a modulus of elasticity and a yield strength. The thermoformable material $M_T$ may thus deform when subject to a load and may regain its shape imparted by the thermoforming process to conform to the user's foot 11 after load is removed.

In some embodiments, the thermoformable material $M_T$ may be a shape-memory material. That is, after the thermoformable material $M_T$ is thermoformed, the thermoformable material $M_T$ may be heated to a temperature $T_2$ to expand and regain an original shape, i.e., the shape of the thermoformable material $M_T$ before the thermoforming process having imparted the shape of the user's foot 11 to the skate boot 22 and to the material $M_T$.

In some embodiments, after the thermoformable material $M_T$ is heated to a temperature $T_2$ to expand and regain an original shape, the thermoformable material $M_T$ may again be thermoformed such that the user's foot 11 compresses and impart its shape to the skate boot 22 and the polymeric materials $M_1$-$M_N$ of the shell 30.

The temperature $T_2$ may be equal or greater (i.e. hotter) than the temperature $T_1$. That is, in some embodiments, the temperature $T_2$ may be approximately equal to the temperature $T_1$. In some embodiments, the temperature $T_2$ may be at least 50° C. warmer than the temperature $T_1$, in some embodiments at least 100° C. warmer, in some embodiments at least 200° C., in some embodiments even more.

The temperature $T_1$ may be low enough to ensure that the user's foot 11 compressing the skate boot 22 during thermoforming does not get burnt. For example, in some embodiments, the temperature $T_1$ may be no more than 100° C., in some embodiments no more than 80° C., in some embodiments no more than 60° C., in some embodiments even less.

The thermoformable material $M_T$ may be of any nature. For instance, in this embodiment, the thermoformable material $M_T$ comprises a polymeric material. More specifically, in this embodiment, the thermoformable material $M_T$ comprises a foam material.

In this embodiment, the thermoformable subshell comprising the thermoformable material $M_T$ is the internal subshell 85₁. In some embodiments, the pads 760₁-760ₚ may comprise the thermoformable material $M_T$.

As another example, in some embodiments, the skate boot 22 may be made using any other manufacturing processes, including conventional ones (e.g., using a conventional lasting machine, thermoforming, etc.), while including one or more features discussed herein, such as, for example, the heel-locking member 756, the graphic elements 121 on the toe cap 32, an overmolded connection for the tendon guard 35, etc.

Figure 243:
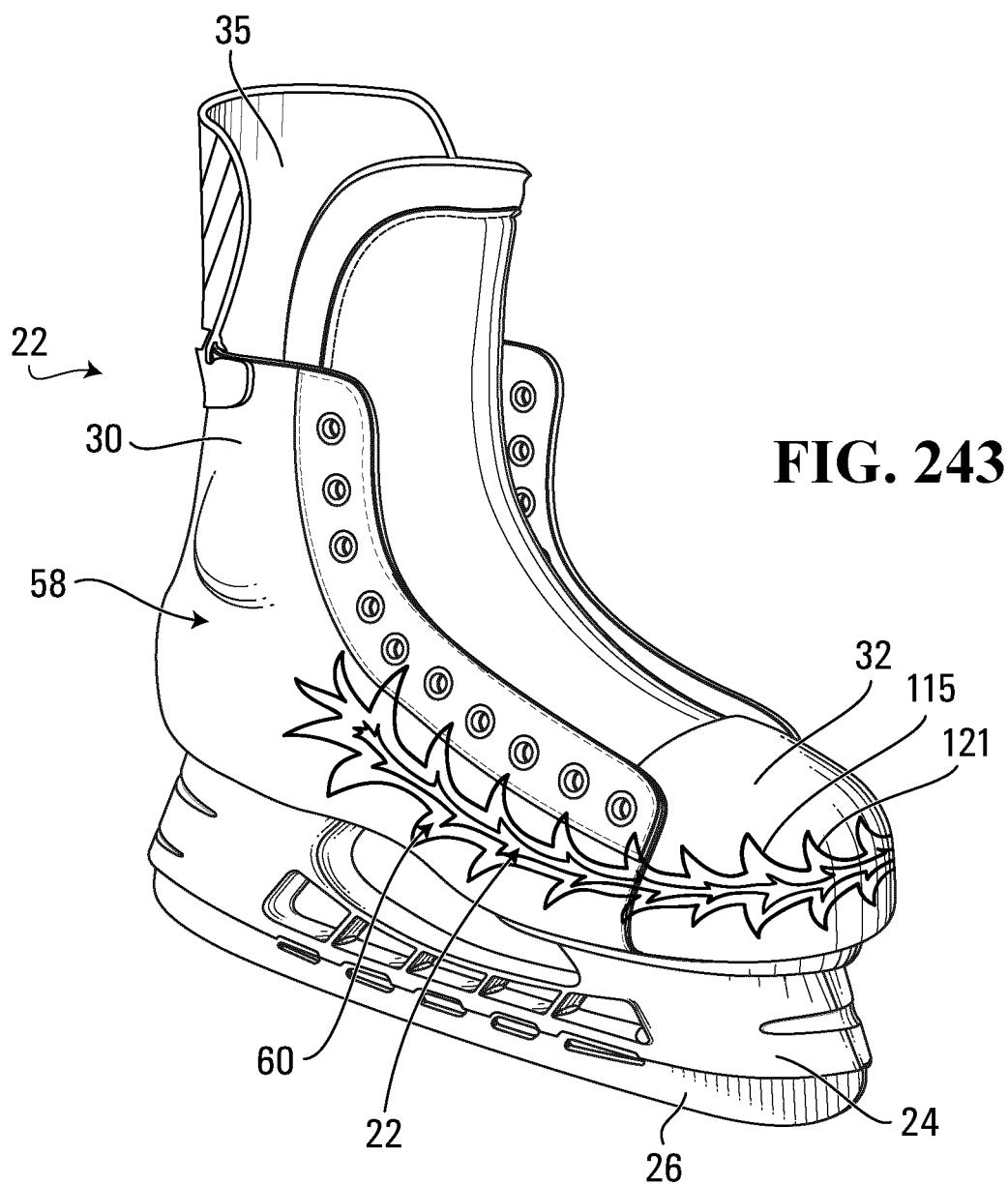
FIG. 243 shows an example of a variant in which the skate boot comprises a toe cap and a graphic element occupying a significant portion of a surface of the toe cap.

For instance, in some embodiments, as shown in FIG. 243, the skate boot 22 is made using a standard toe cap 32 which is not integrally made with the shell 30 of the skate boot 22. In this embodiment, the skate boot 22 comprises one or more design elements 121 which may be disposed over various portions of the shell 30 and/or over various other portions of the skate boot 22, for instance over the medial side portion 68 of the shell 30, over the lateral side portion 66 of the shell 30, over a top portion of the shell 30, and so on, and may also be disposed over the toe cap 32, over the tongue 34, over the tendon guard 35, over the liner 36, over the footbed 38, over the insole 40, over the lace members 44₁, 44₂, over the eyelets 46₁-46ₑ, and so on. For instance, the design elements 121 may be disposed at least on a side of the toe cap 32. In this example, the design elements 121 are disposed on a medial side, on a lateral side and on a top side of the toe cap 32.

The design elements 121 may cover at least a substantial part (i.e., a substantial part or an entirety) of a surface area of the toe cap 32 that is externally visible (i.e., visible from outside of the skate boot 22). For instance, in some embodiments, the design elements 121 covers at least a quarter (i.e., 25%), in some embodiments at least a third (i.e., 33%), in some embodiments at least a majority (i.e., at least 50%), in some embodiments at least 75%, and in some embodiments an entirety of the toe cap 32.

Some of the design elements 121 may also be continuous with other design elements 121 of adjacent portions of the skate boot 22. That is, there may be a continuity of the design element 121 between the toe cap 32 of the skate boot 22 and a given one of the medial side portion 68 of the shell 30 and the lateral side portion 66 of the shell 30, thus providing an impression that the design elements 121 extend from a given one of the toe cap 32, the medial side portion 68 and the lateral side portion 66 to another one of the toe cap 32, the medial side portion 68 and the lateral side portion 66. In this embodiment, there is continuity of design elements 121 between the toe cap 32 of the skate boot 30, the medial side portion 68 of the shell 30 and the lateral side portion 66 of the shell 30.

In this embodiment, an external clear layer may be applied over the design elements 121 such that the design elements 121 are visible through the clear layer and such that the clear layer protects the design elements 121 from flying pucks, sticks, etc.

The design elements 121 may include a design pattern, a printed image, and so on. In this embodiment, the design element is a graphic element which includes one or many different colors.

Although in embodiments considered above the skate 10 is designed for playing ice hockey on the skating surface 14 which is ice, in other embodiments, the skate 10 may be constructed using principles described herein for playing roller hockey or another type of hockey (e.g., field or street hockey) on the skating surface 14 which is a dry surface (e.g., a polymeric, concrete, wooden, or turf playing surface or any other dry surface on which roller hockey or field or street hockey is played). Thus, in other embodiments, instead of comprising the blade 26, the skating device 28 may comprise a wheel holder holding a set of wheels to roll on the dry skating surface 14 (i.e., the skate 10 may be an inline skate or other roller skate). The wheel holder may be constructed using principles discussed herein in respect of the blade holder 24. Moreover, in other embodiments, the skate 10 may be a figure skate constructed using principles described herein for figure skating.

Figure 245:
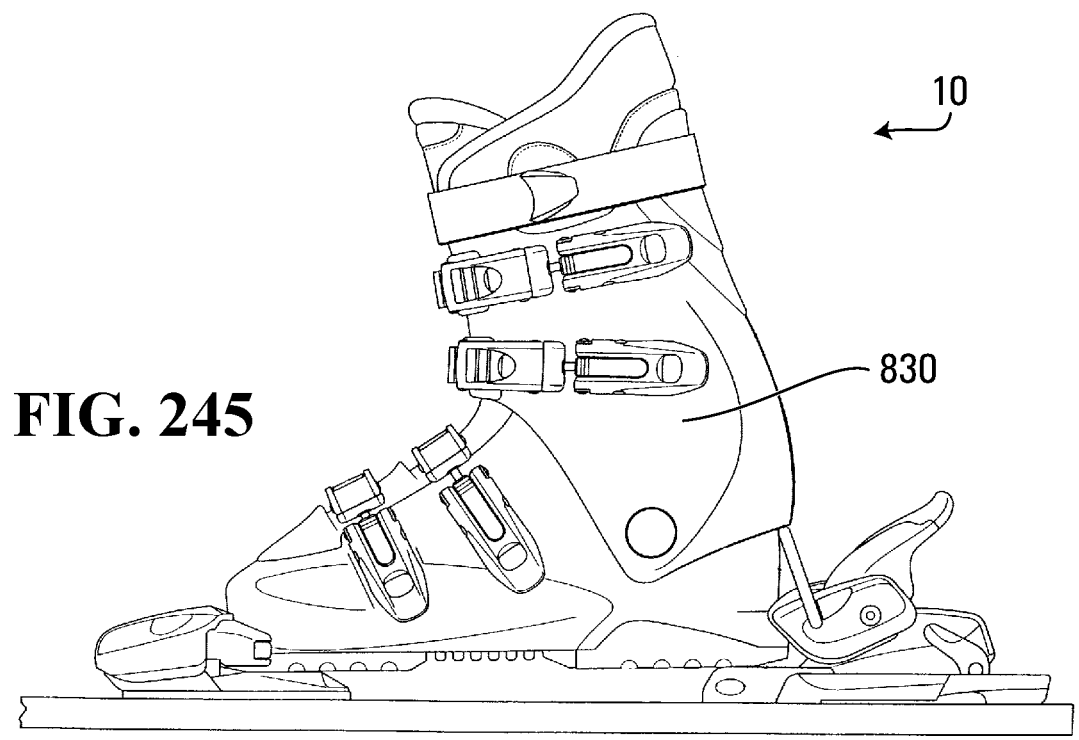
FIGS. 245 to 249 show examples of variants in which the footwear is a ski boot, a work boot, a snowboard boot, a sport cleat or a hunting boot.
Figure 246:
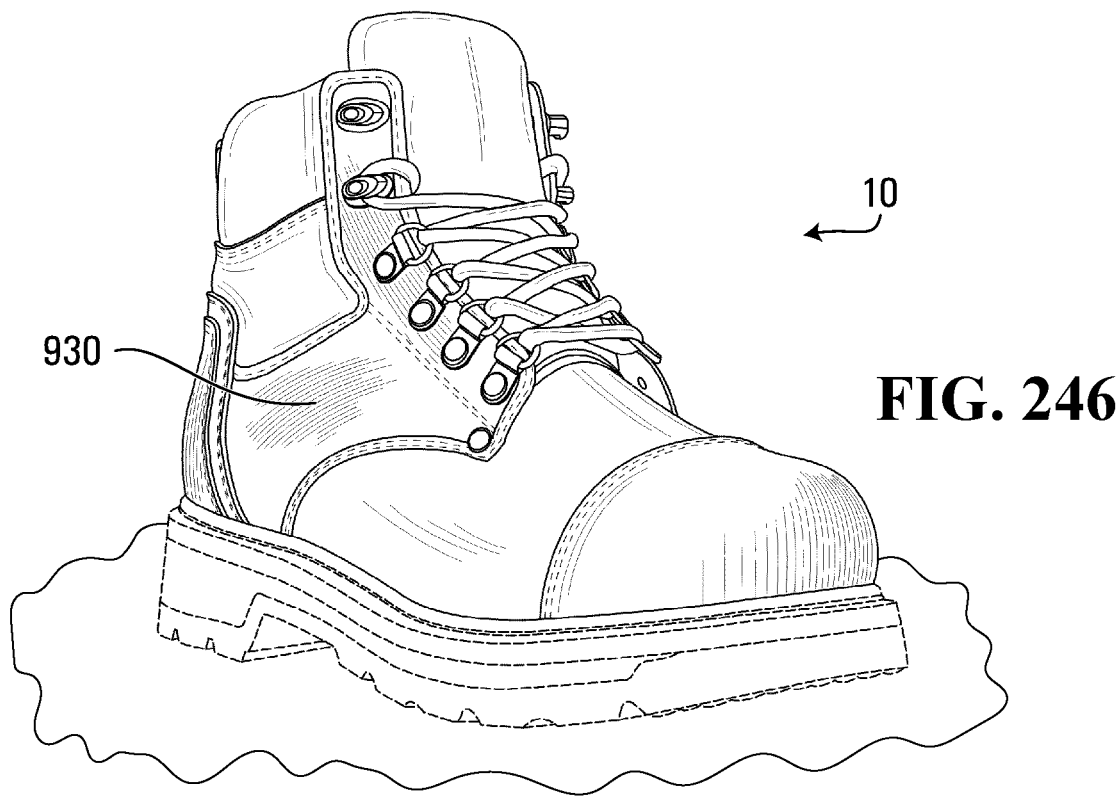
Figure 247:
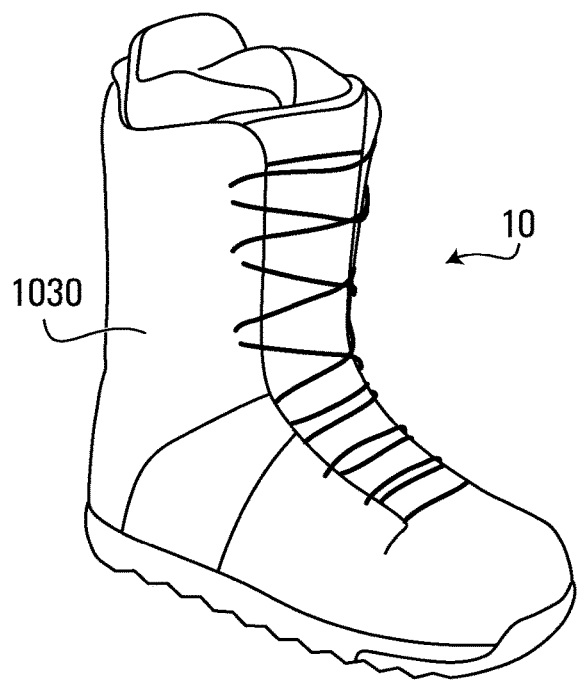
Figure 248:
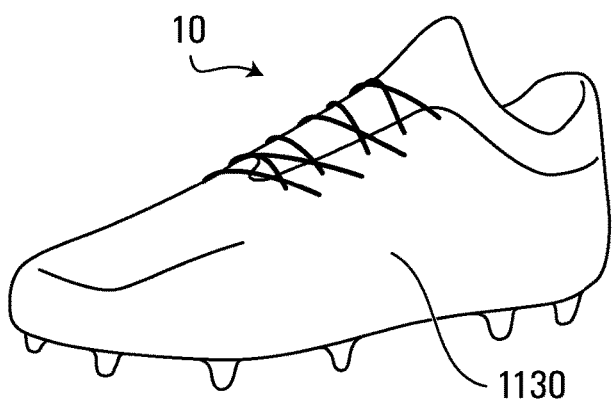
Figure 249:

Furthermore, although in embodiments considered above the footwear 10 is a skate for skating on the skating surface 14, in other embodiments, the footwear 10 may be any other suitable type of footwear. For example, as shown in FIG. 245, the footwear 10 may be a ski boot comprising a shell 830 which may be constructed in the manner described above with respect to the shell of the skate. In particular, the ski boot 10 is configured to be attachable and detachable from a ski 802 which is configured to travel on a ground surface 8 (e.g., snow). To that end, the ski boot 10 is configured to interact with an attachment mechanism 800 of the ski 802. In another example, as shown in FIG. 246, the footwear 10 may be a boot (e.g., a work boot or any other type of boot) comprising a shell 930 which can be constructed in the manner described above with respect to the shell of the skate. In another example, as shown in FIG. 247, the footwear 10 may be a snowboard boot comprising a shell 1030 which can be constructed in the manner described above with respect to the shell of the skate. In another example, as shown in FIG. 248, the footwear 10 may be a sport cleat comprising a shell 1130 which can be constructed in the manner described above with respect to the shell of the skate. In another example, as shown in FIG. 249, the footwear 10 may be a hunting boot comprising a shell 1230 which can be constructed in the manner described above with respect to the shell of the skate.

In some embodiments, any feature of any embodiment described herein may be used in combination with any feature of any other embodiment described herein.

Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

In describing the embodiments, specific terminology has been resorted to for the sake of description but this is not intended to be limited to the specific terms so selected, and it is understood that each specific term comprises all equivalents.

In case of any discrepancy, inconsistency, or other difference between terms used herein and terms used in any document incorporated by reference herein, meanings of the terms used herein are to prevail and be used.

Although various embodiments have been illustrated, this was purposes of describing, but should not be limiting. Various modifications will become apparent to those skilled in the art.

The invention claimed is:

1. A skate boot for a skate, the skate boot being configured to receive a foot of a user and comprising:
   a body comprising a medial side portion configured to face a medial side of the user's foot, a lateral side portion configured to face a lateral side of the user's foot, and an ankle portion configured to receive an ankle of the user; and a tendon guard configured to face an Achilles tendon of the user, extending upwardly from the body of the skate boot, and affixed to the body of the skate boot by overmolding;

wherein: the body of the skate boot comprises a plurality of injection-molded layers; the medial side portion, the lateral side portion, and the ankle portion of the body of the skate boot are injection molded integrally with one another; the body of the skate boot is overmolded onto the tendon guard such that a given one of the injection-molded layers extends into an interlocking hollow space of the tendon guard; and an overlying one of the injection-molded layers overlies the given one of injection-molded layers where the given one of the injection-molded layers extends into the interlocking hollow space of the tendon guard.

2. The skate boot of claim 1, wherein the injection-molded layers include different injection-molded materials.

3. The skate boot of claim 1, wherein the interlocking hollow space includes a hole.

4. The skate boot of claim 1, wherein the interlocking hollow space includes a recess.

5. The skate boot of claim 1, wherein the interlocking hollow space comprises a plurality of voids.

6. The skate boot of claim 5, wherein the voids include holes.

7. The skate boot of claim 5, wherein the voids include recesses.

8. The skate boot of claim 1, wherein a lower portion of the tendon guard is affixed to the body of the skate boot by overmolding and an upper portion of the tendon guard is free of overmolding.

9. The skate boot of claim 1, wherein a material of the tendon guard is different from an injection-molded material of the given one of the injection-molded layers at an overmold.

10. The skate boot of claim 9, wherein the material of the tendon guard is less stiff than the injection-molded material.

11. The skate boot of claim 1, comprising a fabric between the tendon guard and the body of the skate boot.

12. The skate boot of claim 11, wherein the fabric is a woven fabric.

13. The skate boot of claim 11, wherein the fabric is a nonwoven fabric.

14. A skate comprising the skate boot of claim 1.

15. A skate boot for a skate, the skate boot being configured to receive a foot of a user and comprising:
   a body comprising a medial side portion configured to face a medial side of the user's foot, a lateral side portion configured to face a lateral side of the user's foot, and an ankle portion configured to receive an ankle of the user that are formed integrally with one another, the body of the skate boot including a plurality of injection-molded layers; and
   a tendon guard configured to face an Achilles tendon of the user, extending upwardly from the body of the skate boot, and affixed to the body of the skate boot by overmolding of a given one of the injection-molded layers onto the tendon guard;

wherein: the given one of the injection-molded layers extends into an interlocking hollow space of the tendon guard; an overlying one of the injection-molded layers overlies the given one of the injection-molded layers where the given one of the injection-molded layers extends into the interlocking hollow space of the tendon guard; and an injection-molded material of the given one of the injection-molded layers is different from an injection-molded material of the overlying one of the injection-molded layers.

16. The skate boot of claim 15, wherein the injection-molded material of the given one of the injection-molded layers is at least one of stiffer and denser than the injection-molded material of the overlying one of the injection-molded layers.

17. The skate boot of claim 15, wherein the interlocking hollow space includes a hole.

18. The skate boot of claim 15, wherein the interlocking hollow space includes a recess.

19. The skate boot of claim 15, wherein the interlocking hollow space comprises a plurality of voids.

20. The skate boot of claim 19, wherein the voids include holes.

21. The skate boot of claim 19, wherein the voids include recesses.

22. The skate boot of claim 15, wherein an upper portion of the tendon guard above the interlocking hollow space is free of overmolding.

23. The skate boot of claim 15, comprising a fabric between the tendon guard and the body of the skate boot.

24. The skate boot of claim 23, wherein the fabric is a woven fabric.

25. The skate boot of claim 23, wherein the fabric is a nonwoven fabric.

26. A skate comprising the skate boot of claim 15.

27. A skate boot for a skate, the skate boot being configured to receive a foot of a user and comprising:
   a body comprising a medial side portion configured to face a medial side of the user's foot, a lateral side portion configured to face a lateral side of the user's foot, and an ankle portion configured to receive an ankle of the user; and
   a tendon guard configured to face an Achilles tendon of the user, extending upwardly from the body of the skate boot, and affixed to the body of the skate boot by overmolding;

wherein: the body of the skate boot comprises injection-molded material; the medial side portion, the lateral side portion, and the ankle portion of the body of the skate boot are injection molded integrally with one another; the body of the skate boot is overmolded onto the tendon guard such that a given portion of the injection-molded material extends into an interlocking hollow space of the tendon guard and an overlying portion of the injection-molded material overlies the given portion of the injection-molded material where the given portion of the injection-molded material extends into the interlocking hollow space of the tendon guard; and an upper portion of the tendon guard above the interlocking hollow space of the tendon guard is free of overmolding.

* * * * *